(12) United States Patent
Nankaku

(10) Patent No.: US 6,496,848 B1
(45) Date of Patent: Dec. 17, 2002

(54) CONTROL METHOD FOR CONTROL SOFTWARE EXECUTION SYSTEM

(75) Inventor: Shigeki Nankaku, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 1298 days.

(21) Appl. No.: 08/568,289

(22) Filed: Dec. 6, 1995

(30) Foreign Application Priority Data

Dec. 26, 1994 (JP) .............................. 6-323233
Aug. 11, 1995 (JP) .............................. 7-205600

(51) Int. Cl.⁷ .............................................. G06F 9/00
(52) U.S. Cl. ...................................... 709/100; 709/102
(58) Field of Search ................... 395/673, 674, 395/800

(56) References Cited

U.S. PATENT DOCUMENTS

| | | | | |
|---|---|---|---|---|
| 4,034,353 A | * | 7/1977 | Denny et al. ............... | 364/200 |
| 4,231,106 A | * | 10/1980 | Heap et al. ................. | 364/900 |
| 4,601,008 A | * | 7/1986 | Kato .......................... | 364/900 |
| 4,845,615 A | * | 7/1989 | Blasciak ..................... | 364/200 |
| 5,168,566 A | * | 12/1992 | Kuki et al. ................. | 395/650 |
| 5,202,987 A | * | 4/1993 | Bayer et al. ................ | 395/650 |
| 5,386,561 A | * | 1/1995 | Huynh et al. .............. | 395/650 |
| 5,469,571 A | * | 11/1995 | Bunnell ..................... | 395/700 |
| 5,517,629 A | * | 5/1996 | Boland ...................... | 395/375 |
| 5,606,705 A | * | 2/1997 | Randall et al. ............. | 395/800 |

OTHER PUBLICATIONS

Ho et al, Real–Time Scheduling of Multiple Segment Tasks, COMPSAC pp. 680–686, 1990.*
Bernd Pol, "Betriebssysteme, eine Einführung", Elektronik 2/1981, pp. 43–56.
René Kuhn "Echtzeitbetriebssysteme auch für Mikrocomputer", Elektroniker, No. 6/1978, pp. EL6 to EL8.

* cited by examiner

Primary Examiner—Majid Banankhah
(74) Attorney, Agent, or Firm—Sughrue Mion, PLLC

(57) ABSTRACT

To insure that a task is started once and runs for a prespecified time previously allocated for the task, the real time operating system according to the present invention computes lapse of time from a current point of time, writes the computed lapse of time in a counter, and makes the task run after the period of time written in the counter has passed.

11 Claims, 75 Drawing Sheets

TASK RUNNING CYCLE TABLE

| TACK NAME | RUNNING CYCLE | TIMES OF REPETITION | |
|---|---|---|---|
| SERVO PROCESSING TASK | 2 0 | ∞ | ~50 |
| CORRECTION COMPUTING TASK | 5 0 | 1 | |
| PROGRAM ANALYSIS TASK | 1 0 0 | 2 | |
| DISPLAY TASK | 5 0 0 | ∞ | |
| ⋮ | ⋮ | ⋮ | |

231 TASK RUNNING TIME TABLE

| TASK NAME | TOTAL TICK NUMBER |
|---|---|
|  |  |
|  |  |
|  |  |

FIG. 31

250 TASK RUNNING STANDARD DATA

| TASK NAME | RUNNING RATE | TOTAL RUNNING TICK NUMBER |
|---|---|---|
| | | |
| | | |
| | | |

251
RUNNING TIME
DETERMINATION ALLOWANCE

252 RUNNING RATE DETERMINATION ALLOWANCE

| UPPER LIMIT | LOWER LIMIT |
|---|---|
| | |

F I G. 3 5
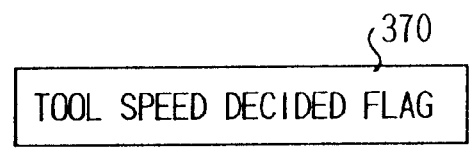
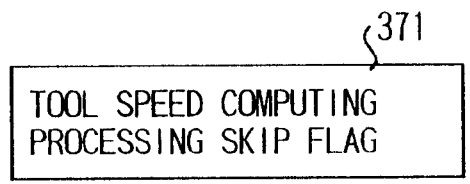
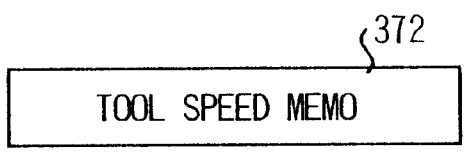
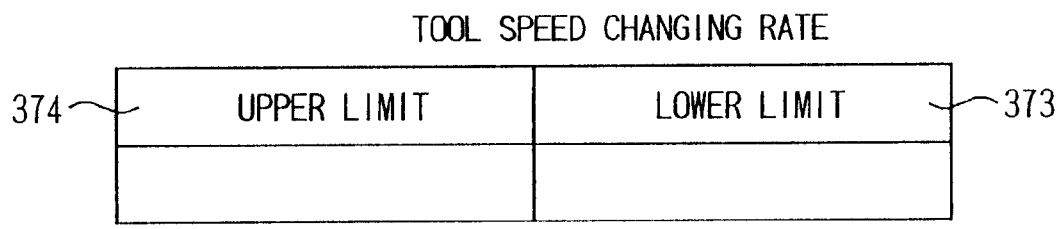

FIG. 37

```
                    ┌─────────────────┐ ╱380
                    │ MACHINING PROGRAM│
                    │  NUMBER MEMO    │
                    └─────────────────┘
```

381 MACHINING PROGRAM SCHEDULING TABLE

| MACHINING PROGRAM MEMO | TIMES |
|---|---|
|  |  |

382 MACHINING DEABLED PROGRAM MEMO

| MACHINING PROGRAM NUMBER |
|---|
|  |

FIG. 39

400 TASK STOP TABLE

| TASK NAME | STOP TICK NUMBER |
|---|---|
| | |

411

| TASK STOP INTERRUPT MEMO |
|---|

F I G. 5 5
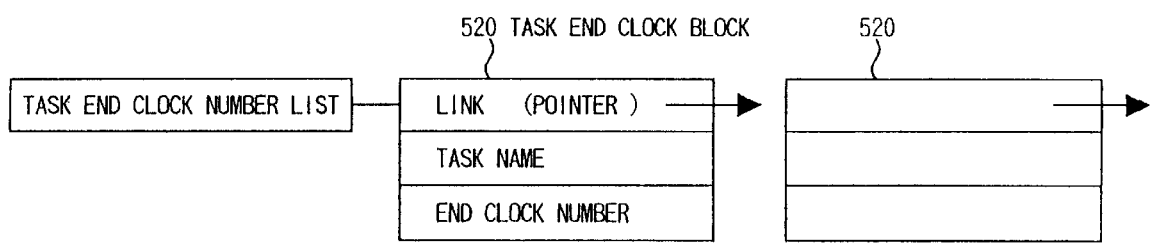
F I G. 5 6
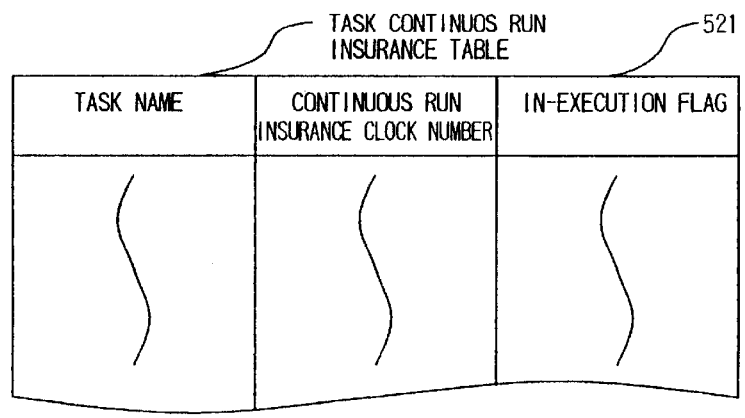

531 TASK RUNNING TIME TABLE

| TASK NAME | TOTAL CLOCK NUMBER |
|---|---|
|  |  |
|  |  |
|  |  |

FIG. 67

550 TASK RUNNING STANDARD DATA

| TASK NAME | RUNNING RATE | TOTAL RUNNING CLOCK NUMBER |
|---|---|---|
|  |  |  |
|  |  |  |
|  |  |  |

551

RUNNING TIME DETERMINATION ALLOWANCE

552 RUNNING RATE DETERMINATION ALLOWANCE

| UPPER LIMIT | LOWER LIMIT |
|---|---|
|  |  |

FIG. 69

| TASK NAME | STOP CLOCK NUMBER |
|---|---|
| | |

600 TASK STOP TABLE

611
TASK STOP CLOCK MEMO

FIG. 78A
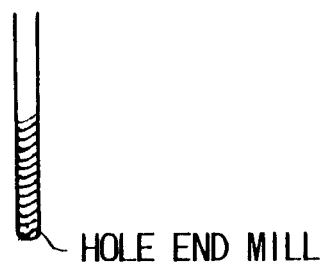
HOLE END MILL
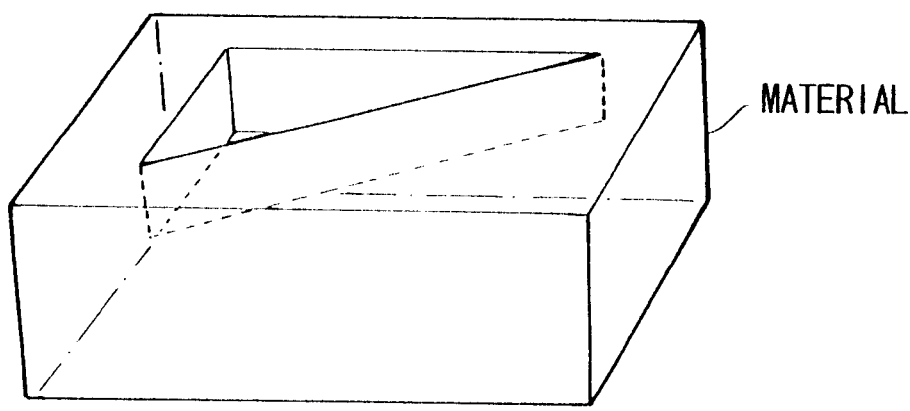
MATERIAL
FIG. 78B
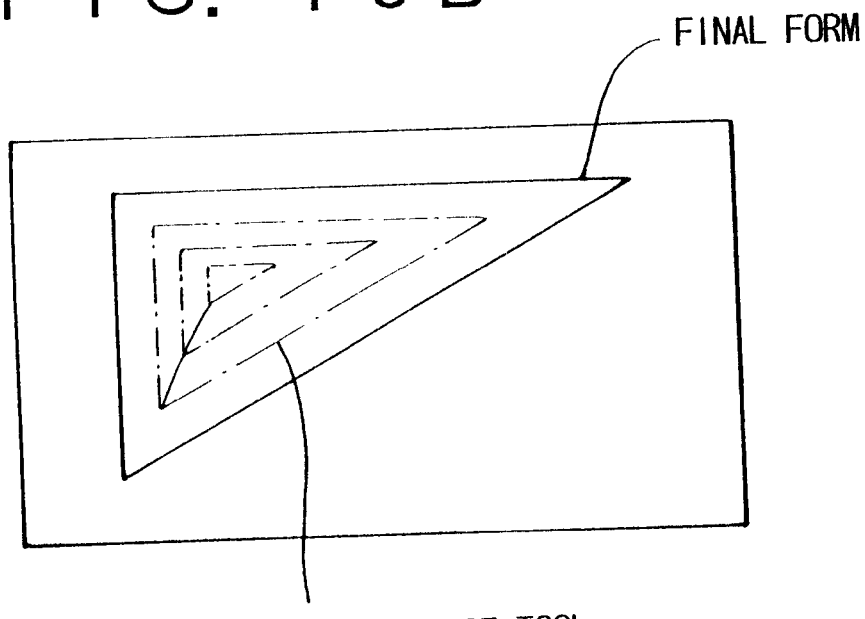
FINAL FORM
CENTRAL LOCUS OF TOOL

CONTROL METHOD FOR CONTROL SOFTWARE EXECUTION SYSTEM

FIELD OF THE INVENTION

The present invention relates to a control method for a control software execution system, and more particularly to a control method for a control software execution system for an NC unit for efficiently executing software (a control program) for controlling a numerical control unit (described as NC unit hereinafter).

BACKGROUND OF THE INVENTION

FIG. 73 is a block diagram showing general configuration of a control software execution system for a conventional type of NC unit, and in this figure the reference numeral 501 indicates an NC unit as a whole. Description is made hereinafter for general configuration of the conventional type of NC unit with reference to the hardware configuration in this NC unit 501.

In FIG. 73, designated at the reference numeral 1 is a main CPU for controlling operations of each section or executing computing required for numerical control, at 2 a system bus connecting section of the unit to each other, at 3 a ROM (non-volatile storage device) for storing control software or the like for realization of main functions of the NC unit 501, at 4 a RAM (volatile storage device) used for temporal data storage or as a work area.

Also in this figure, designated at the reference numeral 5 is a SIO interface section for transacting data with external devices by means of serial communications, at 6 a display unit for displaying a running state of the NC unit 501 or identifying an command given to the NC unit 501, at 7 a keyboard for giving commands to the NC unit 501 (input device), at 8 a servo control section for computing commands for controlling a servo motor. This servo control section 8 may comprise a dedicated CPU which is different from the main CPU 1.

Also in this figure, designated at the reference numeral 9 is a servo amplifier for electrically amplifying an command received from the servo control section 8 and driving a servo motor or a main shaft of machine tool (not shown), at 10 a servo motor for controlling a machining section of machine tool (not shown), at 11 a programmable control section (described as PC section hereinafter) for transacting data other than commands for servo control with the machine tool, at 12 a system clock (not shown) and an external interrupt signal inputted to the main CPU 1. The system clock is a clock signal for establishing synchronism for controlling the NC unit 501 as a whole. The external interrupt signal 12 is a signal for reporting an event (emergent state) such as power error or emergent stop to the main CPU 1.

Next, a description is made for operations. FIG. 74 is an explanatory view for explanation of a sequence for execution of analysis of a machining program for a control software execution system for the NC unit 501 shown in FIG. 73, and at first the main CPU 1 sequentially reads control software written in the ROM 3 via the system bus 2, and executes the contents.

In FIG. 74, in a machining program input processing 21, a machining program 20 is read via the SIO interface section 5 from the outside, and is stored in the RAM 4. Then, each block (a prespecified unit decided for each machining program to be inputted) is converted to internal data which can easily be processed internally.

Also in a correction computing processing 22, internal data for each block is processed and computed to obtain a travel. Also such parameters as a tool diameter or a tool length are corrected. Furthermore such operations as updation of internal coordinate values are executed. In a setting/display processing 23, various type of data for the NC unit 501 are displayed in the display unit 6. Also each of the various set-up data inputted by an operator using the keyboard 7 is stored in the RAM 4. In addition, in an interpolation processing 24, a travel for each shaft per minute time unit using a result of the correction computing processing 22.

In a servo processing 25, a result of the interpolation processing 24 is further converted to a travel for each shaft per minute time unit. Furthermore feedback control (not shown) is executed from a speed detector or a position detector (not shown herein) attached to the servo motor 10 or the machine tool (not shown) is executed. In a processing 26 by a programmable controller (described as PC hereinafter), control over peripheral devices around the machine tool such as input/output processing to and from the machine tool or the main shaft is executed.

As described above with reference to FIG. 73, the NC unit 501 can respond to an emergent state other than the normal processing flow such as emergency stop by receiving the external interrupt signal 12 and having interrupt processing executed. When the external interrupt signal 12 (Refer to FIG. 73) is inputted, the main CPU 1 executes a prespecified particular processing, and returns to the normal command after execution of the prespecified particular processing has been finished.

FIG. 75 is a concept view showing interrupt processing. In this figure, reference numerals 30 to 36 indicate a normal command, 37 to 40 indicate an interrupt command, and 41 indicates an command for return to normal command respectively. For instance, when an external interrupt signal 12 (Refer to FIG. 73) is inputted while the main CPU 1 executes a normal command 33, the main CPU 1 detects an interrupt after execution of the normal command 33, and starts execution of an interrupt command 37 specified previously. Then after execution of interrupt commands 37 to 40 is finished, the main CPU 1 executes the return command 41, returns to the normal command 34, and then executes normal commands 35, 36.

It should be noted that, if a time required for interrupt processing becomes longer, the possibility of multiple interrupt in which another interrupt is inputted during execution of interrupt processing becomes higher, and if any interrupt is inhibited during executing of interrupt processing, a quick response to an interrupt request becomes impossible, and for the reasons as described above it is desirable to make the time for interrupt processing as short as possible.

By the way, control software for the NC unit 501 has the features as described below.

At first, because of the variety of functions to be realized by the control software for the NC unit 501, a number of required software is very large, and many people are required to be involved in development of the software.

Secondly, a response time (turn around time, dead line) required for execution of each function of control software for the NC unit 501 is different. For instance, in the servo processing 25 (Refer to FIG. 74), if some delay occurs in computing a result of processing, cutting is stopped, a work becomes a defective product, so that real time processing is required. On the other hand, in such a processing as display on the display unit 6, even if some delay occurs, not trouble is generated, so that real time processing is not required.

Thirdly, a processing by control software for the NC unit 501 is not of a batch type, nor of a compiler type (in which an entire machining program is analyzed from its beginning to the end and then all the moving data for a servo is outputted at once), but of an interpreter type (in which a machining program is divided to several blocks, the blocks are analyzed one by one, and also the moving data for servo is outputted little by little).

Fourthly, there are many types of interrupt processing to be executed by the main CPU 1.

Because of these features, generally control software for the NC unit 501 is based on a real time operating system (described as RTOS hereinafter), and usually a task for each function to be executed under the control is regarded as an execution unit.

Next, a description is made for a method of controlling each task with the RTOS. To check dispatching priority of each task at a specified time interval or to delay execution of a task by a specified period of time, generally a timer interrupt (not shown) is loaded to the main CPU 1 (Refer to FIG. 73) at a certain cycle. This is called system clock.

Also the RTOS checks a state of each task each time system clock interrupt is generated, stops a task in execution, and has other task executed. This is called scheduling or dispatch.

Furthermore in the RTOS, dispatching priority (priority in execution) is assigned to each task. This dispatching priority means that, while a task having lower dispatching priority is being executed, if a task having higher dispatching priority is ready for execution, execution of the task having lower dispatching priority is interrupted and the task having higher dispatching priority is executed. This is called preempt of task.

FIG. 76 is a timing chart showing a relation in terms of time between operations in each task, and in this figure, a time required for processing largely varies in such a task as the correction computing task because of complicatedness of a task to be computed. Generally a system clock cycle is decided assuming a task requiring the longest processing time. As a result, when other task is executed, idle time when the main CPU 1 is not executing any effective processing, as T1 shown i FIG. 76, is generated. Also it should be noted that, in FIG. 76, when there is not any other processing to be executed, a processing is waited in a loop in the RTOS as described above.

Generally, the RTOS has a function to run a task at a specified cycle or a function to measure a running time of a task, but these time-related factors can only be controlled or measured with a time unit which is a multiple of an integral number of the system clock ΔT.

Among the three tasks shown in FIG. 76, a processing time (computing time) for the servo processing task, display setting task is kept constant respectively. However, in the correction computing task, a processing time largely varies according to contents of a machining program. On the other hand, the servo processing task executes data communications or the like to the servo amplifier 9, so that the task is run once for one system clock cycle. Otherwise, data for running the servo motor 10 forward the amplifier unit can not be transmitted, and operation of the servo motor 10 is stopped.

For this reason, control is provided by, for instance, terminating execution of the correction computing task for each block of a machining program so that a time for running once will not become excessively long. On the contrary, however, even if a processing time for the correction computing task is short and a total of processing time for the three tasks is 1/N (N: an integral number) of the system clock, each task runs only once for each system clock cycle. Because of this restriction, there is an upper limit for cutting feed speed in an NC unit. For this reason, if each task can run twice for each system clock cycle, it is possible to double the cutting feed speed, and the machining time is reduced to approximately ½ of the original one as shown in FIG. 77.

The NC unit 501, which executes control software under control by the RTOS as described above, has various types of operating mode. The operating modes include, for instance, a state where a work is cut by means of automatic operation or in the manual mode, or a case where real machining is not executed and a graphic tool path is displayed for checking correctness of the machining program.

Also as a means for inputting a machining program, in addition to the EIA format which is a standard machining program for the NC unit 501, for instance, an automatic programming is available. This is for automatically controlling a speed or a position of tool, or an operation thereof such as in a case where, when data for a tool to be used, a form of a work, and a final machine form or other parameters are inputted and as a result, the final form is automatically provided as a result of machining as shown in FIG. 78A and FIG. 78B.

A task for analyzing the EIA format or a machining program such as an automatic programming as described above executes the processing as shown in FIG. 79. Namely, ZZZ1 is a processing for reading a machining program by 1 block and storing the block in a work area on a memory. ZZZ2 is a processing for analyzing the data read in ZZZ1 and preparing data to be delivered to the correction computing task.

ZZZ3 is a processing for issuing SVC to terminate a task. With this SVC, this task delivers the right for using the main CPU 1 to other task. Then the system enters the stand-by state until, for instance, the correction computing task demands the next data and the machining program starts the analysis task.

However, in the control software execution system for an NC unit having the configuration as described above, the problems as described below occur.

At first, an order for execution of tasks each realizing functions of an NC unit can be decided only according to the dispatching priority, and for this reason it is impossible to cyclically run all tasks, or to decide an execution time for each task.

Secondly, even in a case where task control is carried out according to timing, the time unit is limited to a time unit of the system clock (a multiple of an integral number of system clock).

Thirdly, it is extremely difficult to decide dispatching priority for each task, and in a case where three or more tasks are involved therein, so called the priority inversion (a phenomenon of inversion of dispatching order in which a task having lower dispatching priority stops execution of a task having higher dispatching order) may occur, so that there are several restriction for practical operations in the execution system based only on the dispatching order.

Fourthly, as dispatching priority between tasks is decided when a system is prepared, there exist tasks short in a processing time, or those having, on the contrary, excessive processing time.

Fifthly, as a processing requiring specification of a cycle is treated as an interrupt, the processing must be short, which is one of the restrictions over the system operations.

Sixthly, irrespective of the fact that a load to each task varies according to a running state or running mode of an NC unit, a running state of each task is decided when the system is generated, and the state can not be changed later.

Seventhly, there is no means for determining whether a task is in the normal state or not (a task has fallen in an abnormal state).

Eighthly, irrespective of size of one block in a machining program, a machining program analysis task ends each time analysis of one block is finished, so that a processing time may become short or excessive according to size of one block.

SUMMARY OF THE INVENTION

It is an object of the present invention to allocate an appropriate processing time to each task by realizing flexibility in a system for specifying an execution for each task and thereby obtain an effective control method for a control software execution system.

In the control method for a control software execution system according to the present invention, control of tasks each realizing a function of an NC unit respectively can be executed by a small time unit, furthermore a cycle for starting the task can easily be specified, so that waste of the time allocated to each task can be reduced, and furthermore a task can be controlled according to the running time, and because of this feature system construction becomes easier.

In another control method for a control software execution system according to the present invention, control for tasks each realizing a function of an NC unit can be executed by the running time, waste of the time allocated to each task can be reduced, and furthermore a task can be controlled according to the running time, and because of this feature system construction becomes easier.

In another control method for a control software execution system according to the present invention, continuous running time can be insured for task each realizing functions of an NC unit respectively, so that waste of the time allocated to each task can be reduced, and furthermore a task can be controlled according to the running time, and because of this feature system construction becomes easier.

In another control method for a control software execution system according to the present invention, control according to an accurate starting time and a running time can be executed for tasks each realizing a function of the NC unit respectively, so that waste of the time allocated to each task can be reduced, and furthermore a task can be controlled by the running time, and because of this feature system construction becomes easier.

In another control method for a control software execution system according to the present invention, control according to an accurate starting time and a continuous running time for tasks each realizing a function of the NC unit respectively can be executed, so that waste of the time allocated to each task can be reduced, and furthermore a task can be controlled within the running time, and because of this feature system construction becomes easier.

In another control method for a control software execution system according to the present invention, an accurate executing time for tasks each realizing a function of the NC unit respectively can be acquired, so that allocation of a running time for each task can easily be executed, and because of this feature system construction becomes easier.

In another control method for a control software execution system according to the present invention, an accurate executing time for a task for realizing functions of an NC unit as well as for an interrupt processing can be acquired, so that allocation of a running time for each task can easily be executed, and because of this feature system construction becomes easier.

In another control method for a control software execution system according to the present invention, a running time for all tasks can be recorded, and furthermore a rate of a running time for all tasks can be specified, so that allocation of a running time for each task can be optimized. For this reason, an accurate executing time for interrupt processing can be acquired, and allocation of a running time for each task can easily be executed, and because of this feature system construction becomes easier.

In another control method for a control software execution system according to the present invention, allocation of a running time for each task can automatically be optimized according to operating conditions of the unit, so that wasting time in each task can be eliminated. Namely, a task can be run only for a period of time appropriate for the task in each mode by changing a running rate for a task according to an operating mode of the an NC unit, so that an executing speed of an NC unit can be improved.

In another control method for a control software execution system according to the present invention, a rate for running time allocated to each task can be changed while operating the NC unit, wasting time in each task can be eliminated, and a machining time in machining of repetition can be shortened by automatically setting allocation of a running time for each task realizing a function of an NC unit to be optimal.

In another control method for a control software execution system according to the present invention, a task in which an error has been generated can be defined by comparing the running time. Namely when an error has been generated in a task realizing a function of an NC unit, the fact can be detected, and for this reason determination can immediately be made that an error has been generated in the NC unit.

In another control method for a control software execution system according to the present invention, when it is determined that an error has occurred in automatic machining by the NC unit, automatic machining is executed again by changing a tool, so that the possibility that machining process stops due to occurrence of an error can be reduced, and continuous machining is automatically realized, and for this reason reliability for continuous running of an NC unit can be improved.

In another control method for a control software execution system according to the present invention, when it is determined that an error has occurred in automatic machining by the NC unit, automatic machining is executed again by changing a tool speed, so that the possibility that machining stops due to occurrence of an error can be reduced, and continuous machining can automatically be executed, and for this reason reliability for continuous running of an NC unit can be improved.

In another control method for a control software execution system according to the present invention, when it is determined that an error has occurred in automatic machining of the NC unit, automatic machining is executed again by other machining program, so that the possibility that machining stops due to occurrence of an error can be reduced, and for this reason continuous machining can automatically executed and reliability for continuous running of an NC unit can be improved.

In another control method for a control software execution system according to the present invention, a running time for tasks each realizing a function of an NC unit respectively is limited, so that each task will not run for a period of time exceeding an allocated period of time for the task, and because of this feature system construction becomes easier.

In another control method for a control software execution system according to the present invention, control for tasks each realizing a function of an NC unit respectively can more precisely be executed, and a processing time for each task can be optimized, so that waste of the time can be reduced and a total processing time can be shortened. In addition, the system itself can determine abnormal conditions in the control software execution system for the NC unit, so that a processing for avoidance from occurrence of abnormal conditions therein can easily be executed.

In another control method for a control software execution system according to the present invention, control according to a period of time for tasks each realizing functions of an NC unit can be executed with a small time unit, furthermore a cycle for starting a task can easily be specified so that waste of the time allocated for each task can be reduced, and furthermore a task can be controlled according to the running time, and because of this feature system construction becomes easier.

In another control method for a control software execution system according to the present invention, control according to a rate for a running time for tasks each realizing a function of an NC unit respectively can be executed, so that waste of the time allocated for each task can be reduced, and furthermore a task can be controlled according to the running time, and because of this feature system construction becomes easier.

In another control method for a control software execution system according to the present invention, a continuous running time for tasks each realizing a function of an NC unit respectively can be insured, so that waste of the time allocated for a task can be reduced, and furthermore a task can be controlled according to the running time, and because of this feature system construction becomes easier.

In another control method for a control software execution system according to the present invention, control according to an accurate starting time and a running time for tasks each realizing a function of an NC unit respectively can be executed, so that waste of the time allocated for each task can be reduced, and furthermore a task can be controlled according to the running time, and because of this feature system construction becomes easier.

In another control method for a control software execution system according to the present invention, control according to an accurate starting time and a continuous running time for tasks each realizing a function of an NC unit respectively can be executed, so that waste of the time allocated for each task can be reduced, and furthermore a task can be controlled within the running time, and because of this feature system construction becomes easier.

In another control method for a control software execution system according to the present invention, an accurate executing time for tasks each realizing a function of an NC unit respectively can be acquired, so that allocation of a running time for each task can easily be executed, and because of this feature system construction becomes easier.

In another control method for a control software execution system according to the present invention, an accurate executing time for task each realizing a function of an NC unit respectively and an interrupt time can be acquired, so that allocation of a running time for each task can easily be executed, and because of this feature system construction becomes easier.

In another control method for a control software execution system according to the present invention, a running time for all tasks can be recorded, and furthermore a rate of the running time for a task can be specified, so that allocation of a running time for each task can be optimized. In addition, an accurate executing time for an interrupt can be acquired, and allocation of the running time for each task can easily be executed, and because of this feature system construction becomes easier.

In another control method for a control software execution system according to the present invention, allocation of a running time for each task can automatically be optimized according to operating conditions of the unit, waste of the time can be eliminated in each task. Namely, a task can be run only for a period of time appropriate to the task in each mode by changing a running rate for a task according to an operating mode of the NC unit, and an executing speed of an NC unit can be improved.

In another control method for a control software execution system according to the present invention, a rate of running time allocated for each task can be changed while running the NC unit, so that waste of the time thereof can be eliminated in each task, and by automatically optimizing a rate of the running time for tasks each realizing a function, the machining time in machining of repetition can be shortened.

In another control method for a control software execution system according to the present invention, a task in which an error has been generated can be defined by comparing the running time. Namely when an error has been generated in the task realizing a function of the NC unit, the fact can be detected, so that determination can immediately be made that an error has been generated in the NC unit.

In another control method for a control software execution system according to the present invention, restriction according to a running time for tasks each realizing a function of an NC unit can be executed, so that a task will not run exceeding an allocated period of time for each task, and because of this feature system construction becomes easier.

In another control method for a control software execution system according to the present invention, control for tasks each realizing a function of an NC unit respectively can more precisely be executed, so that a processing time for each task can be optimized, and for this reason waste of the time thereof can be reduced, and a total processing time can be shortened. In addition, the system itself can determine abnormal conditions of the control software execution system for an NC unit, so that a processing for avoidance from occurrence of abnormal conditions therein can easily be executed.

Other objects and features of this invention will become understood from the following description with reference to the accompanying drawings.

BRIEF DESCRIPTION OF THE DRAWINGS

FIG. 31 is an explanatory view showing data structure required for the control software execution system for an NC unit according to Embodiment 11;

FIG. 35 is an explanatory view showing data structure required for the control software execution system for an NC unit according to Embodiment 13;

FIG. 37 is an explanatory view showing data structure required for the control software execution system for an NC unit according to Embodiment 14;

FIG. 39 is an explanatory view showing data structure required for the control software execution system for an NC unit according to Embodiment 15;

FIG. 55 is an explanatory view showing structure of a task end clock number list;

FIG. 56 is an explanatory view showing structure of a task continuous running insurance table;

FIG. 67 is an explanatory view showing data structure required for the control software execution system for an NC unit according to Embodiment 27;

FIG. 69 is an explanatory view showing data structure required for the control software execution system for an NC unit according to Embodiment 28;

FIGS. 78A and 78B are explanatory views showing a state of an automatic program operation.

DESCRIPTION OF THE PREFERRED EMBODIMENTS

Detailed description is made for the control software execution system according to the present invention with reference to related drawings.

Figure 1:
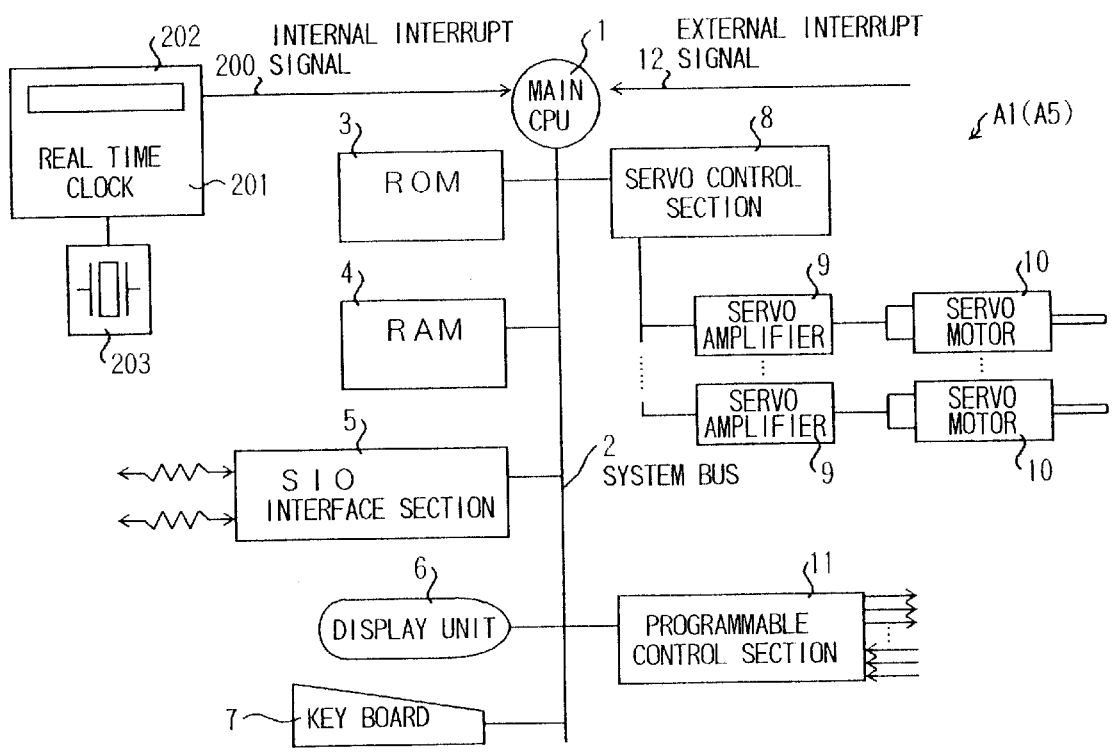
FIG. 1 a block diagram showing general configuration of a control software execution system for an NC unit according to Embodiment 1.

At first description is made for configuration in Embodiment 1 of the present invention. FIG. 1 is a block diagram showing general configuration of a control software execution system A1 for an NC unit according to Embodiment 1, and this control software execution system A1 comprises the following elements. In this figure, designated at the reference numeral 1 is a main CPU for controlling operations of each section or executing computing required for numerical control, at 2 a system bus for connecting various sections in the system to each other, at 3 a ROM (non-volatile storage means) for storing therein control software for realizing main functions of the NC unit or the like, at a RAM (volatile storage memory) used for temporally storing data or as a work area, at 5 an SIO interface section for transacting data with external devices by means of serial communications.

Also in FIG. 1, designated at the reference numeral 6 is a display unit for displaying running condition of the NC unit or displaying data to identify each command given to the NC unit, at 7 a keyboard as an input means for giving commands to the NC unit, at 8 a servo control section for computing commands for controlling a servo motor, and the servo control section 8 may have a dedicated CPU different from the main CPU 1.

Further, in FIG. 1, designated at the reference numeral 9 is a servo amplifier for electrically amplifying a command received from the servo control section 8 and driving a servo motor or a main shaft of machine tool (not shown), at 10 a servo motor for controlling a machining section of the machine tool (not shown), at 11 a programmable control section (described as PC section hereinafter) for transacting data other than commands for servo control with the machine, and at 12 a system clock (not shown) and an external interrupt signal each inputted into the main CPU 1. Herein the system clock is a clock signal for establishing synchronism to control the entire NC unit as a whole, while the external interrupt signal is a signal for reporting generation of invents (emergent invents) such as power error or emergency stop to the main CPU 1.

In FIG. 1, the reference numeral 200 indicates an internal interrupt signal, and generation or timing of this signal is controlled by the main CPU 1. The reference numeral 201 indicates a real time clock, which is controlled by the main CPU 1 and executes such operations as controlling the internal interrupt signal 200 or reading time. Furthermore, the reference numeral 202 is a counter register provided inside the real time clock 201, and the counter register decrements the value by 1 each time a clock signal is inputted from outside, and when the value is decremented to 0, the default value is set or its operation is kept down until a value is again set from the main CPU 1. Selection of this operation, and setting or changing the default value can be freely executed by main CPU 1. The reference numeral 203 indicates a quartz oscillator for outputting a clock signal to the real time clock 201.

Then, a description is made for operations of the control software execution system A1 for the NC unit having the configuration as described above. Generally, as a system clock, a frequency from 60 Hz to 100 Hz (60 to 100 oscillations per second). If the system clock is set to a value higher than that described above, times of execution for processing the interrupt becomes too large, and as a result time when a task executing a function of the NC unit can run is reduced. However, as the minimum time unit is too large for minute control of a task, interrupt is not used, and for instance the general purpose real time clock 201 is used. When a clock signal having a frequency of 10 MHz is inputted from the quartz oscillator 203 to the real time clock 201, the real time clock 201 decrements the internal counter register 202 one by one. If a clock signal having a frequency of 10 MHz is inputted, measurement can be executed at a unit of 0.1 μs (0.0000001 sec).

The real time clock 201 also can play a role as a programmable interval timer. This is a function to generate interrupt to the CPI 1 when a specified default value is zero (0). Generally the real time clock 201 has a plurality of channels available for either purpose as described above.

An execution cycle of each task is registered by SVC (supervisor call, or a service call) previously or when the task is started. Herein the SVC is a generic name of operations in which a task demands some type of service to the RTOS. The phrase of "some type of service" means an operation such as stopping execution of the task itself, communicating with other tasks, starting execution of other task (starting executing) or stopping the execution until some necessary conditions are established.

Figures 2, 3:
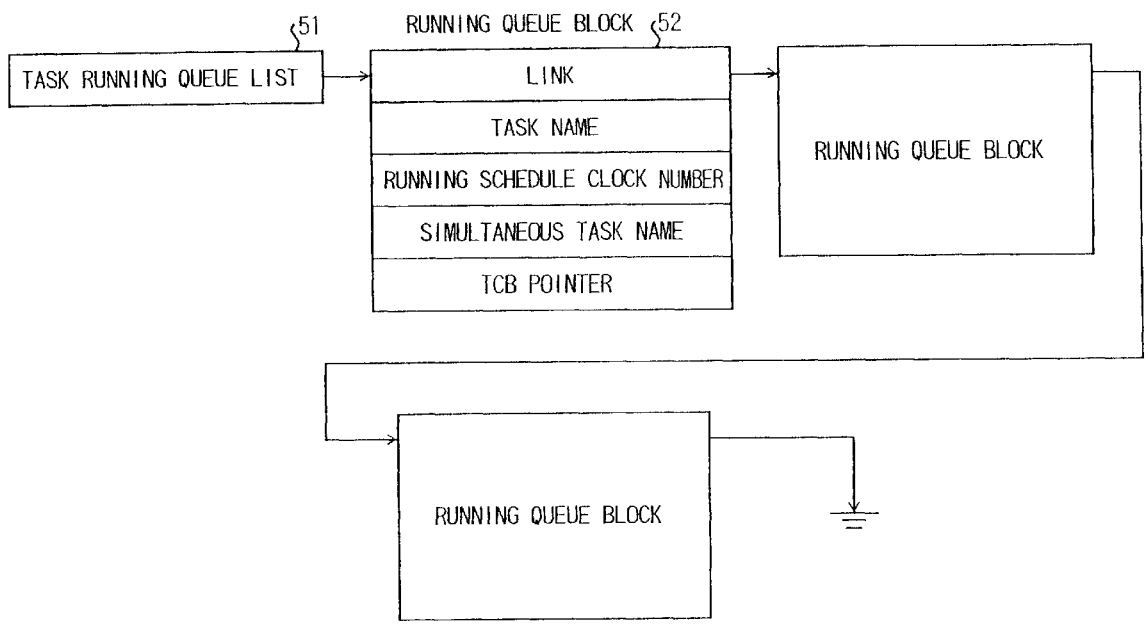
FIG. 2 is an explanatory view showing structure of a task running cycle table.
FIG. 3 is an explanatory view showing structure of a task running queue list.

The data is registered by the RTOS in a "task running cycle table" 50 as shown, for instance, in FIG. 2. FIG. 2 shows data configuration having a "running cycle" and "times of repetition". Herein the running cycle is defined as a value indicating a number of clocks until the next running cycle of the task is started, and the times of repetition is defined as a value indicating how many times the cycle should be started. Herein it is assumed, for instance, that, if this value is a minus one, the value indicates the ∞, and in that case the task is started repeatedly. Using this task running cycle table 50, the RTOS prepares a "task running queue list" 51 as shown in FIG. 3 each time the task is started.

In FIG. 3, running queue blocks 52 in the task running queue list 51 are blocks comprising "ink" indicating a position of the next running queue block, "task name", "running schedule clock number" indicating lapse of time from a current point of time required until the running cycle is started, "simultaneous task name" indicating task name or names required to be run simultaneously, and "TCB pointer" indicating a position of TCB.

Figure 4:
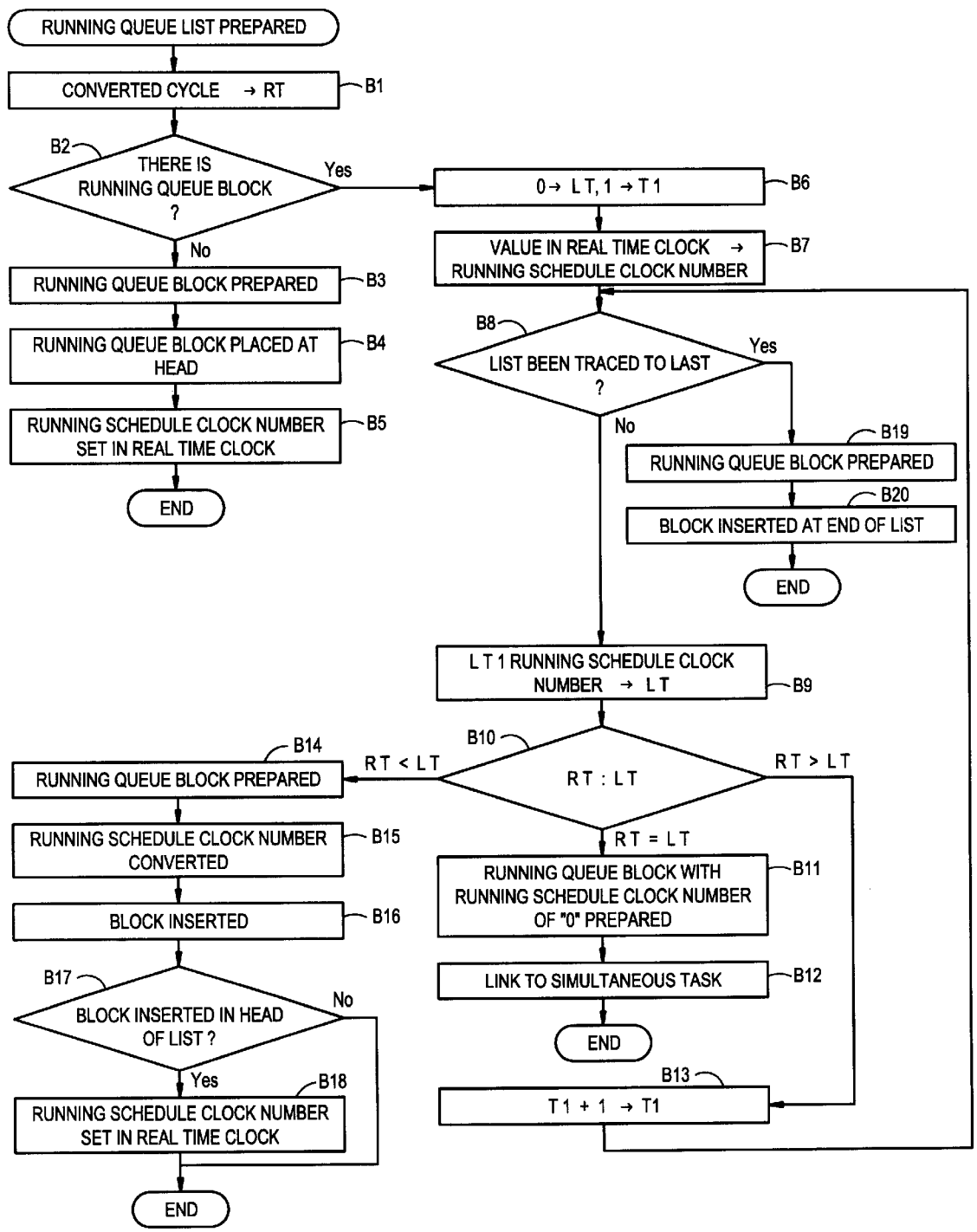
FIG. 4 is a flow chart showing a processing sequence when the control software execution system for an NC unit according to Embodiment 1 prepares a task running queue list.

Next, a description is made for concrete operations with reference to FIG. 4. For convenience in description, it is assumed herein that a clock signal inputted into the quarts oscillator 203 has a frequency of 10 MHz and the internal counter register 202 decrements by 1 once for 0.1 μsec. Namely, it is assumed herein that the minimum time unit in measurement is 0.1 μsec. Also it is assumed in the following description that interrupt is inhibited during certain processing such as operation of a list. Furthermore when preparing the running queue block 52, as a task name, name indicating the task is previously registered.

FIG. 4 shows a sequence when the RTOS prepares the task running queue list 51. In this figure, at first in step B1, a requested running cycle is converted to an internal clock number. For instance, if the requested running cycle is 10 msec, the internal clock number is 100,000 (100,000×0.1 μsec.=10 msec). This value is used as TR (request time). Then in step B2, determination is made as to whether any running queue block exists in the current running queue list or not, and if it is determined that there is no running queue block, system control shifts to processing in step B3, and on the contrary if it is determined that there is any running queue block, system control shifts to processing in step B6.

Step B3 indicates a processing in a case where there was no running queue block 52 in the running queue list 51, and in this processing a running queue block 52 is prepared and in step B4 it is placed at the head of the running queue list 51. Then in step B5 a running schedule clock number for the header block in the running queue list 51 is set in a counter register 202 of the real time clock 201.

Step B6 is a processing in a case where it is determined that there is the running queue block 52 in the running queue list 51, and in this processing a last task running time LT is set to 0, and a task index TI is set to 1. Herein the LT is defined as a parameter for computing how many clocks are required until execution of the task is started, and T1 is an index indicating the tasks in the running queue list. Then in step B7, a value provided by the counter register 202 of the current real time clock 201 is read, and the value is included in a running schedule clock number for the header running queue block 52. Then in step B8, determination is made as to whether all the running queue blocks 52 in the running queue list 51 have been checked (or traced) or not.

As a result, in step B8, if it is determined that all the running queue blocks 52 have not been checked, system control shifts to processing in step B9. Step B9 is a processing executed when it was determined that there was the running queue block 51 in the running queue list 51, and a running schedule clock number for the running queue block 52 shown in TI is fetched from the running queue list 51, and is added to LT.

Then in step B10, RT is compared to LT. Step B11 is a processing executed when it was determined that RT was equal to LT (RT=LT), and in this processing the running queue block 52 is prepared. Then a running schedule clock number is set to zero (0). Step B12 is a processing for linking, for instance, the running queue block 52 prepared in step B11 to a simultaneous task name in blocks indicated by TI in the running queue list 51. Herein the term "linking" is defined as an operation for, for instance, placing an address for a block prepared in 11 at a position of a simultaneous task name for the running queue block 52 indicated by TI; in brief an operation for locating a block prepared in step B11 at a place which can easily be found out.

Step B13 is a processing executed in a case where RT is larger than LT (RT>LT), and a value of TI is incremented by 1, and then system control returns to step B8 to repeat the same processing.

Step B14 is a processing executed in a state where RT is smaller than LT (RT<LT), and in this processing the running queue block 52 is prepared. Then a running schedule clock number is set to a value of RT−LT+(a running schedule clock number for the running queue block 52 just 1 before that indicated by TI). Then in step B15, a running schedule clock number for a block indicated by TI is set to a value of LT−RT, and in step B16, a running queue block 52 prepared in step B14 is inserted between the running queue block 52 indicated by TI and a block just ahead. Then, in step B17, determination is made as to whether the block inserted in step B16 is present in the head of the running queue list 51 or not, and if it is determined in step B18 that the inserted block is in the head of the running queue list 51, a running schedule clock number for the header block in the running queue list 51 is set in the counter register 202 of the real time clock 201.

In step B19, if it is determined in B8 that all the running queue blocks have been checked, the running queue block 52 with a running schedule clock number of RT−LT is prepared, and then in step B20, the running queue block 52 prepared in step B19 is inserted at the end of the running queue list 51.

Figure 5:
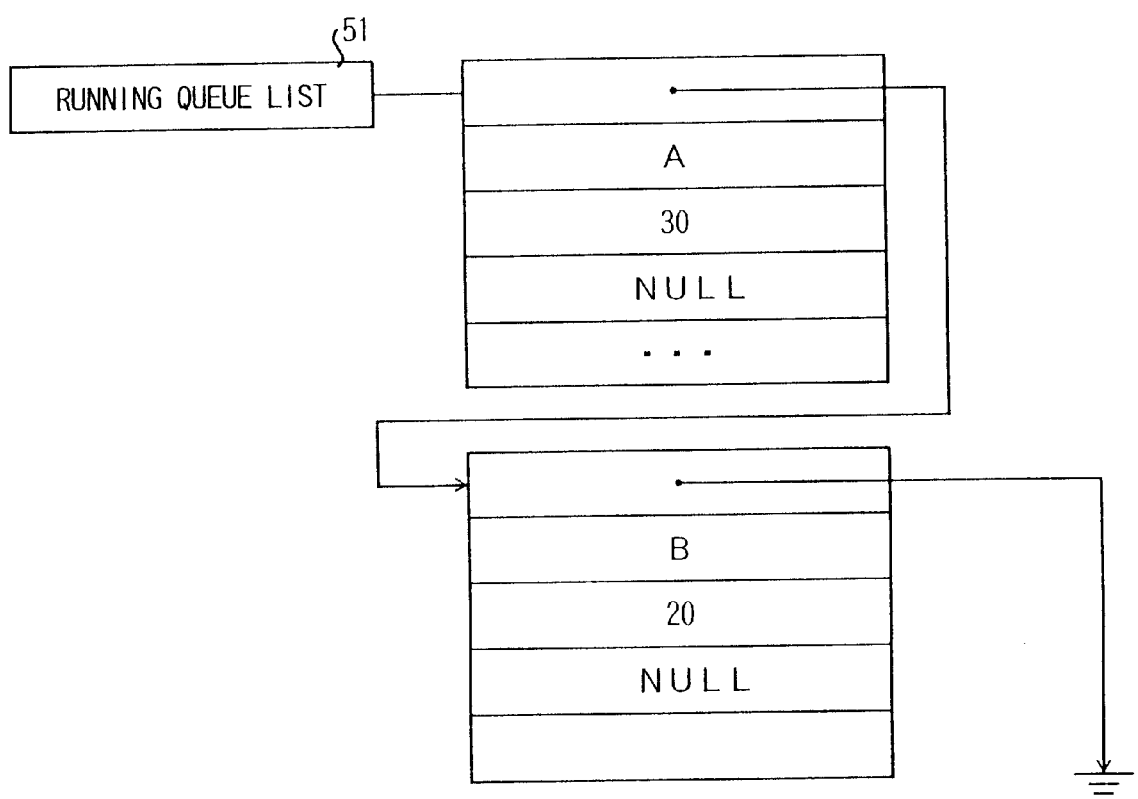
FIG. 5 is an explanatory view showing structure of a running queue list.
Figure 6:
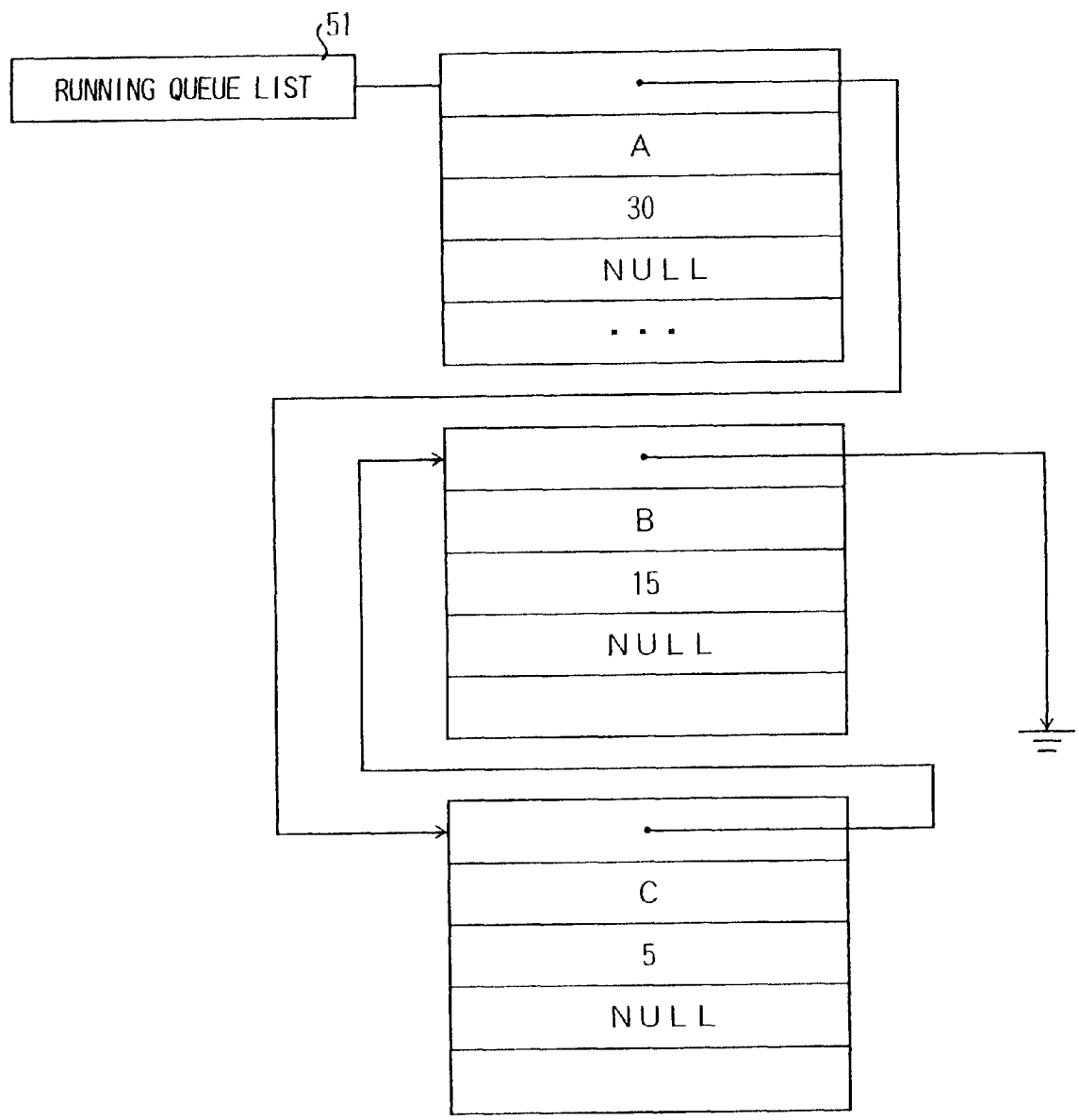
FIG. 6 is an explanatory view showing a state after a block has been added to the running queue list.

FIG. 5 shows an example of the running queue list 51. In this example, a task A is started in 30 clocks from a current point of time and then a task B is started in further 20 clocks from the start of the task A (namely in 50 clocks from a current point of time). If a request for starting a task C in 35 clocks from a current point of time is issued to the RTOS, the running queue list becomes as shown in FIG. 6 according to the sequence shown by the flow chart in FIG. 4.

In step B5 or step B18 shown in FIG. 4, a running schedule clock number for a header block in the running queue list 51 is specified in the counter register 202 of the real time clock 201, and after a time equivalent to the specified clock number has passed, a request for "task start interrupt" is generated. Description is made for this task start interrupt processing with reference to FIG. 7.

Figure 7:
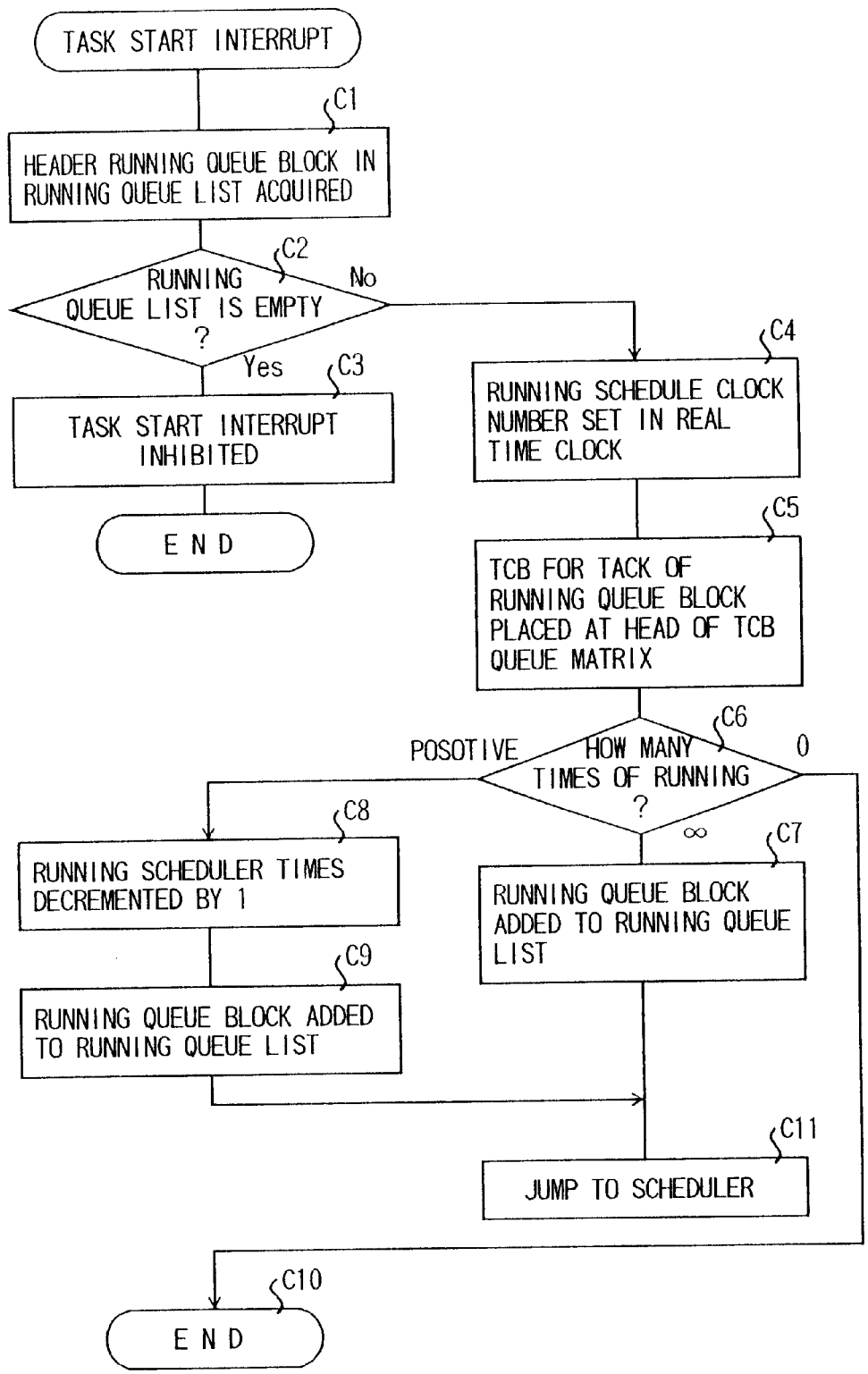
FIG. 7 is a flow chart showing a processing sequence for task start interrupt processing.

In FIG. 7, in step C1, a processing for separating the header running queue block 52 in the running queue list 51 from the running queue list 51 is executed, and then whether the running queue list 51 has become empty or not is checked in step C2. Step C3 is a processing in a case where it was determined that the running queue list 51 had become empty, and task start interrupt is inhibited by, for instance, setting the counter register 202 of the real time clock 210 to zero (0) so that a subsequent request for task start interrupt will not be generated.

Step C4 is a processing in a case where it is determined in step C2 that there remains any running queue block 52 in the running queue list 51 and in the processing, a running schedule clock number in the header running queue block 52 is set in the counter resister 202 of the real time clock 201. Then in step C5, a start task is taken out from the running queue block 52 separated in step C1, and TCB for the task is placed at the head of a TCB queue matrix.

Then in step C6, cycle times in the task running cycle table 50 (Refer to FIG. 2) for the task just run is checked. Step C7 is a processing in a case where time of running are indefinite (negative), and in this processing the running schedule clock number in the running queue block 52 for this task is converted to a running cycle of the task running cycle table 50 and the running queue block is added to the running queue list.

Step C8 is a processing in a case where the running times is a positive integer, and the running schedule times is decremented by 1. Then in step C9, the running queue block 52 for this task is prepared for the task through the processing shown in FIG. 4, and is added to the running queue list.

Step C10 is a processing in a case where running times is zero (0), and in this case no processing is executed, and the processing is terminated. After processing in steps C7 and C9, in step C11 system control jumps to a scheduler in the RTOS. A processing by the scheduler is the same as a processing by a scheduler in the conventional technology, and description thereof is omitted.

Figure 8:
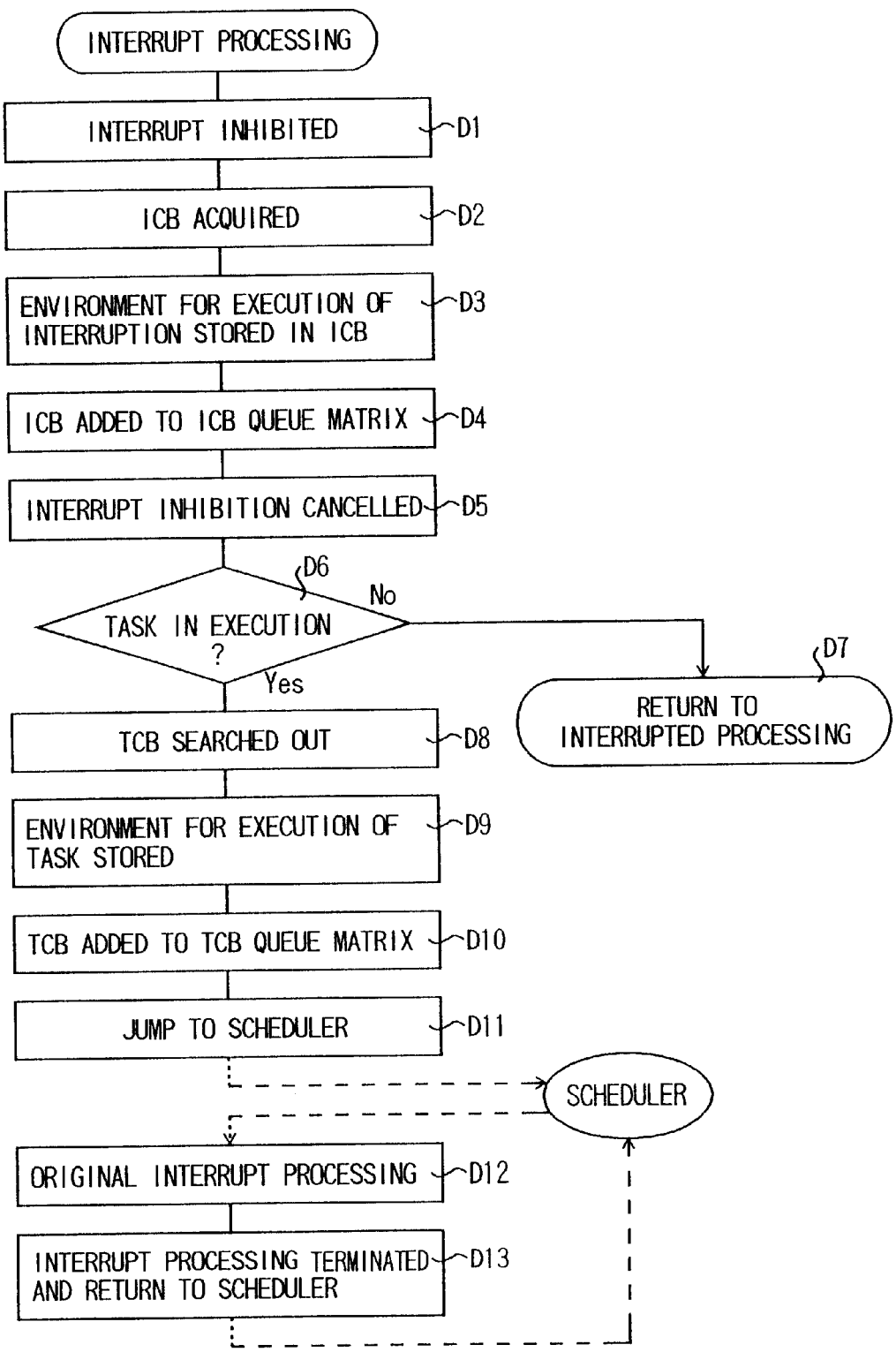
FIG. 8 is a flow chart showing a processing sequence for general interrupt processing.

Next, a description is made for general interrupt processing other than interrupt for task start with reference to FIG. 8. Step D1 is a header of interrupt processing in case where an interrupt is generated, and at first generation of other interrupt is inhibited. However, generally this processing is automatically generated when an interrupt is generated by the main CPU 1. Step D2 is a processing for acquiring an unused ICB from an ICB pool (a space for ICBs not used yet therein).

Then in step D3, an environment for execution of an interrupt of the task itself is stored in the ICB. Storage of a header address in a processing in step D12 as an address for a command to be executed next is also included. Also in step D4, the ICB just prepared is added to the ICB queue matrix to be executed by the scheduler. Then in step D5, inhibition of interrupt by step D is canceled. In this step and on, there is the possibility that interrupt is generated again. The processing described above, is for making an interrupt inhibited period of time as short as possible.

Then in step D6, determination is made as to whether the interrupted processing is interrupt processing or RTOS or execution of a task. Step D7 is a processing in a case where, as a result of determination above, it is determined that the interrupted processing is interrupt processing or execution of RTOS, and in this case system control directly returns to the interrupted processing. On the contrary, step D8 is a processing in a case where it is determined that the interrupted processing is execution of a task, and in this case at first TCB for the interrupted task is searched. Then in step D9, an environment for execution of the interrupted task is stored in the TCB found in step D8.

Furthermore, in step D10, the prepared TCB is added to an order of priority in the TCB queue matrix to be executed by the scheduler. Also in step D11, system control jumps to the scheduler, and then returns from the scheduler to step D12, but this processing is not always executed immediately after system control has jumped to the scheduler, and sometimes system returns to step D12 after other ICB has been processed. Interrupt processing from this step and on is original interrupt processing specific to each interrupt, and the processing varies according to a case for interrupt. Furthermore, step D13 is a processing for terminating interrupt processing, and generally an command for return to an ordinary subroutine is issued, and according to this return command, system control returns to the ICB processing by the scheduler.

As described above, the control software execution system A1 for an NC unit according to Embodiment 1 has, in addition to functions of an RTOS having only the scheduling system generally based on priority, a function to control for starting a task at a more minute precision than a system clock, and executes control system for an NC unit.

With Embodiment 1, the control software execution system A1 for an NC unit can execute time control for tasks each realizing functions of the NC unit with a smaller unit, and furthermore can easily specify a cycle for starting a task. For the reasons as described above, waste of time allocated to each task can be reduced, and furthermore a task can be controlled within a running time allocated to the task, so that system construction becomes easy and also a processing speed in the NC unit is improved.

Figure 9:
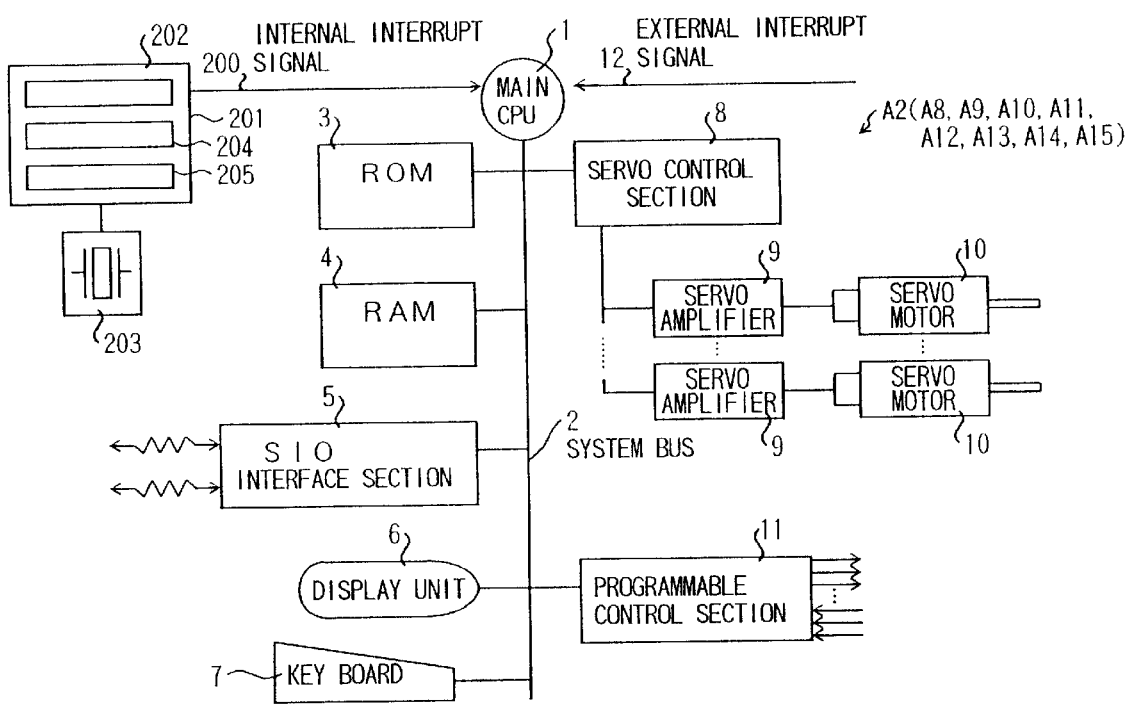
FIG. 9 is a block diagram showing general configuration of the control software execution system for an NC unit according to Embodiment 2.

Next, a description is made for configuration in Embodiment 2 of the present invention. The contents in FIG. 9 showing general configuration of a control software execution system A2 for an NC unit according to Embodiment 2 is substantially the same as that in FIG. 1 relating to Embodiment 1. It should be noted that in Embodiment 1, an interrupt port for a real time clock 201 was used by only one channel, while three channels are used in the present embodiment.

Detailed description is made hereinafter for configuration thereof. The reference numerals 1 to 11 of this control software execution system A2 indicate the same components as those shown in FIG. 1 relating to Embodiment 1, the description thereof is omitted herein. In FIG. 9, the reference numeral 200 indicates an internal interrupt signal inputted into the main CPU 1. Generation and timing of this signal can be controlled by the main CPU 1. The reference numeral 201 indicates a real time clock, which is controlled by the main CPU 1, and controls an internal interrupt signal 200 or reads a time.

The reference numeral 202 indicates a counter register in the real time clock 201. The counter register decrements the value by 1 each time a clock signal is inputted from outside, and when the value is decremented to zero (0), the default value is set again. It should be noted that the default value can freely be set from the main CPU 1. The reference numeral 203 indicates a quartz oscillator for inputting a clock signal to the real time clock 201.

The reference numerals 204 and 205 indicate a second and a third counter registers each provided inside of the real time clock 201. The counter register decrements the value by 1 each time a clock signal is inputted from outside, and when the value is decremented to zero (0), the default value is set again or its operation is kept down until a value is again set from the main CPU 1. Selection of this operation, and setting or changing the default value can automatically be executed by CPU 1. Also the counter register 202, second counter register 204, and third counter register 205 can independently set and cancel respectively. The counter registers 202, 204 and 205 are used each for measurement of a task running time, a reference time interrupt, and a running time alarm in this embodiment.

Figure 10:
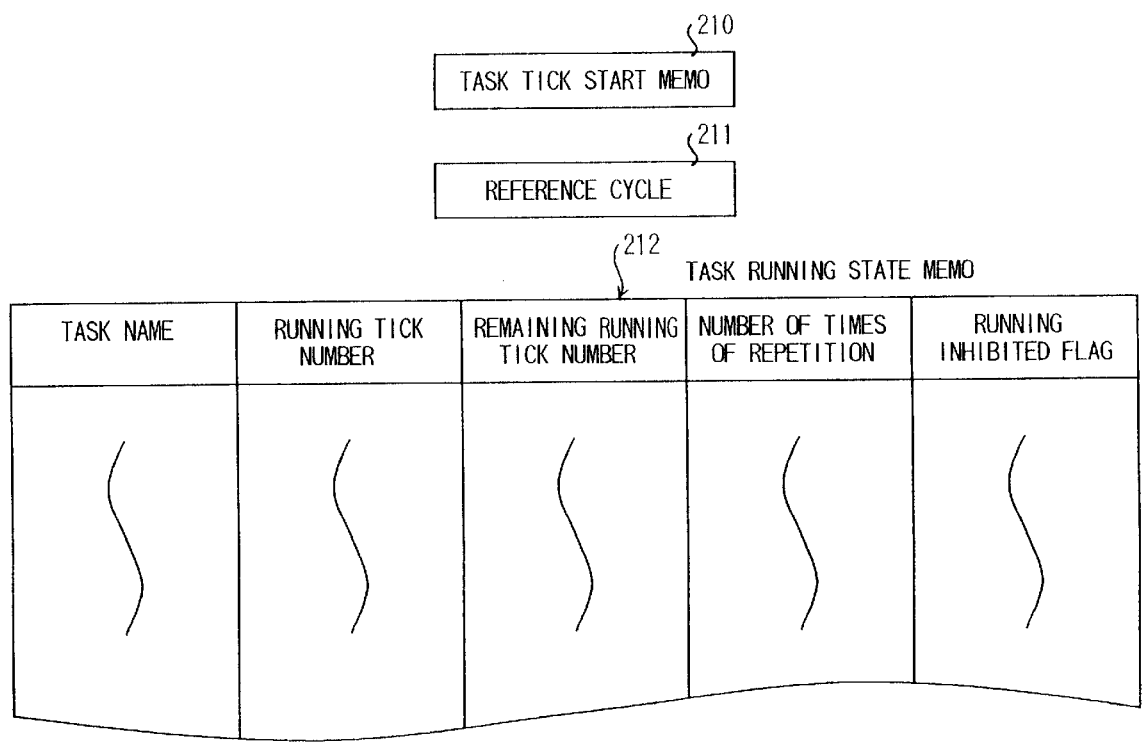
FIG. 10 is an explanatory view showing data structure required in the control software execution system for an NC unit according to Embodiment 2.

Next, a description is made for operations of the control software execution system A2 of the NC unit. FIG. 10 shows data structure required for the present embodiment, and the reference numeral 210 indicates "a task start tick memo", and the RTOS records a value of the internal counter register 202 in the real time clock 201 shown in FIG. 9 right before the RTOS starts execution of a task, then computes a period of time in which the task ran by obtaining a difference between the recorded value and a value of the internal counter register 202 when the task is terminated and system control returns to the RTOS.

Also the reference numeral 211 indicates a region for storing "a reference cycle". One reference cycle is previously registered in the system. How long does each task run for each this cycle is specified previously. The specification may be executed with either a period of time or a number of ticks, but herein it is converted to a number of ticks for the sake of simplicity of description thereof.

Furthermore, the reference numeral 212 indicates "a task running state memo". A running rate of each task is registered by the SVC previously or when the task is started. For instance, a specified running cycle for each task is registered, namely if a task A is 10%, a task B is 5%, and a task C is 20%, and a reference cycle is 20 m/sec, the task A may run at 2 m/sec, the task B at 1 m/sec, and the task C at 4 m/sec for every 20 m/sec respectively.

Herein, in FIG. 1 like in Embodiment 1, assuming that a clock signal inputted to the quartz oscillator 203 is set to 10 MHz, the internal counter register 202 decrements the value by 1 for each 0.1 $\mu$/sec. Namely assuming that a minimum unit for measurement is 0.1 $\mu$/sec, each of the tasks A, B, and C may run by 20,000 ticks, 10,000 ticks, and 40,000 ticks respectively within a number of clocks of 200,000 ticks. This tick number is stored in a column of "running tick number" of the task running state memo 212. Herein for a task in which a rate for running is not specified, a value in this column is set to zero (0).

A column of "remaining running tick number" makes a copy of the column of running tick number each time one reference cycle is finished, and decrements by the tick numbers equal to those when the task ran last. The contents of this column for all the tasks may be set to zero (0) each time one reference cycle is finished. The sum of running tick number should naturally be smaller than a reference cycle. The error check thereof may be executed, for instance, each time a running tick number is newly registered to the task state memo. It should be noted that description for error check is omitted in the description below.

Then what is to be set in a column of "a number of times of repetition" is a number of times indicating how many times the task is to be started. For instance, if the value is a minus value, it will be indicated with a sign of ∞. In this case, the task described above will be set to start repeatedly.

Also a column of "running inhibited flag" is used by a scheduler. The task in which this flag is ON is left out from the object for scheduling. Namely the task in which this flag is ON can not run even if the priority thereof is high.

Next, a description is made for operations of interrupt processing. The control software execution system A2 presets a value for a reference cycle 211 (Refer to FIG. 10) to the internal counter register 204 of the real time clock 201 (a programmable interval timer)(Refer to FIG. 9) before a task for protecting a running rate starts to run when the system control has actuated or the like.

Figure 11:
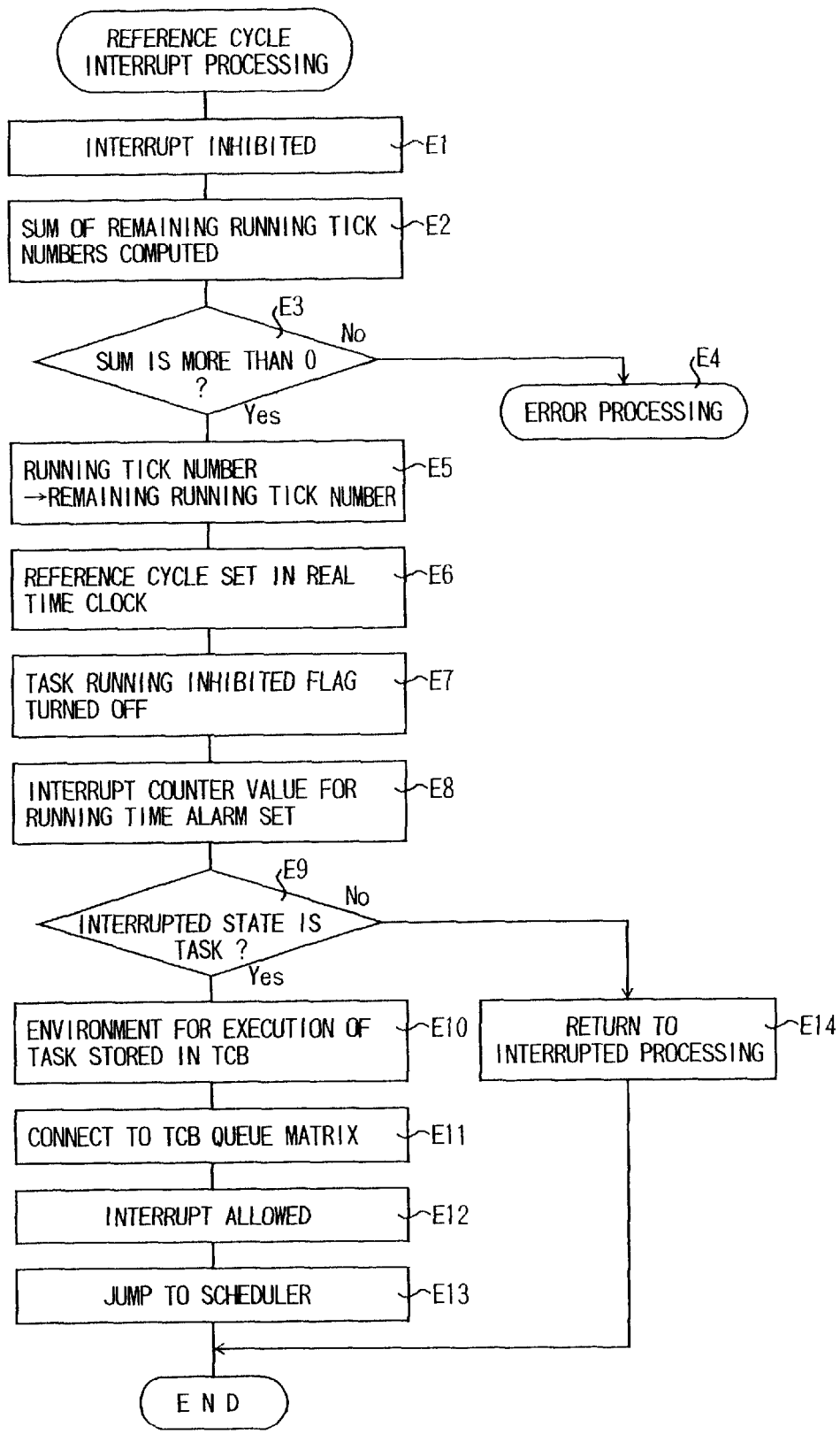
FIG. 11 is a flow chart showing a processing sequence for standard interrupt processing.

FIG. 11 is a flow chart for explanation of a sequence for reference cycle interrupt processing, and step E1 is a header step of interrupt processing in a case where an interrupt is generated and at first generation of other interrupt is inhibited herein. Normally, this processing is automatically executed by the main CPU 1. In step E2, the sum of remaining running tick numbers of the task running state memo 212 (Refer to FIG. 10) is obtained. In step E3, determination is made as to whether the sum thereof is more than zero (0) or not, and in a case where it is determined that the sum is not more than zero (0), an error processing is executed in step E4, however, this case does not normally occur, so that the description thereof is omitted herein.

On the contrary, in step E3, in a case where it is determined that the sum thereof is more than zero (0), the value in the column of running tick number of the task running state memo 212 (Refer to FIG. 10) is copied to the column of remaining running tick number for each task. Then, in step E6, a value of the reference cycle 211 (refer FIG. 10) is set again to the internal counter register 204 of the real time clock 201 (a programmable interval timer) (Refer to FIG. 9).

Then, in step E7, a processing for turning OFF running inhibited flags of all the tasks of the task running state memo 212 (Refer to FIG. 10) is executed. With this processing, all the tasks become objects for scheduling again. Furthermore, in step E8, the value subtracting the sum of remaining running tick numbers of the task running state memo 212 from the reference cycle 211 (Refer to FIG. 10) is set in the internal counter register 205 for a running time alarm of the real time clock 201 (Refer to FIG. 9). As a result thereof, an interrupt for a running time alarm will be generated when there is no time left but for running only the task of which a cycle is insured.

Then in step E9, determination is made as to whether the interrupted state is a task in execution or not, and in a case where it is determined that the state is in a task in execution, an environment for execution of task is stored in TCB in step E10, and in step E11, the TCB stored in step E10 is connected to a TCB queue matrix, and furthermore in step E12, interrupt is allowed, and in step E13, system control jumps to the scheduler.

On the contrary, in step E9, if it is determined that the state is not a task in execution, system control returns to the interrupted processing in step E14. In this step, inhibition/permission of interrupt is returned to the state when interrupted.

In the description above concerning interrupt processing, no comment is given to the system based on the conventional technology in which an address for interrupt processing itself is registered in a list and multiplex interrupt (an interrupt during interrupt processing) is allowed, but even in that case, a processing for permitting a multiplex interrupt may be executed like that in the conventional technology. It should be noted that in that case overhead (wasting time required by the time a necessary processing is executed) is generated and it is required to set a rate for task running or other parameters to larger values.

Figure 12:
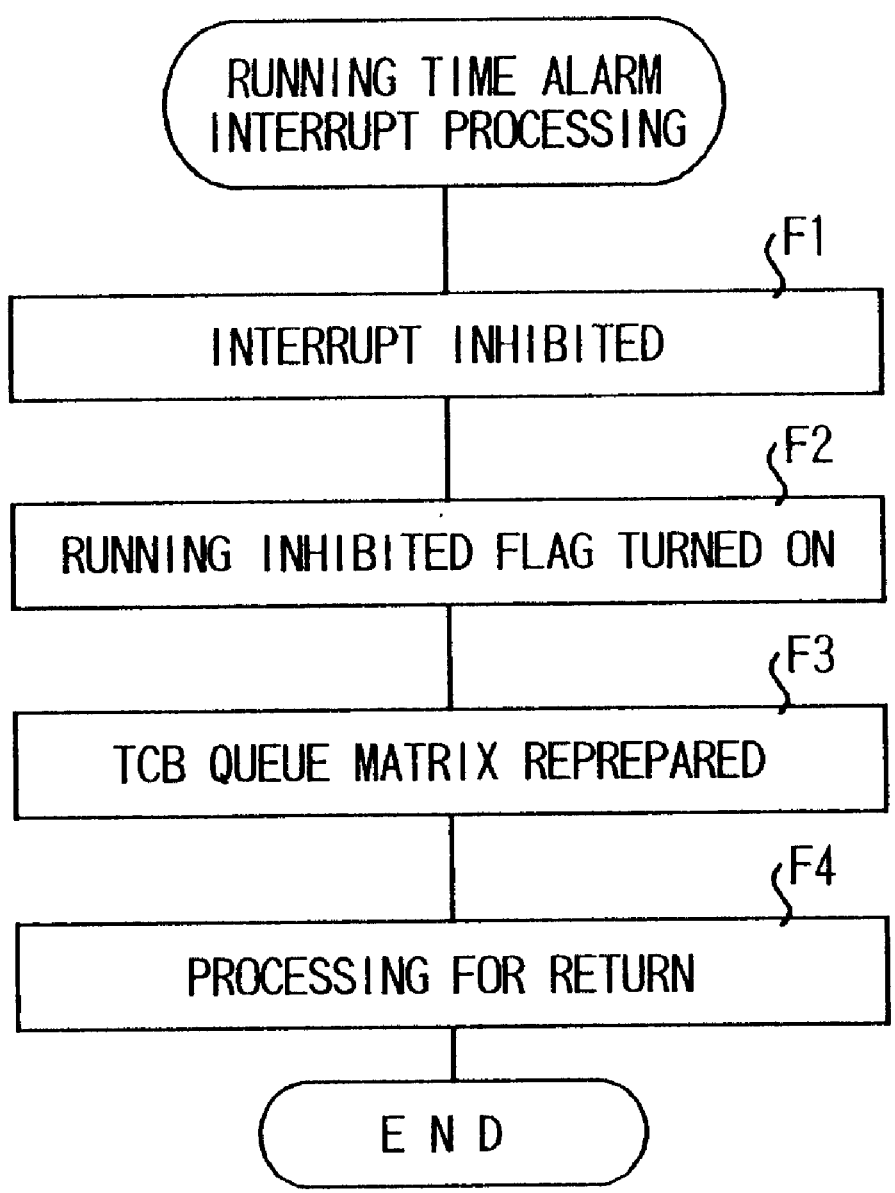
FIG. 12 is a flow chart showing a processing sequence for running time alarm interrupt processing.

FIG. 12 is a flow chart for explanation of a sequence for running time alarm interrupt processing. Step F1 indicates a header of interrupt processing executed when certain interrupt is generated, and at first generation of other interrupt is inhibited herein. Generally this processing is automatically executed by the main CPU 1. In step F2, running inhibited flags for all the task in which remaining running tick number of the task running state memo 212 (Refer to FIG. 10) is 0 or minus is turned ON.

In step F3, a queue matrix for task processing is reprepared so that the TCB in which all the running inhibited flags are OFF will be in front of the TCB in which all the running inhibited flags are turned ON. Namely the task in which a running inhibited flag is ON should run in front of the task in which the flag is OFF. In step F4, if an interrupted state is a task in execution, an environment for execution of the task is stored in the TCB, interrupt is permitted, and system control jumps to the scheduler. On the contrary, if an interrupted state is not a task in execution, system control returns to the interrupted processing.

Figure 13:
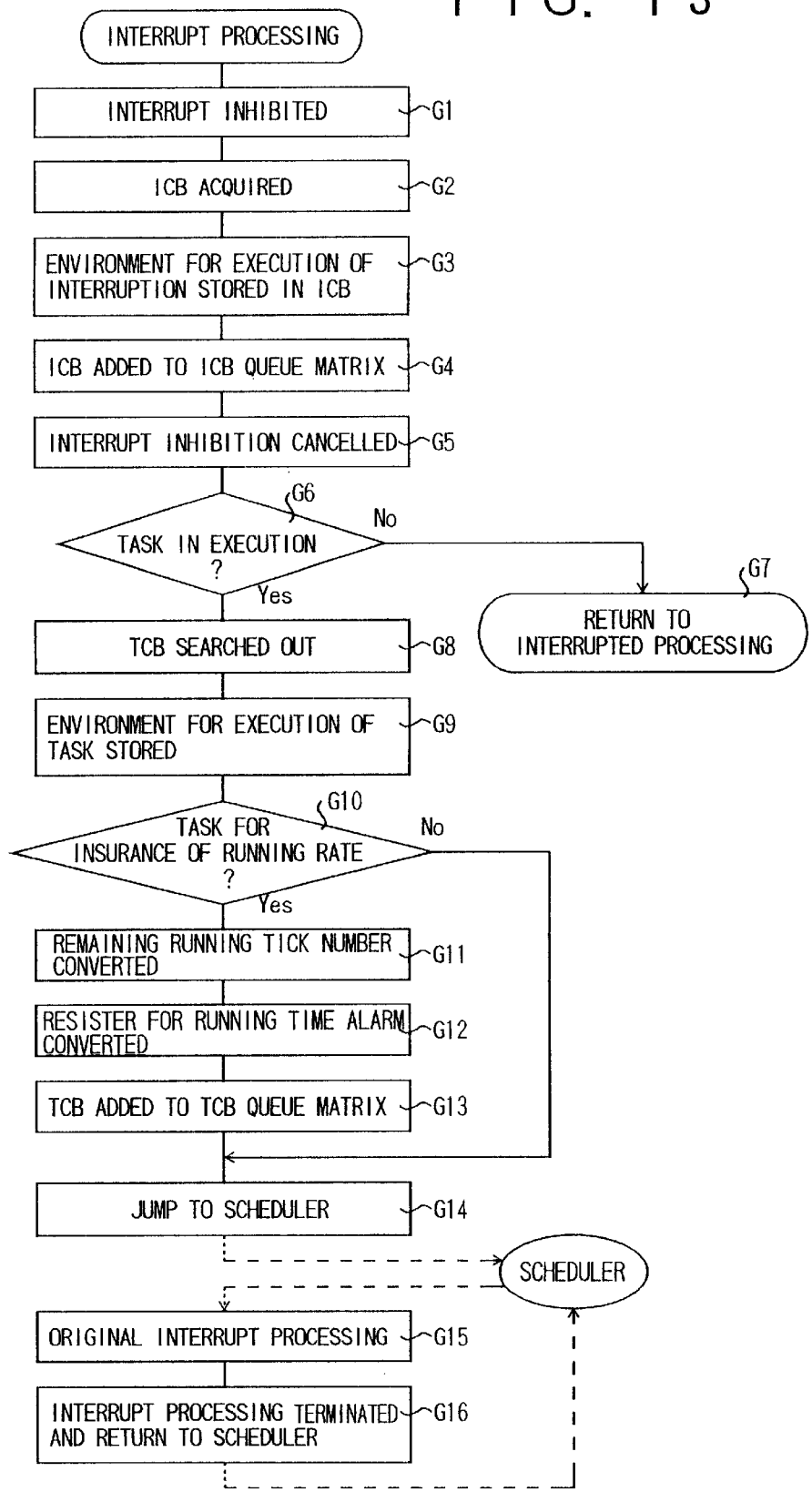
FIG. 13 is a flow chart showing a processing sequence for general interrupt processing.

FIG. 13 is a flow chart showing a sequence for general interrupt processing other than a reference cycle interrupt. Step G1 is a header step of interrupt processing in case where a certain interrupt is generated, and at first generation of other interrupt is inhibited. Generally this processing is automatically executed by the main CPU 1. In step G2, one ICB not used yet is acquired from the ICB pool (which is a site where ICBS not used yet are stored). In step G3, an environment for execution of this interrupt processing (itself) is stored in ICB. This operation includes storage of a header address for a processing in step G15 described later in the ICB as an address for command to be executed next.

In step G4, the ICB prepared herein is added to the ICB queue matrix to be executed by the scheduler. In step G5, inhibition of interrupt is canceled. After this step on, there is a possibility that interrupt is generated again. The processing described above is for making an interrupt inhibited period of time as short as possible.

In step G6, determination is made as to whether the interrupted processing is interrupt processing, or an operation by RTOS, or a task in execution. Step G7 is a processing executed in a case where the interrupted processing is interrupt processing or an operation by RTOS, and in this case system control directly returns to the interrupted processing. Step G8 is a processing executed in a case where the interrupted processing is for a task in execution, and in this case, at first the TCB for interrupted task is searched out. In step G9, an environment for execution of the interrupted task is stored in the TCB found out in step G8.

Step G10 is a processing for determining whether a task currently being executing is a task which is an object for insurance of a running rate or not. Concretely, determination is made as to whether the task has a value of 1 or more in the column of remaining running tick number in the task running state memo 212 (Refer to FIG. 10). Step G11 is a processing executed in a case where it has been determined that the task in execution was an object for insurance in step G10, and the value provided by the internal counter register 202 (Refer to FIG. 9) is subtracted from the value stored in the reference cycle 211 (Refer to FIG. 10). This result indicates a tick number indicating counts equivalent to a period of time in which the task continuously ran in this cycle. This number is subtracted from the column of remaining running tick number for the task in the task running state memo 211.

In step G12, the value subtracted in step G11 is added to the value of the internal counter register 205 for running time alarm of the real time clock 201 (Refer to FIG. 9). In proportion to a period of time in which the tasks insured for continuous run, a running time not insured for continuous run is increased.

In step G13, the prepared TCB is added to a TCB queue matrix executed by the scheduler. At this time, if the running inhibited flag for even one of the tasks is ON in the column of the task running state memo 212 (Refer to FIG. 10), in the TCB queue matrix the TCBs for the tasks for which the running inhibited flags are OFF is set before the TCB for the task for which running inhibited flags are ON.

In step G14, system control jumps to the scheduler. Step G15 indicates a processing in a case where system control returns from the scheduler, and this processing is not always executed right after system control has jumped to the scheduler, and it may be executed after other ICB has been processed, but system control will return to this step after all. From this step on original interrupt processing specific to each interrupt is executed, and contents of the processing varies according to a cause for interrupt. Step G16 is a processing for terminating interrupt processing, and in the processing an command for return to a normal subroutine is generally issued, and system control returns to the ICB processing section of the scheduler with this return command.

Figure 14:
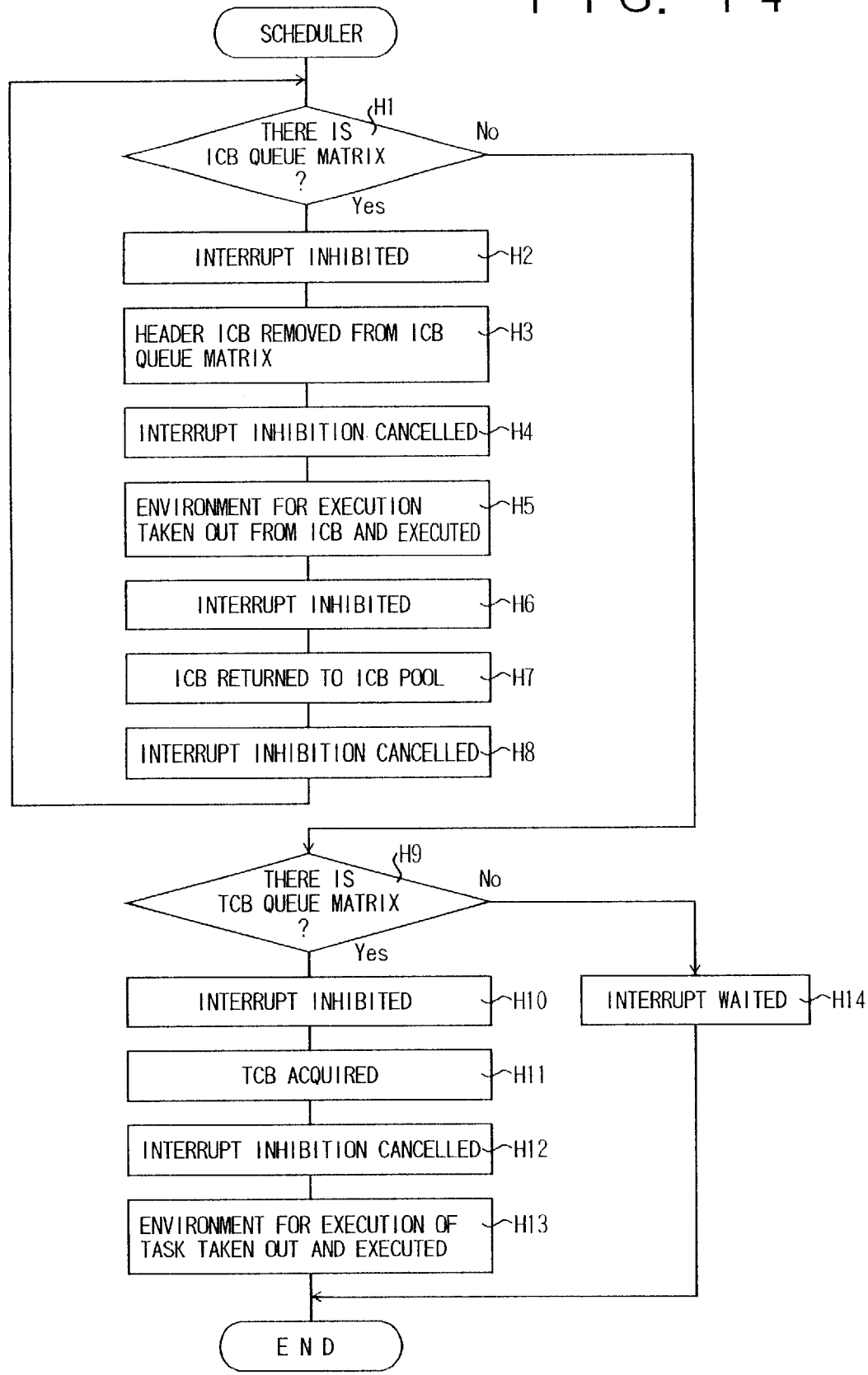
FIG. 14 is a flow chart showing a sequence for a processing by a scheduler.

Next, a description is made for operations of the scheduler of RTOS with reference to FIG. 14. For simplicity, in the present embodiment, description is made hereinafter by assuming that an idle task which is the lowest in the priority and executes no processing toward outside is always running.

Step H1 is a processing for checking whether there is a queue matrix for interrupt processing (ICB) or not. Step H2 is a processing executed in a case where it is determined that there is a queue matrix for interrupt processing, and in the processing at first interrupt is inhibited to execute the queue matrix. This operation is executed because, if an interrupt is generated and it is tried to add the interrupt to the queue matrix for interrupt processing while a list of the queue matrix for interrupt processing is being processed, consistency of the list is lost.

In step H3, the header ICB is removed from the list of the queue matrix for interrupt processing. In step H4, inhibition of interrupt is canceled. In step H5, an environment for execution of interrupt processing such as an execution address and a register stored in step G3 (Refer to FIG. 13) is taken out from the ICB removed in step H3, and processing is executed therewith. This is the processing in step G15 (Refer to FIG. 13). Step H6 is a processing executed when system control returns from step G16 (Refer to FIG. 13), and in this step interrupt is inhibited again. In step H7, the ICB having been removed in step H3 is returned to the ICB pool. In step H8, interrupt inhibition is canceled and then system control returns to step H1. And then, as long as there is a queue matrix for interrupt processing, the processing sequence from step H1 to step H7 is repeated.

Step H9 is a processing executed in a case where there is not a queue matrix for interrupt processing in step H1, and in this case determination is made as to whether there is a queue matrix for TCB or not. Step H10 is a processing executed in a case where it is determined that there is a queue matrix for TCB in step H9, and in the processing, at first interrupt is inhibited in order to execute the queue. In step H11, in a case where the task for TCB is a task for which a running rate is insured, the value of the internal counter register 202 (Refer to FIG. 9) for running time measurement of the real time clock 201 (Refer to FIG. 9) is stored in the task start tick memo 210 (Refer to FIG. 10).

In step H12, interrupt inhibition is canceled. In step H13, an environment for execution of the task stored in step G9 (Refer to FIG. 13) is taken out from the TCB removed from the queue matrix (a list) for a task processing in step H11, and the processing is executed therewith.

As described above, the control software execution system A2 for an NC unit according to Embodiment 2 is a system in which a function of executing a control for giving insurance of a task running time is added to the RTOS having only a normal scheduling system based on a priority, and executes control software for an NC unit according to the system. With Embodiment 2, the control software execution system A2 for an NC unit can execute a control according to a running time for task for realizing functions of an NC unit. For this reason, waste of time allocated to each task can be reduced. Furthermore, a task can be controlled according to the running time, and because of this feature system construction becomes easier.

Figure 15:
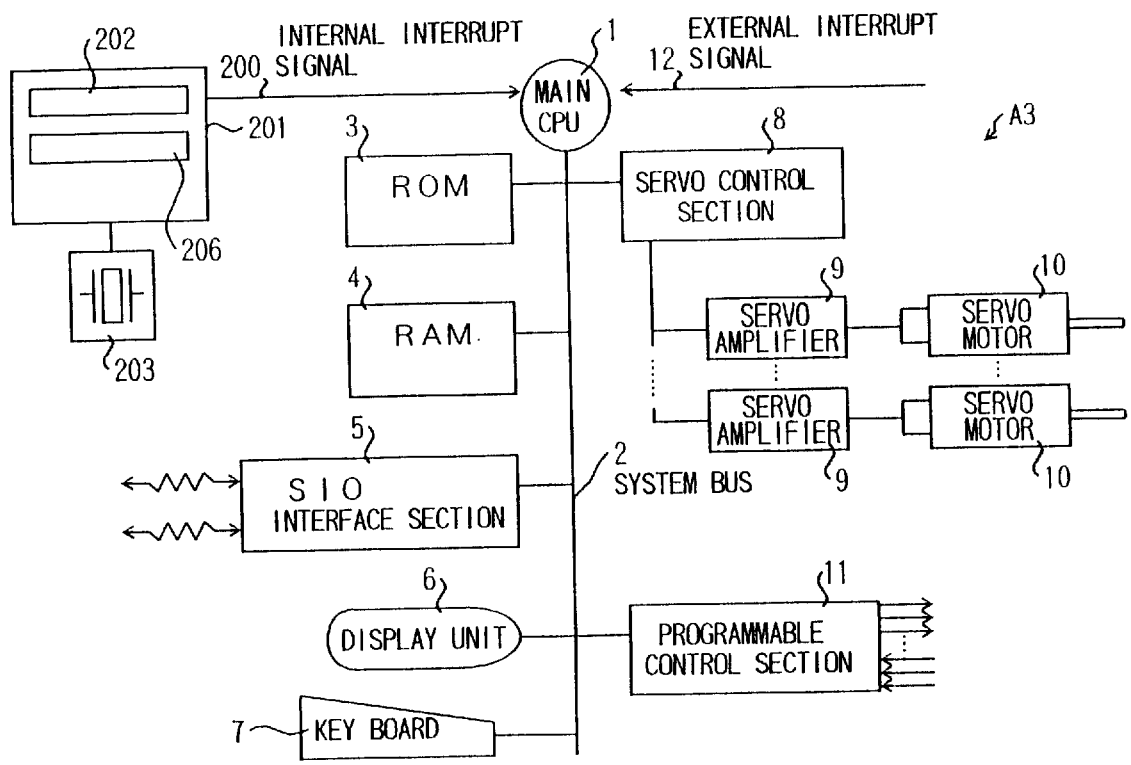
FIG. 15 is a block diagram showing general configuration of the control software execution system for an NC unit according to Embodiment 3.

Next, a description is made for configuration of Embodiment 3. The contents in FIG. 15 showing general configuration of the control software execution system A3 for an NC unit is substantially the same as those in FIG. 9 relating to Embodiment 2. It should be noted that in Embodiment 3, a counter register 206 is provided inside of the real time clock 201 like the counter register 202. In Embodiment 3, this counter register 206 is used for continuous run terminate interrupt.

Figure 16:
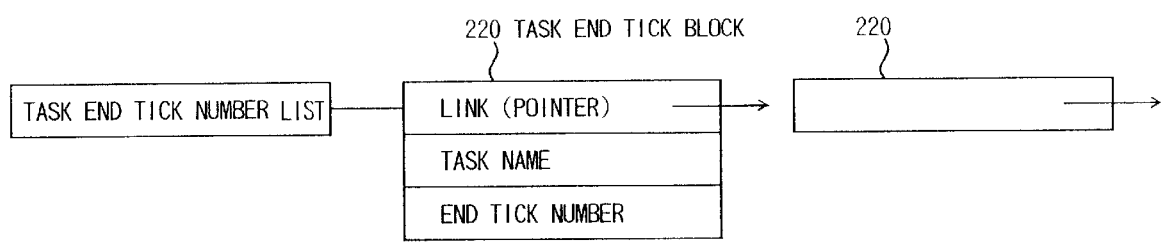
FIG. 16 is an explanatory view showing structure of a task end tick number list.
Figure 17:
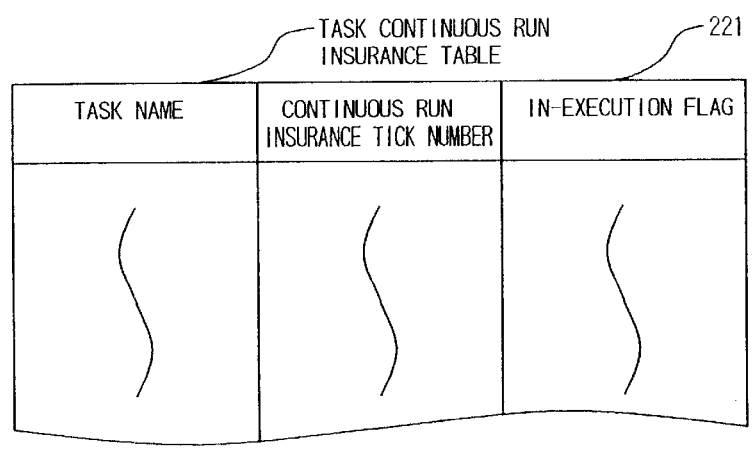
FIG. 17 is an explanatory view showing structure of a task continuous running insurance table.

Next, a description is made for operation in Embodiment 3. FIG. 16 and FIG. 17 each show data structure each required for insuring continuous run of a task, and FIG. 16 shows structure of a list for a "task end tick number".The reference numeral 220 indicates "a task end tick block". Components of the task end block include "a link (a pointer)" for linking a task end block, "a task name", and "an end tick number". Like in the description above, it is assumed also in the description of the present embodiment that internally time control is executed according to a number of ticks.

FIG. 17 shows the contents of "a task continuous run insurance table" 221. There are columns for "a name of task", "continuous run insurance tick number", and "in-execution flag", and a value of a continuous run insurance tick number is set when system control starts, or by SVC. A value in column is set to 0 to a task which does not require a continuous run. A column for the in-execution flag is turned ON when a task insured for its continuous run is currently running, and OFF in other cases, and two or more of this flags are never turned ON simultaneously. This table is not required if specified as a parameter in the SVC for a task start, but for convenience in the description hereinafter, it is assumed that this table is used in the present embodiment.

The scheduler in the RTOS insures a continuous run for a task by not executing re-scheduling after end of interrupt processing even if an interrupt is generated when a task, a continuous run of which is insured, is running. Execution of a task, a continuous run of which is insured, is terminated only when "continuous run end interrupt" has been generated.

Figure 18:
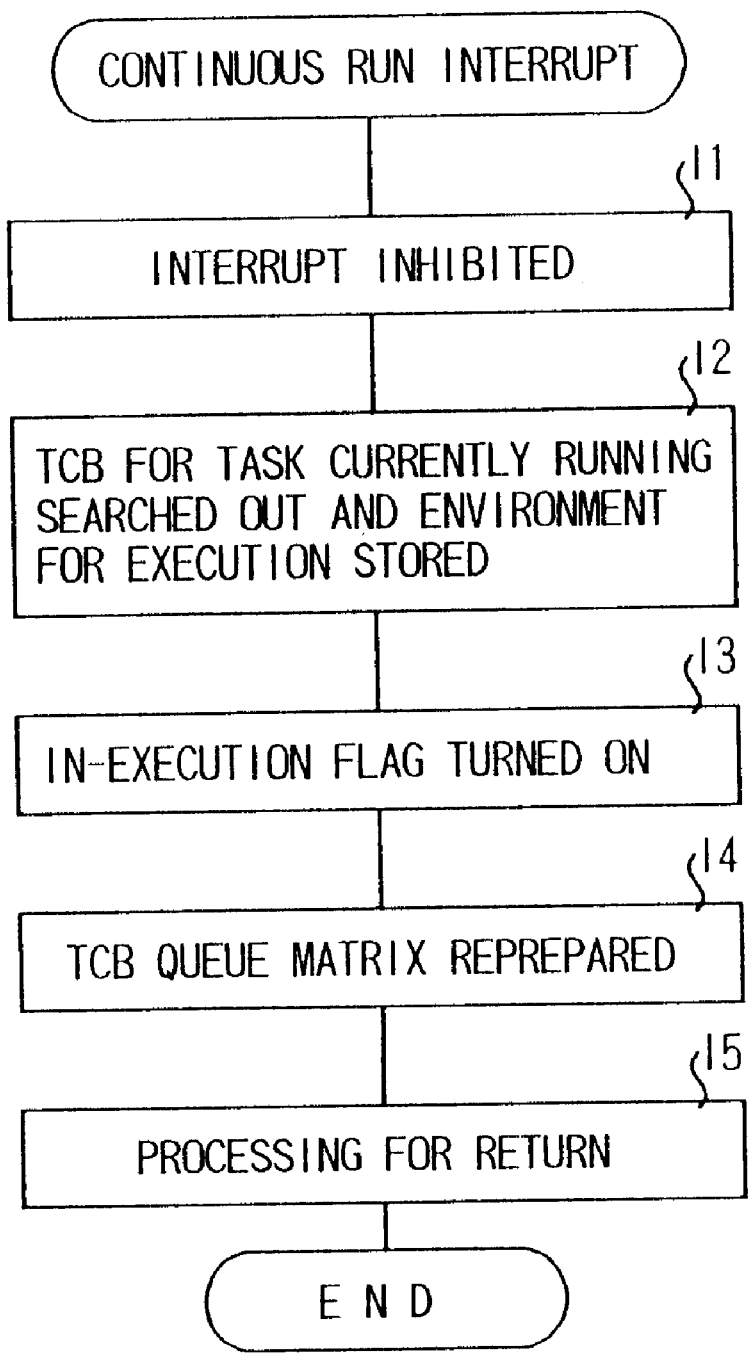
FIG. 18 is a flow chart showing a processing sequence for continuous running interrupt processing.

The RTOS determines at first, when the SVC for a task start has been issued, whether the task is a task, a continuous run of which is insured or not, and if it is determined that the task is the one, a continuous run of which is insured, a continuous run tick number is set from the task continuous run insurance table (Refer to FIG. 17) in the internal counter register 206 of the real time clock 201 (Refer to FIG. 15). When a period of time equivalent to the set clock number has passed, "a continuous run end interrupt" will be generated. Firstly, description is made for interrupt processing. FIG. 18 is a flow chart showing a processing sequence for a continuous run interrupt. Step I1 is a header step of the interrupt processing in a case where a certain interrupt is generated, and at first generation of other interrupt is inhibited. Generally, this processing is automatically executed by the main CPU 1. Step I2 is a processing for searching out a TCB for a task currently running, a continuous run of which is insured, and an environment for execution of the current task is stored in the TCB found out.

Then in step I3, the in-execution flag (Refer to FIG. 17) for the task is turned OFF. Step I4 is a processing for repreparing a queue matrix for a task processing according to dispatching priority. Furthermore, step I5 is a processing in which, if the interrupted processing is a task in execution, an environment for execution of a task is stored in a TCB, and system control jumps to the scheduler, and if it not, system control returns to the interrupted processing. In this step, an interrupt is permitted, as soon as system control has returned.

Figure 19:
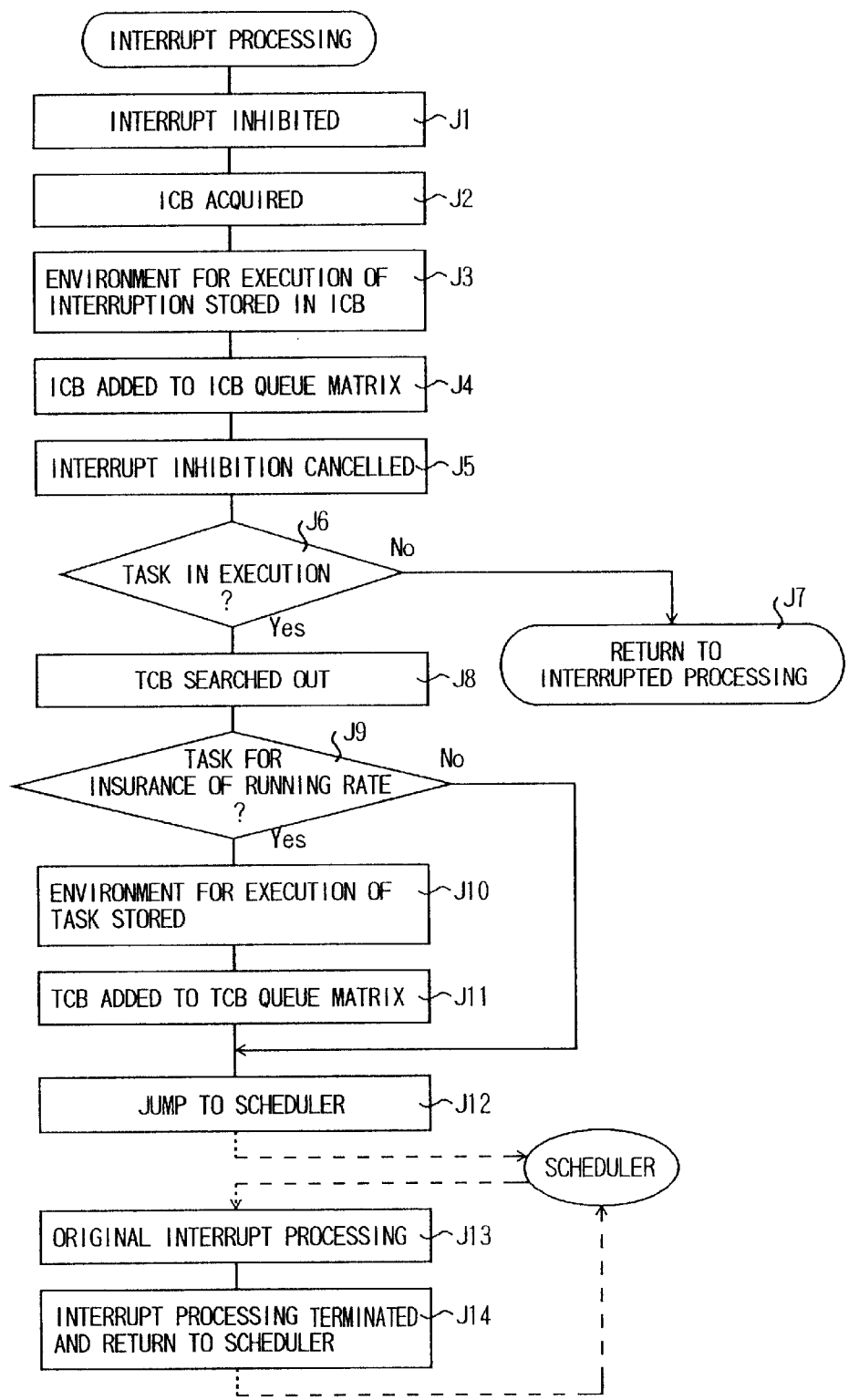
FIG. 19 is a flow chart showing a processing sequence for general interrupt processing.

Next, a description is made for a processing sequence for general interrupt with reference to FIG. 19. Step J1 is a header step of interrupt processing in a case where a certain interrupt is generated, and at first generation of other interrupt is inhibited. Generally this processing is automatically executed by the main CPU 1. In step J2, one ICB not used yet is acquired from the ICB pool (a site where ICBs not used yet are stored). In step J3, an environment for execution of this interrupt processing (for itself) is stored in the ICB. This operation also includes storage of the header address of the processing in step J13 as an address for an command to be executed next time.

In step J4, the prepared ICB is added to an ICB queue matrix to be executed by the scheduler. In step J5, inhibition of an interrupt in step J1 is canceled. After this step and on, there is a possibility that an interrupt may be generated again. The processing described above is for making an interrupt inhibited time as shorter as possible. In step J6, determination is made as to whether the interrupted processing is interrupt processing or an operation by the RTOS, or a task in execution.

Step J7 is a processing executed when the interrupted processing is interrupt processing or an operation by the RTOS, and in this case system control returns directly to the interrupted processing. On the contrary, step J8 is a processing executed when the interrupted processing is a task in execution, and in this case, at first, a TCB for the interrupted task is searched out. Step J9 is a processing for determining whether the task currently being executed is a task as an object for insurance of a continuous run or not. More particularly, determination is made as to whether the interrupted task is a task with a value of 1 or more in the column for continuous run insurance tick number in the task continuous run insurance table (Refer to FIG. 17) or not. In a case where it is determined that the task is an object task insured for its continuous run, nothing is executed in steps J10 and J11, and system control shifts to step J12.

Step J10 is a processing in a case where it is determined that the task is not an object insured for its continuous run, and an environment for execution of the interrupted task is stored in the TCB found out in step J8. In step J11, a TCB queue matrix (Refer to FIG. 5) is re-prepared according to the dispatching priority. In step J12, system control jumps to the scheduler. Step J13 is a processing to which system control returns from the scheduler. This processing is not always executed right after system control has jumped to the scheduler, and in some cases this processing might be executed after other ICB has processed, but in any case system control returns to this step. From this step on it is an original interrupt processing executed specifically to each interrupt, and the contents of processing varies according to a cause for each interrupt. Step J14 is a step for terminating interrupt processing, and in this step generally an command for return to an ordinary subroutine is issued. With this command, system control returns to an ICB processing section for scheduler.

As described above, the control software execution system A3 of an NC unit according to Embodiment 3 is based on a system in which a function capable of executing a control for giving insurance of a continuous running time to a task is added to a RTOS having only a scheduling system based on general dispatching priority, and control software for the NC unit is executed based on this system.

With Embodiment 3, the control software execution system A3 for an NC unit enables insurance of a continuous running time for tasks each realizing a function of the NC unit respectively. For this reason, waste of time allocated to each task can be reduced. Furthermore, a task can be controlled according to the running time, and because of this feature system construction becomes easier.

Figure 20:
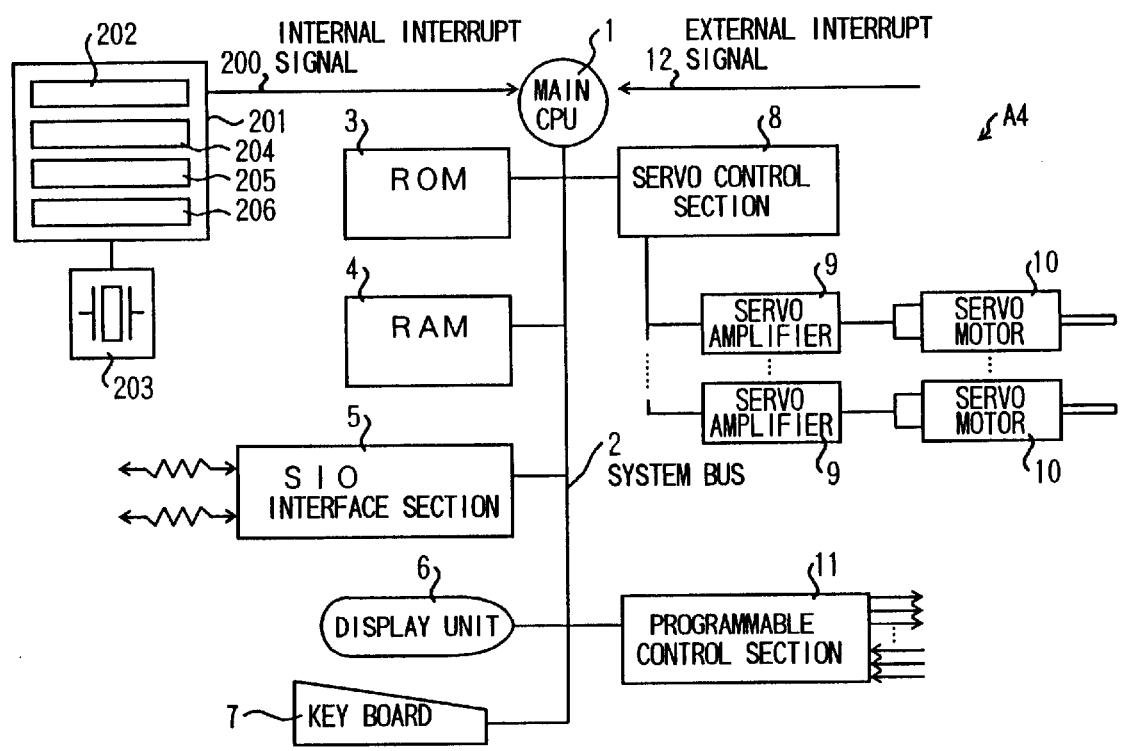
FIG. 20 is a block diagram showing general configuration of the control software execution system for an NC unit according to Embodiment 4.

Next, a description is made for configuration of Embodiment 4. Contents of FIG. 20 showing general configuration of a control software execution system A4 for an NC unit according to Embodiment 4 is substantially the same as contents of FIG. 1 relating to Embodiment 1. It should be noted that in Embodiment 1, an interrupt port of the real time clock 201 is used by only one channel, while in the present embodiment, it is different from that in Embodiment 1, four channels are used for it. Description is made hereinafter for the present embodiment with reference to FIG. 2 to FIG. 4 and FIG. 10.

Namely, the reference numeral 202 indicates a counter register provided inside of the real time clock 201, and this counter register decrements the value by 1 each time a clock signal is inputted from outside. When the value is decremented to 0, operation will be kept stopped until the default value is set again, or a value is set again from the main CPU 1. Selection of this operation, and setting or changing the default value can be executed freely from the main CPU 1.

The reference numerals 204, 205, and 206 indicate counter registers each provided inside of the real time clock 201. These registers decrement the value by 1 each time a clock signal is inputted from outside. When the value is decremented to 0, the default value is set again. Also the default value can be set freely from the main CPU 1. The counter registers 202, 204, 205, and 206 can be set or canceled independently from each other. In the present embodiment, the counter registers 202 to 206 are used each for measurement of a task running time, reference time interrupt, running time alarm, and task running interrupt respectively.

Next description is made for operations of the control software execution system A4 of the NC unit. An execution cycle for each task is registered by the SVC when the task is preset or started like in Embodiment 1.

This data is registered in, for instance, "the task running cycle table" 50 as shown in FIG. 2 by the RTOS. FIG. 2 shows data structure having columns for "a running cycle" and "times of repetition" for each task. The running cycle is a value of a clock number indicating a period of time until the task runs next time, while times of repetition indicates how many times the task will be started. For instance, if this value is a minus one, it is assumed that the value is infinite. In that case the task is started repeatedly. The RTOS prepares "the task running queue list" 51 as shown in FIG. 3 each time the task is started by using this task running cycle table 50.

In FIG. 3, each running queue block 52 in the list is a block comprising "a task name", "a running schedule clock number" indicating how long a time should pass from the current point of time before execution of the task is started, and "simultaneous task name" indicating names for tasks to be run simultaneously. The method for the RTOS to prepare a task running queue list is the same as that shown in FIG. 4 relating to Embodiment 1, so that description thereof is omitted herein.

Also as described in Embodiment 2, FIG. 10 shows data configuration required for insurance of a running rate for a task, and the reference numeral 210 indicates a "task start tick memo". The value of the internal counter register 202 (Refer to FIG. 20) of the real time clock 201 (Refer to FIG. 20) is recorded right before the RTOS starts execution of a task. Then a period of time the task has run is computed by obtaining a difference between the recorded value and the value of the internal counter register 202 (Refer to FIG. 20) when system control returns to the RTOS after execution of the task has been finished.

The columns for "a reference cycle" 211, "a task running state memo" 212, "a remaining running tick number", and columns of "a number of times of repetition" and "a running inhibited flag" each shown in FIG. 10 are the same as those in Embodiment 2, so that description thereof is omitted herein.

A running schedule clock number for a header block of a running queue list in steps B4 and B16 shown in FIG. 4 is stored in the counter register 202 (Refer to FIG. 20) of the real time clock 201 (Refer to FIG. 20), and after a period of time equivalent to the specified clock number has passed, "a task start interrupt" is generated. This processing for task start interrupt is the same as that described according to FIG. 7 in Embodiment 1, so that description thereof is omitted herein.

The control software execution system A4 shown in FIG. 20 presets a value for the reference cycle 211 (Refer to FIG. 10) in the counter register 204 provided inside of the programmable interval timer 201, for instance, when the system has been actuated before a task for which a running rate is insured is started. After a period of time equivalent to this preset tick number has passed, a reference cycle interrupt is generated.

A processing sequence for the reference cycle interrupt is the same as that described with reference to FIG. 11 relating to Embodiment 2, so that description thereof is omitted herein. Also a processing sequence for the running time alarm interrupt is also the same as that described with reference to FIG. 12 relating to Embodiment 2, so that description thereof is omitted herein. A processing sequence for the general interrupt other than the reference cycle interrupt is also the same as that described with reference to FIG. 13 relating to Embodiment 2, so that description thereof is omitted herein. Furthermore an operation of the scheduler for the RTOS is also the same as the sequence described with reference to FIG. 14 relating to Embodiment 2, so that description thereof is omitted herein.

Herein description is made for a task start interrupt, a reference time interrupt, a running time alarm interrupt, and a general interrupt centering on operations to the TCB queue matrix.

The task start interrupt is a processing for inserting the TCB for a task started by this interrupt to the header of the TCB queue matrix. Also the reference time interrupt enables run of all the tasks. The running time alarm interrupt is a processing for reporting to a general interrupt the fact that a running time alarm interrupt has been generated by setting the TCB for a task, a rate of running time of which is insured, in front of the TCB for task not insured for continuous run and at the same time by turning ON a running inhibited flag in the task running state memo 212 (Refer to FIG. 10). Furthermore in a general interrupt, the TCBs for tasks insured for a running time are linked to those for tasks, a running time for which is not insured, until a reference time interrupt is generated in a case where a running time alarm interrupt has been generated by the processing for running time alarm interrupt.

Herein, either one of the dispatching priority selection schemes according to a task start interrupt or to a general interrupt is previously specified. If a scheme according to a task start interrupt is selected, a time to start a task becomes more accurate, but a running rate for a task becomes somewhat inaccurate. On the contrary, if a scheme according to a general interrupt is selected, a running rate for a task becomes more accurate, but a time for starting the task becomes somewhat inaccurate. For selecting either one of the schemes, a threshold value may be specified by any means. For instance, a scheme is advisable in which priority is put on a running rate so long as a delay of a time to start a task is not more than a prespecified period of time, but the priority is put on start of a task when the delay exceeds the prespecified period of time.

As described above, the control software execution system A4 for the NC unit according to Embodiment 4 is based on a system in which a function capable of providing controls for a task start cycle as well as for insurance of a running rate of a task is added to the RTOS having only a scheduling system based on normal dispatching priority, and executes control software for an NC unit according to this system.

With Embodiment 4, the control software execution system A4 for the NC unit can provide controls for accurate starting time and a running time for tasks each realizing a function of the NC unit respectively. For this reason, waste of time allocated to each task can be reduced, and furthermore execution of a task can be controlled according to the running time, and because of this feature system construction becomes easier.

Next, a description is made for Embodiment 5. The general configuration of a control software execution system A5 for an NC unit according to Embodiment 5 is the same as that shown in Embodiment 1, so that description thereof is omitted herein.

Next, a description is made for operations of the control software execution system A5 for an NC unit according to Embodiment 5. Like in Embodiment 1, an execution cycle for each task is registered by the SVC previously or when the task is started.

The data is registered by the RTOS in, for instance, the "task running cycle table" 50 as shown in FIG. 2. "A running cycle" and "times of repetition" in this task running cycle table 50 are the same as those in Embodiment 1, so that description thereof is omitted herein.

In FIG. 3, each running queue block in the list is a block each comprising "a task name", "a running schedule clock number" indicating how long a time should pass from the current point of time on before execution of the task is started, and "a simultaneous task name" indicating names of tasks to be run simultaneously. The method in which the RTOS prepares this task queue list is the same as that shown in FIG. 4 in Embodiment 1, so that description thereof is omitted herein.

Also as Embodiment 3, FIG. 16 and FIG. 17 show data structure required for insurance of a running rate of continuous run for a task, and FIG. 16 shows structure of the list of "a task end tick number". The reference numeral 220 indicates "a task end tick block". Components of the task end block are a pointer for linking the task end blocks to each other, "a task name", and "an end tick number" or the like. As in the description above, it is assumed in the description of the present embodiment that internally time control is executed always according to a number of ticks. The column of "inexecution flag" is turned ON when a task, currently continuous run of which is insured, is running, and OFF in other cases. Two or more of this flags are never turned ON simultaneously.

FIG. 17 shows a "task continuous run insurance table" 221. This table has columns for a "task name" and a "task continuous run insurance tick number", and the value of a continuous run tick number is set when system control starts or by the SVC. A value in this column is set to 0 for a task with a continuous run not specified. Although this table is not required if it is specified as a parameter thereof in the SVC for task start, for convenience in description hereinafter, it is assumed that this table is used.

The scheduler in the RTOS insures a continuous run for a task by not executing re-scheduling after interrupt handing has finished even if an interrupt is generated while a task, a continuous run of which is insured, is running. An execution of the task, a continuous run of which is insured, is terminated only when a "continuous run end interrupt" is generated.

When the SVC for a task start is issued, the RTOS at first determines whether the task is one, a continuous run of which is insured, or not, and if it is determined that the task is the one insured for a continuous run, a continuous run tick number is set in the counter register inside of the real time clock 201 (Refer to FIG. 1) from the task continuous run insurance table 221 (Refer to FIG. 17). After a period of time equivalent to the set clock number has passed, a "continuous run end interrupt" is generated.

A processing sequence for a continuous run end interrupt is the same as the contents in FIG. 18 relating to Embodiment 3, so that description thereof is omitted herein. A processing sequence for the general interrupt other than the reference cycle interrupt is also the same as that described with reference to FIG. 19 relating to Embodiment 3, so that description thereof is omitted herein. As for the scheduler, it is also the same as a conventional type thereof, so that description thereof is omitted herein.

Herein, description is made for a continuous run end interrupt and a general interrupt centering on operations to the TCB queue matrix, namely the following three points:

1) When a task start interrupt is generated, the TCB for a task started by this interrupt is inserted to the header of the TCB queue matrix.

2) When a continuous run end interrupt is generated, the inexecution flag of the in-execution task is turned OFF, and other task is allowed to run.

3) When a general interrupt is generated, a dispatch of the TCB queue matrix is not executed for a task for which a continuous run is insured.

Herein either one of dispatching priority schemes 1) and 3) described above is previously selected. If the scheme 1) is selected, a time to start a task becomes more accurate, but a continuous running time for a task becomes somewhat inaccurate. On the other hand, if the scheme 3) is selected, a continuous running time for a task becomes more accurate, but a time to start a task becomes somewhat inaccurate. For selecting either one of the schemes, a threshold value may be decided by any means. For instance, a scheme is advisable in which priority is put on continuous run so long as a delay of a time to start a task is not more than a prespecified period of time, but the priority is put on start of a task when the delay exceeds the prespecified period of time.

As described above, the control software execution system A5 for the NC unit according to Embodiment 5 is based on a system in which a function capable of providing controls for a task start cycle as well as for insurance of continuous run of a task is added to the RTOS having only a scheduling system based on general dispatching priority, and executes control software for an NC unit according to this system.

With Embodiment 5, the control software execution system A5 for the NC unit can provide controls for accurate starting time as well as a time for continuous run of tasks each realizing a function for an NC unit respectively. For this reason, waste of time allocated to each task can be reduced, and furthermore execution of a task can be controlled according to the running time, and because of this feature system construction becomes easier.

Figure 21:
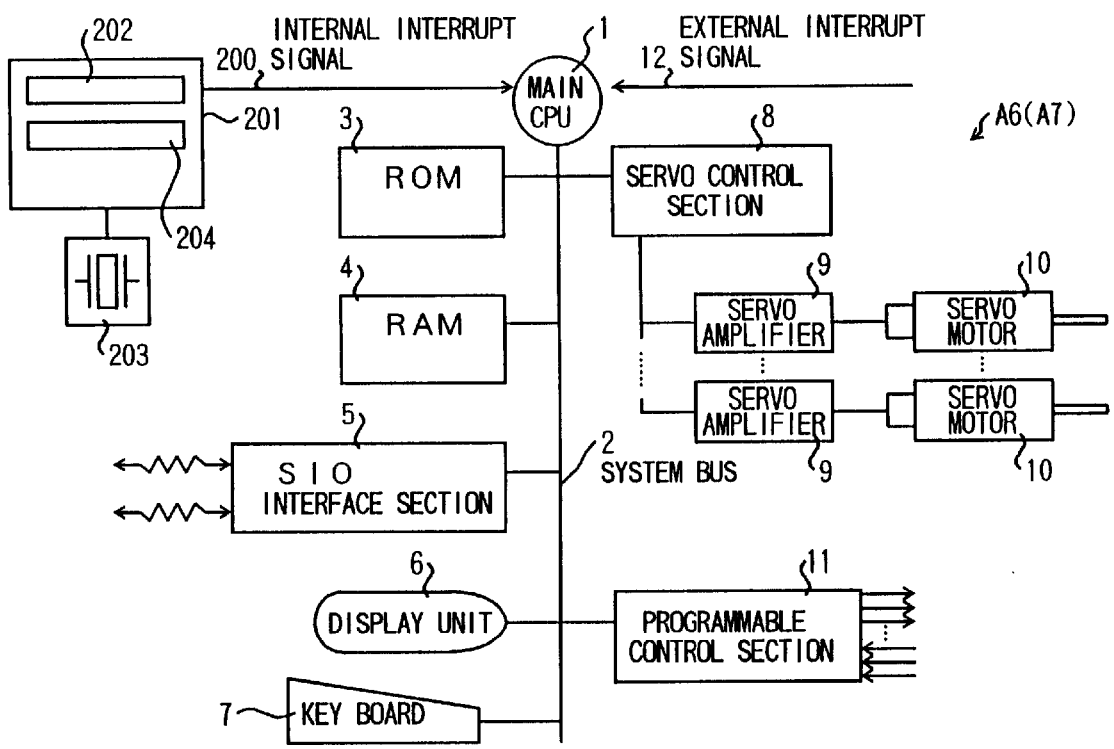
FIG. 21 is a block diagram showing general configuration of the control software execution system for an NC unit according to Embodiment 6.

Next, a description is made for Embodiment 6 of the present invention. FIG. 21 shows general configuration of an control software execution system A6 for an NC unit according to Embodiment 6, and the contents is substantially the same as Embodiment 1. It should be noted that, although in Embodiment 1 only one channel of an interrupt port for the real time clock 201, two channels are used in this embodiment.

In this figure, the reference numerals 202, 204 each indicates a counter register inside of the real time clock 201. The counter registers 202, 204 are set and released each independently. In this embodiment, the counter registers 202, 204 are used for measurement of task running time respectively.

Next, a description is made for operations of the control software execution system A6 for an NC unit. In an RTOS for the control software execution system A6 according to the present embodiment, previously, or for instance when operation of the system is started, the internal counter registers 202, 204 in the real time clock 201 are set so that default values are set again when the count is decremented to zero (0), and also an interrupt will not be generated even when the count is decremented to zero (0).

Also immediately before a task is started, the counter value is read and stored. Also immediately after operation for the task is finished, the counter value is again read, and a difference between the value and the value having been stored is obtained. The value indicates a clock number indicating a running time of the task. Then a site for storing a sum of the values is prepared for each task, and a sum of a running time of each task is recorded by adding a count read each time to the sum stored at the site.

Figure 22:
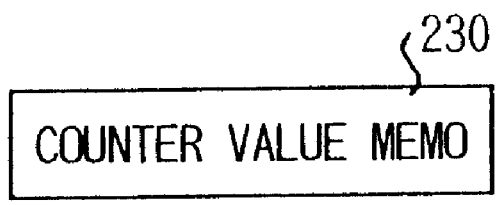
FIG. 22 is an explanatory view showing data structure required for the control software execution system for an NC unit according to Embodiment 6.
Figure 23:
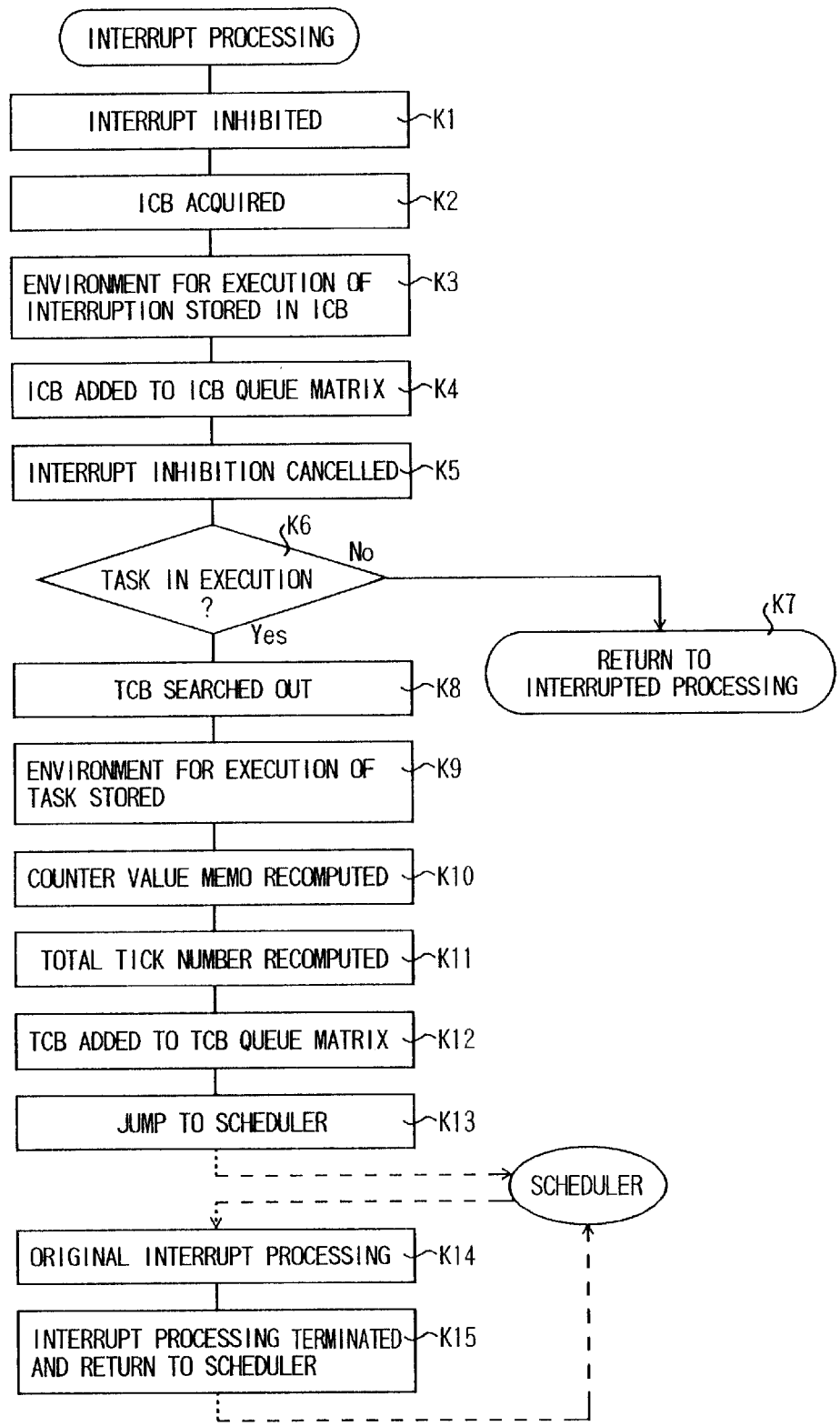
FIG. 23 is a flow chart showing a processing sequence for general interrupt processing.
Figure 24:
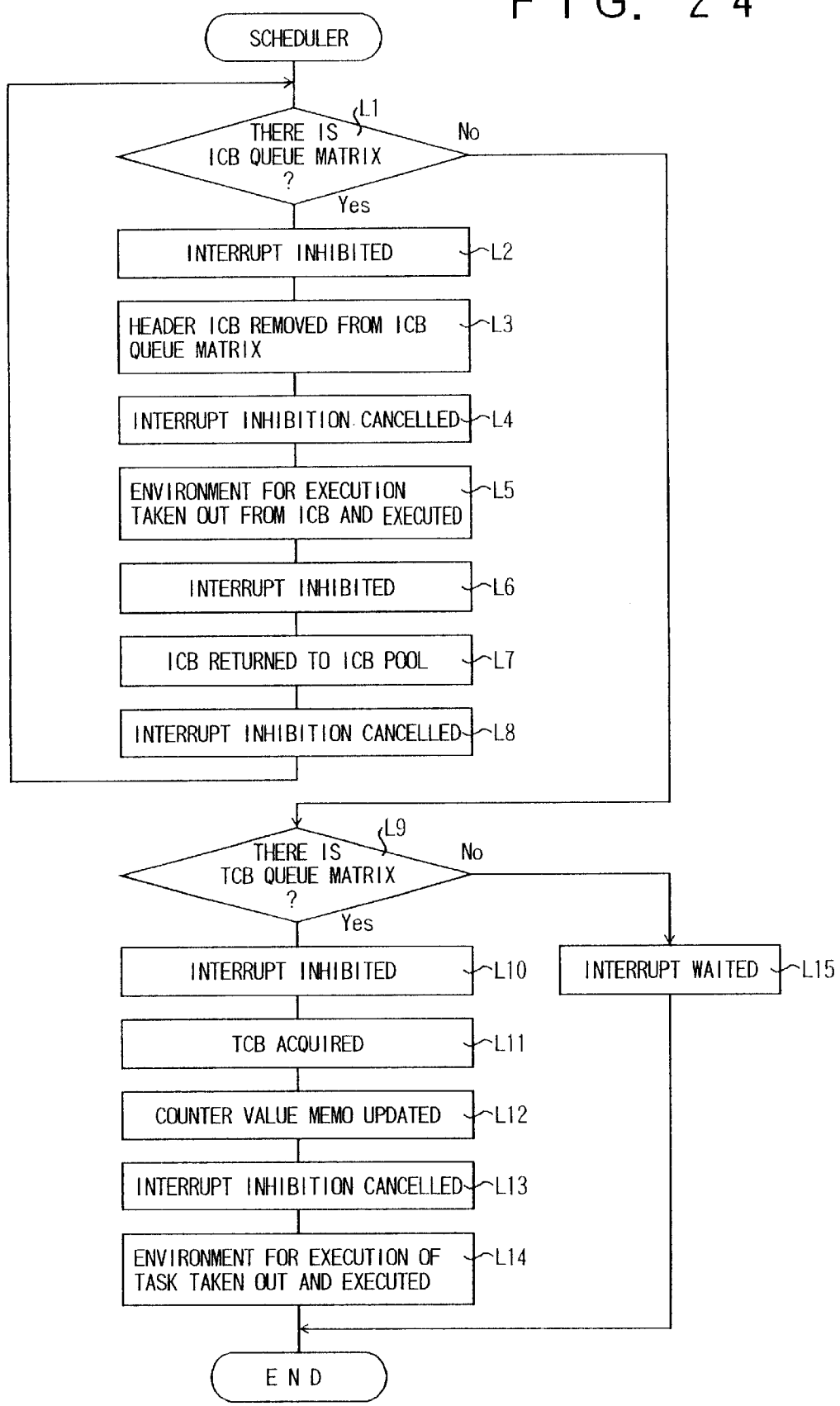
FIG. 24 is a flow chart showing a sequence for a processing by a scheduler.

Next, further detailed description is made for operations of the control software execution system A6 for an NC unit according to the present embodiment. FIG. 22 shows data structure required for recording a running time of each task, and the reference numeral 230 indicates a counter value memo, while the reference numeral 231 indicates a task running time table, and this table has a column for a total tick number for each task as shown in the figure. FIG. 23 shows a flow chart showing a processing sequence in general interrupt processing, and FIG. 24 is a view showing a sequence of processing by a scheduler.

FIG. 23 is a flow chart showing a processing sequence in general interrupt processing, and step K1 is an operation executed first in interrupt processing when an interrupt is generated, and with this operation generation of other interrupt is inhibited. Generally this processing is automatically executed by the main CPU 1. In step K2, one ICB not used yet is acquired from the ICB pool (which is a site where ICBs not used yet are stored). In step K3, an environment for execution of this interrupt processing (itself) is stored in the ICB. This operation includes also storage of a header address for a processing in step K8 as an address for an command to be executed next. In step K4, the ICB prepared herein is added to an ICB queue matrix to be executed by the scheduler. In step K5, inhibition of interrupt by step K1 is canceled. From this step and on, there is a possibility that an interrupt is generated again. The processing described above is for making a time of interrupt inhibition as short as possible.

In step K6, determination is made as to whether the interrupted processing is interrupt processing or RTOS, or execution of a task. The step K7 is an operation executed when it is determined that the interrupted processing is interrupt processing or execution of an RTOS, and system control directly returns to the interrupted processing. Step K8 is a processing executed when it is determined that the interrupted processing is execution of a task, and a TCB for the interrupted task is searched out. In step K9, an environment for execution of the interrupted task is stored in the TCB found out in step K8.

Step K10 is a processing for reading a value of the internal counter register 204 in the real time clock 201 (Refer to FIG. 21) and subtracting the value from a value provided in the counter value memo 230 (Refer to 22). The result is a number of ticks indicating a period in which the task continuously ran in the cycle. In step K11, the value obtained in step K10 is added to a column for the total tick number for the task in the task running time table 231 (Refer to FIG. 22). In step K12, the prepared TCB is added to an order of priority in the TCB queue matrix to be executed by the scheduler. Step K14 is a processing executed after having returned from the scheduler. This processing is not always executed right after jumping to the scheduler, and in some cases this processing is executed after other ICB is processed, but in any case system control returns to this step. The sequence from this step on is an original interrupt processing specific to each interrupt, and contents of the processing varies according to a case for interrupt. Step K15 is a processing to terminate interrupt processing, and generally an command for return to the ordinary subroutine is issued, and system control returns to the scheduler's ICB processing section according to this return command.

FIG. 24 shows operations of the RTOS according to this embodiment. For convenience in description, it is assumed that an idle task having the lowest priority and executing nothing to external devices is always running in this embodiment.

Step L1 is a processing to determine whether there is any queue matrix for interrupt processing or not. Step L2 is a processing executed when it is determined that there is a queue matrix for interrupt processing, and at first interrupt is inhibited to execute the queue matrix. This is because, if an interrupt is generated during a processing of list of queue matrix for interrupt processing and it is tried to add the interrupt to the queue for interrupt processing, consistency of the list is lost.

Step L3 is a processing for removing a header ICB from a list of queue matrix for interrupt processing. In step L4 inhibition of interrupt is canceled. In step L5, an environment for execution of interrupt processing such as an execution address or a register stored in step K3 (Refer to FIG. 23) is taken out from the ICB removed in step L3 and the required processing is executed. This is a processing executed in step K14 (Refer to FIG. 23). Step L6 is a step to which system control returns from step K15 (Refer to FIG. 23), and interrupt is inhibited again. In step L7, the ICB removed in step L3 is returned to the ICB pool. In step L8, inhibition of interrupt is canceled, and then system control returns to step L1. Then, as long as there is a queue matrix for interrupt processing, the processing sequence from step L1 to step L7 is repeated.

Step L9 is a step for determining whether there is a queue matrix for TCB, and step L10 is a processing executed when it is determined that there is a queue for interrupt processing, and at first interrupt is inhibited to execute the queue matrix. Step L11 is a processing for removing a header TCB from a list of queues matrix for interrupt processing. In step L12, a value provided by the internal counter register 204 (FIG. 22) for measuring a running time in the real time clock 201 (Refer to FIG. 21) is stored in the counter value memo 230 (Refer to FIG. 22).

In step L13, inhibition of interrupt is canceled. In step L14, an environment for execution of the task stored in step K9 (Refer to FIG. 23) is taken out from the TCB removed from the queue matrix (list) for task processing in step L11 and the task is executed. In this case, system control jumps to the processing, and never returns to this step. Step L15 is a processing executed when it is determined in step L9 that there is no TCB queue matrix, and interrupt is waited for.

As described above, by checking the task running time table 231 (Refer to FIG. 22) after having this system executed for a required period of time, it is possible to confirm a period of time when each task actually ran (for executing a processing in each task).

It should be noted that, if a column for a number of times for task running is provided, in addition to that for task running time, in the task running time table 231 (Refer to FIG. 22) to record a number of times of task running, it is useful when deciding a running cycle, a running rate, and running time for a task described below.

Furthermore, by providing, in addition to the counter value memo 230 (Refer to FIG. 22), a task end counter value memo, and by storing a value of the internal counter register 204 (Refer to FIG. 21) in the real time clock 201 (Refer to FIG. 21) in the beginning of interrupt processing and using a value obtained by subtracting a value in the task end counter value memo from a value in the counter value memo 230 as a number of ticks indicating a period of time when the task run continuously, it is possible to obtain a true time when the task ran excluding the time for interrupt processing.

As described above, the control software execution system A6 for an NC unit according to Embodiment 6 is based on a system with a function to check an actual running time of a task, and control software for an NC unit is executed according to this system.

With Embodiment 6, the control software execution system A6 for an NC unit can easily execute such operations as running time allocation to each task by checking an accurate time required for execution of each task realizing functions of the NC unit, and because of this feature system construction becomes easy.

Next, a description is made for Embodiment 7 of the present invention. General configuration of the control software execution system A7 for an NC unit according to Embodiment 7 is the same as that in Embodiment 6, so that description thereof is omitted herein.

Next, a description is made for operations of the control software execution system A7 according to the present invention. The RTOS in the control software execution system A7 according to the present embodiment is set so that, if a value of internal counter register in the real time clock 201 is decremented to zero (0), previously or for instance, when service operation of the system is started, the default value is set again, and an interrupt will not be generated even if a value of the internal counter register is decremented to zero (0).

Also immediately before execution of a task is started, the counter value is read and stored, and immediately after execution of the task is finished, the counter value is read again, and a difference between the value and the value having been stored is computed. The value is a clock number indicating a period of time when the task ran last. A site for storing therein a sum of the values is prepared for each task, and by accumulating the values at the site, a total of running time of each task is recorded. Furthermore an ICB processing executed by a scheduler in the conventional technology is executed not by a scheduler, but by a task having the highest priority.

Figure 25:
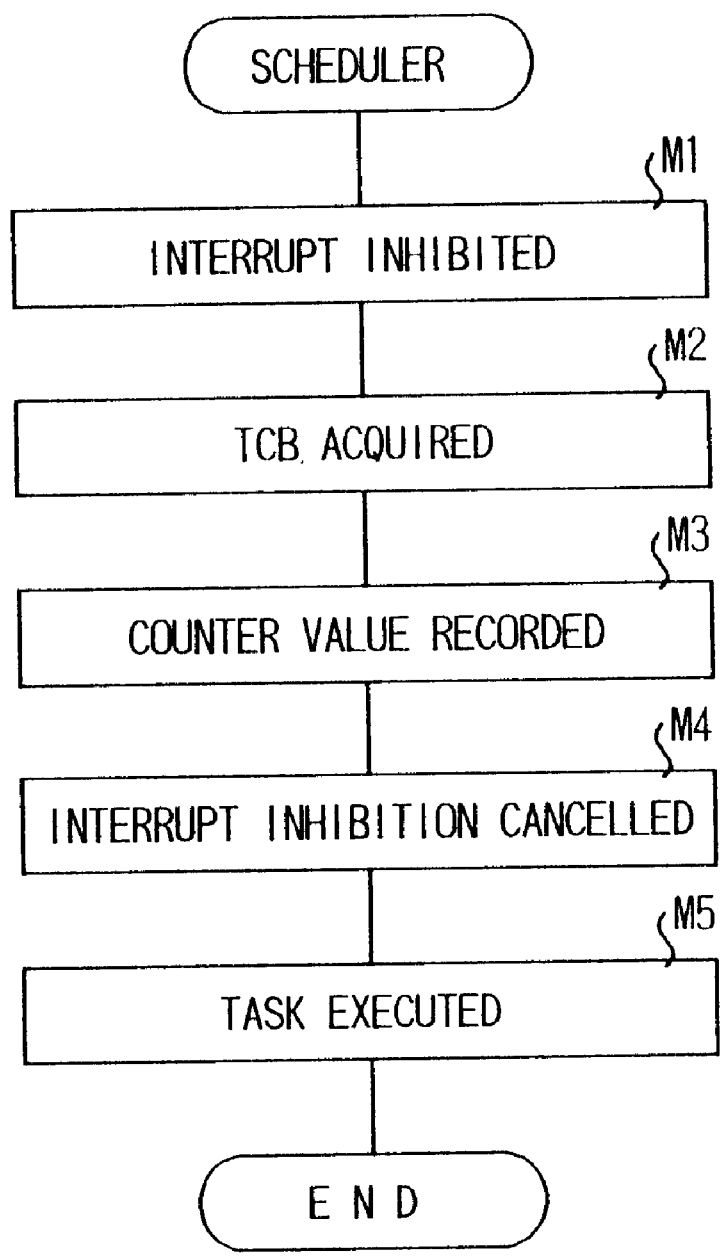
FIG. 25 is a flow chart showing a sequence for a processing by a scheduler.
Figure 26:
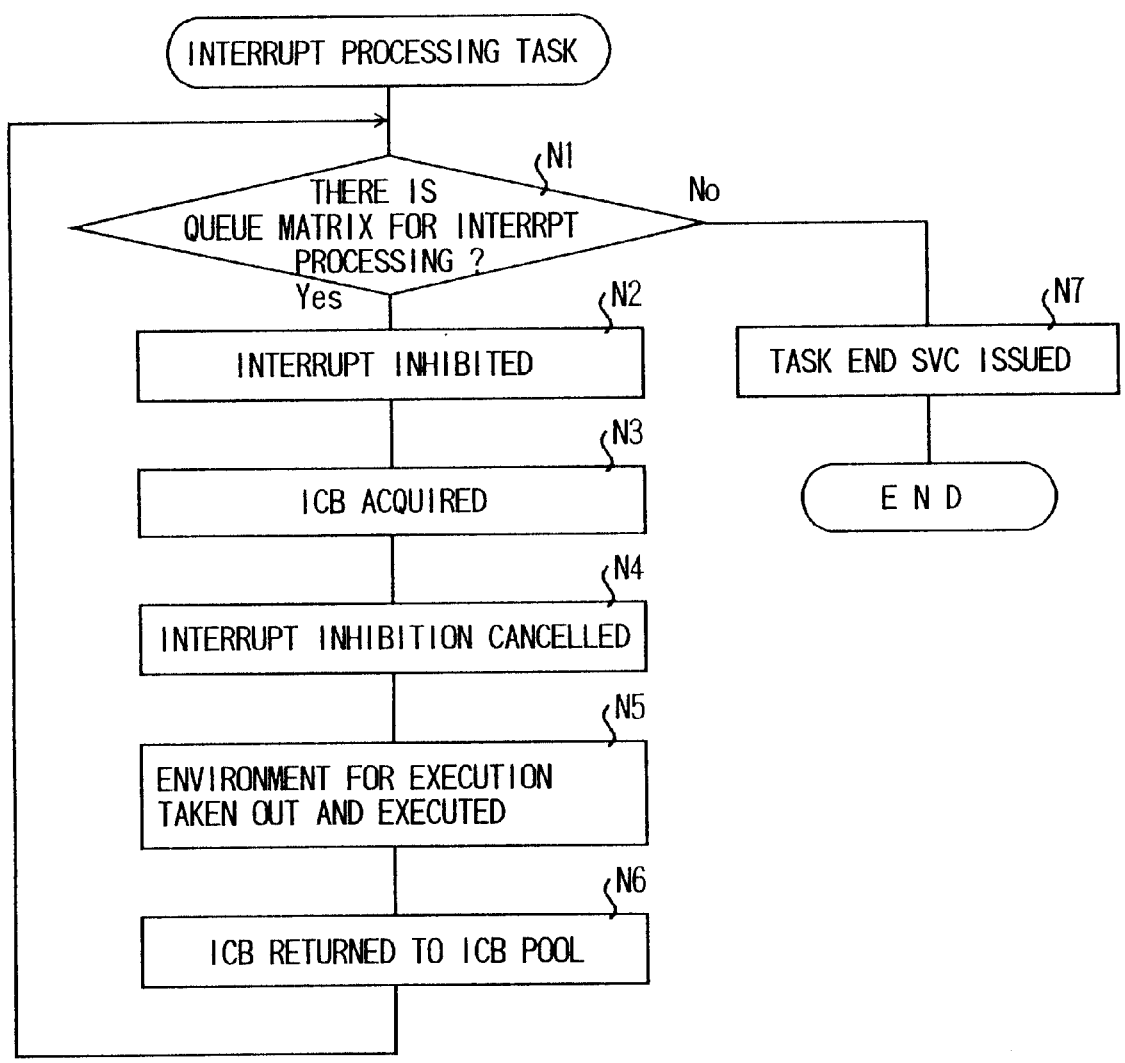
FIG. 26 is a flow chart showing a processing sequence for a task for interrupt processing.

Next, further detailed description is made for operations in execution of the control software for an NC unit according to the present Embodiment. FIG. 25 is a flow chart showing a sequence of processing by the scheduler, and FIG. 26 is a flow chart showing a processing sequence of a task for interrupt processing having the highest dispatching priority. As data structure, the same ICB (Interrupt control block) as that in the conventional technology is used. The interrupt processing in this embodiment is the same as that in the previous embodiments, so that description thereof is omitted herein.

FIG. 25 shows operations of a scheduler in the RTOS according to the present embodiment, and it is assumed in description of the present embodiment that an idle task is provided and the idle task is always queuing for execution. Step M1 is a processing executed when there is a queue matrix for task processing (TCB), and to execute the queue matrix, at first an interrupt is inhibited. In step M2, a header TCB is removed from a list of queues matrix for interrupt processing. In step M3, a value of the internal counter register 204 (Refer to FIG. 21) for measurement of a running time in the real time clock 201 (Refer to FIG. 21) is stored in the counter value memo 230 (Refer to FIG. 22).

In step M4, inhibition of an interrupt is canceled. In step M5, an environment for execution of a task stored during interrupt processing is taken out from the TCB removed from the queue matrix (list) for task processing in step M3, and the task is executed. In this step, system control jumps to the processing, and does not return to this step.

FIG. 26 shows operations in a task for executing interrupt processing according to the present embodiment. Step N1 is a processing for determining whether there is a queue matrix for interrupt processing or not. Step N2 is a processing executed when it is determined that there is a queue matrix for interrupt processing, and to execute matrix the queue, at first an interrupt is inhibited. This operation is executed because, if an interrupt is generated and it is tried to add the interrupt to the queue while the list of the queue matrix for interrupt processing is being processed, consistency of the list is lost.

Step N3 is a processing for acquiring a header ICB from a list of queue matrix for interrupt processing. In step N4, inhibition of an interrupt is canceled. In step N5, an environment for execution of interrupt processing such as an execution address or a register stored during interrupt processing is taken out from the ICB removed in step N3, and the processing is executed. Step N6 is a processing for returning the ICB removed in step N3 to the ICB pool. Then system control returns to step N1, and a sequence from N1 to N6 is repeated while there is a queue matrix for interrupt processing. Step N7 is a processing executed when there is no queue matrix for interrupt processing (ICB), and in this case an SVC for terminating a task is issued, and a right to use the main CPU 1 is delivered to other task.

As described above, after the control software execution system according to the present embodiment is run for a necessary period of time, by checking the task running time table 231 (Refer to FIG. 22), it is possible to know the period of time in which each task actually ran (the processing was executed).

Furthermore by executing interrupt processing at a level of task processing, a running time of a task for execution of interrupt processing can be regarded as a time for interrupt processing, also a time required for interrupt processing can be measured. Also by designing the system so that a running time for each cause for an interrupt can be recorded within a task for execution of interrupt processing, a time required for processing according to each cause for interrupt can be measured.

As described above, the control software execution system A7 for an NC unit according to the Embodiment 7 is a system in which a function to know an actual running time for execution of a task as well as for a time required for interrupt processing is added, and executes control software for an NC unit according to the system.

With Embodiment 7, the control software execution system A7 for an NC unit can easily execute such a processing as allocation of a running time to each task by knowing an accurate period of time required for execution of a task realizing a function of the NC unit as well as a time required for interrupt processing, and for this reason system construction becomes easier.

Next, a description is made for Embodiment 8. In an NC unit having a means for measuring a running time for a task or interrupt processing, and furthermore having a means for changing a running time for a task, there are a plurality types of general configuration for a control software execution system A8 for an NC unit realizing the functions described above according to a way to specify a running time or running rate for a task. However, in this embodiment, for convenience in description, description is made for a case where a running rate for a task can be specified.

General configuration of the control software execution system A8 for an NC unit according to Embodiment 8 is substantially the same as that in Embodiment 2 (Refer to FIG. 9), so that description thereof is omitted herein. A processing for insuring a running rate for a task is substantially the same as that in Embodiment 2 (FIG. 11 to FIG. 12), and the required data structure is also the same as that therein, and the system comprises a task start tick memo 210 (Refer to FIG. 10), a region 211 for storing a reference cycle (Refer to FIG. 10), and a task running state memo 212 (Refer to FIG. 10). The task running state memo 212 (Refer to FIG. 10) has columns for a remaining running tick number, times of repetition, and a running inhibited flag.

Furthermore, to measure a running time for a task, a task running time table 231 (Refer to FIG. 22) is provided in the system like that in Embodiment 6. Also the task running time table 231 (Refer to FIG. 22) has a column for a total tick number for each task. It should be noted that a counter value memo 230 (Refer to FIG. 22) is not used herein because it plays the same role as the task running state memo 212 (Refer to FIG. 10). Also a sequence of reference time interrupt processing and a sequence of running time alarm interrupt processing are the same as those in Embodiment 2 (Refer to FIG. 11 and FIG. 12), so that description thereof is omitted herein.

Figure 27:
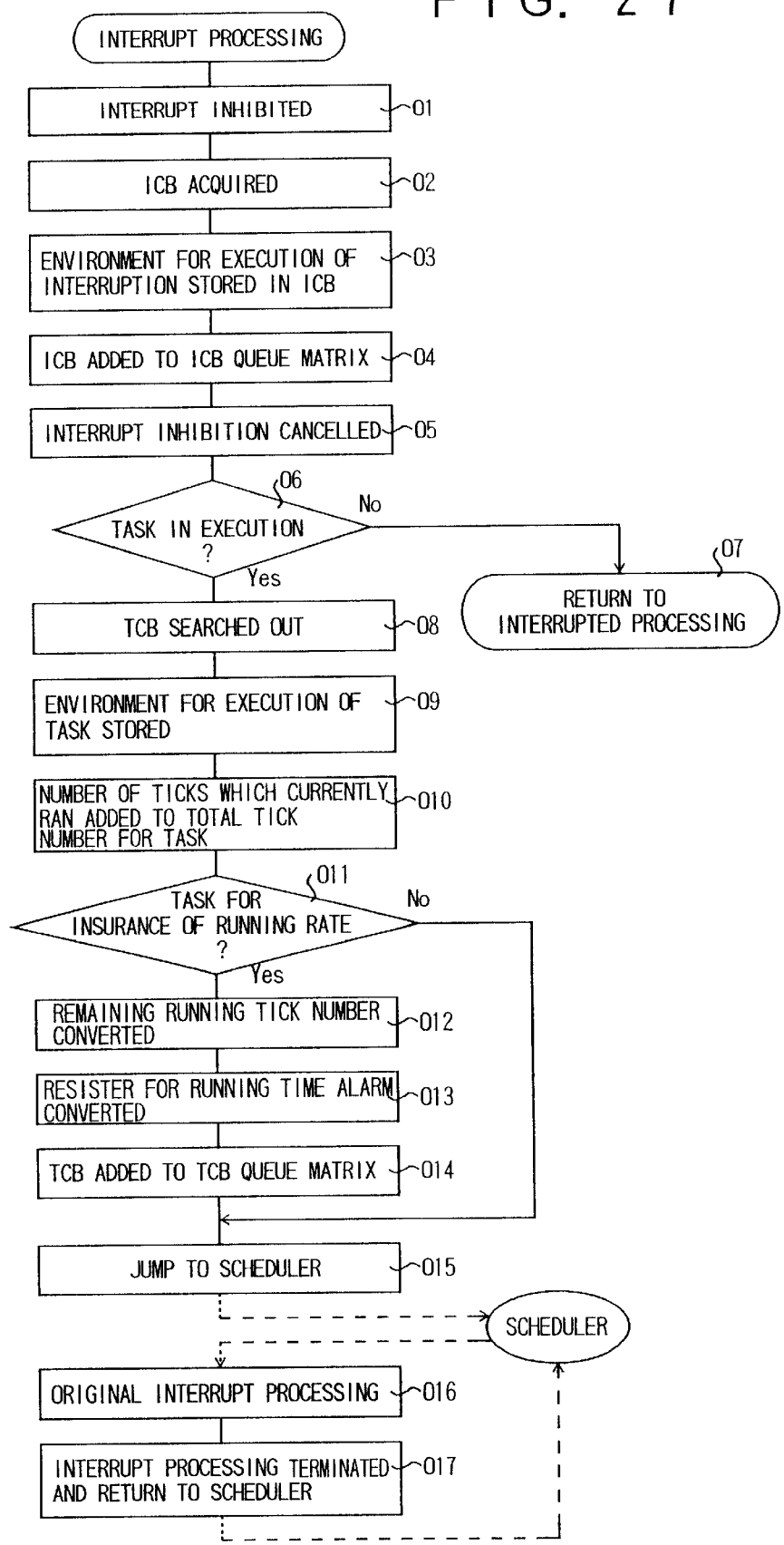
FIG. 27 is a flow chart showing a processing sequence for general interrupt processing.

FIG. 27 shows a flow chart for explanation of a processing sequence in general interrupt processing, and step O1 is an operation executed first in interrupt processing when an interrupt is generated, and in this operation generation of other interrupt is inhibited. Generally this processing is automatically executed by the main CPU 1. In step O2, one ICB not used yet is acquired from the ICB pool (a site for storing therein ICBs not used yet).

In step O3, an environment for execution of this interrupt processing (itself) is stored in the ICB. This operation includes also a storage of a header address for a processing in step O8 as an address for an command to be executed next. In step O4, the ICB prepared herein is added to an ICB queue matrix to be executed by the scheduler. In step O5, inhibition of interrupt by step O1 is canceled. From this step and on, there is a possibility that an interrupt is generated again. The processing described above is for making a time of interrupt inhibition as short as possible.

In step O6, determination is made as to whether the interrupted processing is interrupt processing or RTOS, or a task in execution. Step O7 is a processing executed in a case where it is determined that the interrupted processing is interrupt processing or an operation of the RTOS, and system control directly returns to the interrupted processing. Step O8 is a processing executed in a case where it is determined that the interrupted processing is a task in execution, and at first a TCB for the interrupted task is searched out. In step O9, an environment for execution of the interrupted task is stored in the TCB searched out in step O8.

Step O10 is a processing for subtracting a value of the internal counter register 202 (Refer to FIG. 9) from a value stored in the reference cycle 211 (Refer to FIG. 9). The result is a number of ticks indicating a period in which the task continuously ran. The value is added to a column for a total tick number for the task in the task running time table 231 (Refer to FIG. 22). Step O11 is a processing for determining whether the task currently in execution is a task as an object, a running rate of which is insured, or not. More particularly, determination is made as to whether the task is a task having one or more columns for a remaining running tick number in the task running state memo 212 (Refer to FIG. 9) or not.

Step O12 is a processing executed in a case where it is determined that a task is a task as the object of a processing in step O11, and the value obtained in step O10 is subtracted from a value of the column for remaining running tick number for the task in the task running state memo 211. In step O13, the value obtained in step O10 is added to a value provided in the internal counter register 205 for the running time alarm in the real time clock 201 (Refer to FIG. 9). Time for running tasks other than those insured for a running cycle increases in proportion to a period of time in which tasks insured for a running cycle ran.

In step O14, the prepared TCB is added to the TCB queues matrix to be executed by the scheduler according to an order of the dispatching priority. It should be noted that in this step, if the running inhibited flag is turned ON in the column for even one task in the task running state memo 212 (Refer to FIG. 10), a TCB for the task of which the running inhibited flag is OFF is set before tasks of which the running inhibited flag are ON in the TCB queue matrix. In step O15, system control jumps to the scheduler.

Step O16 is a processing executed after system control has returned from the scheduler. This processing is not always executed immediately after jumping to the scheduler, and in some cases this processing is executed after other ICB is processed, but in any case system control returns to this step. The sequence from this step on is original interrupt processing executed specifically to each interrupt, and contents of the processing varies according to a cause for interrupt. Step O17 is a processing to terminate interrupt processing, and generally an command for return to an ordinary subroutine is issued, and system control returns to the scheduler's ICB processing section according to this return command.

Figure 28:
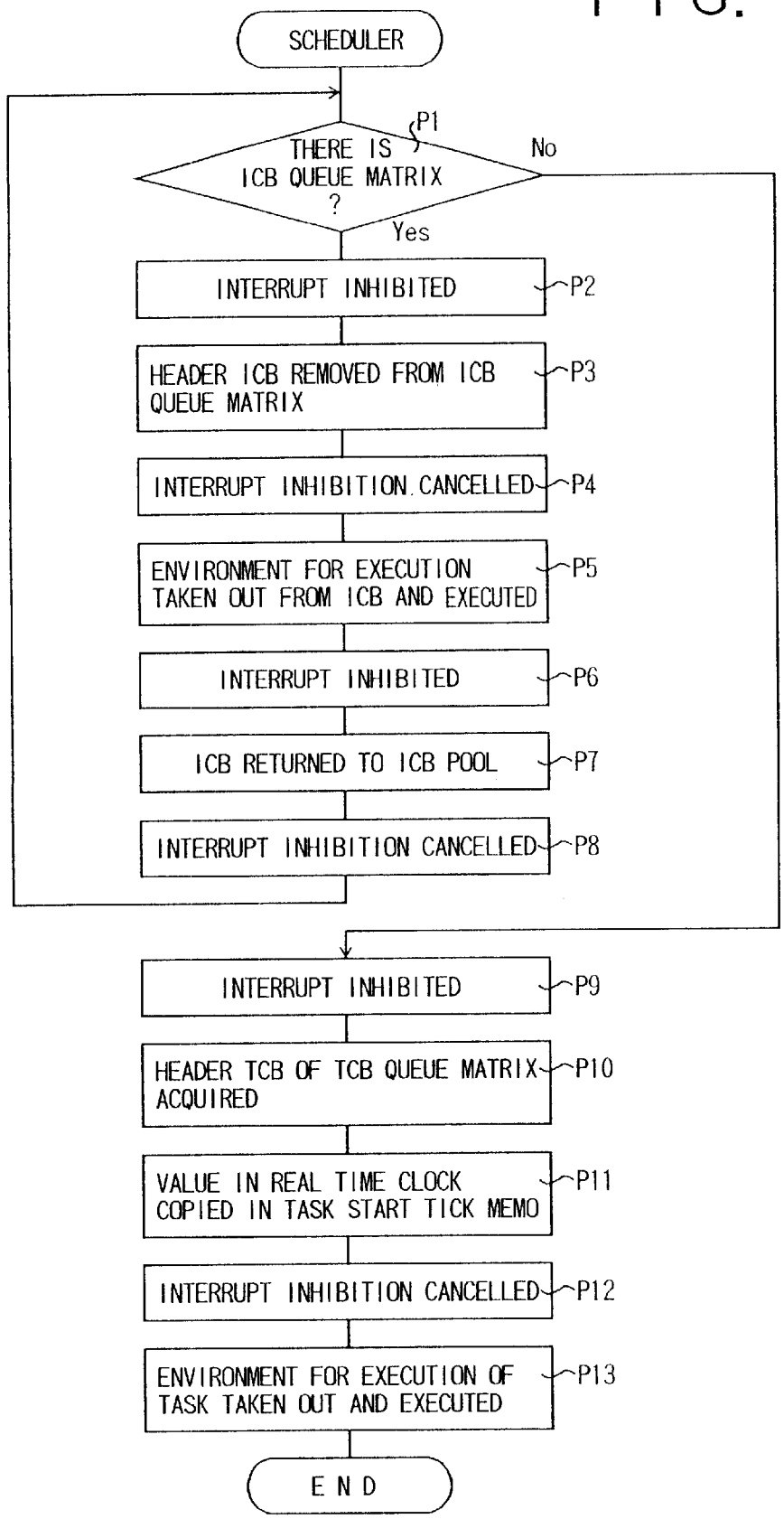
FIG. 28 is a flow chart showing a sequence for a processing by a scheduler.

FIG. 28 shows operations of the scheduler, and it is assumed that an idle task having the lowest priority and executing nothing to external devices is always running in this embodiment. Step P1 is a processing to determine whether there is any queue matrix for interrupt processing (ICB) or not. Step P2 is a processing executed in a case where it is determined that there is a queue matrix for interrupt processing, and at first interrupt is inhibited to execute the queues matrix. This is because, if an interrupt is generated during a processing of the list of queue matrix for interrupt processing and it is tried to add the interrupt to the queue matrix for interrupt processing, consistency of the list is lost.

Step P3 is a processing for removing a header ICB from a list of queues matrix for interrupt processing. In step P4 inhibition of interrupt is canceled. In step P5, an environment for execution of interrupt processing such as an execution address or a register stored in step O3 (Refer to FIG. 27) is taken out from the ICB removed in step P3 and the required processing is executed. This is a processing executed in step O16 (Refer to FIG. 27). Step P6 is a step to which system control returns from step O17 (Refer to FIG. 27), and interrupt is inhibited again. In step P7, the ICB removed in step P3 is returned to the ICB pool. In step P8, inhibition of interrupt is canceled, and then system control returns to step P1. Then, as long as there is a queue matrix for interrupt processing, the processing sequence from P1 to P7 is repeated.

Step P9 is a processing executed in a case where it is determined that there is no queue matrix for ICB, and an interrupt is inhibited to execute the queue matrix. Step P10 is a processing for acquiring a header TCB from a list of queues matrix for interrupt processing. In step P11, a value provided by the internal counter register 202 (Refer to FIG. 9) for measuring a running time in the real time clock 201 (Refer to FIG. 9) is stored in the task start tick memo 210 (Refer to FIG. 10). In step P12, inhibition of interrupt is canceled. In step P13, an environment for execution of the task stored in step O9 is taken out from the TCB acquired from the header of the queue matrix for task processing in step P10 and the task is executed. In this case, system control jumps to the processing, and never returns to this step.

As described above, the control software execution system A8 for an NC unit according to Embodiment 8 is based on a system with functions to set a running rate of a task and to know an actual running time of a task and interrupt processing, and control software for an NC unit is executed according to this system.

With Embodiment 8, the control software execution system A8 for an NC unit can easily execute such operations as running time allocation to each task by knowing an accurate time for execution of each task realizing functions of the NC unit respectively and for execution of interrupt processing, and because of this feature system construction becomes easier.

Next, a description is made for Embodiment 9. General configuration of the control software execution system A9 for an NC unit according to Embodiment 9 is substantially the same as that in Embodiment 2 (Refer to FIG. 9), so that description thereof is omitted herein.

Figure 29:
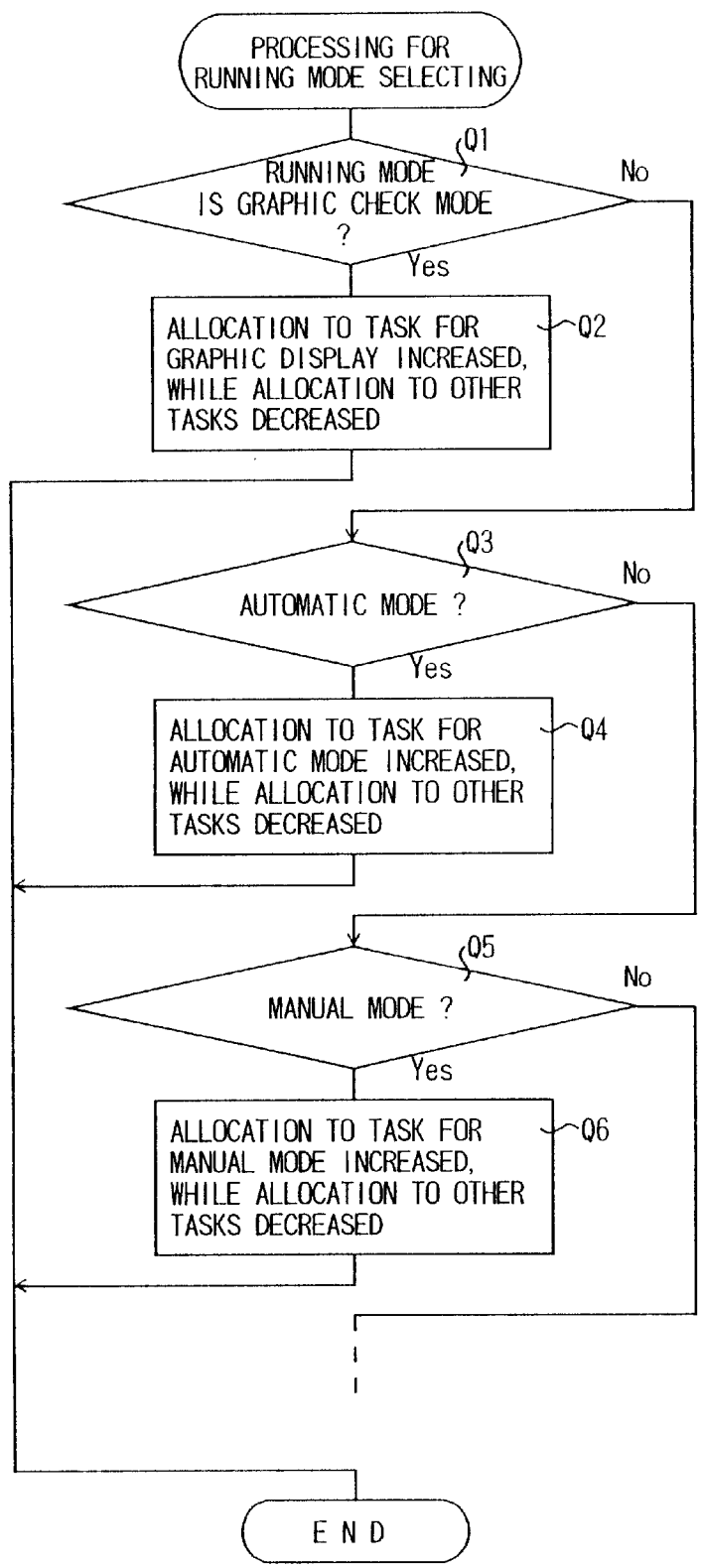
FIG. 29 is a flow chart showing a processing sequence for running mode selecting process.

Next, a description is made for operations of the control software execution system A9 for an NC unit. FIG. 29 is a flow chart showing a processing sequence of a running mode selecting portion for the NC unit, and step Q1 is a portion for determining whether a mode for the NC unit is one for a graphic check or not. Step Q2 is a processing executed in a case where it is determined that the mode is a graphic check mode, and in this case, allocation to a task for graphic display is increased, while allocation to other tasks, for instance, a task for an automatic mode processing is decreased in stead.

Step Q3 is a processing executed in a case where it is determined that the mode is not a graphic check mode and to determine whether the mode is an automatic mode or not. Step Q4 is a processing executed in a case where it is determined that the mode is an automatic mode, and allocation to a task for an automatic mode processing is increased, while allocation to other processing tasks is decreased. Step Q5 is a processing for checking whether the mode is a manual mode or not. Step Q6 is a processing executed in a case where it is determined that the mode is a manual mode, and allocation to a task for a manual processing is increased, while allocation to other processing tasks is decreased. After this step on, processing is executed in other mode, and description thereof is omitted herein.

As described above, the control software execution system A9 for an NC unit according to Embodiment 9 executes control software for the NC unit by changing a running rate for a task according to a running mode for the NC unit.

With Embodiment 9, the control software execution system A9 for an NC unit can have a task run for a period of time appropriate for the task for each mode by changing a running rate for a task with a running mode for the NC unit, and for this reason an executing speed for an NC unit is improved.

Next, a description is made for Embodiment 10. A control software execution system A10 for an NC unit according to Embodiment 10, when having an identical machining program run for a plurality number of times (in a case where the same machining is executed for a plurality number of times), optimizes running distribution to each task in machining process in a second machining and on according to running conditions for each task in a first machining process.

General configuration of the control software execution system A10 for an NC unit according to Embodiment 10 is substantially the same as that in Embodiment 2 (Refer to FIG. 9), so that description thereof is omitted herein, but for convenience in description hereinafter, it is assumed that the system has a means for specifying a running rate for each task and a means for recording running conditions for an actual task like, for instance, those in Embodiment 8 in the present embodiment.

Data structure to be used, like that in Embodiment 8, has a task start tick memo 210 (Refer to FIG. 10), a region 211 for storing a reference cycle (Refer to FIG. 10), a task running state memo 212 (Refer to FIG. 10), and a task running time table 231 (Refer to FIG. 22) or the like. The task running state memo 212 (Refer to FIG. 10) has columns for a remaining running tick number, times of repetition, and a running inhibited flag, and the task running time table 231 (Refer to FIG. 22) has a column for a total tick number for each task.

A processing sequence of reference time interrupt processing and a processing sequence of running time alarm interrupt processing each are the same as those in Embodiment 2 (Refer to FIG. 11 and FIG. 12), and a processing sequence of general interrupt processing is the same as that in Embodiment 8 (Refer to FIG. 27), so that description thereof is omitted herein.

Figure 30:
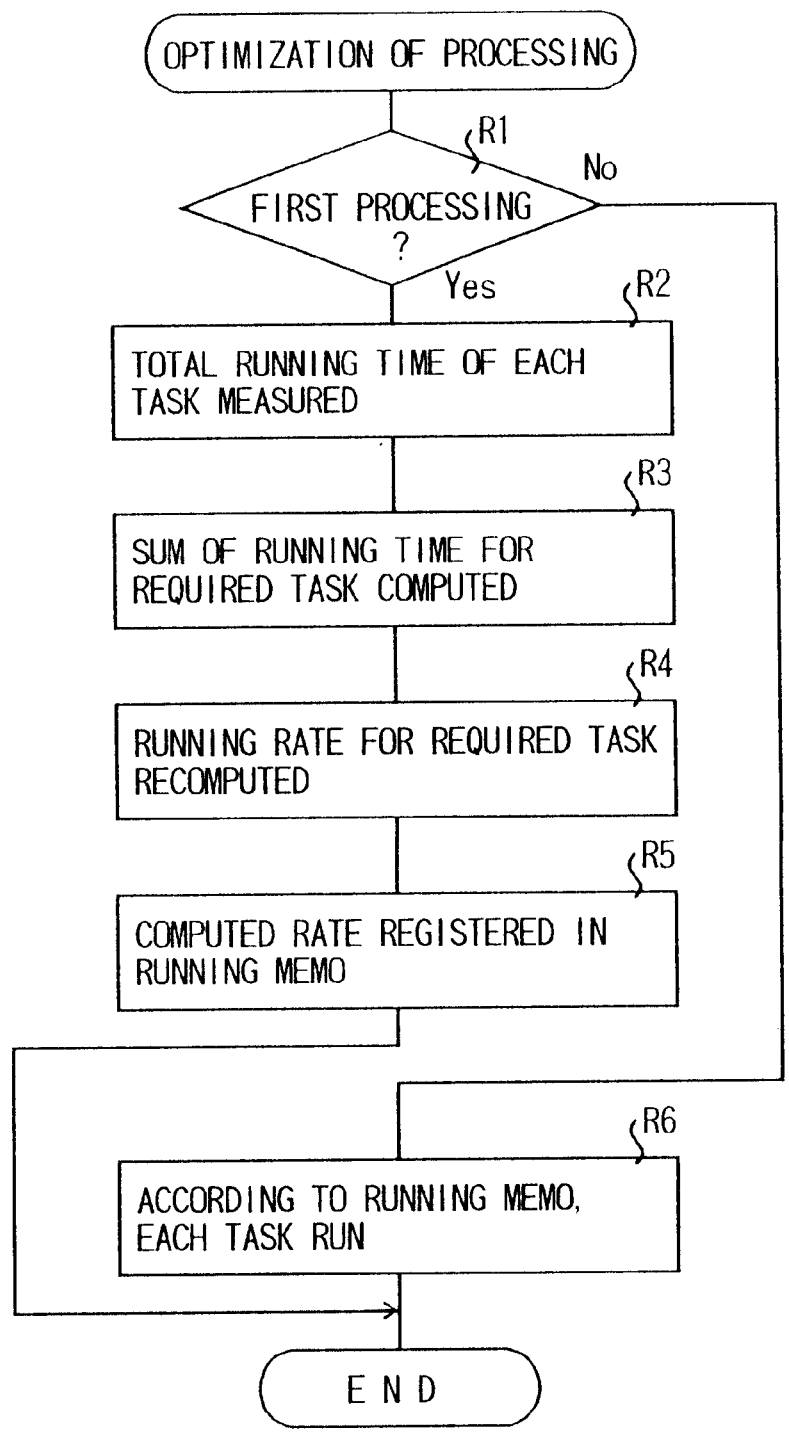
FIG. 30 is a flow chart showing a processing sequence for optimizing allocation of a task running time.

FIG. 30 is a flow chart showing a sequence for optimizing an allocated running time to each task for reducing a processing time in a plurality times of machining, and step R1 is a processing for determining whether the machining is a first processing or a second one and on in the same machining processing. Step R2 is a processing executed in a case where it is determined that the machining is a processing in the first machining, and measures and records a total running time (a tick number) of each task. Step R3 is a processing for computing a sum of running time for required tasks other than any tasks not required such as an idle task excluded from tasks which ran.

Step R4 is a processing for computing a running rate for a required task according to the sum obtained in step R3. It is assumed that a running rate for a task not required to be run is zero (0). In step R5, the rate thereof computed in step R4 is registered in a column for a running rate in the task running state memo 212 (Refer to FIG. 10). Step R6 is a processing executed in machining in the second machining processing and on, and for having each task run according to a running rate for each task in the task running state memo 212 (Refer to FIG. 10) registered in step R5.

As described above, the control software execution system A10 for an NC unit according to Embodiment 10 has a function of automatically setting an optimal running rate for a task, and executes control software for an NC unit.

With Embodiment 10, the control software execution system A10 for an NC unit can reduce a machining time in a repeated machining process by automatically optimizing allocation of a running time to each task realizing a function of the NC unit.

Next, a description is made for Embodiment 11 of the invention. A control software execution system A11 for an NC unit according to Embodiment 11 determines that execution of a task is in an abnormal state in a case where a standard running rate, a total running time for each task and data for each task in the control software execution system for an NC unit actually running previously registered are deviated from the prespecified rate.

General configuration of the control software execution system A11 for an NC unit according to Embodiment 11 is the same as that in Embodiment 8 (Refer to FIG. 9), description thereof is omitted herein. Also a method of measuring data for each task in the control software execution system for an NC unit actually running is the same as the case in Embodiment 8, so that description thereof is omitted herein.

Data structure required for determining whether each task is running normally or not is shown in FIG. 3. The reference numeral 250 indicates "task running standard data", which has columns for "a running rate" and "a total running tick number" or the like for each task. These data may be prepared previously when the system has been generated, or may be set at any given time before the data is used by some SVC.

In the figure, the reference numeral 251 indicates "a running time determination allowance" for storing therein data for a degree of allowance according to which execution of the task is not regarded as a task error when the deviation is less than a prespecified rate even if there is deviation in the task running time, and the reference numeral 252 indicates "a running rate determination allowance" for storing therein data for a degree of allowance according to which execution of the task is not regarded as a task error when the deviation is within a prespecified range even if there is deviation in task running rate. This running rate determination allowance has a column for lower limit and a column for upper limit, and the execution of task is not regarded as a task error as long as deviation thereof is within the range.

For the purpose to determine whether each task is running normally or not, a task running time table 231 (Refer to FIG. 22) may be compared to task standard data 250 (Refer to FIG. 31) by the scheduler, for instance, when task switching is executed, or the determination may be made by providing a task error determining task which cyclically runs and according to a result of determination by the task thereof.

It is assumed in the following description that determination as to whether the task is running normally or not is made by the error determining task. Also a value of determination allowance 251 may be set for a total running time and for a running rate discretely, but, for convenience in description, it is assumed in the following description that an identical value for the two is used.

Figure 32:
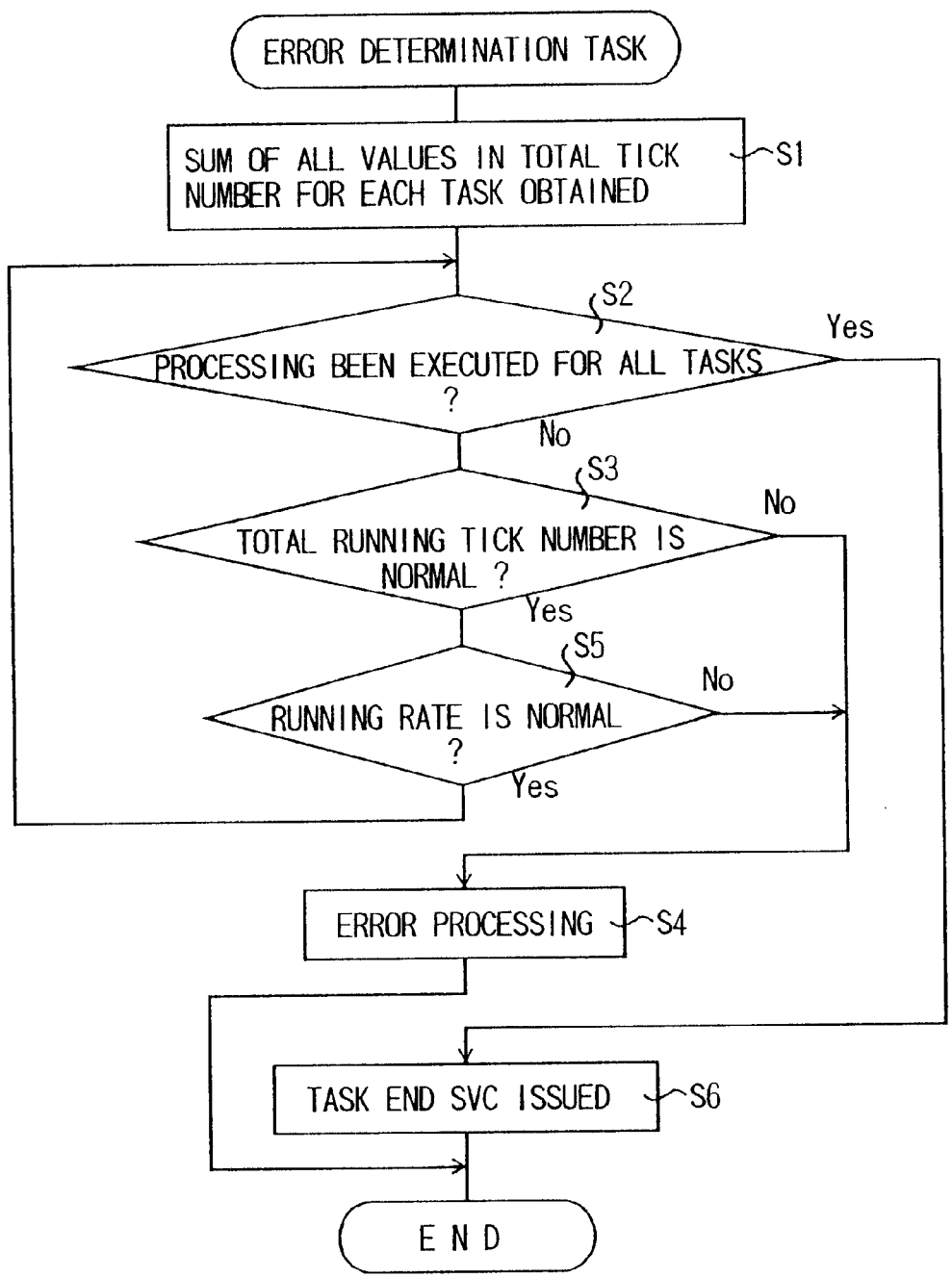
FIG. 32 is a flow chart showing a processing sequence for an error determining task.

FIG. 32 is a flow chart showing operations of the error determining task. Step S1 is a processing executed first in the error determining task for obtaining a sum of all values in the columns for a total tick number for each task in the task running time table 231 (Refer to FIG. 22). In step S2, determination is made as to whether a processing sequence from step S3 to step S5 described below has been executed or not for all tasks, and system control jumps to step S6 in a case where it is determined that the processing has been terminated to all the tasks.

In step S3, a value of a total tick number for the task in the task running time table 231 (Refer to FIG. 22) is compared to a total running tick number of the standard data 250 (Refer to FIG. 31). If a value of a total tick number for the task in the task running time table 231 (Refer to FIG. 22) is smaller than or equal to a value obtained by multiplying a value of a total running tick number of the standard data 250 (Refer to FIG. 31) by a value of running time determination allowance 251 (Refer to FIG. 31), execution of the task is regarded as a normal one.

Step S4 is a processing executed in a case where it is determined that an error is generated in a task in step S3, and in the processing some error processing such as transferring a message that a task error has been generated to an operator is executed. Step S5 is a processing for checking a running rate of a task. In this step, a running rate for the task is computed by summing values of a total tick number in the task running time table 231 (Refer to FIG. 22) for all tasks, and by dividing a total tick for the sum. If the value obtained above is between the lower limit and the upper limit of a running rate determination allowance in the standard data 250 (Refer to FIG. 31), execution of the task is regarded as a normal one. In a case where it is determined that there is an error, system control jumps to step S4. In step S6, as a result of determination of all tasks, any abnormal condition has not been found out therein, so that an SVC indicating a task end is issued, and system control executes nothing until the task is called next.

As described above, when an error is generated in a task realizing a function of the NC unit, the control software execution system A11 for an NC unit according to Embodiment 11 can detect the error.

With Embodiment 11, the control software execution system All for an NC unit has a function of detecting errors when any error is generated in a task realizing a function of the NC unit, so that generation of any error in the NC unit can quickly be detected.

Figure 33:
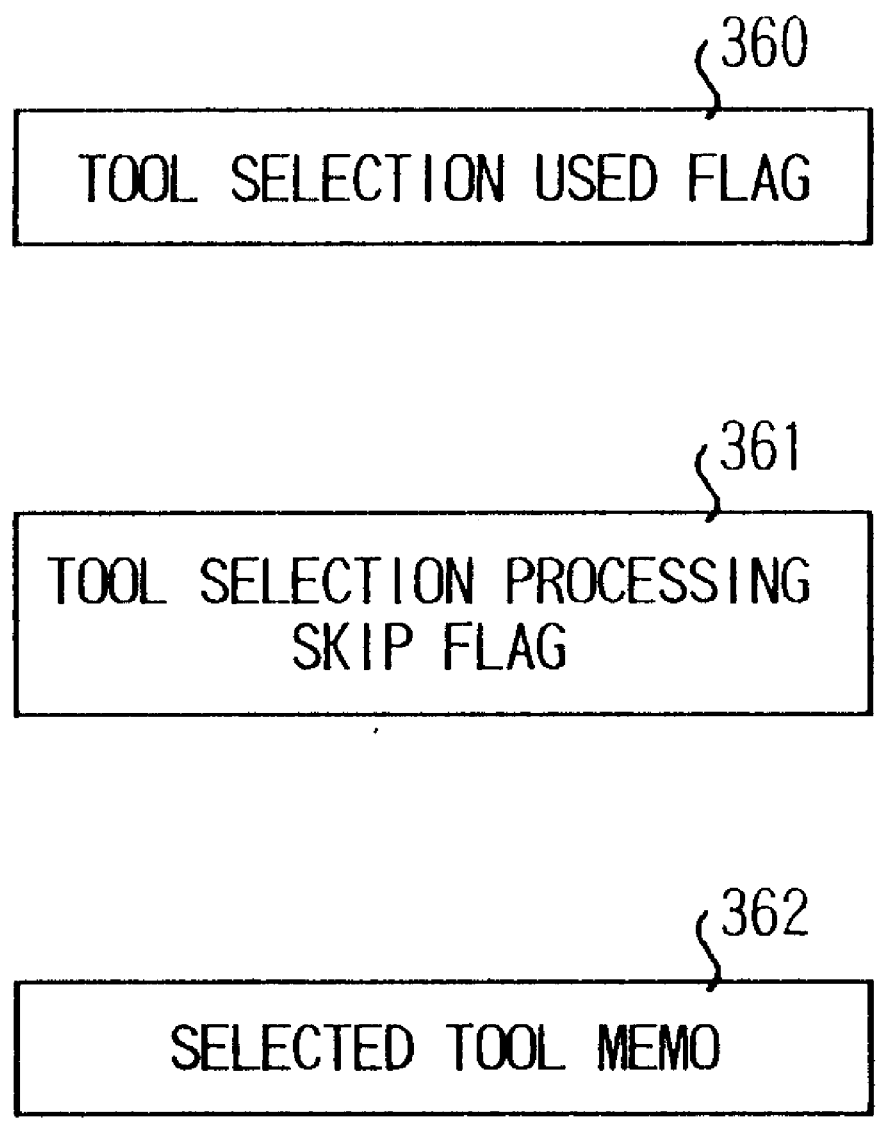
FIG. 33 is an explanatory view showing data structure required for the control software execution system for an NC unit according to Embodiment 12.

Next, a description is made for Embodiment 12 of the invention. General configuration of a control software execution system for an NC unit according to Embodiment 12 is substantially the same as that in Embodiment 11 (Refer to FIG. 9), so that description thereof is omitted herein. Also it is assumed in the following description that data structure which is the same as that in Embodiment 11 (Refer to FIG. 22 and FIG. 31) is used. FIG. 33 shows data newly required in this embodiment. In FIG. 33, the reference numeral 360 indicates "a tool selected used flag". This flag is turned OFF in a processing section for executing a new machining process, and is turned ON in a processing section for selecting a tool in control software for the NC unit. Namely if the flag is ON, it is indicated that the tool selection processing has been called.

Also the reference numeral 361 indicates "a tool selection processing skip flag". This flag is turned OFF in a processing section for execution a new machining process, and an error determining task is turned ON when a tool is selected in the error determining task described below in control software for the NC unit. In the original processing for tool selection, a tool is not selected by itself when the tool selection processing skip flag is ON, and a tool selected by the error determining task is used. The reference numeral 362 indicates "a selected tool memo" for delivering to each other the tools each selected by the original tool selection processing and by the error determining task.

Figure 34:
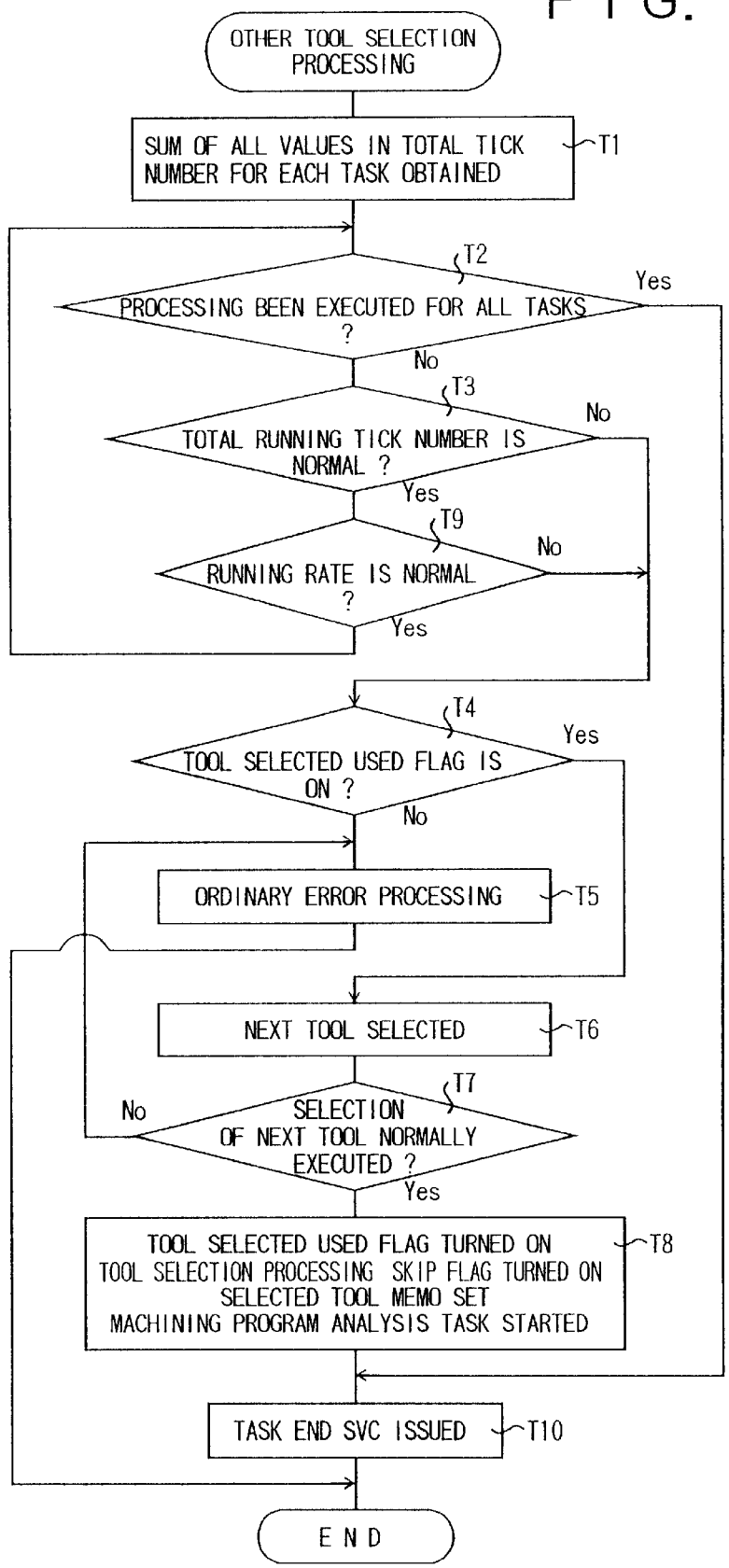
FIG. 34 is a flow chart showing a processing sequence for a tool selecting process.

Next, a description is made for operations of the control software execution system A12 for an NC unit. FIG. 34 is a flow chart showing a processing sequence in other tool selecting portion of the NC unit, and it is assumed in the following description that this processing is executed by the error determining task like in Embodiment 11. Step T1 is a processing executed first in the error determining task for obtaining a sum of all the values in the column for a total tick number for each task in the task running time table 231 (Refer to FIG. 22). Step T2 is a processing for determining whether the processing described below has been executed or not to all tasks, and when the processing has been executed for all the tasks, system control jumps to step T6.

In step T3, a value of a total tick number for the task is compared to a total running tick number of the standard data 250 (Refer to FIG. 31) in the task running time table 231 (Refer to FIG. 22). If the value of a total tick number for the task in the task running time table 231 (Refer to FIG. 22) is smaller than or equal to a value obtained by multiplying a value of a total running tick number of the standard data 250 (Refer to FIG. 31) by a value of the running time determination allowance 251 (Refer to FIG. 31), execution of the task is regarded as normal.

Step T4 is a processing executed in a case where it is determined that an error is generated in a task, and unless the tool selected used flag 360 (Refer to FIG. 33) is ON, system control shifts to step T5. Step T5 is an ordinary processing executed when it is determined that an error has been generated in a task in step T4, and in the processing some error processing such as transferring a message indicating that a task error has been generated to an operator is executed. Step T6 is a processing executed in a case where the tool selected used flag 360 (Refer to FIG. 33) is ON, and a next tool is selected.

Selection of a next tool means selecting one from the same types of tools, for instance if the tool is an end mill, then the next tool should be an end mill, and likely if the tool is a ball end mill, then the next tool should be a ball end mill, the next tool has a diameter different from that of a previous one. In this processing, the following configuration is allowable where, for instance, by providing a machining mode, a tool having a larger diameter is selected if priority is put on the machining speed, and a tool having a smaller diameter is selected if priority is put on machining precision.

In this processing, the tool having caused an error can be checked from the selected tool memo 362 (Refer to FIG. 33). Step T7 is a processing for determining whether the tool has normally been selected or not. In step T7, if it is determined that there is no tool to be selected, system control shifts to an ordinary error processing section T5. Step T8 is a processing executed in a case where it is determined that the tool has normally been selected, and in the processing the tool selected used flag 360 (Refer to FIG. 33) is turned OFF, the tool selection processing skip flag 361 (Refer to FIG. 33) is turned ON, and data on the selected tool is delivered to the original tool selection processing section by setting the data in the selected tool memo 362 (Refer to FIG. 33). Then machining is started again, for instance, by starting a machining program analysis task.

Step T9 is a processing for checking a running rate of a task. In the processing a running rate for the task is computed by summing up values of a total tick number for all the tasks in the task running time table 231(Refer to FIG. 22), and by dividing a total tick number for the task by the value obtained above. If the value is within a range from a lower limit to an upper limit of the running rate determination allowance of the standard data 250 (Refer to FIG. 31), execution of the task is regarded as normal. In a case where it is determined that there is an error in the task, system control shifts to step T4. Step T10 is a processing executed in a case where all the tasks have been checked but no error has been found out in any task, and in this case an SVC for terminating the task is issued and system control executes nothing until the task is called next.

As described above, the control software execution system A12 for an NC unit according to Embodiment 12 executes control software for the NC unit when it is determined that an error has been generated in automatic machining by the NC unit, by changing the tool and executing automatic machining again.

With Embodiment 12, in the control software execution system A12 for an NC unit, when it is determined that an error has been generated in automatic machining by the NC unit, automatic machining is executed again by changing a tool, and for this reason, the possibility that machining processing is stopped due to generation of an error is reduced, continuous machining is insured, and reliability to a continuous run of an NC unit is improved.

Next, a description is made for Embodiment 13 of the present invention. General configuration of an control software execution system A13 for an NC unit according to Embodiment 13 is substantially the same as that in Embodiment 11 (Refer to FIG. 9), so that description thereof is omitted herein. It is assumed in the following description that the same data structure as that in Embodiment 11 (Refer to FIG. 22, and FIG. 31) is used.

FIG. 35 shows data newly required in this embodiment. In FIG. 35, the reference numeral 370 indicates "a tool speed decided flag". This flag is turned OFF in a processing section for executing new machining process and turned ON in a processing section for computing a tool speed in control software for the NC unit. Namely if this flag is ON, it indicates that a processing for computing the tool speed has been called. The reference numeral 371 indicates "a tool speed computing processing skip flag". This flag is turned OFF in a processing section for executing a new machining process in control software for the NC unit and the flag for the error determining task is turned ON when the tool speed is changed according to the error determining task.

In the original processing for computing a tool speed, computing of a speed is not executed by itself, but a speed changed by the error determining task is used when the tool speed computing processing skip flag is ON. Also the reference numeral 372 indicates "a tool speed memo" for delivery of a tool speed between the original tool speed computing processing and the error determining task. The reference numeral 373 indicates a value of a lower limit in a tool speed changing rate. If the value is under this rate, a tool speed can not be changed. The reference numeral 374 indicates a value of upper limit in the tool speed changing rate. If the value is over this rate, the tool speed can not be changed. The lower limit value in the tool speed changing rate 373 and the upper limit value in the tool speed changing rate 374 each are prespecified.

Figure 36:
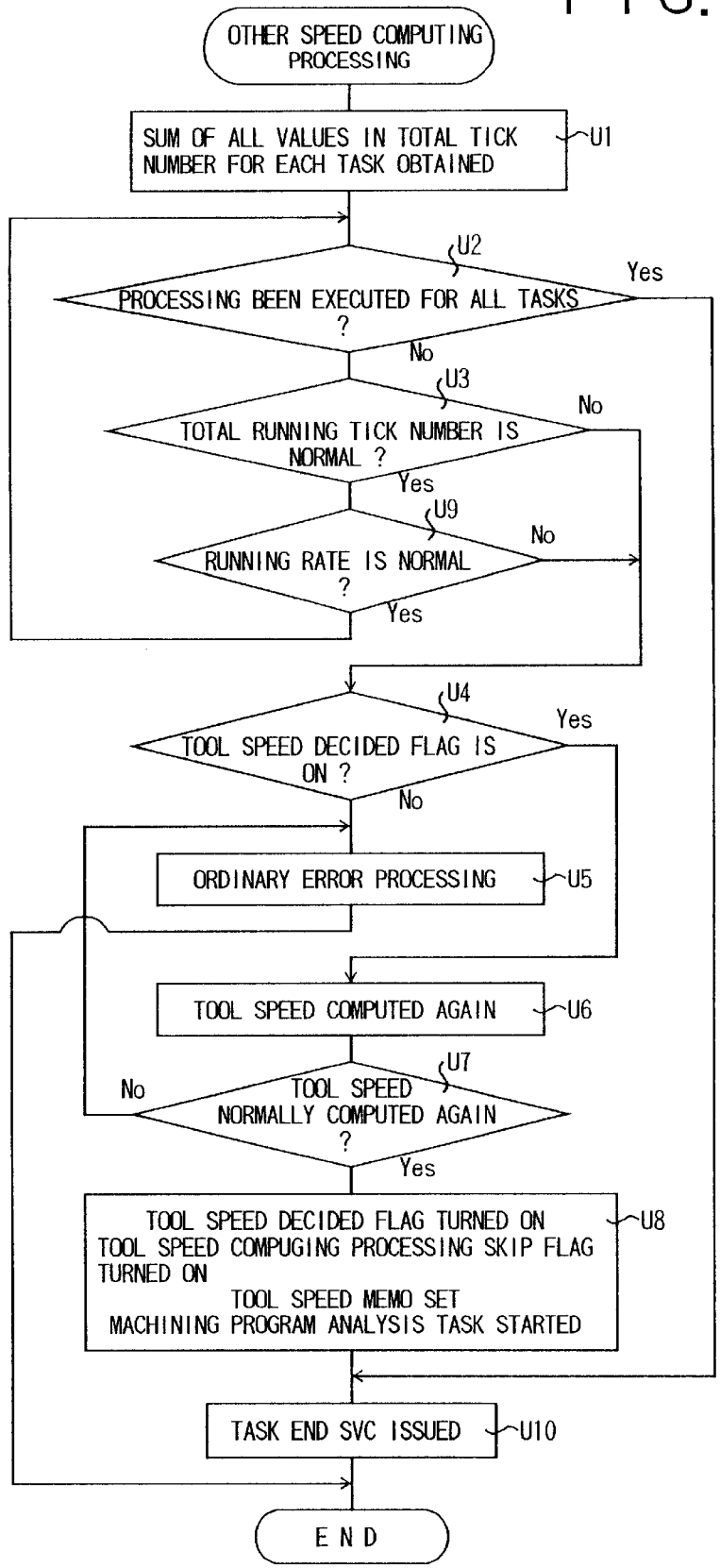
FIG. 36 is a flow chart showing a processing sequence for a speed re-computing process.

Next, a description is made for execution and operations of control software for an NC unit. FIG. 36 is a flow chart showing a processing sequence of other speed computing portion of the NC unit. It is assumed in the following description that this processing is executed by the error determining task like in Embodiment 11. In the figure, step U1 is a processing executed first in the error determining task for obtaining a sum of values of the columns for a total tick number for all tasks in the task running time table 231 (Refer to FIG. 22). Step U2 is a processing for determining whether the processing described below has been executed for all tasks or not, and if the processing has been finished for all tasks, then system control shifts to step U6.

In step U3, a value of a total tick number for the task is compared to a total running tick number of the standard data 250 (Refer to FIG. 31) in the task running time table 231 (Refer to FIG. 22). If a value of a total tick number for the task in the task running time table 231 (Refer to FIG. 22) is smaller than or equal to a value obtained by multiplying a value of the total tick number of the standard data 250 by a value of running time determination allowance 251 (Refer to FIG. 31), execution of the task is regarded as normal.

Step U4 is a processing executed in a case where it is determined that an error has been generated in a task, and unless the tool speed decided flag 370 (Refer to FIG. 35) is ON, system control shifts to step U5. Step U5 is a normal processing executed in a case where it is determined that an error has been generated in a task in step U4, and in the processing some error processing such as transferring a message indicating that a task error has been generated to an operator is executed.

Step U6 is a processing executed in a case where it is determined that the tool speed decided flag 370 (Refer to FIG. 35) is ON, and in the processing a tool speed is changed. In this processing, the following configuration is allowable where, for instance, by providing a machining mode, a tool speed is increased by a prespecified rate if priority is put on machining speed, and a tool speed is decreased by a prespecified rate if priority is put on machining precision. In this processing, a tool speed at which an error occurs is checked by referring the tool speed memo 372 (Refer to FIG. 35).

Step U7 is a processing for determining whether a tool speed can be decided or not. In step U6, when a tool speed is not in a range from a value of a lower limit in the tool speed changing rate 373 (Refer to FIG. 35) to a value of an upper limit in the tool speed changing rate 374 (Refer to FIG. 35), system control shifts to a normal error processing step U5. Step U8 is a processing executed in a case where a tool speed can be changed, and in this processing the tool speed decided flag 370 (Refer to FIG. 35) is turned OFF, the tool speed computing processing skip flag 371 (Refer to FIG. 35) is turned ON, and data for the tool speed changed herein is delivered to the original tool speed computing processing section by setting the data in the tool speed memo 372 (Refer to FIG. 35). Then machining is started again, for instance, by starting a machining program analysis task.

Step U9 is a processing for checking a running rate of a task. In the processing, a running rate of the task is obtained by summing up values of a total tick number for all tasks in the task running time table 231 (Refer to FIG. 22), and by dividing a total tick for the task by the value obtained above. If the value is in a range from a lower limit to an upper limit of the running rate determination allowance of the standard data 250 (Refer to FIG. 31), execution of the task is regarded as normal. When it is determined that there is an error in the task, system control shifts to step U4. Step U10 is a processing executed in a case where the determination has been made for all tasks, but no error was found out, and in this processing, an SVC for terminating the task is issued, and nothing is executed until the task is called next.

As described above, the control software execution system A13 for an NC unit according to Embodiment 13 executes control software when an error has been generated in automatic machining by the NC unit, by changing a tool speed and executing automatic machining again.

With Embodiment 13, the control software execution system A13 for an NC unit executes, when it is determined that an error has been generated due to automatic machining in the NC unit, automatic machining is executed again by changing a tool speed, and because of this feature the possibility that machining is stopped by generation of an error can be reduced, continuous machining can automatically be executed, and reliability to continuous run of the NC unit is improved.

Next, a description is made for Embodiment 14 of the invention. General configuration of an control software execution system A14 according to Embodiment 14 is substantially the same as that in Embodiment 11 (Refer to FIG. 9), so that description thereof is omitted herein.

It is assumed in the following description that data structure which is the same as that in Embodiment 11 (Refer to FIG. 22 and FIG. 31) is used. FIG. 37 shows data newly required in this embodiment. In FIG. 37, the reference numeral 380 indicates "machining program number memo". The machining program analysis task executes analysis for a machining program having this number by referring this machining program number memo.

Also the reference numeral 381 indicates "a machining program scheduling table". Herein "a number" and "times" or other items for the machining program to be executed are previously registered. The numeral 382 indicates "a machining disabled program memo". The number of the machining program failed in machining is recorded by the error determining task.

Figure 38:
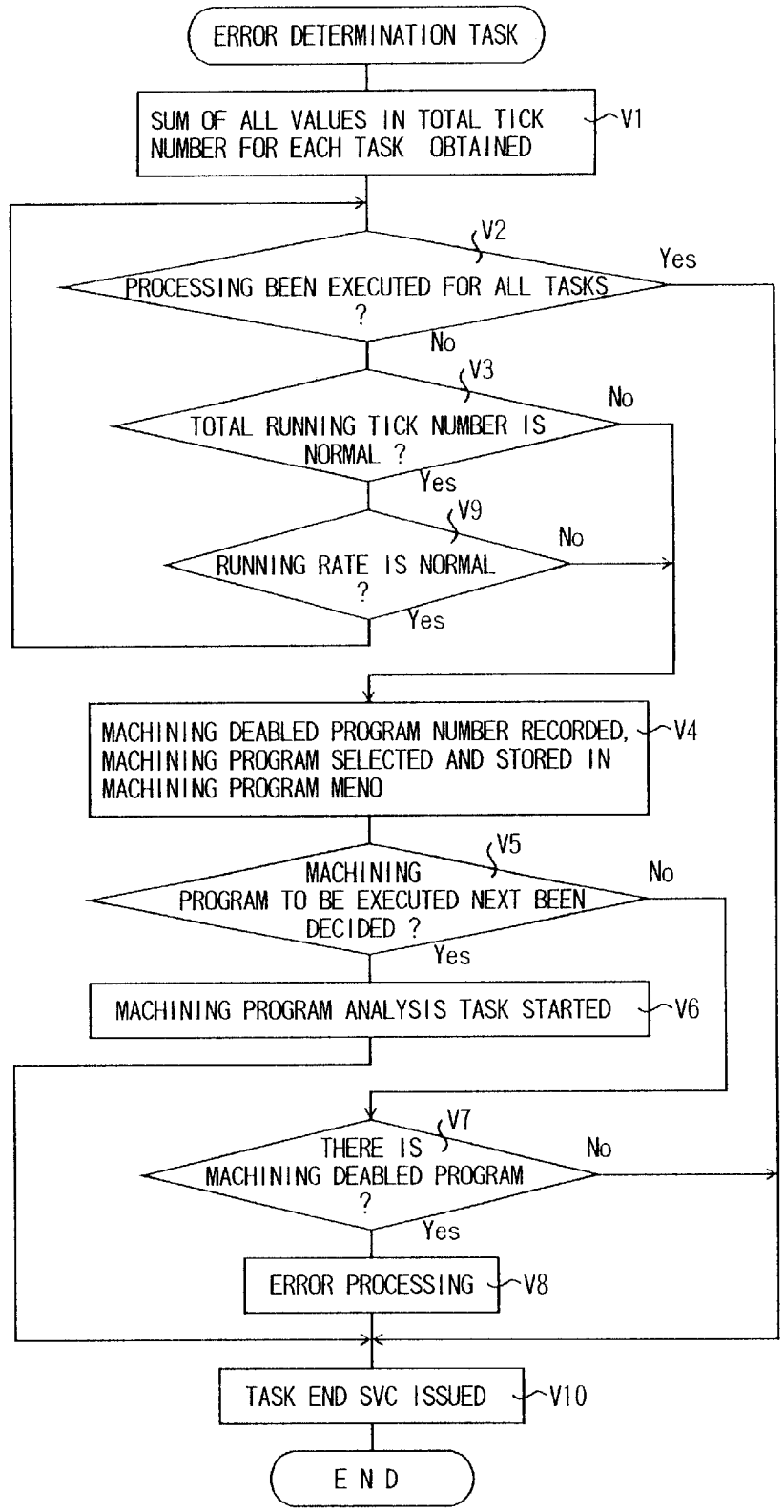
FIG. 38 is a flow chart showing a processing sequence for a selecting process of other machining program.

Next, a description is made for operations of the control software execution system A14 for an NC unit. FIG. 38 is a flow chart showing a processing sequence for selection of other machining program for the NC unit. This processing is executed by the error determining task like in Embodiment 11. Step V1 is a processing executed first in the error determining task and for obtaining a sum of values of columns for a total tick number for all tasks in the task running time table 231 (Refer to FIG. 22). Step V2 is a processing for determining whether the processing described below has been executed for all tasks or not, and if processing for all tasks has been finished, system control shifts to step V10.

In step V3, a value of a total tick number for the task is compared to a total running tick number of the standard data 250 (Refer to FIG. 31) in the task running time table 231 (Refer to FIG. 22). If a value of the total tick number for the task in the task running time table (Refer to FIG. 22) is smaller than or equal to a value obtained by multiplying a value of the total tick number of the standard data 250 (Refer to FIG. 31) by a value of the running time determination allowance 251 (Refer to FIG. 31), execution of the task is regarded as normal in step V9.

Step V4 is a processing executed in a case where it is determined that an error has been generated in a task in step V3, and in this processing a number of processing of machining program in which an error has been generated is recorded in the machining disabled program memo 382 (Refer to FIG. 37), a number of machining program to be executed next is selected from the machining program scheduling table 381 (Refer to FIG. 37), and the number is stored in the machining program number memo 380 (Refer to FIG. 37).

Step V5 is a processing for determining whether the machining program to be executed next has been decided or not. When all the machining programs registered in the machining program scheduling table 381 (Refer to FIG. 37) has been executed in step V4, system control shifts to the processing in step V7. Step V6 is a processing executed in a case where a machining program to be executed next has been decided, and machining is started again, for instance, by starting a machining program analysis task.

Step V7 is a processing executed in a case where a machining program to be executed next could not be decided, and in the processing determination is made as to whether there is any program with which machining could not be executed or not by checking whether the data has been set in the machining disabled program memo 382 (Refer to FIG. 37) or not. Step V8 is a processing executed in a case where it is determined that there is a machining program not having been executed, and in the processing the fact that an error has been generated is reported to the operator with any means according to the machining disabled program memo 382 (Refer to FIG. 37). Also in step V10, as a result of determination of all the tasks, any task in abnormal conditions has not been found out, so that an SVC for a task end is issued, and nothing is executed until the task is called next.

As described above, the control software execution system A14 for an NC unit according to Embodiment 14 executes automatic machining with other machining program when it is determined that an error has been generated in automatic machining by the NC unit.

With Embodiment 14, in the control software execution system A14 for the NC unit, by executing automatic machining again with other machining program when it is determined that an error has been generated in automatic machining by the NC unit, the possibility that machining stops due to generation of an error can be reduced, continuous machining can automatically be executed, and reliability to continuous run of the NC unit is improved.

Next, a description is made for Embodiment 15 of the invention. General configuration of the control software execution system A15 for an NC unit according to Embodiment 15 is the same as that in Embodiment 2 (Refer to FIG. 9), so that description thereof is omitted herein. It should be noted that in the present embodiment, an internal register in the real time clock 201 (Refer to FIG. 9) uses only two channels of 202 and 204. The internal counter register 202 (Refer to FIG. 9) is used for measurement of a running tick number for a task, and the internal counter register 204 (Refer to FIG. 9) is used for a task stop interrupt.

FIG. 39 shows data structure required in the present embodiment, and the reference numeral 400 indicates "a task stop table". A number of ticks starting to end each task is registered in a column of "a stop tick number" in this task stop table 400 by the SVC previously or when the task is started. For a task not specified, this value is set to zero (0).

The reference numeral 210 (Refer to FIG. 10) indicates "a task start tick memo". The memo records a value of the internal counter register 202 in the real time clock 201 (Refer to FIG. 9) right before the RTOS starts execution of a task, and a task running time is computed by obtaining a difference between the value previously registered and a value provided by the internal counter register 202 (Refer to FIG. 9) when the task is finished and system control returns to the RTOS. The reference numeral 411 indicates "task stop interrupt memo". When a task stop interrupt can not be executed immediately, this memo is kept ON and processed later.

The control software execution system A15 for an NC unit according to this embodiment sets a stop tick number in the task stop table 400 (Refer to FIG. 39) in the internal counter register 204 each time the task is started if it has been specified. And if the task stop interrupt has been generated, the task is forcefully terminated.

In a case where the main CPU 1 has been occupied by other task before a task stop interrupt is generated, a running tick number for the task is computed from values provided by the internal counter register 202 (Refer to FIG. 9) and by a task start tick memo 210 (Refer to FIG. 10), and a value equivalent to the running tick number obtained in the previous step is decremented from a stop tick number in the task stop table 400 (Refer to FIG. 39). As described above a maximum running tick number for the specified task can be limited.

Figure 40:
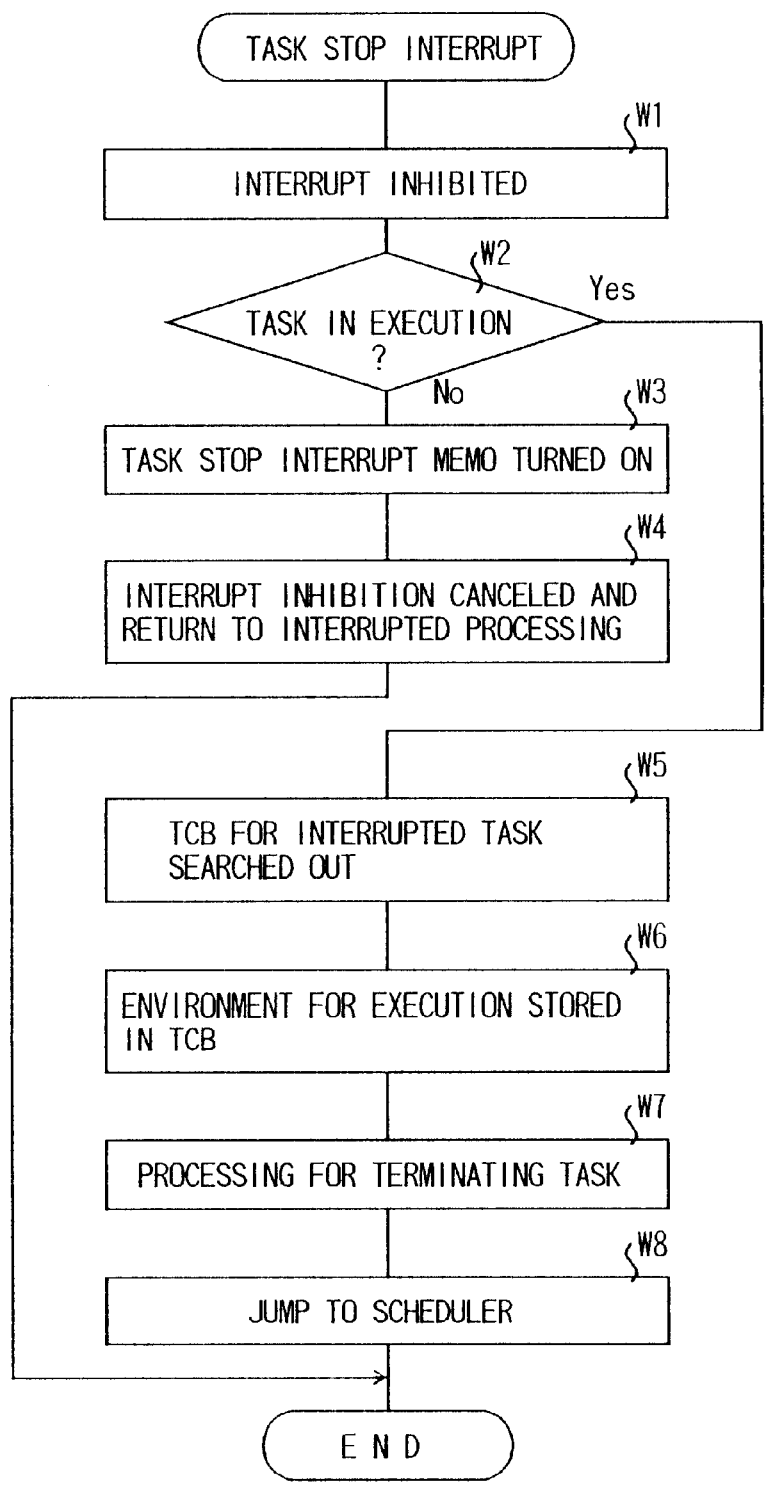
FIG. 40 is a flow chart showing a processing sequence for task stop interrupt processing.

Next, a detailed description is made for operations of the control software execution system A15 for an NC unit according to the embodiment. First of all description is made for a processing sequence of interrupt processing. FIG. 40 is a flow chart showing a processing sequence of a task stop interrupt. Step W1 is a processing executed first in interrupt processing when an interrupt has been generated, and in the processing at first generation of other interrupt is inhibited. Generally this processing is automatically executed by the CPU. Step W2 is a processing portion for determining whether an interrupted processing is a task in execution or not. Step W3 is a processing executed in a case where it is determined that the processing is not a task in execution, and in this case, the task stop interrupt memo 411 (Refer to FIG. 39) is turned ON. In step W4, inhibition of interrupt is canceled, and system control returns to the interrupted processing.

Step W5 is a processing executed in a case where it is determined that an interrupt has been generated in a task processing, and at first a TCB for the interrupted task is searched out. In step W6, an environment for execution for the interrupted task is stored in the TCB found out in step W5. In step W7, a processing for terminating the task similar to the SVC for task stop is executed. A processing that, for instance, a column for the status of the TCB is stopped, and the interrupt is switched from the TCB queue matrix to a queue matrix for tasks in stop, is executed. In step W8, system control jumps to the scheduler.

Figure 41:
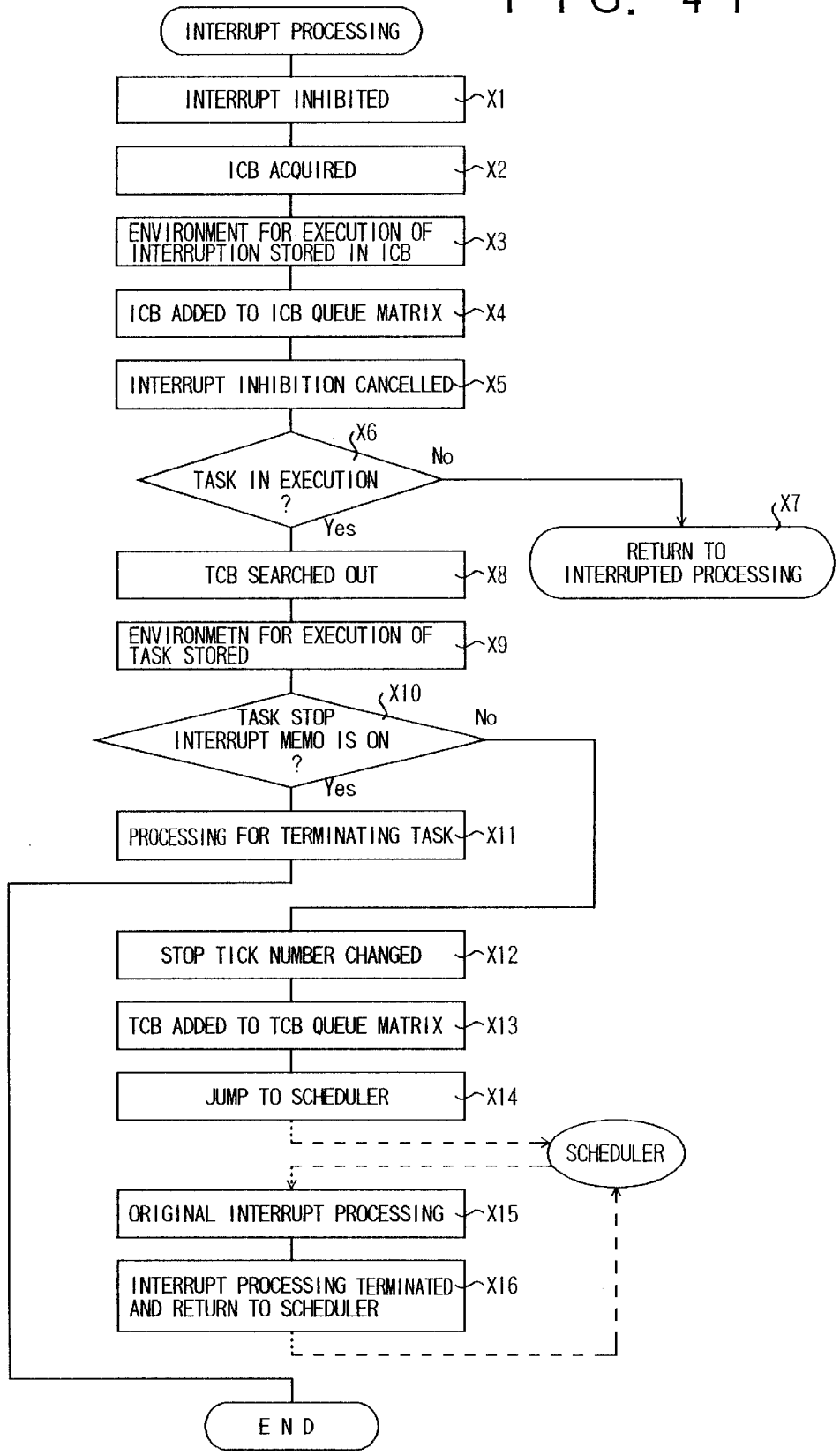
FIG. 41 is a flow chart showing a processing sequence for general interrupt processing.

FIG. 41 is a flow chart showing a sequence of general interrupt processing other than task stop interrupt. Step X1 is a processing executed first in interrupt processing when an interrupt has been generated, and in the processing at first generation of an interrupt is inhibited, and generally this processing is automatically executed by the main CPU 1. In step X2, one ICB not used yet is acquired from the ICB pool (which is a site where ICBs not used yet are stored ).

Step X3 is a processing for storing an environment for execution for this interrupt processing (itself in an ICB). This operation includes storage of a header address of the processing in step X8 in the ICB as an address for an command to be executed next time. In step X4, the ICB prepared herein is added to the ICB queue matrix executed by the scheduler. In step X5, inhibition of an interrupt in step X1 is canceled. From this step on there will be the possibility that an interrupt is generated again. The processing described above is for making an interrupt inhibited time as short as possible.

Step X6 is a processing for determining whether an interrupted task is an interrupt processing or an operation by the RTOS, or a task in processing. Step X7 is a processing executed when the interrupted processing is interrupt processing or an operation by the RTOS, and in this case system control directly returns to the interrupted processing. Step X8 is a processing executed in a case where the interrupted processing is a task in execution, and in this processing at first an TCB for the interrupted task is searched out. In step X9, an environment for execution of the interrupted task is stored in the TCB found out in step X8. Step X10 is a processing for determining whether a task stop interrupt memo 411 (Refer to FIG. 39) is ON or not.

Step X1 is a processing executed when the task stop interrupt memo 411 (Refer to FIG. 39) is ON, and in the processing, an processing for terminating the task similar to the task stop SVC is executed. For instance, such a processing as stopping the operation for the status column for the TCB, and the switching from a queue matrix for TCB to a queue matrix for stopped tasks.

Step X12 is a processing executed when the task stop interrupt memo 411 (Refer to FIG. 39) is OFF, and in the processing a running tick number for the task is computed from a difference between the internal counter register 202 (Refer to FIG. 9) in the real time clock 201 (Refer to FIG. 9) and the task start tick memo 210 (Refer to FIG. 10), and the value obtained in the previous step is decremented from the stop tick number in the task stop table 400 (Refer to FIG. 39). In step X13, the TCB prepared in step X9 is added to the TCB queue matrix executed by the scheduler according to the dispatching priority. In step X14, system control jumps to the scheduler.

Also step X15 is a step to which system control returns from the scheduler. This processing is not always executed right after system control has jumped to the scheduler, and in some cases this processing is executed after other ICB has been processed, but in any case system control returns to this step. The sequence from this step on is original interrupt processing executed specifically to each interrupt, and contents of the processing varies according to a cause for interrupt. Step X16 is a processing to terminate interrupt processing, and generally an command for return to the original subroutine is issued, and system control returns to the scheduler's ICB processing section according to this return command.

Figure 42:
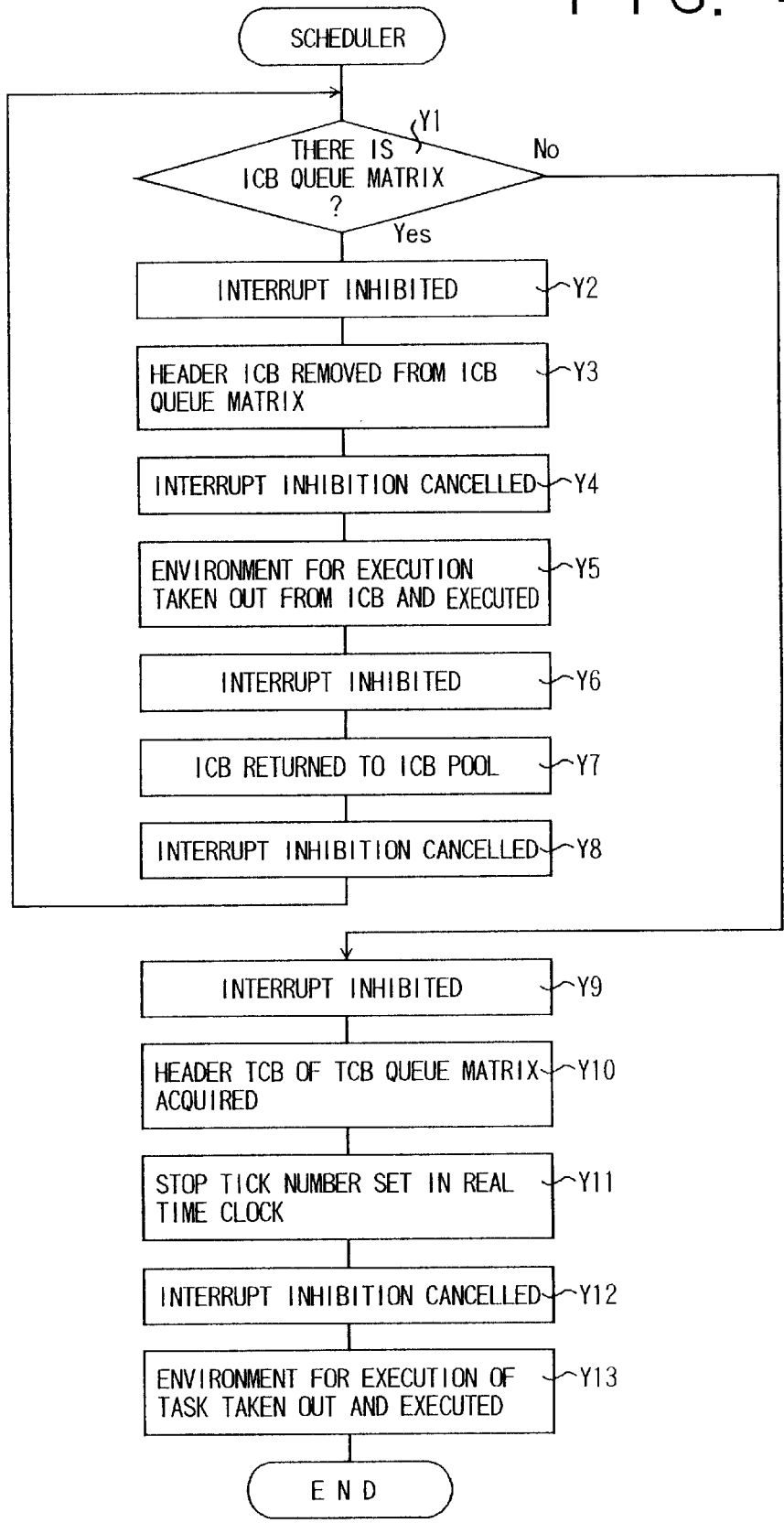
FIG. 42 is a flow chart showing a sequence for a processing by a scheduler.

Description is made for operations of the scheduler of the control software execution system A15 for an NC unit according to this embodiment with reference to FIG. 42. For convenience in description hereinafter, it is assumed in the following description that an idle task having the lowest priority and executing nothing to external devices is always running in this embodiment.

Step Y1 is a processing to determine whether there is a queue matrix for interrupt processing (ICB) or not. Step Y2 is a processing executed when it is determined that there is a queue matrix for interrupt processing, and in the processing at first interrupt is inhibited to execute the queue matrix. This is because, if an interrupt is generated during a processing of the list of queues matrix for interrupt processing and it is tried to add the interrupt to the queue matrix for interrupt processing, consistency of the list is lost.

Step Y3 is a processing for removing a header ICB from a list of queues matrix for interrupt processing. In step Y4 inhibition of interrupt is canceled. In step Y5, an environment for execution of interrupt processing such as an execution address or a register stored in step X3 is taken out from the ICB removed in step Y3 and the required processing is executed. This is a processing executed in step X15 (Refer to FIG. 41). Step Y6 is a step to which system control returns from step X16 (Refer to FIG. 41), and interrupt is inhibited again. In step Y7, the ICB removed in step Y3 is returned to the ICB pool. In step Y8, inhibition of interrupt is canceled, and then system control returns to step Y1. Then as long as there is a queue matrix for interrupt processing, the processing sequence from step Y1 to step Y7 is repeated.

In step Y9, an interrupt is inhibited. Step Y10 is a processing for acquiring the header TCB from the list of interrupt handing queue matrix. Step Y11 is a processing for setting a value of stop tick number for the task in the task stop table 400 (Refer to FIG. 39) in the internal counter register 204 in the real time clock 201 (Refer to FIG. 9) in a case where the task in TCB is a task with a stop tick number in the task stop table 400 (Refer to FIG. 39) of zero(0) or more. As a result of that, when a period of time equivalent to the tick number set as described above, a task stop interrupt is generated. In step Y12, inhibition of an interrupt is canceled. In step Y13, an environment for execution of the task stored in step X9 (Refer to FIG. 41) is taken out from the TCB acquired from the queue matrix for a task processing (list) in step Y10 and the task is executed. In this case, system control jumps to the processing, and never returns to this step.

As described above, the control software execution system A15 for an NC unit according to Embodiment 15 is based on a system in which a function capable to provide a control of a task running time is added to the RTOS having only a scheduling system based on normal priority, and control software for the NC unit is executed according to this system.

With Embodiment 15, the control software execution system A15 for an NC unit can provide a control of tasks each realizing a function of the NC unit respectively according to a running time. For this reason, a task will not run for a period of time exceeding that allocated to the task, and because of this feature system construction becomes easier.

Next, a description is made for Embodiment 16 of the present invention. In a control software execution system A16 for an NC unit according to Embodiment 16, execution of a task for machining program analysis is not finished each time one block is processed like in a conventional technology, but is continued as long as the machining program exists, and interruption of the analysis is executed according to a prespecified period of time.

Figure 43:
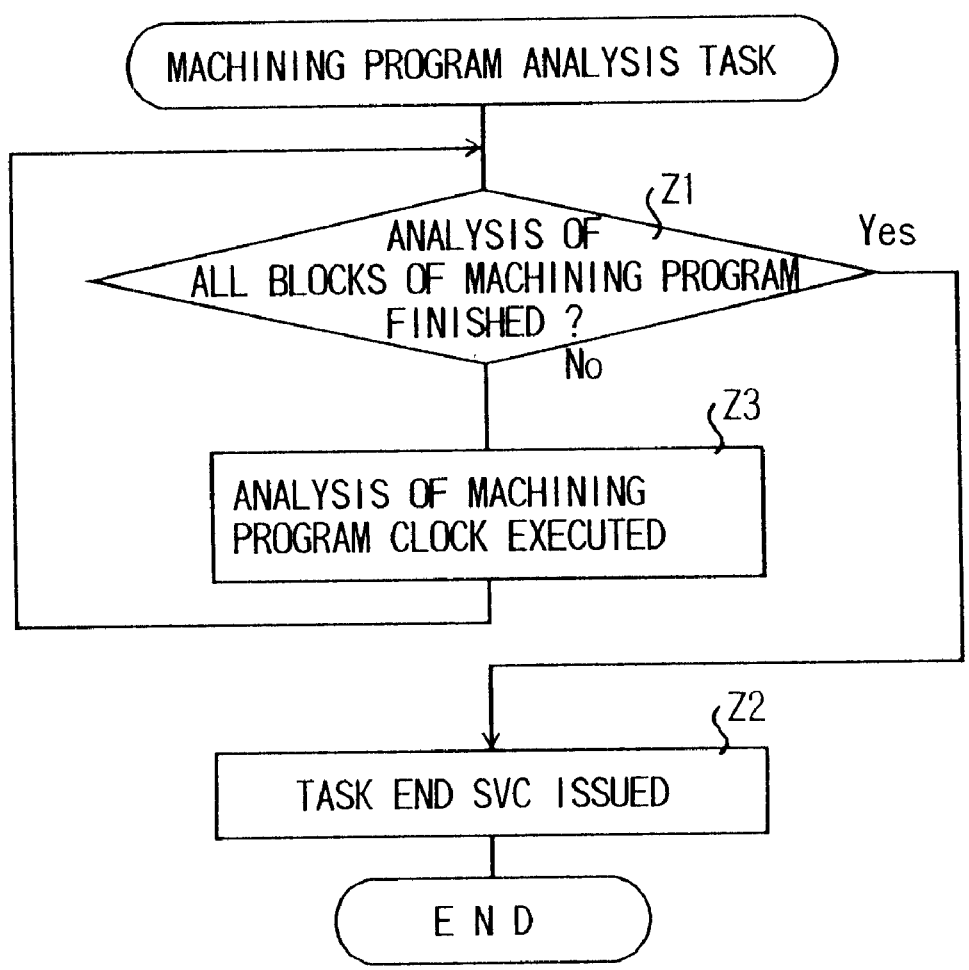
FIG. 43 is a flow chart showing a processing sequence for a machining program analysis task.

Description is made for a executing sequence of a machining program analysis task of a control software execution system A16 for an NC unit according to Embodiment 16 with reference to FIG. 43. Step Z1 is a processing executed first in the machining program analysis task, and in the processing determination is made as to whether all the blocks of the specified machining program have been analyzed or not. Step Z2 is a processing executed in a case where it is determined that all the blocks of the machining program have been analyzed, and an SVC for a task end is issued, and nothing is executed until the task is started again. Step Z3 is a processing executed in a case where it is determined that any blocks of the machining program not having been analyzed is still left in the task, and analysis of the block is executed. After this step and on, the processing in step Z1 is repeated until analysis of all the blocks is finished.

As described above, the control software execution system A16 for an NC unit according to Embodiment 16 continues a task for analyzing a machining program as long as a program to be executed exists, and executes control software for the NC unit for interrupting analysis according to a timing.

With Embodiment 16, the control software execution system A16 for an NC unit runs and interrupts a task for analyzing a machining program at a time interval, so that excess of processing time due to a size of block for a machining program is eliminated, and more particularly, it can be expected to improve processing ability in analysis of a machining program comprising minute linear segments. Furthermore, as a method of preparing a task, such a complicated processing as terminating execution of each block of a machining program is not required.

As described above, with the control software execution system for an NC unit according to each embodiment of the present invention, control of tasks each realizing a function of the NC unit respectively by sharing can precisely be executed, so that a processing time required for each task can be optimized, and for this reason waste of time can be reduced, which makes the entire processing time shorter. Also the system has a means for determining by itself an error in the control software execution system for an NC unit, so that it is easy to suppress troubles caused by an error.

Figure 44:
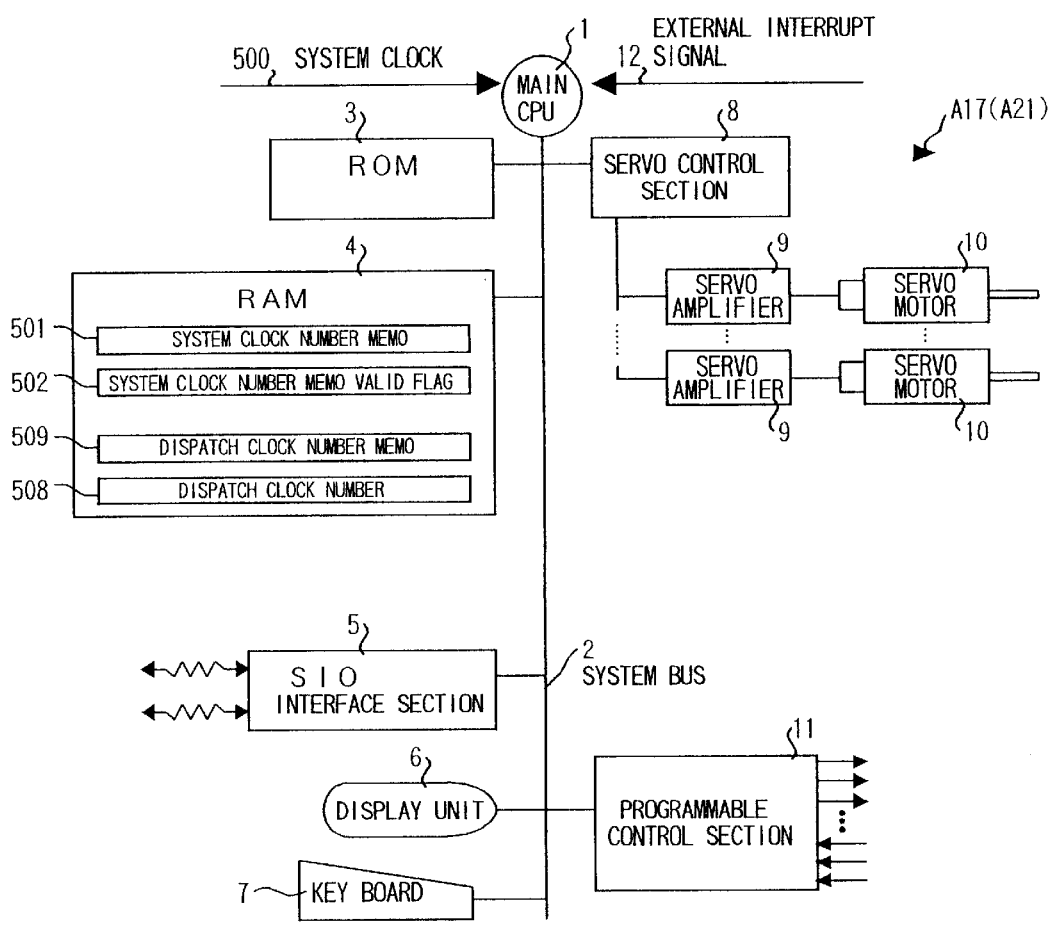
FIG. 44 is a block diagram showing general configuration of the control software execution system for an NC unit according to Embodiment 17 (21)

Next, a description is made for Embodiment 17 of the present invention. FIG. 44 is a block diagram showing general configuration of the control software execution system according to Embodiment 17, and the control software execution system A17 comprises the following components. In this figure, designated at the reference numeral 1 is a main CPU for controlling operations of each section or for executing computing required for numerical control, at 2 a system bus linking each section of the system to each other, at 3 a ROM (non-volatile storage means) for storing therein control software realizing main functions of the NC unit, at 4 a RAM (volatile storage means) used for temporally storing therein data or as a work area, at 5 an SIO interface section for transacting data with external devices by means of serial communications.

Also in FIG. 44, designated at the reference numeral 6 is a display unit for displaying running conditions of the NC unit, and for executing data display for identifying an command given to the NC unit, at 7 a keyboard as an input means for giving commands to the NC unit, and at 8 a servo control section for computing commands for controlling a servo motor, and the servo control section 8 may have a dedicated CPU different from the main CPU.

Furthermore in FIG. 44, designated at the reference numeral 9 is a servo amplifier for electrically amplifying an command received from the servo control section 8 and driving the serve motor or a main shaft of a machining tool (not shown), at 10 a servo motor for controlling a machining section of a machining tool (not shown), at 11 a programmable controller section for transacting data other than commands for servo control with the machining tool (called PC section hereinafter), at 12 an external interrupt signal inputted into the main CPU 1. Herein the external interrupt signal is a signal for alerting generation of an event (emergent event) such as power failure or emergency stop to the main CPU 1.

Also in FIG. 44, the reference numeral 500 indicates a system clock inputted to the main CPU 1. Herein the system clock is a clock signal for establishing synchronism for controlling the entire NC unit, and this signal causes timer interrupt to the CPU 1 at a prespecified cycle for checking dispatching priority of each task in the system at a specified interval or delaying execution of a task by a specified period of time. This cycle must fully be short such as, for instance, micro second. For instance, a 10 MHz clock signal should be used. In this case, task control can be executed at a time unit of 0.1 $\mu$sec (0.0000001 sec).

The RTOS checks a state of each task each time a system clock interrupt is generated, stops a task now in execution and has other task executed (this operation is called scheduling or dispatching).

In FIG. 44, the reference numeral 501 indicates a system clock number memo stored in the RAM 4. This system clock number memo is decremented by the RTOS each time the system clock 500 is inputted. The reference numeral 502 is a system clock number memo valid flag. Only in a case where this memo is set to a value indicating effectiveness, the system clock number memo 501 is regarded valid.

Also the reference numeral 508 is a dispatch clock number stored in the RAM 4. When system clock input is executed by the times of system clock set therein, a processing similar to that executed in the conventional embodiments such as dispatch is executed by the RTOS. This dispatch clock number 508 may be set once when system power is turned ON, but a frequency for calling the scheduler can be changed also by changing the dispatch clock number 508 during service operation of the system.

Furthermore, the reference numeral 509 indicates a dispatch clock number memo stored in the RAM 4, and this value is decremented each time the system clock 500 is inputted, and when this value is reduced to zero (0), an RTOS processing similar to that executed in the conventional embodiments such as dispatch is executed.

Next, a description is made for operations of the control software execution system A17 for an NC unit having the configuration as described above.

An execution cycle of each task is previously, or when execution for the task is started, registered by means of SVC (supervisor call or service call). Herein the SVC is a generic name of operations for a task to request any service to the RTOS. Any service as defined herein includes, for instance, stopping execution of the task itself until some conditions are satisfied, communications with other task, or starting or stopping other task (starting or stopping execution of other task).

The data is registered by RTOS in, for instance, the "task running cycle table" 50 as shown in FIG. 2. FIG. 2 shows data structure having a "running cycle" and a "number of times of repetition" for each task. Herein the running cycle is defined as a value of a clock number until a task is run next time, and the number of times of repetition indicates how may times the task is to be started. For instance, if this value is a negative one, it indicates ∞, and in that case, the task is repeatedly started. The RTOS prepares the "task running queue list" 51 as shown in FIG. 3 each time start of a task is instructed.

In this figure, the each running queue block 52 in the task running queue list 51 is a block comprising such elements as "link" indicating a position of the next running queue block, "task name", "running schedule clock number" indicating how long the task is required to wait until its execution is started, "simultaneous task name" indicating a name of task or tasks to be run simultaneously, and "TCB pointer" indicating a position of TCB.

Figure 45:
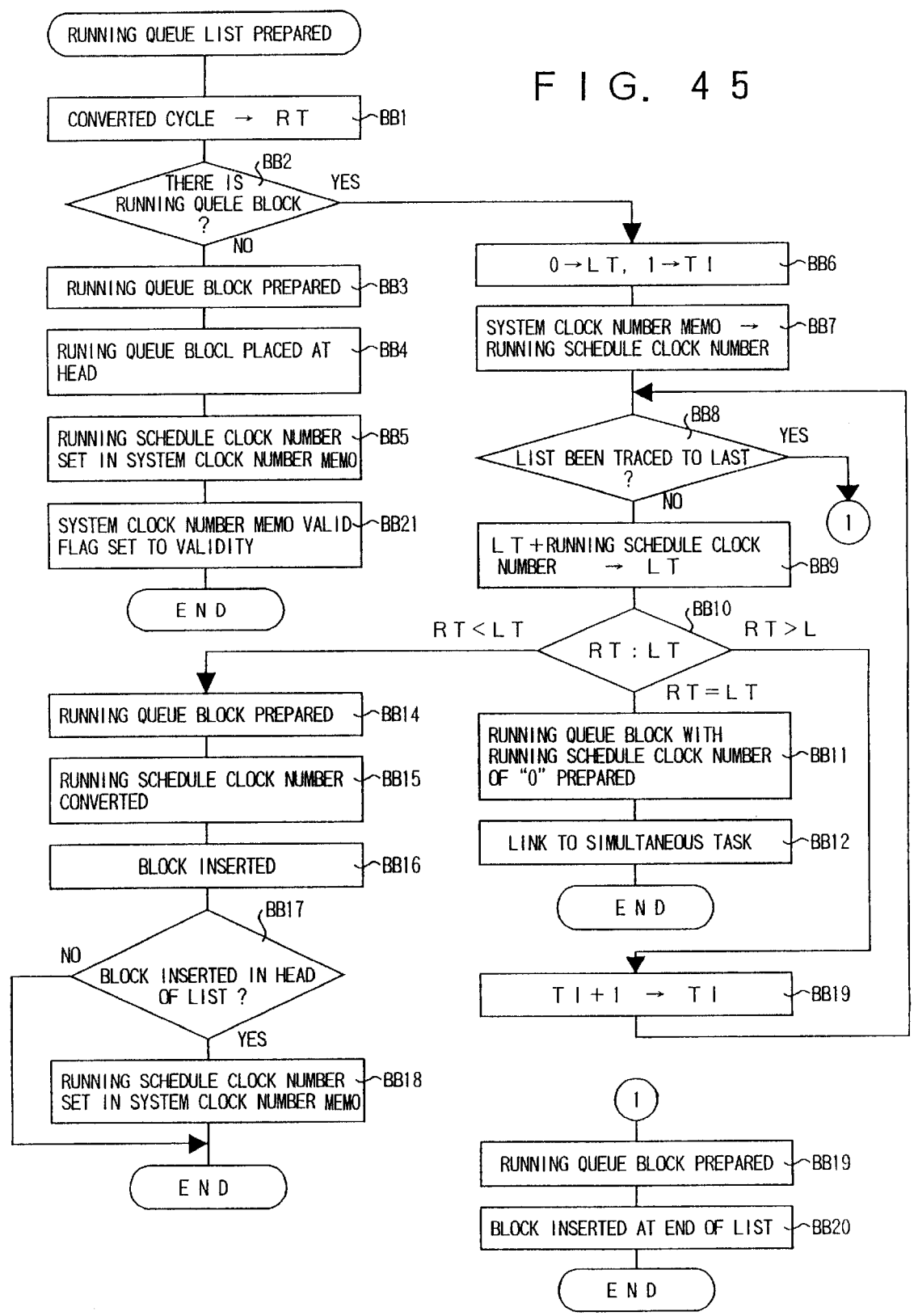
FIG. 45 is a flow chart showing a processing sequence in which the control software executing system for an NC unit according to Embodiment 17 prepares a task running queue list.

Next description is made for concrete operations with reference to the flow chart shown in FIG. 45. For convenience in description, herein it is assumed that a frequency of the system clock 500 inputted into the system is 10 MHz, namely that the system clock 500 is inputted once for every 0.1 μsec. Also it is assumed in the following description that interrupt is inhibited while a necessary processing like operation of a list is executed. Furthermore in a case where the running queue block 52 is prepared, a name of the task is inputted as a task name.

FIG. 45 shows a sequence for RTOS to prepare the task running queue list 51. In this figure, at first in step BB1, the requested running cycle is converted to an internal clock number. For instance, if the requested cycle is 10 msec, the running cycle is converted to 100,000 (100,000×0.1 sec=10 msec). This value is used as RT (request time). Next in step BB2, determination is made as to whether a running queue block is included in the current running queue list or not, and if it is determined that no running queue block is included, system control shifts to a processing in step BB3, and on the contrary if it is determined that any running queue block is included therein, system control shifts to a processing in step BB6.

Step BB3 is a processing for preparing the running queue block 52 in a case where the running queue block 52 is not included in the running queue list 51, and in step BB4, the running queue block 52 is placed at the head of the running queue list 51. Then, in step BB5, a running schedule clock number in a header block of the running queue list 51 is stored in the system clock number memo 501. In step BB21, a value indicating validity is set in the system clock number memo valid flag 502.

Step BB6 is a processing in a case where it is determined that the running queue block 52 is included in the running queue list 52, and in this processing the final task running time LT is set to 0, and the task index TI is set to 1. Herein LT is a parameter for computing in how many clocks from the current point of time the task is to be run, while TI is an index indicating the task in the running queue list.

Then in step BB7, a value of the current system clock number memo 501 is read, and the value is added to a running schedule clock number in the header running queue block 52. Then in step BB8, determination is made as to whether all the running queue blocks 52 in the running queue list 51 have been checked (traced) or not.

As a result, in step BB8, if it is determined that all the running queue blocks 52 have not been checked yet, system control shifts to step BB9. Step BB9 is a processing in a case where it is determined that the running queue block 52 is included in the running queue list 51, and a running schedule clock number in the running queue block 52 indicated by TI is taken out from the running queue list 51, and is added to LT.

Then in step BB10, RT is compared to LT. Step BB11 is a processing in a case where RT is equal to LT (RT=LT), and the running queue block 52 is prepared. In this step, the running schedule clock number is set to 0. In step BB12, the running queue block 52 prepared in the step BB11 is linked to the simultaneous task name in a block indicated by TI in the running queue list 51. Herein the term "linking" is defined as allocating the block prepared in step BB11 at a position where it can easily be found such as, for instance, placing an address of the block prepared in step BB11 at a position of the simultaneous task name in the running queue block 52 indicated by TI.

Step BB13 is a processing executed in a case where RT is larger than LT (RT>LT), and in this processing 1 of TI is added thereto, and then system control returns to step BB8, and the same processing is repeated.

Step BB14 is a processing in a case where RT is smaller than LT (RT<LT), and the running queue block 52 is prepared. Then the running schedule clock number is set to RT−LT+(a running schedule clock number of the running queue block 52 just one ahead that indicated by TI).

Then in step BB15, the running schedule clock number for the block indicated by TI is set to LT−RT, and in step BB16 the running queue block 52 prepared in step BB14 is inserted between the running queue block 52 indicated by TI and the preceding block.

Then in step BB17, determination is made at to whether the block inserted in step BB16 is a header of the running queue list 51 or not, and in step BB18 if it is determined that the block inserted in step BB16 is at the head of the running queue list 51, and a running schedule clock number for a header block of the running queue list 51 is stored in the system clock number memo 501.

In step BB19, in a case where it was determined in step BB8 that all the running queue blocks were checked, the running queue block 52 with the running schedule clock number of RT LT is prepared, and then in step BB20, the running queue block 52 prepared in step BB19 is inserted to the end of the running queue list 51.

FIG. 5 relating to the above embodiment shows an example of the running queue list 51. In this example, task A is started in 30 clocks from the current point of time, and then in further 20 clocks (namely in 50 clocks from the current point of time) task B is started. If it is assumed that a request for starting task C in 35 clocks later to the RTOS, the running queue list will become as shown in FIG. 6 according to a sequence indicated by the flow chart shown in FIG. 45.

In step BB5 or in step BB18 shown in FIG. 45, a running schedule clock number for a header block in the running queue list 51 is stored in the system clock number memo 501, and then after a period of time equivalent to the specified clock number has passed, a task start processing is called from the system clock interrupt described later. This task start processing is described with reference to FIG. 46.

Figure 46:
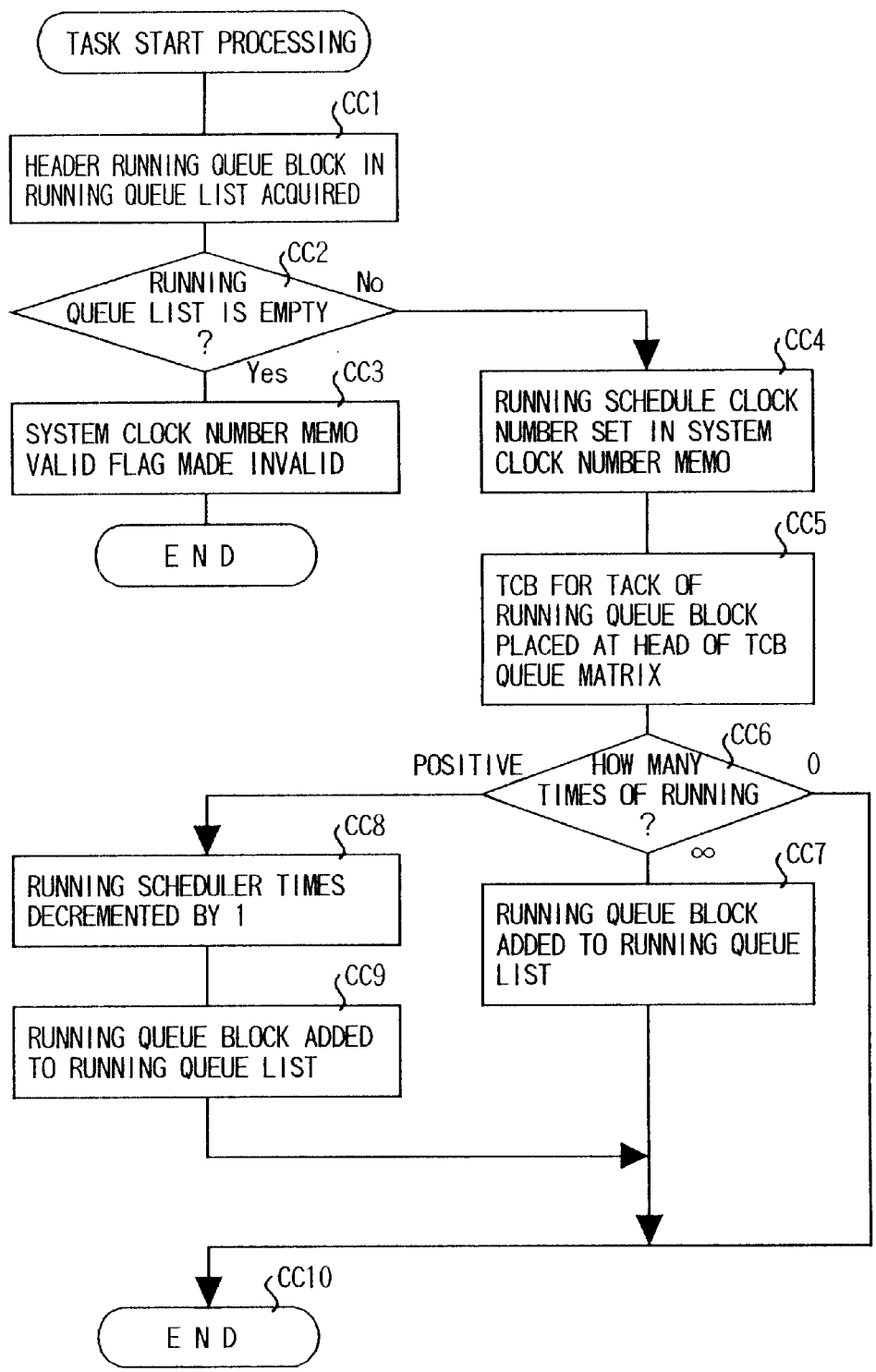
FIG. 46 is a flow chart showing a processing sequence for task start.

In FIG. 46, in step CC1, a processing for separating the running queue block 52 at the head of the running queue list 51 from the running queue list 51 is executed, and then in step CC2, determination is made as to whether the running queue list 51 has become empty or not. Step CC3 is a processing in a case where it is determined that the running queue list 51 has become empty, and by making invalid the system clock number memo valid flag 502, calling for start of any subsequent task is suppressed, and the processing sequence is terminated.

Step CC4 is a processing executed in a case where it is determined in step CC2 that any running queuing block 52 still remains in the running queue list 51, and a running schedule clock number for the header running queue block 52 is set in the system clock number memo 501. Then in step CC5, a task starting from the running queue block 52 separated in step CC1 is taken out and a TCB for the task is placed at the head of the TCB queue matrix.

Then in step CC6, cycle times for the task just run in the task running cycle table 50 (Refer to FIG. 2) is checked. Step CC7 is a processing in a case where the running times is infinite (negative), and a running schedule clock number in the running queue block 52 for this task is changed to a running cycle in the task running cycle table 50, and the running queue block is added to the running queue list.

Step CC8 is a processing executed in a case where the running times is a positive integral number, and the running schedule times is decremented by 1. Then in step CC9, the running queue block 52 for this task is prepared to this task by means of the processing shown in FIG. 4, and the running queue block 52 is added to the running queue list. Step CC10 is a processing executed in a case where the running times is 0, and in this case any specific processing is not executed, and the processing sequence is terminated.

Figure 47:
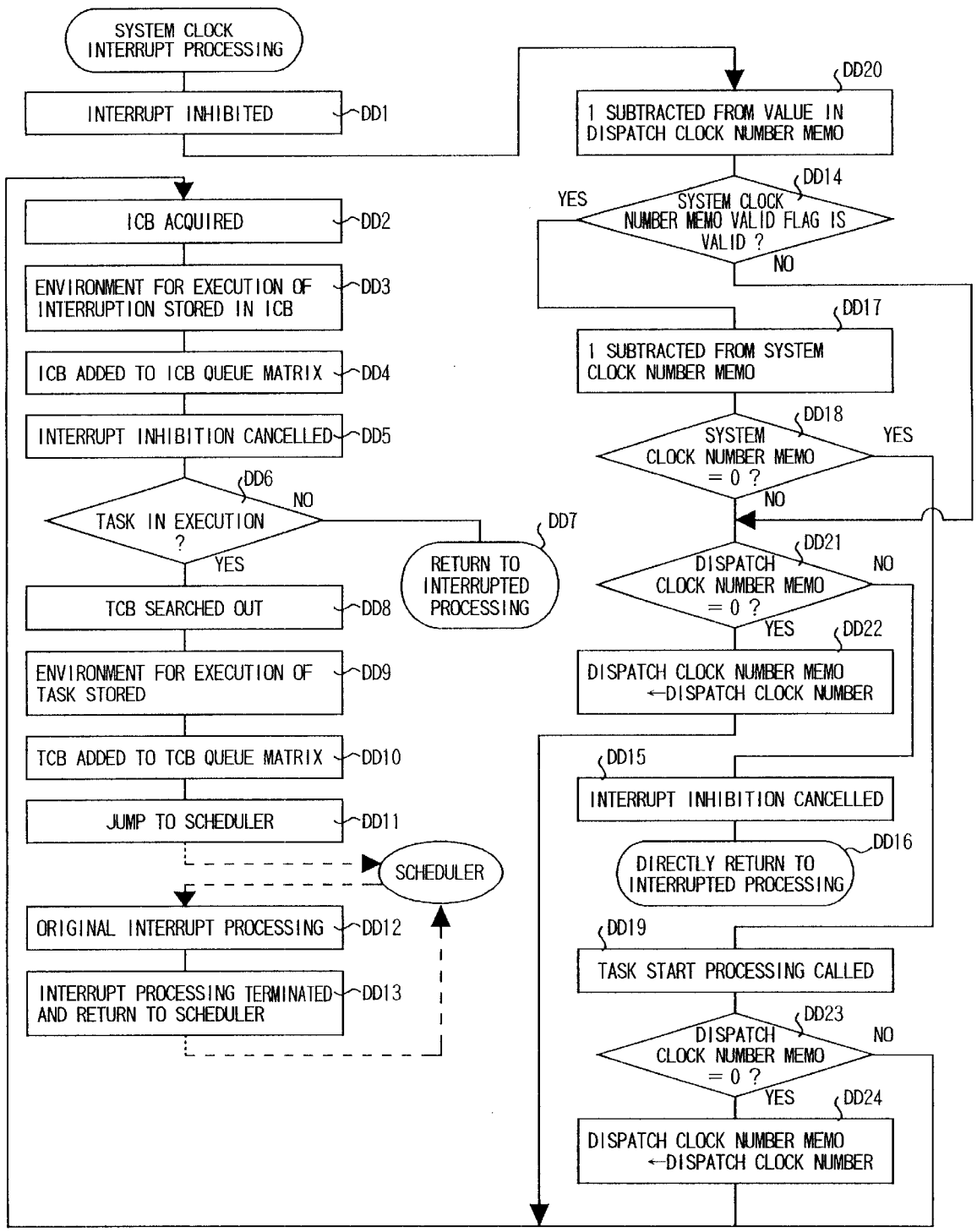
FIG. 47 is a flow chart showing a processing sequence for system clock interrupt processing.

Next, a description is made for a system clock interrupt processing with reference to FIG. 47. Step DD1 is a header of the interrupt processing executed when a system clock interrupt is generated, and at first generation of other interrupt is inhibited. It should be noted that this processing is automatically executed when an interrupt is generated by the main CPU 1.

Step DD20 is a processing for decrementing a value in the dispatch clock number memo 509 by 1. Step DD14 is a processing for determining whether the system clock number valid flag 502 has been validized or not, and if it is determined that the flag does not indicate validity, system control shifts to the processing in step DD21 described later, and on the contrary if it is determined that the flag indicates validity, the processing in step DD17 is executed.

Step DD21 is a processing for determining whether a value in the dispatch clock number memo 509 has been decremented to 0 or not, while step DD22 is a processing executed when it is determined that the dispatch clock number memo 509 has been decremented to 0, and then the dispatch clock number memo 509 is initialized with a value of the dispatch clock number 508. Then a dispatch processing from step DD2 is executed.

Step DD15 is a processing executed in a case where it is determined that a value of the dispatch clock number memo 509 has not been decremented to 0, and in this processing interrupt inhibition is canceled. Step DD16 is a processing for directly returning to an interrupted processing not via the scheduler. Step DD17 is a processing for subtracting 1 from a value of the interrupt clock number memo 50.

Step DD18 is a processing for determining whether a value of the interrupt clock number memo 501 has become equal to 0 or not, and if it is determined that the value is not equal to 0, as still a task start processing is not called, system control shifts to step DD21 to determine whether dispatch is to be executed or not. Step DD19 is a processing for calling the task start processing described in relation to FIG. 46. When having returned from the task start processing, system control shifts to the processing in step DD23. Step DD23 is a processing for determining whether a value of the dispatch clock number memo 509 has been decremented to 0 or not, and step DD24 is a processing executed in a case where a value of the dispatch clock number memo 509 has been decremented to 0, and then the dispatch clock number memo 509 is initialized with a value of the dispatch clock number 508 again.

Step DD2 is a processing for getting one of ICBs not used yet from the ICB pool (a place for storing ICBs not used yet).

Then in step DD3, an environment for execution of the task for interrupt processing by itself is stored in the ICB. Storage of a header address in the processing in step DD12 as an address for an command to be executed next in the ICB is also included in this process. Also in step DD4, the ICB just prepared is added to an ICB queue matrix to be executed by the scheduler. Then in step DD5, interrupt inhibition in DD1 is canceled. In this step and on, an interrupt may be generated again. The processing sequence described above is for making an interrupt-inhibited time as short as possible.

Then in step DD6, determination is made as to whether the interrupted processing is an interrupt processing, or an operation by the RTOS, or a task in execution. Step DD7 is a processing executed in a case where it was determined that the interrupted processing is an interrupt processing or an operation executed by the RTOS, and then system control directly returns to the interrupted processing. On the contrary, step DD8 is a processing in a case where it was determined that the interrupted processing is a processing of a task in execution, and then at first a TCB for the interrupted task is searched for. Then in step DD9, an environment for execution of the interrupted task is stored in the TCB found out in step DD8.

Furthermore in step DD10, the prepared TCB is added to the TCB queue matrix to be executed by the scheduler according to the dispatching priority. In step DD11, system control jumps to the scheduler, and then system control returns from the scheduler to the step DD12, but this processing is not always executed immediately after system control jumps to the scheduler, and sometimes system control returns to step DD12 after other ICB has been processed. The processing sequence from this step and on is the original interrupt processing specifically executed each time an interrupt is generated, and contents of the processing varies according to a cause for each interrupt. Furthermore step DD13 is an operation for terminating interrupt processing, and in this processing generally an command for return to an ordinary subroutine is issued, and according to this return command system control returns to the scheduler ICB processing.

In the description above, and also in the following description concerning interrupt, a processing in which addresses of interrupt themselves are previously registered in a list for enabling multiple-interrupt (other interrupt during interrupt processing) is the same as that in the conventional technology, so that description thereof is omitted.

As described above, the control software execution system A17 for an NC unit according to Embodiment 17 of the present invention enables control of a system clock for an RTOS having only an ordinary scheduling system based on dispatching priority with a minute time unit, and also restricts call to the scheduler due to a system clock interrupt only to the necessary cases without overhead in the RTOS and with a function to execute control over task start added thereto, so that control software for an NC unit can accurately be executed without fail.

With Embodiment 17 of the present invention, the control software execution system A17 for an NC unit can execute time control over tasks each realizing functions of the NC unit with a small time unit, and furthermore can specify a cycle for starting each task easily. For this reason, waste of time allocated to each task can be reduced, and a task can be controlled so that it is executed within a running time allocated to the task, so that system construction becomes easier and a processing speed in the NC unit is improved.

Next, a description is made for configuration of Embodiment 18 of the present invention. Contents of FIG. 18 showing general configuration of the control software execution system A18 for an NC unit according to Embodiment 18 is almost the same as those shown in FIG. 44 relating to Embodiment 17. However, Embodiment 18 is different from Embodiment 17 in that, although the latter has only the system clock number memo 501, the former has, in addition to the system clock number memo 501, an accumulated system clock number memo 503 and a system clock number memo 505 for running time alarm.

Next, a detailed description is made for configuration of the control software execution system A18 for an NC unit according to Embodiment 18 of the present invention. It should be noted that the components 1 to 12, 500, 508, and 509 of the control software execution system A18 are the same as those shown in FIG. 44 relating to Embodiment 17 above, and description thereof is omitted herein.

Figure 48:
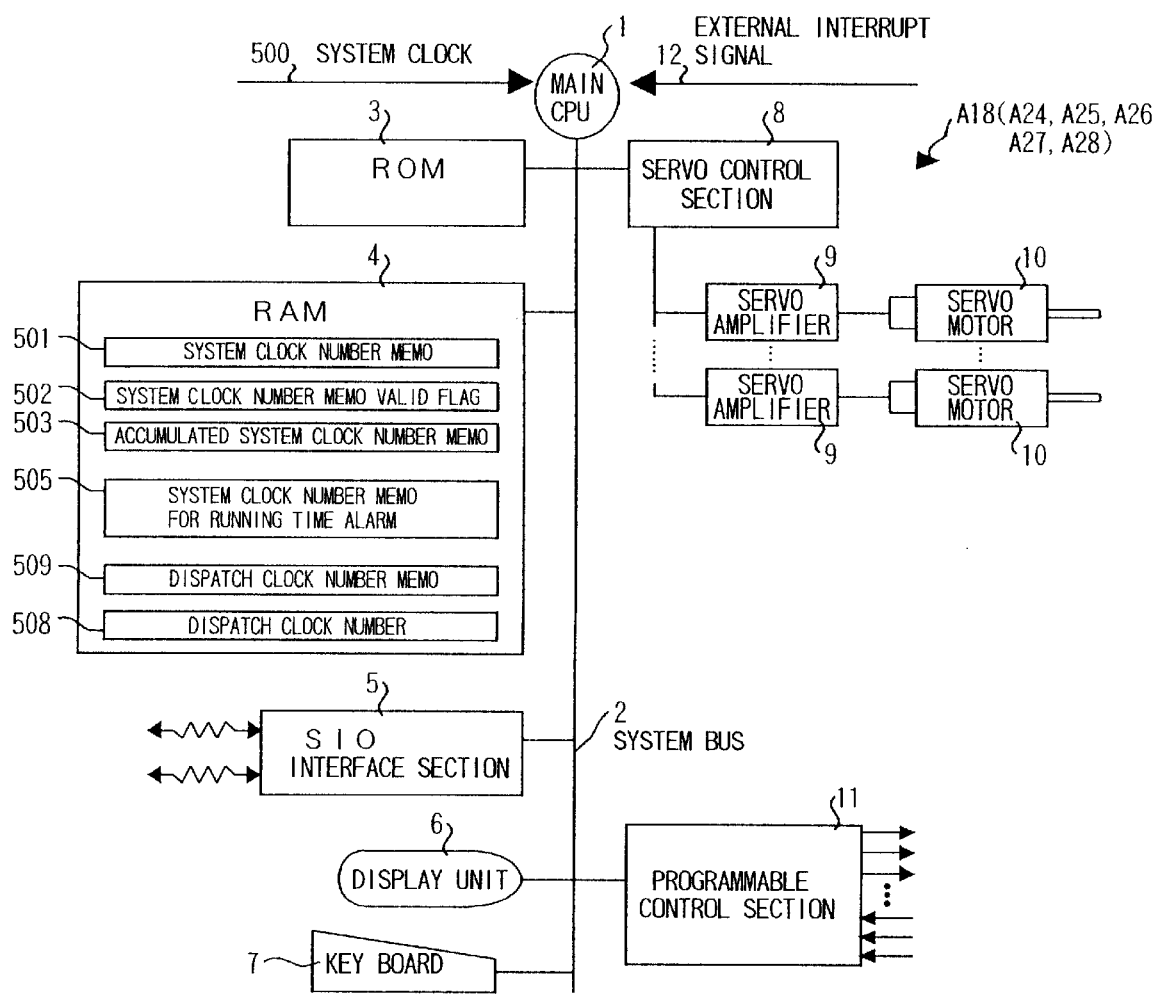
FIG. 48 is a block diagram showing general configuration of the control software execution system for an NC unit according to Embodiment 18 (24, 25, 26, 27, 28)

In FIG. 48, the reference numeral 501 indicates a system clock number memo for reference time interrupt stored in the RAM 4. A value of this system clock number memo 501 is decremented by the RTOS each time the system clock 500 is inputted. The reference numeral 502 indicates a system clock number memo valid flag stored in the RAM 4, which indicates whether the system clock number memo 501 is valid or not. The reference numeral 503 indicates an accumulated system clock number memo for measurement of task running time stored in the RAM 4, and a value of the accumulated system clock number memo is incremented by the RTOS each time the system clock 500 is inputted. The reference numeral 505 is a system clock number memo for running time alarm used for generating a running time alarm stored in the RAM 4.

Figure 49:
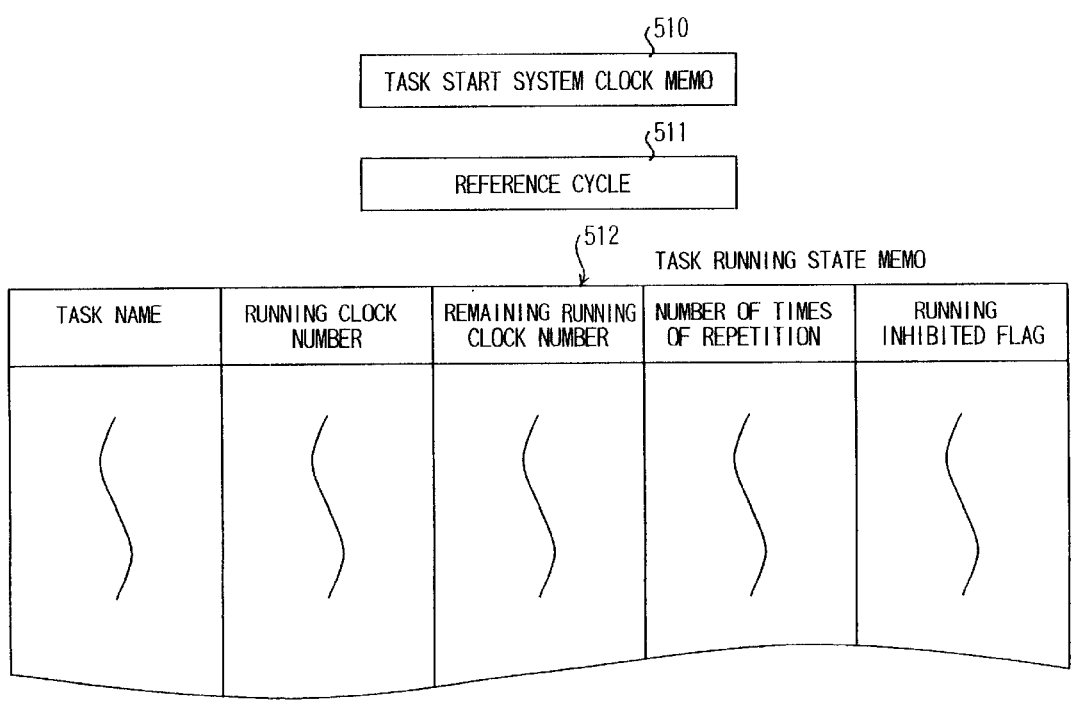
FIG. 49 is an explanatory view showing data structure required for the control software execution system for an NC unit according to Embodiment 18.

Next, a description is made for operations of the control software execution system A18 for an NC unit according to Embodiment 18. FIG. 49 shows data structure required in this embodiment, and the reference numeral 510 indicates a "task start system clock memo" for RTOS to store therein a value of the accumulated system clock number memo 503 shown in FIG. 48 right before starting a task and then compute a running time of a task by obtaining a difference between the recorded value and a value of the accumulated system clock number memo 503 generated when execution of a task is finished and system control has returned to the RTOS.

The reference numeral 511 indicates an area to store a "reference cycle" therein. One type of reference cycle is previously registered for a system. How long each task is to be run is specified according to this cycle. The specification may be made with either a clock number or time, but herein for convenience of description, it is assumed that the cycle is converted to a clock number.

Furthermore, the reference numeral 512 indicates a "task running state memo". A percentage of execution of each task is registered with the SVC previously or when execution of the task is started. For instance, if a specified running cycle for each task, namely a percentage of execution of task A is 10%, that of task B is 5%, and that of task C is 20% with the reference cycle of 20 msec, task A, task B, and task C may be run for 2 msec, for 1 msec, and for 4 msec for every 20 msec respectively.

Herein it is assumed that, like in a case of Embodiment 17, the system clock 500 in FIG. 48 is 10 MHz. Namely assuming that the reference minimum time unit is 0.1 $\mu$sec, tasks A, B, C may be run for 20000, 1000, and 40000 clocks respective within a period equivalent to the clock number of 200000 clocks. The clock numbers are stored in the column for "running clock number" in the task running state memo 512. A value of 0 is set for a task with a percentage of executed not specified thereto in this column.

Values in the column for running clock number are copied to the column for "remaining running clock number" each time one reference cycle is over, and thus the clock number corresponding to a period of execution of each task is subtracted from the clock number originally set for each task. Each time the reference time is over, values for all tasks in this column should have been decremented to 0. It is needless to say that a sum of the running clock numbers should not be less than a value equivalent to the reference cycle. The error check may be executed each time the value is registered in the task state memo. It should be noted that description concerning this error checking is omitted in the following description.

Then, a value set in the column for "times of repetition" is a number of times indicating how many times the task is started. If it is assumed that, when this value is a negative one, it indicates the infinite, then the task is started repeatedly.

The column of "running inhibited flag" is used by a scheduler. A task with this flag turned ON is removed from objects for scheduling. Namely when this flag is ON, the task can not be run even if the priority is high.

Then, a description is made for a processing for resetting a reference cycle. The control software execution system A18 sets a value for a reference cycle 511 in the system clock number memo 501 previously before a task insuring a running rate is started for instance when actual service operation is started. After a period of time equivalent to the specified number of clocks has passed, the reference cycle processing is called from a system clock interrupt described later.

Figure 50:
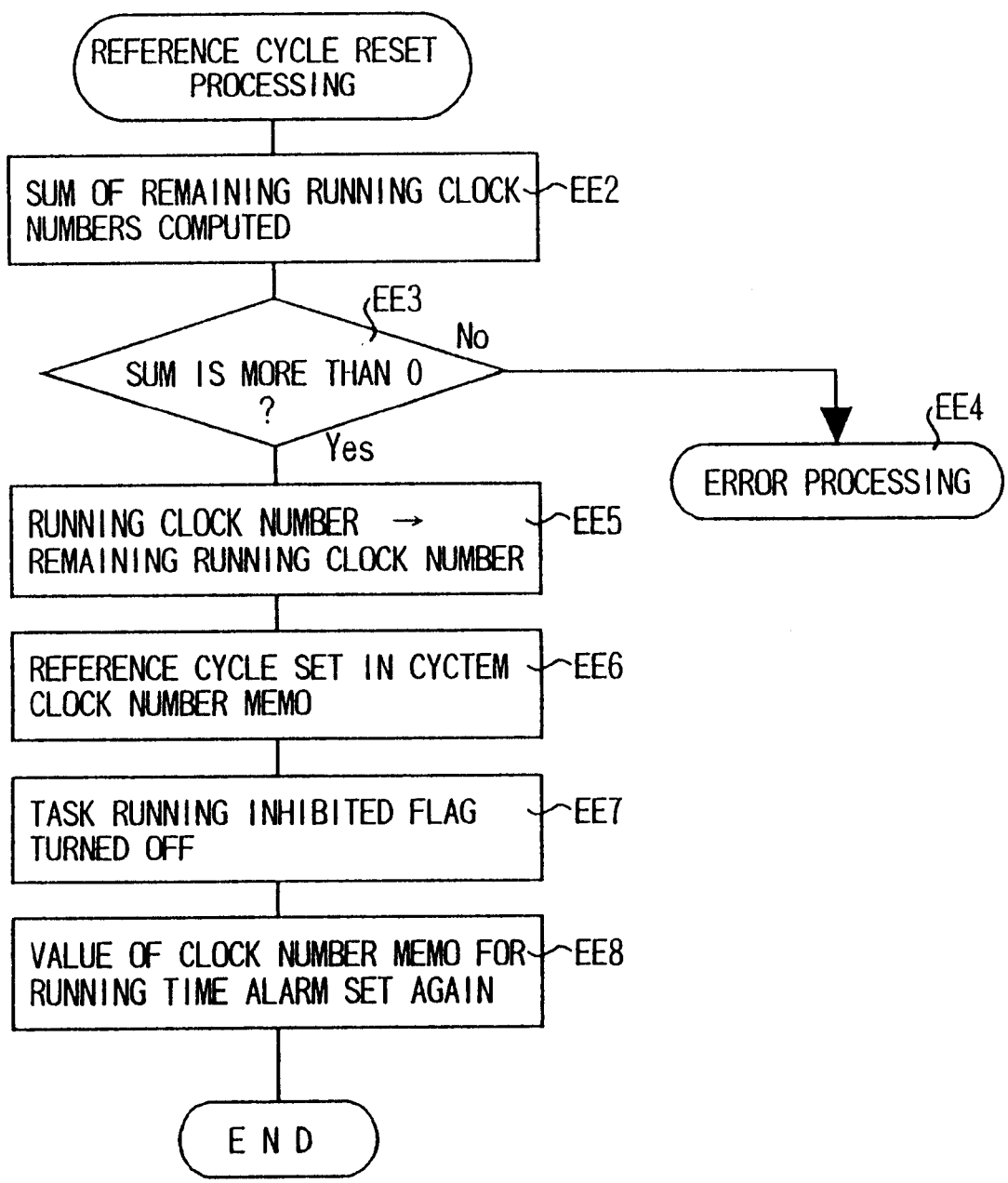
FIG. 50 is a flow chart showing a sequence for a reference cycle reset process.

FIG. 50 is a flow chart showing a sequence of the reference cycle reset processing. The reference cycle reset processing can be considered a sum of a processing for resetting a system as well as all tasks for each cycle. In step EE2, a sum of remaining running clock number in the task running state memo 512 is obtained. In step EE3, determination is made as to whether the sum is more than zero (0) or not, and if it is determined that the sum is not more than 0, an error processing is executed in step EE4, but usually this case does not occur, so that description thereof is omitted herein.

On the contrary, if it is determined in step EE3 that the sum is more than 0, in step EE5 a value in the column for running clock number in the task running state memo 512 is copied to the column for remaining running clock number for each task. Then in step EE6, a value for the reference cycle 511 is again set in the system clock number memo 501.

Then in step EE7, the running inhibited flags for all tasks in the task running state memo 512 are turned OFF. With this processing, all tasks again become an object for scheduling respectively. Furthermore, a value obtained by subtracting a sum of remaining running clock numbers in the task running state memo 512 from the reference cycle 511 is set in the system clock number memo 505 for running time alarm. As a result, when a remaining time in each reference cycle has decreased to a time length only enough to run tasks each having a running cycle insured, a processing for alerting a running time is called. Then system control returns to the called processing.

Figure 51:
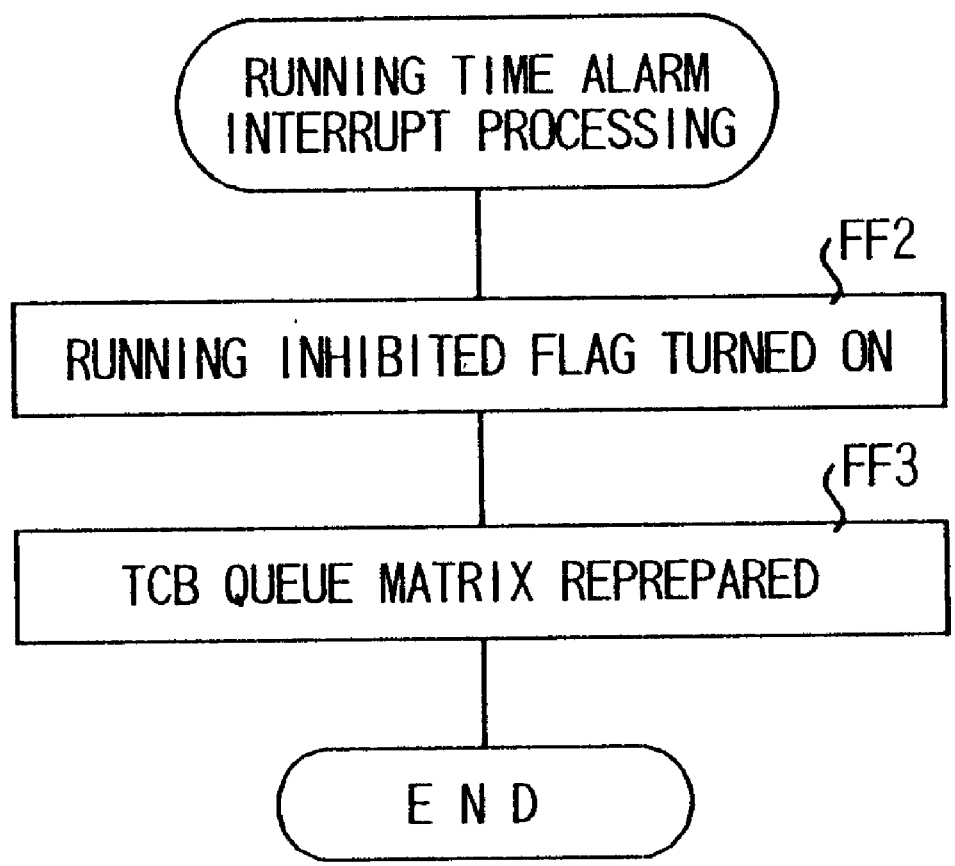
FIG. 51 is a flow chart showing a sequence for a running time alarm process.

FIG. 51 is a flow chart showing a sequence of a running time alarm processing. In step FF2, the running inhibited flags for all the tasks each having a zero or negative remaining running clock number in the task running state memo 512 is turned ON.

In step FF3, a task processing queue matrix is rearranged so that all the TCBs with the running inhibited flag OFF will be placed before those with the flag ON. In other words, the task processing queue matrix is rearranged so that the tasks with the running inhibited flag ON will be executed earlier than those with the flag OFF.

Figure 52:
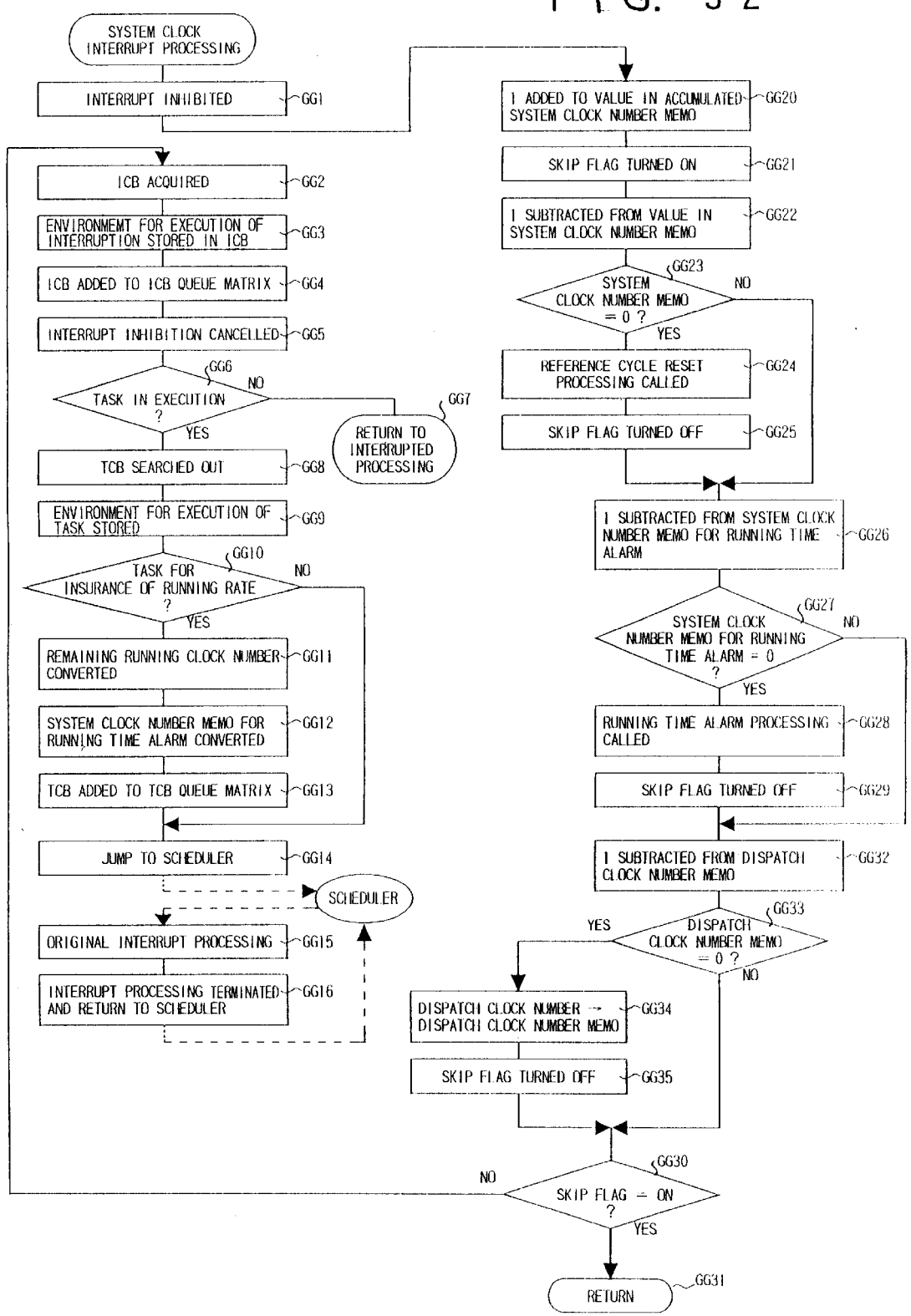
FIG. 52 is a flow chart showing a sequence for system clock interrupt processing.

FIG. 52 is a flow chart showing a sequence of system clock interrupt processing. In the following processing, description for the valid flag is made for only the system clock number memo valid flag 502, but the same valid flag is necessary also for the running time alarm system clock number memo 505. In this flow chart, a processing for the valid flag for the running time alarm system clock number memo 505 is the same as that for the system clock number memo valid flag 502, and for this reason description thereof is omitted herein.

Step GG1 is a header step in interrupt processing when an interrupt is generated, and at first generation of other interrupt is inhibited. Usually this processing is automatically executed by the main CPU 1. Step GG20 is a processing for adding 1 to a value in the accumulated system clock number memo 503. Step GG21 is a processing for turning OFF the skip flag. Herein the skip flag is the one prepared in the RAM 4 and used to indicate whether such a processing as scheduling should be executed upon the last system clock interrupt prepared.

Step GG22 is a processing for subtracting 1 from a value of the system clock number memo 501. Step GG23 is a processing for determining whether a value of the system clock memo 501 has been reduced to zero (0) as a result of the processing in step GG22 or not. Step GG24 is a processing executed in a case where it is determined that the value of the system clock number memo 501 has been reduced to zero (0), and the reference cycle reset processing shown in FIG. 50 is called. Step GG25 is a processing for turning OFF the skip flag. Step GG26 is a processing for subtracting 1 from a value of the running time alarm system clock number memo 505.

Step GG27 is a processing for determining whether a value of the running time alarm system clock number memo 505 has been reduced to zero (0) as a result of the processing in step GG26 or not. GG28 is a processing executed when it is determined that the value of the running time alarm system clock number memo 505 has been reduced to zero, and the running time alarm processing shown in FIG. 51 is called. Step GG29 is a processing for turning OFF the skip flag. Step GG32 is a processing for subtracting 1 from a value of the dispatch clock number memo 509. Step GG33 is a processing executed for determining whether a value of the dispatch clock number memo 509 has been reduced to zero (0) as a result of the processing in steep GG32 or not.

Furthermore step GG34 is a processing for reinitializing the dispatch block number memo 509 with the dispatch clock number 508. Step GG35 is a processing for turning OFF the skip flag. Step GG30 is a processing for determining whether the skip flag is ON or OFF, and if it is determined that the skip flag is OFF, system control shifts to step GG2 to execute such as processing as scheduling. Step GG31 is a processing executed when it is determined that the skip flag is ON, and system control directly returns to the interrupted processing.

In step GG2, one ICB not used yet is taken out from the ICB pool (a site for storing ICBs not used yet). Step GG3 is a processing for storing an environment for execution of this interrupt processing (for the task itself). This operation also includes storage of a header address for a processing in step GG15 as an address for an command to be executed next described later in the ICB.

In step GG4, the ICB prepared in this step is added to a ICB queue matrix to be executed by the scheduler. In step GG5, interrupt inhibition effected in step GG1 is canceled. In this step and ON, there is the possibility that an interrupt is generated again. The above processing sequence is for making a time for interrupt inhibition as short as possible.

In step GG6, determination is made for whether the interrupted processing is interrupt processing, or an operation executed by the RTOS, or a task in execution. Step GG7 is a processing executed when the interrupted processing is interrupt processing or an operation being executed by the RTOS, and then system control directly returns to the interrupted processing. Step GG8 is a processing executed when the interrupted processing is a task processing in execution, and in this case, at first a TCB for the interrupted task is searched out. In step GG9, an environment for execution of the interrupted task is stored in the TCB found out in sep GG8.

Step GG10 is a processing for determining whether a task now in execution is a task included in objects for insurance of running rate or not. Concretely determination is made as to whether or not the task is the one with a value in the column for remaining running clock number in the task running state memo 512 of 1 or more. Step GG11 is a processing executed in a case where the task is an object for insurance of a running rate, and a running clock number for the task obtained by subtracting a value of the recorded task start system clock memo 510 from a value of the accumulated system clock number memo 503 when the task is started is subtracted from a value in the column for remaining running clock number for the task in the task running state memo 512.

In step GG12, the value subtracted in step GG11 (running clock number for the task) is added to a value of the running time alarm system clock number memo 505. Thus time for running tasks other than those with the running cycle insured increases in proportion to a rate of running of the task with the running cycle insured.

Step GG13 is a processing for adding the prepared TCB to a TCB queue matrix to be executed by the scheduler. In this step, if even one task in the running inhibited flag column in the task running state memo 512 has been turned ON, the tasks each with the running inhibited flag turned OFF are placed before those with the running inhibited flag ON in the TCB queue matrix.

In step GG14, system control jumps to the scheduler. Step GG15 is a processing executed when system control returns from the scheduler, and this processing is not always executed immediately after system control jumps to the scheduler, and sometimes this processing is executed after any other ICB is executed, but in any way system control returns to this step. The processing sequence from this step and on is original and specific interrupt processing for each interrupt, and contents of the processing varies according to a cause for an interrupt. Step GG16 is a processing for terminating interrupt processing, and generally an command for returning to an ordinary subroutine is issued, and with this return command, system control returns to an ICB processing section in the scheduler.

Figure 53:
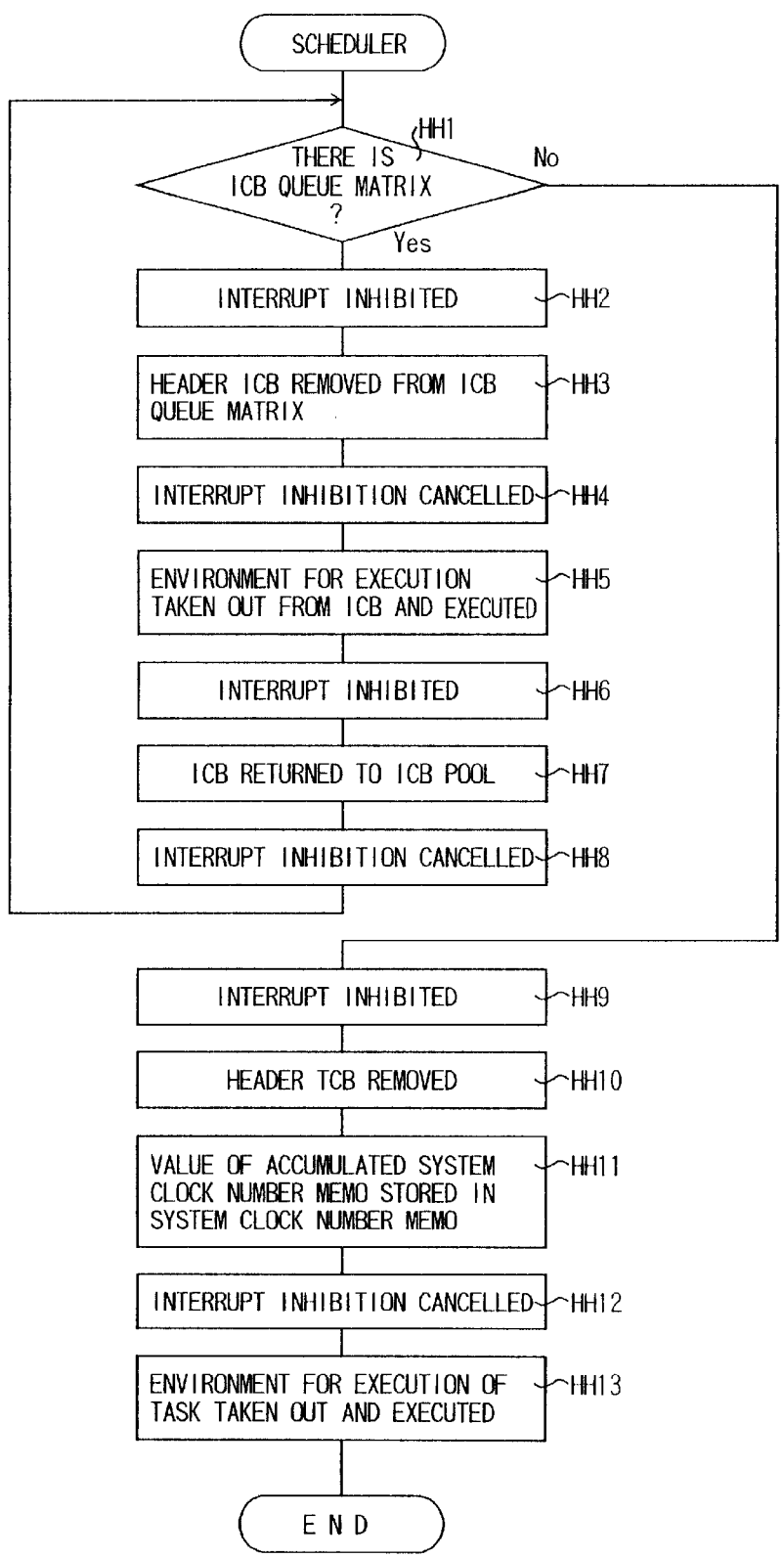
FIG. 53 is a flow chart showing a sequence for a processing by a scheduler.

Next, a description is made for operations of the scheduler under controls by the RTOS with reference to FIG. 53. For convenience of description, in the following description of the present invention, it is assumed that an idle task having the lowest dispatching priority and executing nothing to external devices is always running.

Step HH1 is a processing for determining whether there is a queue matrix for interrupt processing (ICB) or not. Step HH2 is a processing executed when it is determined that there is a queue matrix for interrupt processing, and at first an interrupt is inhibited to execute the queue matrix. This interrupt inhibition is executed because, if any interrupt is generated and is added to a queue matrix for interrupt processing while the list of the queue matrix for the interrupt processing is being processed, consistency of the list is lost.

In step HH3, a header ICB is removed from a list of interrupt processing queue matrix. In step HH4, interrupt inhibition is canceled. In step HH5, an environment for execution of interrupt processing such as an execution address or a register stored in step GG3 is taken out from the ICB removed in step HH3, and the task is executed. This is the processing executed in step GG15. Step HH6 is a step to which system control returns from step GG6, and herein interrupt is inhibited again. In step HH7, the ICB removed in step HH3 is returned to the ICB pool. Interrupt inhibition is canceled in step HH8, and then system control returns to step HH1. Then, while there is a queue matrix for interrupt processing, a processing sequence from step HH1 to step HH7 is repeated.

Step HH9 is a processing when there is a queue matrix for interrupt processing, and at first interrupt is inhibited to executed the queue. In step HH10, a header TCB is removed from a list of queues for interrupt processing. In step HH11, if the task specified by the TCB is a task included in objects for insurance of running rate, execution of the task is started, and a value of the accumulated system clock number memo 503 is stored in the system clock number memo 501.

In step HH12, inhibition of interrupt is canceled. In step HH13, an environment for execution of the task stored in step GG9 is taken out from the queue matrix (list) for task processing, and the task is executed. Then, system control jumps to the processing, and does not return to this step.

As described above, the control software execution system A18 for an NC unit according to Embodiment 18 is a system in which a function capable of providing a control for insuring a running time for each task is added to an RTOS having only a scheduling system based on dispatching priority, and can execute control software for an NC unit based on this system.

With Embodiment 18, the control software execution system A18 for an NC unit can control a running time of tasks each realizing a function of the NC unit. For this reason, waste of time allocated to each task can be reduced. Furthermore a task can be controlled within the running time allocated thereto, so that system construction becomes easier.

Figure 54:
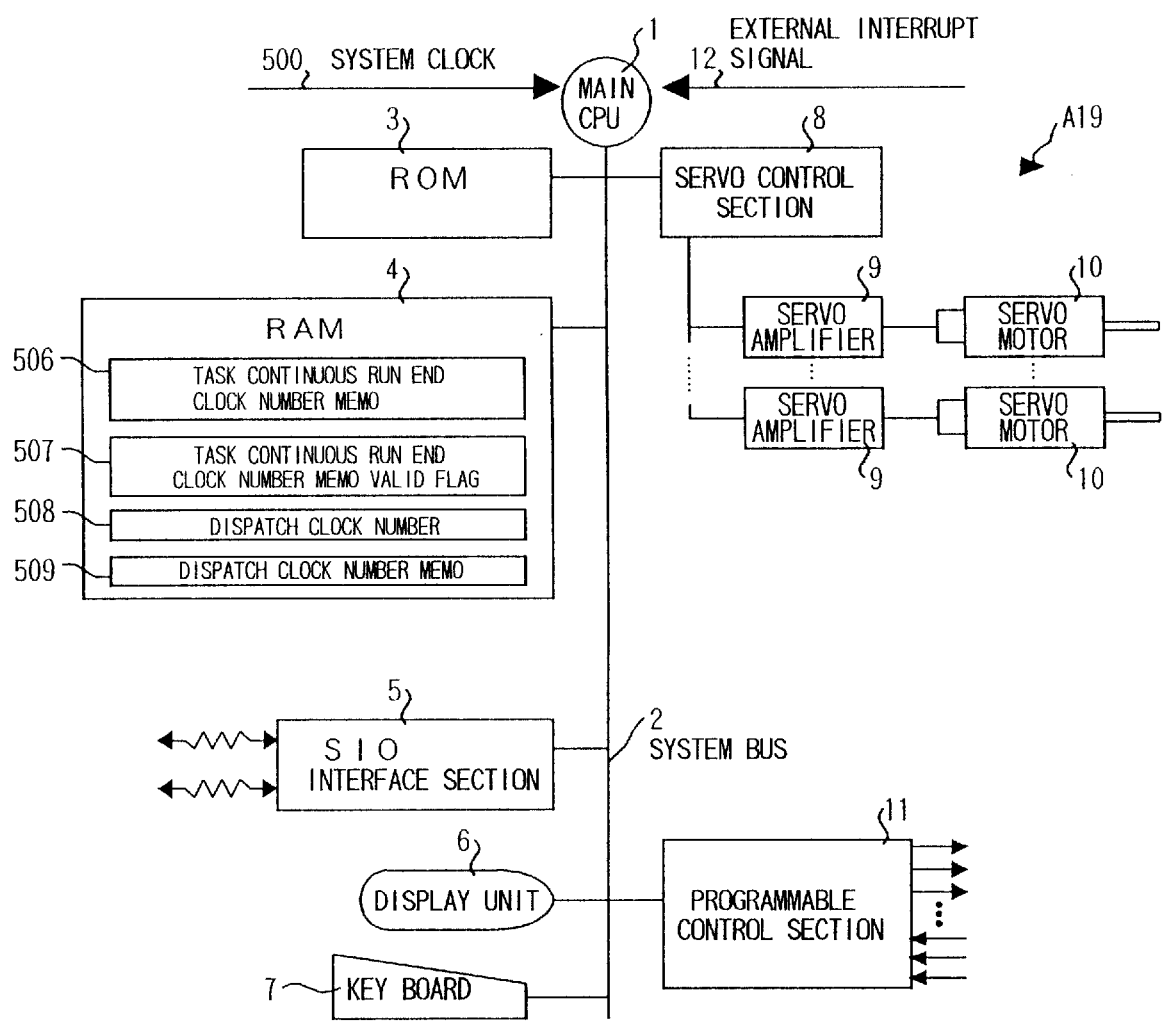
FIG. 54 is a block diagram showing general configuration of the control software execution system for an NC unit according to Embodiment 19.

Next, a description is made for Embodiment 19 of the invention. FIG. 54 shows general configuration of an control software execution system A19 for an NC unit according to Embodiment 19 and the contents is substantially the same as those in FIG. 48 relating to Embodiment 18. Detailed description is made hereinafter for configuration thereof. The reference numerals 1 to 12, 500, 508, and 509 in this control software execution system A19 are the same as those shown in FIG. 44 relating to Embodiment 17, so that description thereof is omitted herein.

The following configuration elements are further added to this control software execution system A19. Namely, the elements are a task continuous run end clock number memo 506 for using for terminating running of a task and the task continuous run end clock number memo valid flag 507.

Next, a description is made for operations of Embodiment 19 of the invention. FIG. 55 and FIG. 56 show data structure each required for insuring continuous running for a task, and FIG. 55 is structure of a list for "a task end clock number". The reference numeral 520 indicates "a task end clock block". Components of the task end block are "link pointer" for linking the task end block, "task name", and "end clock number" or the like. Like in the description above, it is assumed also in the following description of this embodiment that internally a time control is always executed according to a clock number.

FIG. 56 shows contents of a "task continuous run insurance table" 521. This table has columns for "task name", "a continuous run insurance clock number", and "in-execution flag", and a value of continuous run insurance clock number is set when system is started or by an SVC. This column is set to zero (0) for a task continuous run of which has not been specified. A column for an in-execution flag is ON when a task, current continuous run of which is insured, is running, and OFF in other cases. Two or more of this flags are never turned ON simultaneously.

This table is not required to use if it is used as a parameter in the SVC for starting a task, but for convenience in description below, it is assumed that this table is used. The scheduler for the RTOS insures a continuous run of a task by not executing scheduling again after interrupt processing is terminated even if an interrupt is generated when a task insured for a continuous run is running. Execution of a task insured for its continuous run is terminated only when the specified conditions are satisfied, for instance, "continuous run end processing " is called up.

When the SVC for starting a task is issued, at first the RTOS determines whether the task is a task for which a continuous run is insured or not, and if the task is an insured one, a continuous run clock number for the task continuous run insurance table 521 is substituted to the task continuous run end clock number memo 506. A value is decremented by 1 from this value each time a system clock is inputted, and when the value is decremented to zero (0), the task continuous run end processing is called.

Figure 57:
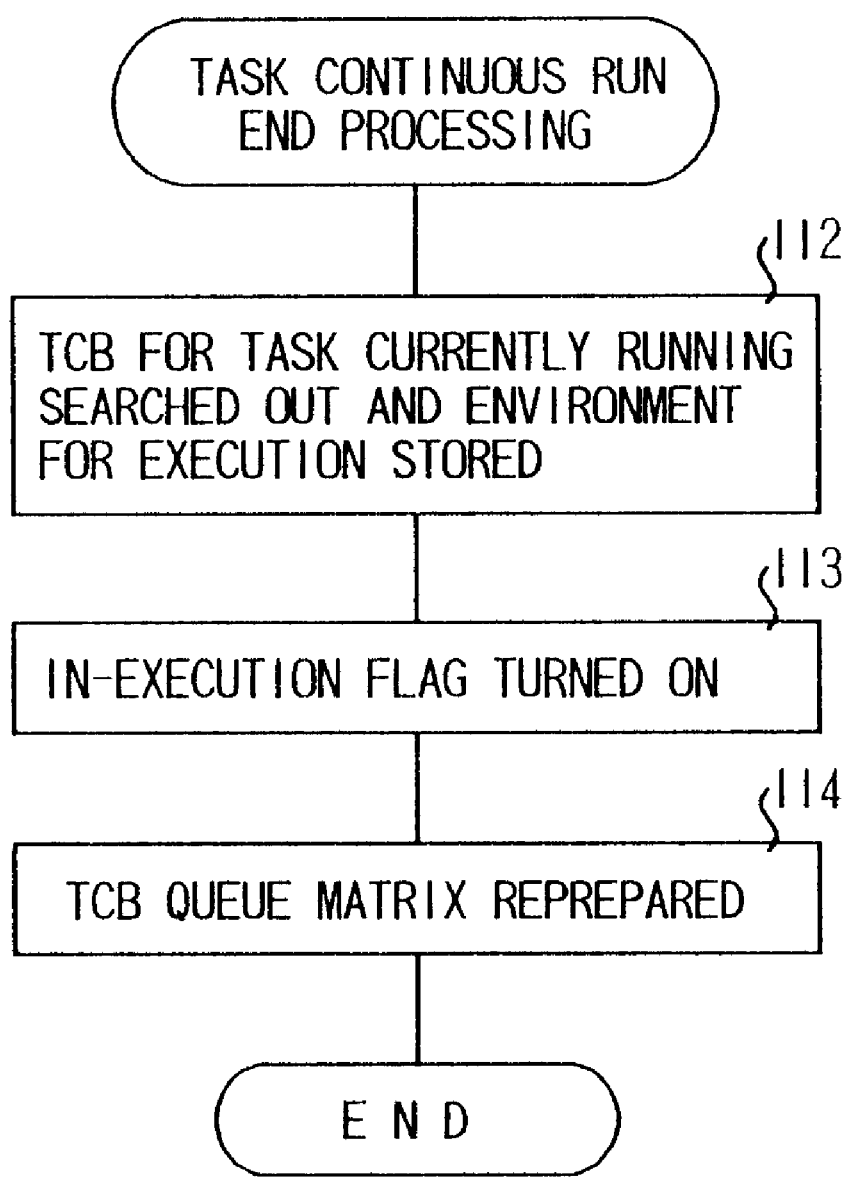
FIG. 57 is a flow chart showing a sequence for a task continuous running terminate process.

At first description is made for the task continuous run end processing. FIG. 57 is a flow chart showing a processing of the task continuous run end. Herein, in step II2, the TCB for a task currently running for which a continuous run is insured is searched out, and an environment for execution for the current task is stored in the TCB. Step II3 is a processing for turning OFF a task in-execution flag in the task continuous run insurance table 521. Step II4 is a processing for re-preparing the task processing queue matrix according to the dispatching priority.

Figure 58:
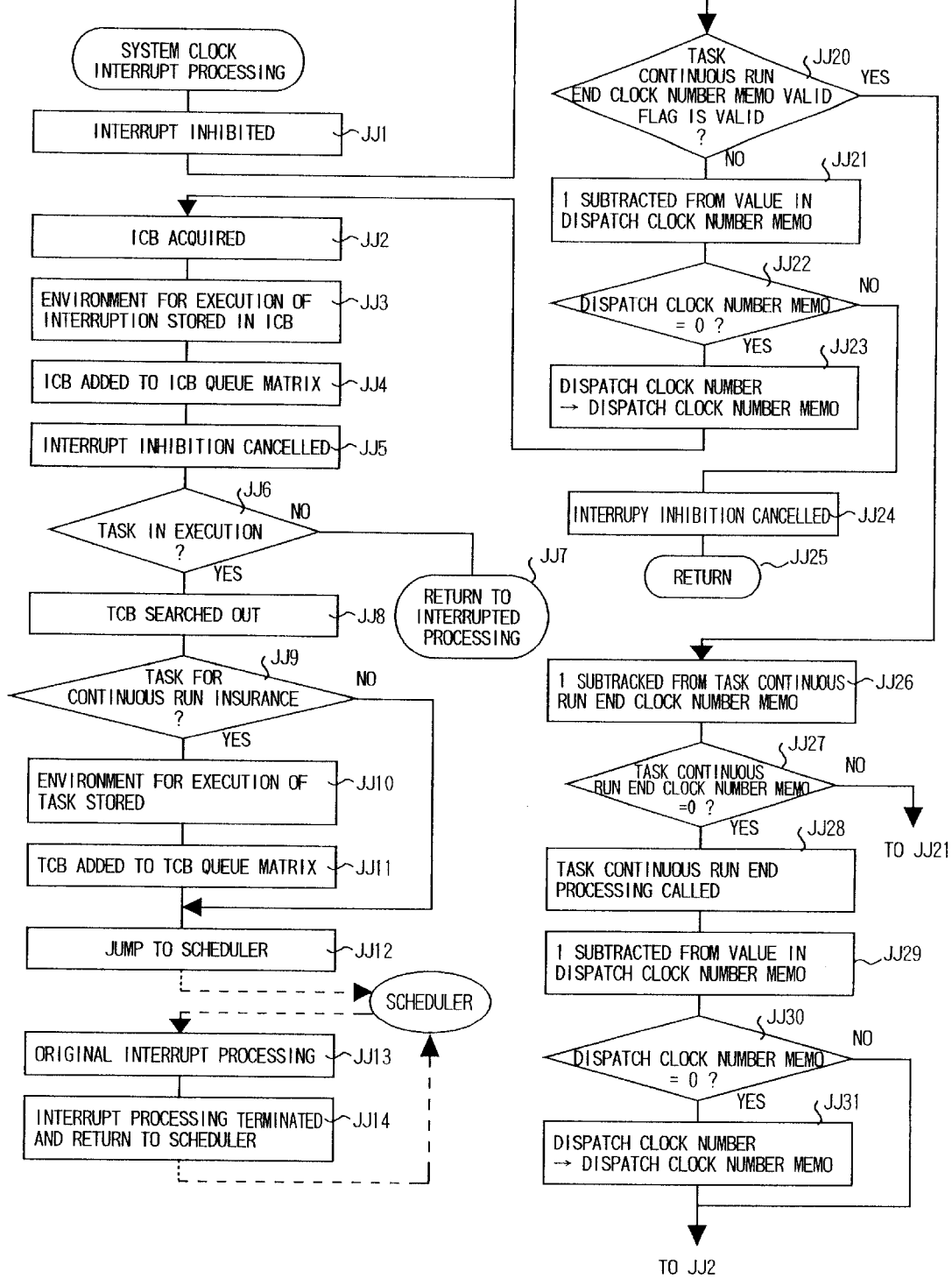
FIG. 58 is a flow chart showing a sequence for system clock interrupt processing.

Next description is made for a sequence of system clock interrupt processing with reference to the flow chart in FIG. 58. At first, step JJ1 is a processing executed first in interrupt processing when an interrupt is generated, and in the processing at first generation of other interrupt is inhibited. Generally this processing is automatically executed by the CPU. Step JJ20 is a processing for determining whether the task continuous run end clock number memo valid flag 507 is valid or not.

Step JJ21 is a processing executed in a case where the task continuous running end clock number memo valid flag 507 is invalid, and a value is decremented by 1 from the dispatch clock number memo 509. Step JJ22 is a processing for determining whether the dispatch clock number memo 509 has been decremented to zero (0) or not. Step JJ23 is a processing for re-initializing a value of the dispatch clock number memo 509 in the dispatch clock number 508. Step JJ24 is a processing for canceling inhibition of interrupt. In step JJ25, system control directly returns to interrupt processing.

Also step JJ26 is a processing for decrementing a value by 1 from the task continuous running end clock number memo 506. Step JJ27 is a processing for determining a result in step JJ26, and if the value of the memo 506 has not been decremented to zero (0), system control jumps to step JJ21. Step JJ28 is a processing for calling up the task continuous run end processing described in FIG. 57.

In step JJ29, a value of the dispatch clock number memo 509 is decremented by 1. Step JJ30 is a processing for determining whether the dispatch clock number memo 509 has been decremented to zero (0) or not. In a case where the value has not been decremented to zero (0), system control jumps to step JJ2. Step JJ31 is a processing for re-initializing a value of the dispatch clock number memo 509 in the dispatch clock number 508. Then system control jumps to step JJ2.

In step JJ2, a ICB not used yet is acquired by 1 from the ICB pool (which is a site where ICBs not used yet are stored). In step JJ3, an environment for execution of this interrupt processing (of itself) is stored in the ICB. Storing the header address of the processing in ICB as an address for an command of following execution is also included in this processing.

Step JJ4 is a processing for adding the ICB currently prepared to an ICB queue matrix to be executed by the scheduler. In step JJ5, inhibition of interrupt in step JJ1 is canceled. After this step on there will be the possibility that an interrupt is generated again. The processing described above is for making an interrupt inhibited time as short as possible.

Step JJ6 is a processing for determining whether the interrupted processing is interrupt processing or an operation by the RTOS, or a task in execution. Step JJ7 is a processing executed when the interrupted processing is interrupt processing or an operation by the RTOS, and in this processing system control directly returns to the interrupted processing. Step JJ8 is a processing executed when the interrupted processing is a task in execution, and in this processing, at first, the TCB for the interrupted task is searched out.

Step JJ9 is a processing for determining whether a task currently in execution is a task for which a continuous run is insured or not. More particularly, determination is made as to whether the task is a task having one or more columns for a continuous run insurance clock number in the task continuous run insurance table 521 (refer to FIG. 56). In a case where it is determined that the task is one insured for its continuous run, steps JJ10 and JJ11 described below are not executed, and system control jumps to step JJ12. Step JJ10 is a processing executed in a case where the task is the one not being an object for continuous run insurance, and in the processing an environment for execution of an interrupted task is stored in the TCB searched out in step JJ8.

Step JJ11 is a processing for re-preparing a TCB queue matrix according to the dispatching priority. In step JJ12, system control jumps to the scheduler. Step JJ13 is a processing executed after system control has returned to this processing from the scheduler. This processing is not always executed right after system control jumps to the scheduler, and in some cases this processing might be executed after other ICB has been processed, but in any case system control will return to this step.

The sequence from this step on is an original interrupt processing specific to each interrupt, and contents of the processing varies according to a cause for interrupt. Step JJ14 is a step for terminating interrupt processing, and generally an command for returning to an ordinary subroutine is issued, and according to the return command, system control returns to an ICB processing block of the scheduler.

As described above, the control software execution system A19 for an NC unit according to Embodiment 19 is a system in which a function capable of insuring a continuous running time for a task to the RTOS having only an ordinary scheduling system based on the dispatching priority, and control software for an NC unit is executed according to this system.

With Embodiment 19, in the control software execution system, continuous running time is insured to a task realizing functions of the NC unit. For this reason waste of time allocated to each task can be reduced. Furthermore a task can be controlled according to the running time, and because of this feature system construction becomes easier.

Next, a description is made for configuration of Embodiment 20. Contents in FIG. 59 showing general configuration of an control software execution system A20 for an NC unit according to Embodiment 20 is substantially the same as contents in FIG. 44 shown in Embodiment 17.

Figure 59:
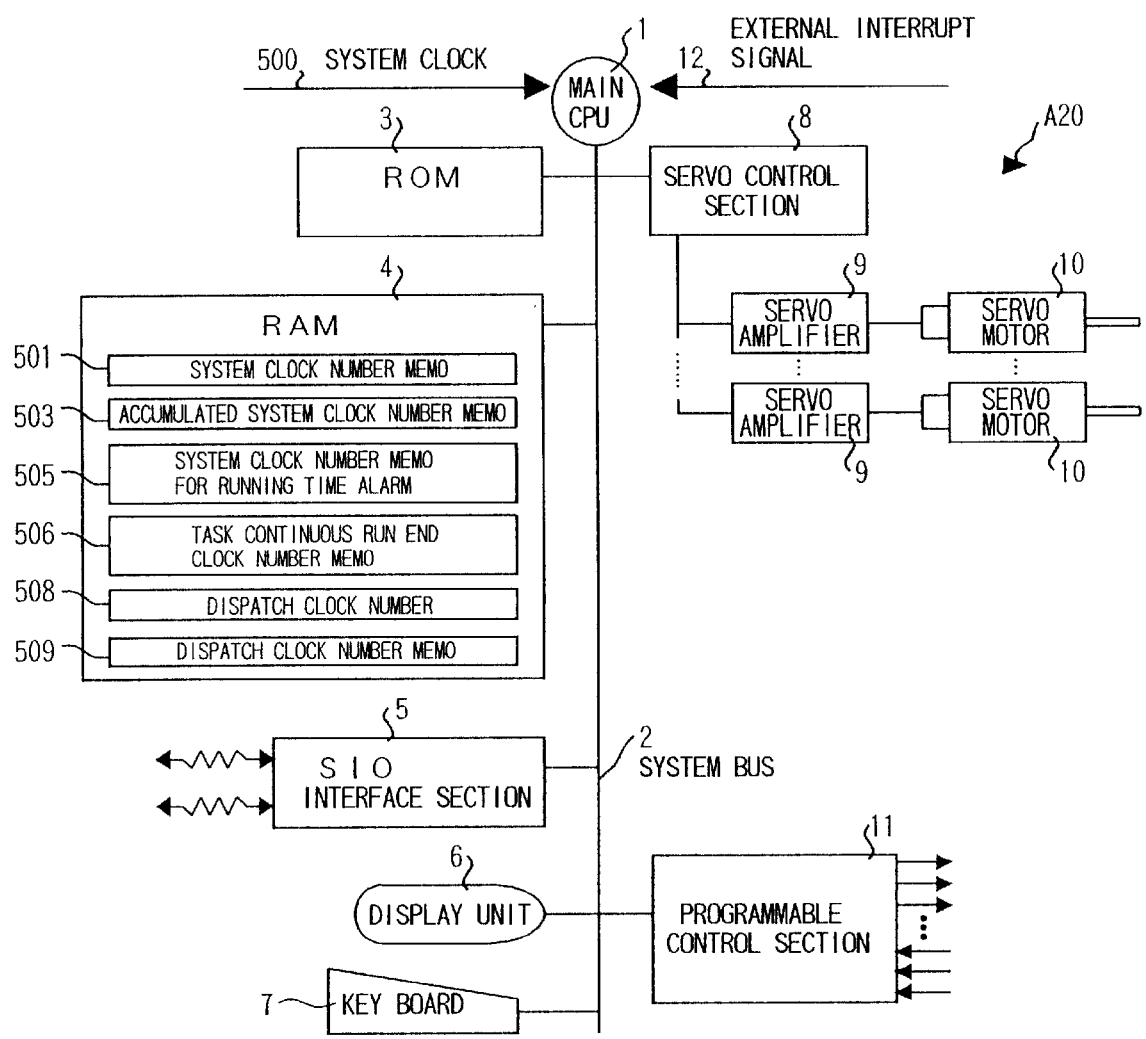
FIG. 59 is a block diagram showing general configuration of the control software execution system for an NC unit according to Embodiment 20.

In the RAM 4 shown in FIG. 59, designated at the reference numeral 501 is a system clock number memo, at 503 an accumulated system clock number memo, at 505 a running time alarm system clock number memo for running time alarm for a task, and at 506 a task continuous run end clock number memo. It should be noted that the reference numeral 508 indicates a dispatch clock number indicating that a dispatch processing is called once for the specified number of system clock generation like the processing in FIG. 44, and the reference numeral 509 indicates a dispatch clock number memo.

Next, a description is made for operations of the control software execution system A20 for an NC unit. An execution cycle for each task is registered by the SVC previously or when the task is started like that in Embodiment 17.

This data is registered in, for instance, "task running cycle table" 50 shown in FIG. 2. FIG. 2 has data structure comprising "a running cycle" and "times of repetition" for each task. A running cycle is defined as a value of the clock number until a task runs next time, while times of repetition is defined as times indicating how many times the task is started. For instance, if this value is a negative value, it is assumed in the following description that the value indicates the infinite. In that case it is assumed that the task is started repeatedly. The RTOS prepares a "task running queue list" 51 like that in FIG. 3 each time a task is started using other task running cycle list 50.

In FIG. 3, running queue blocks 52 in the list each comprise "task name", "running schedule clock number" indicating how long will pass from the current point of time until a task runs next time, and "simultaneous task name" indicating a task name for which a task has to run at the same time.

A method of preparing the task running queue list by the RTOS is the same as that in FIG. 45 in Embodiment 17, so that description thereof is omitted herein.

Also as shown in Embodiment 18, FIG. 49 shows data structure required for insuring a running rate for a task, and the reference numeral 510 indicates "a task start system clock memo". The RTOS records a value of accumulated system clock memo 503 right before the task is started, and a period of time for which the task ran is computed by obtaining a difference between the recorded value and a value of the accumulated system clock memo 503 when system control has returned to the RTOS after execution of the task has been finished.

Also "reference cycle" 511, "task running state memo" 512, a column of "remaining running clock number", a column of "times of repetition", and a column of "running inhibited flag" each shown in FIG. 49 are the same as those in Embodiment 18, so that description thereof is omitted herein.

In steps BB4 and BB6 each shown in FIG. 45, a running schedule clock number of a header block in the running queue list is stored in the system clock number memo 501. After a period of time equivalent to the specified clock number has passed, the RTOS calls a processing of task start.

The control software execution system A20 shown in FIG. 59 previously sets a value of the reference cycle 511 to the system clock number memo before a task, for which a running rate is insured when actuated, is started. After a period of time equivalent to the set clock number has passed, the RTOS calls a processing of the reference cycle. The sequence of reference cycle processing is the same as the sequence shown in FIG. 50 relating to Embodiment 18, so that description thereof is omitted herein.

Also the sequence of a running time alarm processing is the same as the sequence shown in FIG. 51 relating to Embodiment 18, so that description thereof is omitted herein.

Furthermore the sequence of system clock interrupt processing is the same as the sequence shown in FIG. 52 relating to Embodiment 18, so that description thereof is omitted herein.

Also operations of the scheduler in the RTOS is the same as the sequence shown in FIG. 53 relating to Embodiment 18, so that description thereof is omitted herein.

Herein description is made for a task start processing, a reference time processing, a running time alarm processing, and interrupt processing to a system clock centering on operations to the TCB queue matrix.

In the task start processing, the TCB for a task which is started according to this processing is inserted to a header of the TCB queue matrix. Also, the processing of reference time enables all the tasks to run. In the processing of running time alarm, the TCB for a task for which a rate of running time is insured is brought before the TCB for a task other than that described above, and at the same time generation of running time alarm processing is reported to the dispatch processing of a system clock interrupt by turning ON the running inhibited flag in the task running state memo 512.

In the processing for dispatching system clock interrupt, in a case where the running time alarm processing has been generated, the TCB for a task, a running time of which is insured, is linked to a task before the TCB for a task not insured in the TCB queue matrix until the reference time processing is generated.

Herein, priority of either the task start processing or the dispatch processing of a system clock is previously selected. If priority is put on the task start processing, a starting time of a task becomes accurate, but a running rate of a task becomes more or less inaccurate. On the other hand, if priority is put on the dispatch processing, a running rate of a task becomes accurate, and in contrast a starting time of a task becomes more or less inaccurate. As for these values, a threshold value thereof may be decided by any means. For instance, for solving a delay of the starting time for a task, such a method in which priority is put on a running rate until a certain time point, then after that time point priority is put on the processing of a task start may be employed.

As described above, the control software execution system A20 for an NC unit according to Embodiment 20 is a system in which a functions of executing a control giving insurance of a task starting cycle and a task running rate to the RTOS having only an ordinary scheduling system based on dispatching priority, and control software for the NC unit is executed according to this system.

With Embodiment 20, in the control software execution system A20 for an NC unit, control for an accurate starting time and a running time for tasks each realizing a function of the NC unit respectively can be provided. For this reason waste of time allocated to a task can be reduced. Furthermore a task can be controlled with the running time, and because of this feature system construction becomes easier.

Next, a description is made for Embodiment 21. The general configuration of the control software execution system A21 for an NC unit according Embodiment 21 of the present invention is the same as that described in relation to Embodiment 17 (refer to FIG. 44), so that description thereof is omitted herein.

Then description is made for operations of the control software execution system A21 for an NC unit according to Embodiment 21. Like in a case of Embodiment 20, an execution cycle for each task running is registered by SVC previously or when execution of the task is started.

This data is registered by the RTOS in the task cycle table 50 as shown, for instance, in FIG. 2. The "running cycle" and "the number of times of repetition" in this task running cycle table 50 are the same as those in Embodiment 17, so that description thereof is omitted herein.

In FIG. 3, each running queue block in the list is a block comprising "a task name", "a running schedule clock number" indicating how long a time should pass from the current point of time before execution of the task is started, and "simultaneous task name" indicating names of tasks to be run simultaneously.

The method of preparing this task running queue list with the RTOS is the same as that shown in FIG. 45 relating to Embodiment 17, so that description thereof is omitted herein.

Also as in a case of Embodiment 19, FIG. 55 and FIG. 56 each show data structure required for insuring a running rate for continuous run of a task, and FIG. 55 shows structure of a list for "task end clock number". The reference numeral 520 indicates a "task end clock block". Components of a task end block include a pointer for linking the task end block, "a task name", and "an end clock number". Like in the description above, also it is assumed in the description of the present embodiment that internally time control is executed according to a number of clocks. The "in-execution flag" is turned ON when a task insured for its continuous run is currently running, and OFF in other cases. Two or more of this flags are never turned ON simultaneously.

FIG. 56 shows a "task continuous run insurance table" 521. This table has a column for "task name" and that for "continuous run insurance clock number", and a value of the continuous run insurance clock number is set when system operation is started, or by SVC. For a task with continuous run not specified, a value in this column is set to 0. If necessary parameters are specified in SVC for task start, this table is not required, but in the following description, it is assumed for convenience of description that this table is used.

A scheduler in the RTOS insures continuous run of a task by not executing re-scheduling after an end of interrupt processing even if a new interrupt is generated when a task, continuous run of which is insured, is running. Execution of a task insured its continuous run is end when "a continuous run end interrupt" is generated.

When an SVC for task start is issued, at first determination is made as to whether the task is one, continuous run of which is insured, or not, and if it is determined that the task is one, continuous run of which is insured, the continuous run clock number in the task continuous run insurance table (Refer to FIG. 56) is set in the system clock number memo. When a period of time equivalent to the set clock number has passed, execution of the task is called from the "continuous run end processing" RTOS.

A sequence of the continuous run end processing is the same as that in relation to FIG. 57 showing Embodiment 19, so that description thereof is omitted herein.

Also a sequence of general interrupt processing other than that for a reference cycle interrupt is the same as that described in relation to FIG. 58 showing Embodiment 19, so that description thereof is omitted herein.

Also the scheduler is the same as that described in Embodiment 2 (Refer to FIG. 14), so that description thereof is omitted herein.

Herein description is made for a dispatch processing for system clock interrupt centering on operations to a TCB queue matrix. Namely;

1) Firstly in the task start processing, a TCB for a task to be started by this processing is inserted into a head of the TCB queue matrix.
2) Secondly in the continuous run end processing, the inexecution flag for a task being executed is turned OFF, and run of other task is allowed.
3) Thirdly in the system clock interrupt dispatch processing, a TCB queue matrix is not dispatched for a task, continuous run of which is insured.

Herein either one of the dispatching priority schemes 1) and 3) is previously selected. If the scheme 1) is selected, a time to start a task becomes more accurate, but a time of continuous run of the task becomes somewhat inaccurate. On the other hand, if the scheme 3) is selected, a time of the task's continuous run becomes accurate, but a time for starting the task becomes somewhat in accurate. For selecting either one of the schemes, it is advisable to specify a threshold value by any means. For instance, a scheme is advisable in which priority is put on continuous run so long as a delay of a time to start a task is not more than a prespecified period of time, but the priority is put on start of a task when the delay exceeds the prespecified period of time.

As described above, the control software execution system A21 for an NC unit according to Embodiment 21 is based on a system in which a function capable of providing controls for a task start cycle as well as for insurance of continuous run of a task is added to the RTOS having only a scheduling system based on dispatching priority, and executes control software for an NC unit based on this system.

With Embodiment 21 described above, the control software execution system A21 for an NC unit can provide controls for accurate starting time as well as a time for continuous run of tasks realizing functions of the NC unit. Because of this feature, waste of time allocated to each task can be reduced. Furthermore execution of a task can be controlled according to the running time, so that system construction becomes easier.

Figure 60:
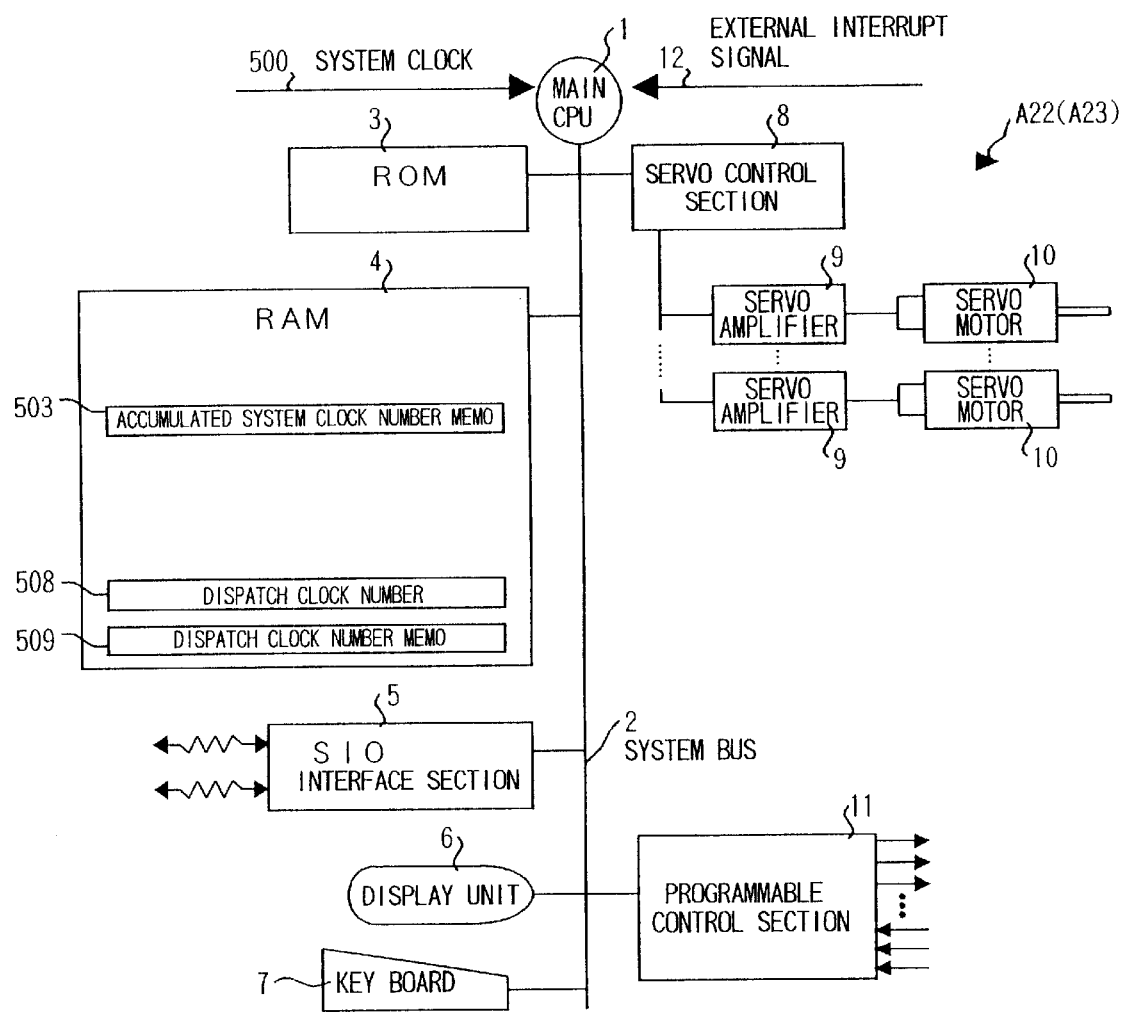
FIG. 60 is a block diagram showing general configuration of the control software execution system for an NC unit according to Embodiment 22 (23)

Next, a description is made for Embodiment 22 of the present invention. FIG. 60 shows general configuration of the control software execution system A22 for an NC unit according to Embodiment 22, and the contents is almost the same as that of Embodiment 17.

Next, a description is made for operations of the control software execution system A22 for an NC unit. The RTOS for the control software execution system A22 according to the present embodiment initializes the accumulated system clock number memo 503, for instance, when service operation of the system is started. The values in the accumulated system clock number memo 503 are incremented by 1 during system clock interrupt processing each time a system clock interrupt is generated.

Also immediately before execution of a task is started, a value of the clock number memo is read and stored. Also just after execution of the task has been finished, a value of the clock number memo is read again, and a difference between the two values above is computed. A value of the difference is a clock number for the last run of the task. A site for storing a sum of the values is prepared for each task, and a sum of a running time of each task is recorded by incrementing the sum.

Figure 61:
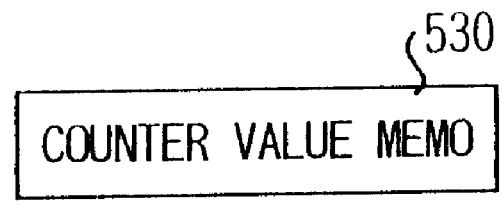
FIG. 61 is an explanatory view showing data structure required for the control software execution system for an NC unit according to Embodiment 22.

Next more detailed description is made for operations of the control software execution system A22 for an NC unit according to the present embodiment. FIG. 61 shows data structure required for recording a running time of each task. In this figure, the reference numeral 530 indicates a counter value memo, while the reference numeral 513 shows a task running time table, and as shown in this figure, there is a column for a total clock number for each task.

Figure 62:
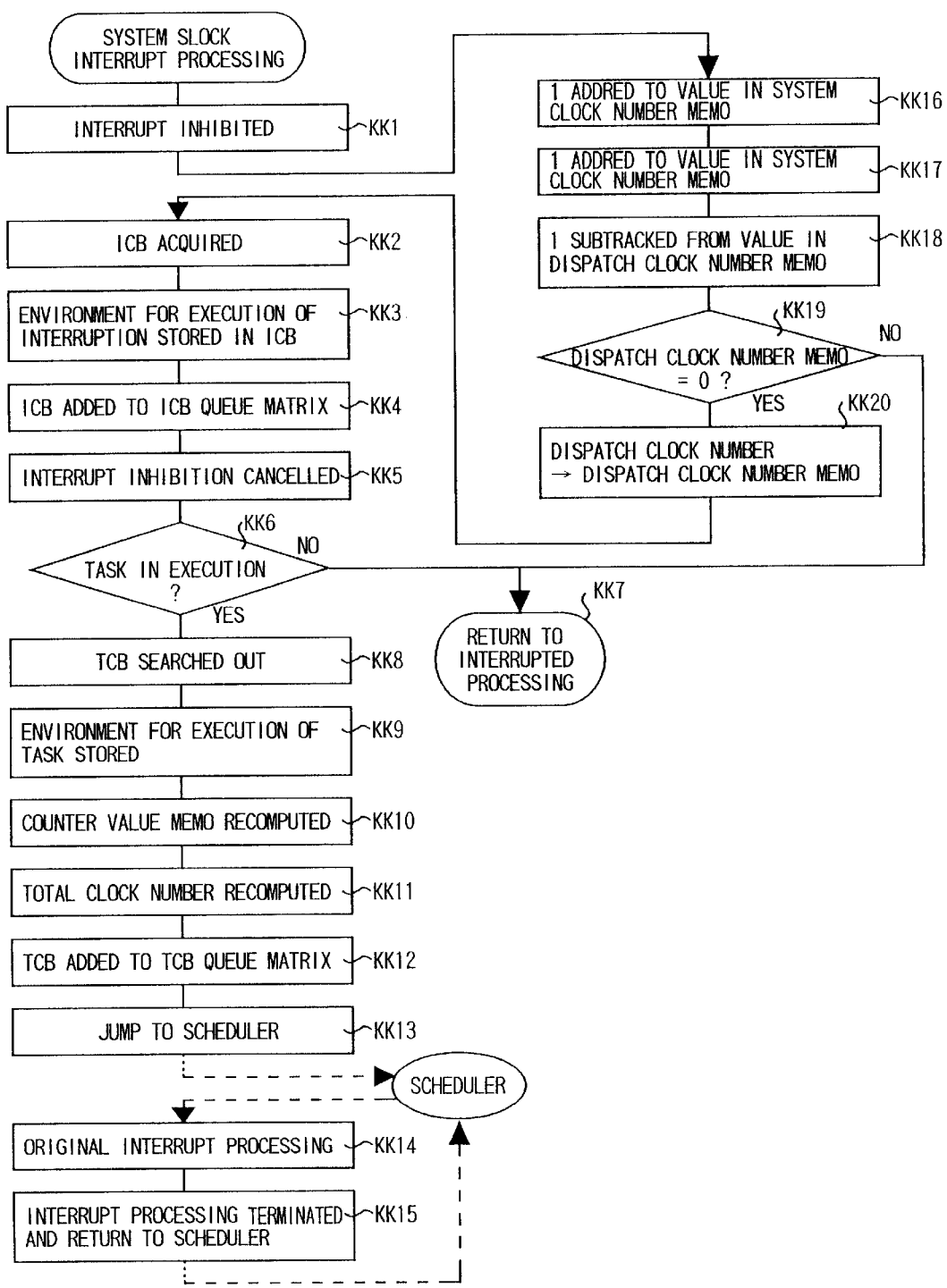
FIG. 62 is a flow chart showing a sequence for system clock interrupt processing.
Figure 63:
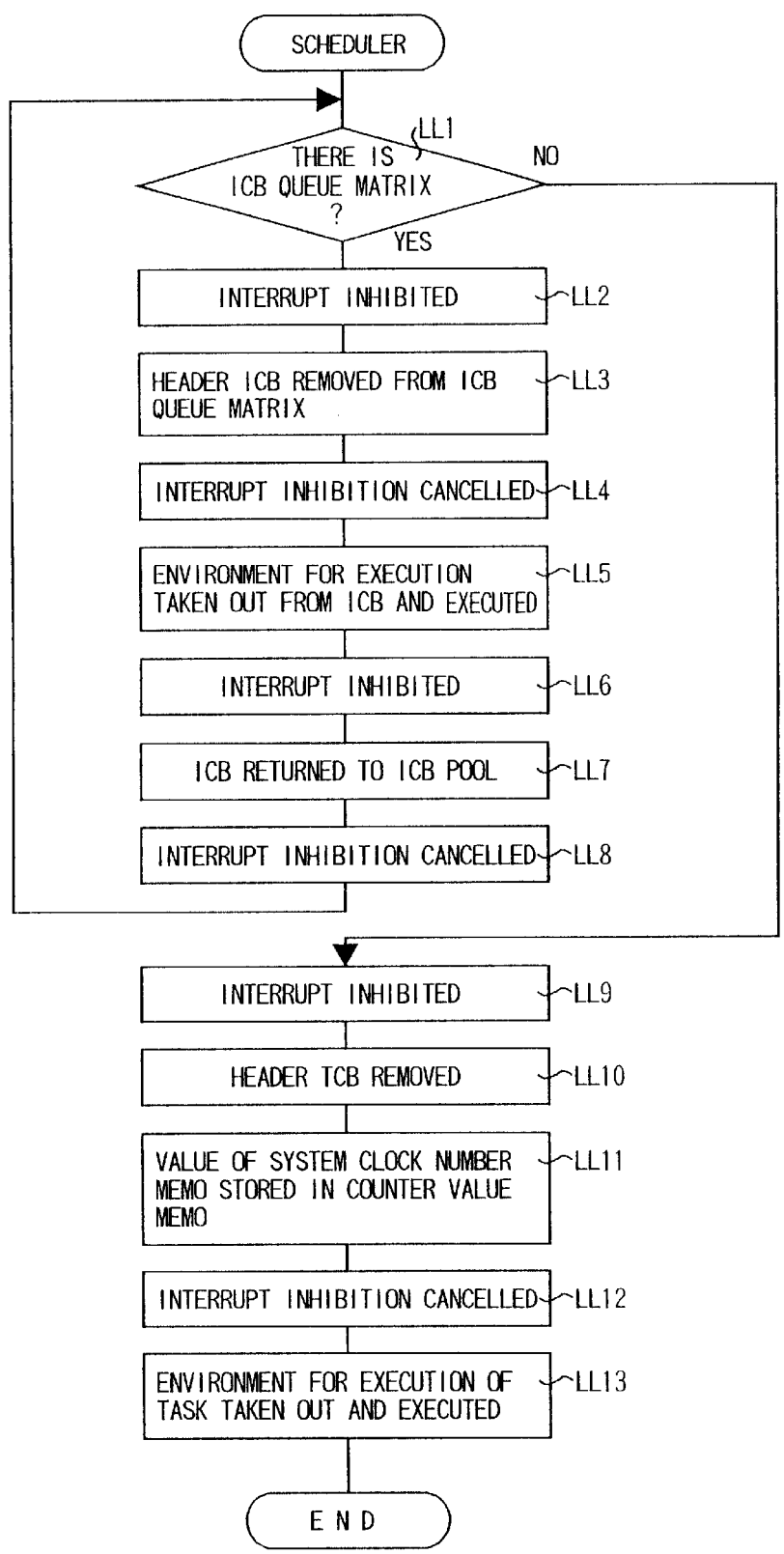
FIG. 63 is a flow chart showing a sequence for processing by a scheduler.

FIG. 62 is a flow chart showing a processing sequence in system clock interrupt processing, and FIG. 63 is a flow chart showing a sequence of processing by the scheduler.

FIG. 63 is a flow chart showing a sequence of system clock interrupt processing, and step KK1 is a processing executed at the head of interrupt processing executed when an interrupt is generated, and at first generation of other interrupt is inhibited. Generally this processing is automatically executed by the main CPU 1. Step KK16 is a processing for adding 1 to a value of the system clock number memo 501. Step KK17 is a processing for adding 1 to a value of the system clock number memo 501.

Step KK18 is a processing for subtracting 1 from a value of the dispatch clock number memo 509, and step KK19 is a processing for comparing the result to zero (0). Step KK20 is a processing executed when a value of the dispatch clock number memo 509 is zero (0), and after the dispatch clock number memo 509 is re-initialized with the dispatch clock number 508, system control goes to step KK2 for dispatch. If it is determined as a result of the comparison that the value is not zero (0) in step KK19, system control shifts to step KK7 to directly return to the interrupted processing.

In step KK2, one ICB not used yet is acquired from the ICB pool (a site for storing ICBs not used yet). In step KK3, an environment for execution of this interrupt (the task itself) is stored in the ICB. This operation also includes storage of a header address for the processing in step KK8 as an address for an command to be executed next. In step KK4, the ICB prepared in the process is added to an ICB queue matrix to be executed by the scheduler. In step KK5, interrupt inhibition effected in step KK1 is canceled. From this step and on, there is the possibility that an interrupt is generated again. The above processing is executed to make the time of interrupt inhibition as short as possible.

In step KK6, determination is made as to whether the interrupted processing is interrupt processing, an operation by the RTOS, or a task in execution. Step KK7 is a processing executed when it is determined that the interrupted processing is interrupt processing or an operation of the RTOS in execution, and in this case system control directly returns to the interrupted processing. Step KK8 is a processing executed when the interrupted processing is a task in execution, and in this case, at first a TCB for the interrupted task is searched out. In step KK9, an environment for execution of the interrupted task is stored in the TCB found in step KK8.

In step KK10, a value of the counter value memo 530 is subtracted from a value of the accumulated system clock number memo 503. A value obtained as a result of subtraction above is a clock number indicating a period in this cycle the task ran continuously. Step KK11 is a processing for adding a value obtained in step KK10 to a column for the total clock number for the task in the task running time table 531. In step KK12, the prepared TCB is added to the TCB queue matrix to be executed by the scheduler according to the dispatching priority order in.

In step KK13, system control jumps to the scheduler. Step KK14 is a processing executed when system control has returned from the scheduler. This processing is not always executed immediately after system control has jumped to the scheduler, and it may be executed after other ICB is processed, but in any way system control returns to this step. The sequence from this step and on is original and specific interrupt processing executed each time an interrupt is generated, and contents of the processing varies according to a cause for an interrupt. Step KK15 is a processing for terminating interrupt processing, and generally an command for returning to a normal subroutine is issued. With this return command, system control returns to the ICB processing block in the scheduler.

FIG. 63 is a flow chart showing operations of the scheduler under controls by the RTOS in the present embodiment. For convenience of description, it is assumed that an idle task having the lowest dispatching priority and executing nothing to external devices is always running. Namely it is assumed in the following description that the idle task is always running.

Step LL1 is a processing for checking whether there is a queue matrix for interrupt processing (ICB). Step LL2 is a processing executed when it is determined that there is a queue matrix for interrupt processing, and to execute the queue matrix, at first generation of other interrupt is inhibited. This interrupt inhibition is effected because, if an interrupt is generated during execution of a list of queues matrix for interrupt processing and it is tried to add the interrupt to the queue matrix for interrupt processing, consistency of the list is lost.

In step LL3, a header ICB is removed from the list of queues for interrupt processing. In step LL4, interrupt inhibition is canceled. In step LL5, an environment for execution of interrupt processing such as an execution address or a register stored in step KK3 (Refer to FIG. 62) is taken out from the ICB removed in step LL3, and interrupt processing is executed. This is the processing executed in step KK14 (Refer to FIG. 62).

Step LL6 is a step to which system control returns from step KK15 (Refer to FIG. 62), and an interrupt is inhibited in this step again. In step LL7, the ICB removed in step LL3 is returned to the ICB pool. In step LL8, interrupt inhibition is canceled, and then system control returns to step LL1. While there is a queue matrix for interrupt processing, the processing sequence from step LL1 to step LL7 is repeated. Step LL9 is a processing executed when there is a queue matrix for interrupt processing, and to execute the queue matrix, at first an interrupt is inhibited.

In step LL10, a header TCB is removed from the list of queues matrix for interrupt processing. In step LL11, a value of the system clock number memo 501 is stored in the counter value memo 530. In step LL12, interrupt inhibition is canceled. In step LL13, an environment for execution of a task stored in step KK9 (Refer to FIG. 62) is taken out from the TCB removed in a queue matrix (list) for task processing in step LL11, and the task is executed. In this case system control jumps to the processing, and does not return to this step again.

As described above, in this embodiment, the system according to this embodiment is run for only length of time, and then a period of time in which each task actually ran (the processing for each task was executed) can be known by checking the task running time table 531.

It should be noted that providing a column for running times in addition to a column for running time of tasks in the task running time table 531 to record also the number of times of running of each task would be useful also in deciding a running cycle, a running rate, and a running time for each task as described below.

Furthermore by providing, in addition to the counter value memo 530, a task end counter value memo, storing a value of the system clock number memo in the task end counter value memo at the head of interrupt processing, and using a value obtained by subtracting a value of the task end counter value memo from a value of the counter value memo 530 as a clock number indicating a period of time in which the task continuously ran, it is possible to obtain a real running time of the task not including a time for interrupt processing.

As described above, the control software execution system A22 for an NC unit according to Embodiment 22 is a system having an additional function to know a real running time of a task, and executes control software for an NC unit based on this system.

With Embodiment 22, the control software execution system A22 for an NC unit can easily execute such a processing as allocating a running time to each task by accurately knowing an accurate time required for execution of each task realizing a function of the NC unit, so that system construction becomes easier.

Next, a description is made for Embodiment 23 of the present invention. General configuration of control software execution system A23 for an NC unit according to Embodiment 23 is the same as that in Embodiment 22, so that description thereof is omitted herein.

Next description is made for operations of the control network execution system A23 for an NC unit according to the present embodiment. In the present embodiment, the RTOS for the control software execution system A23 (Refer to FIG. 60) initializes the system clock memo 501 at 0, for instance, when service operation of the system is started.

Also immediately before execution of the task is started, the counter value is read and stored. Immediately after execution of the task is finished, the counter value is read again, and a difference between the two counter values is obtained. The value of the difference is a clock number indicating a period of time in which the task ran last. By preparing a site for storing a sum of the values for each task, and by adding the value obtained as described above, a total of running time of each task is recorded.

Furthermore in this embodiment, a processing of ICB conventionally executed by a scheduler is executed not by a scheduler, but in a task having the highest dispatching priority.

Figure 64:
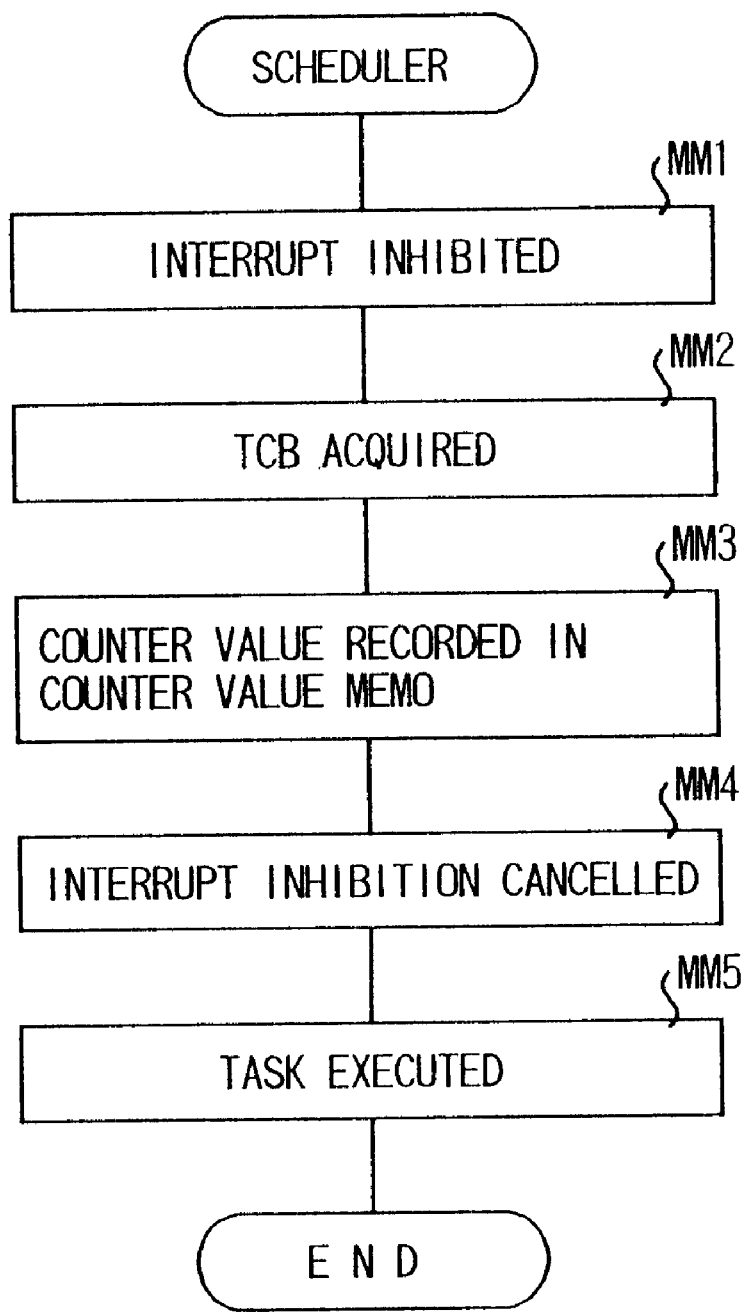
FIG. 64 is a flow chart showing a sequence for processing by a scheduler.
Figure 65:
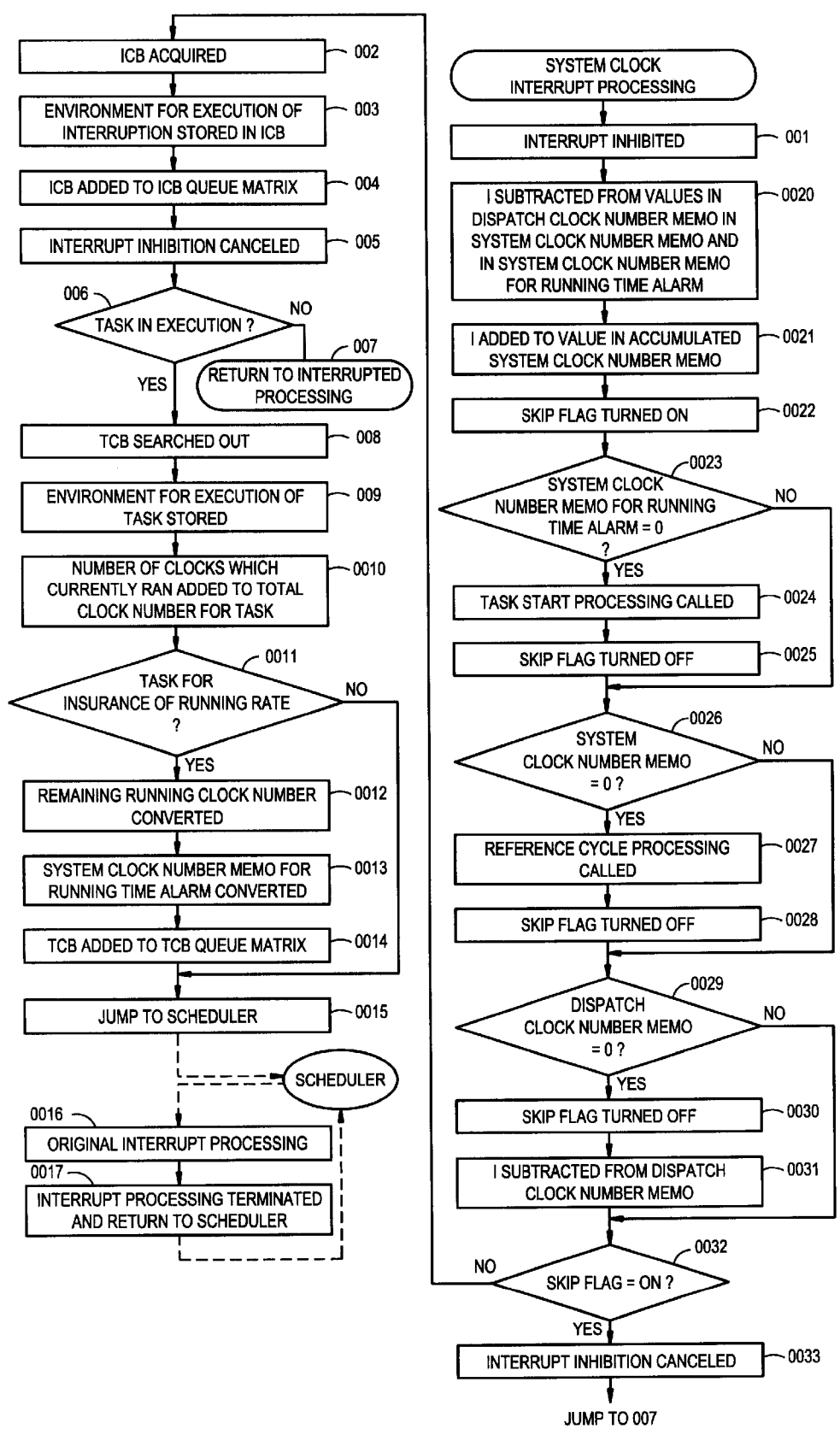
FIG. 65 is a flow chart showing a sequence for system clock interrupt processing.

Next further detailed description is made for the control software execution system for an NC unit according to the present invention. FIG. 64 is a flow chart showing a sequence of processing by a scheduler, while FIG. 65 is a flow chart showing a processing of a task for execution of interrupt processing having the highest dispatching priority for processing an ICB.

As the data structure, the same ICB (Interrupt Control Block) as that in the embodiments above is used. The interrupt processing in this embodiment is the same as that in the embodiments described above, and for this reason description thereof is omitted herein.

FIG. 64 shows operations of a scheduler in the RTOS according to the present embodiment, and it is assumed herein that an idle task is prepared and at least the idle task is always waiting for execution. Step MM1 is a processing executed when there is a queue matrix (TCB) for task processing, and at first interrupt is inhibited to execute the queue matrix. In step MM2, a header TCB is removed from the list of queues matrix for interrupt processing.

In step MM3, a value of the system clock number memo 501 is stored in the counter value memo 530. In step MM4, inhibition of interrupt is canceled. In MM5, an environment for execution of a task stored during interrupt processing is taken out from the TCB removed from the list of queues matrix for task processing in step MM3, and the task is executed. In this case system control jumps to the processing, and does not return to this step.

Operations in a task for interrupt processing in this embodiment is the same as those shown in FIG. 26. Namely Step N1 is a processing for determining whether there is a queue matrix for interrupt processing (ICB) or not. Step N2 is a processing executed when it is determined that there is a queue matrix for interrupt processing, and at first an interrupt is inhibited to execute the queue matrix. This operation is executed because, if an interrupt is generated and it is tried to add the interrupt to the queue matrix for interrupt processing during execution of a list of queues matrix for interrupt processing, consistency of the list is lost.

In step N3, a header ICB is acquired from the list of queues matrix for interrupt processing. In step N4, inhibition of interrupt is canceled. In step N5, an environment for execution of interrupt processing such as an execution address or a register stored during interrupt processing is taken out from the ICB removed in step N3, and the task is executed. In step N6, the ICB removed in step N3 is returned to the ICB pool. Then system control returns to step N1, and a sequence from step N1 to step N6 is repeated while there is a queue matrix for interrupt processing. Step N7 is a processing executed when there is not queue matrix for interrupt processing (ICB), and an SVC for terminate the task is issued and a right to use the main CPU 1 is delivered to other task.

As described above, in the present embodiment, after a task is run for a required period of time, by checking the task running table 531, it is possible to know a time which each task actually ran (the processing was executed).

Furthermore by executing interrupt processing at a level of tasks, a time required for running a task for interrupt processing can be regarded as a time for interrupt processing, and for this reason a time actually required for interrupt processing can be measured. Also by making it possible to record a running time for each cause for interrupt within a task for execution of interrupt processing, it is possible to measure a processing time for each cause for interrupt.

As described above, the control software execution system A23 for an NC unit according to Embodiment 23 is based on a system in which a function to know a time required to execution of a task as well as a time required for interrupt processing is added thereto, so that control software for an NC unit can be executed according to the system.

With Embodiment 23 described above, in the control software execution system for an NC unit, such operations as allocating a running time to each task can easily be executed by accurately checking a time required for execution of each task realizing functions of the NC unit as well as a time required for interrupt processing, so that system construction can easily be made.

Next, a description is made for Embodiment 24 of the present invention. The general configuration of an control software execution system A24 for an NC unit according to Embodiment 24 is the same as that in Embodiment 18, so that description thereof is omitted herein.

Next, a description is made for operations of the control software execution system A24 for an NC unit according to this embodiment. In the NC unit having a means for measuring a running time for a task as well as interrupt processing and furthermore having some means for changing a running time for a task, general configuration of the control software execution system for an NC unit to realize functions of the NC unit varies according to a way of specification of a running time or a running rate for a task, but description of this embodiment assumes a case where a running rate for a task can be specified for convenience of description.

A processing for insuring a running rate for a task is substantially the same as that in Embodiment 18 (Refer to FIG. 50 to FIG. 51), and required data structure is the same as that therein and has a task start system clock memo 510 (refer to FIG. 49), an area for storing a reference cycle 511 (Refer to FIG. 49), and a task running state memo 512 (Refer to FIG. 49). The task running state memo 512 has columns for "a remaining running clock number", "times of repetition", and "a running inhibited flag".

Furthermore in order to measure a running time for a task, the task running state memo has a task running time table 531 (Refer to FIG. 61) like that in Embodiment 22. Also the task running time table 531 (Refer to FIG. 61) has a column for a total clock number for each task. It should be noted that a counter value memo 530 (Refer to FIG. 61) is not used because it plays the same role as the task running state memo 512 (Refer to FIG. 49).

Also a sequence of a processing for a reference time and a sequence of a processing for running time alarm are the same as those in Embodiment 18 (Refer to FIG. 50 and FIG. 51), so that description thereof is omitted herein.

FIG. 65 is a view for explanation of a sequence of system clock interrupt processing. In the description hereinafter, as for a system clock number memo 501 as well as a system clock number memo 505 for running time alarm, valid flags are provided therein respectively like the system clock interrupt processing in Embodiment 18 (Refer to FIG. 47), and processing to the system clock number memo 501 and to the system clock number memo 505 for running time alarm may be executed only in a case where the valid flag is "valid"but because the description becomes complicated, description of the processing is omitted in the flow chart for the description of the present embodiment.

Step OO1 is a header step of interrupt processing when an interrupt is generated, and at first generation of other interrupt i s inhibited. Generally this processing is automatically be executed by the CPU. Step OO20 is a processing for decrementing a value by 1 each from a dispatch clock memo 509, the system clock number memo 501, and the system clock number memo 505 for running time alarm respectively, and step OO21 is a processing for incrementing a value by 1 to in ac cumulated system clock number memo 503.

Step OO22 is a processing for turning ON a skip flag. Herein a skip flag is defined as a flag provided on a RAM 4 and used for indicating whether a processing such as scheduling is executed upon this system clock interrupt. Step OO23 is a processing for determining whether the system clock number memo for running time alarm has been decremented to 0 or not, and in a case where it has been decremented to 0, system control shifts to a processing to call the task start processing in step OO24 (Refer to FIG. 46). Then the skip flag is turned OFF in step OO25. In a case where it is determined in step OO23 that a value of the system clock number memo 505 for running time alarm has not been decremented to 0, system control shifts to a processing in step OO26.

Step OO26 is a processing for determining whether the system clock number memo 501 has been decremented to 0 or not, and as a result, if the value is 0, system control calls a processing of a reference cycle (Refer to FIG. 12) in step OO27, and the skip flag is turned OFF in step OO28.

In a case where as a result of determination in step OO26 it is determined that the value is 0, determination is made as to whether a value of the dispatch clock number memo 509 is 0 or not in step OO29. If a value is 0 as a result thereof, the dispatch clock number memo 509 is re-initialized by turning OFF the skip flag in step OO30 and by putting a value of the dispatch clock number 508 into the dispatch clock number memo 509.

Step OO32 is a processing for determining whether the skip flag is ON or OFF, and if the skip flag is ON, system control cancels inhibition of interrupt in step OO33, then jumps to step OO7 to directly return to the interrupted processing. If the skip flag is OFF, system control jumps to step OO2, and executes an ordinary dispatch processing.

In step OO2, one ICB not used yet is acquired from the ICB pool (a site where ICBs not used yet are stored). In step OO3, an environment for execution of this interrupt processing (of itself) is stored in ICB. This processing includes a storage of a header address of the processing in step OO8 in the ICB as an address for an command to be executed next time.

Step OO4 is a processing for adding the ICB prepared herein to the ICB queue matrix executed by the scheduler. In step OO5 inhibition of interrupt in step OO1 is canceled. After this step on, there is the possibility that an interrupt is generated again. The processing described above is for making the interrupt inhibited time as short as possible. In step OO6, determination is made as to whether the interrupted processing is interrupt processing or an operation by the RTOS, or a task in execution.

Step OO7 is a processing executed when the interrupted processing is an interrupt processing or an operation by the RTOS, and in this case system control directly returns to the interrupted processing. Step OO8 is a processing executed when the interrupted processing is a task in execution, and in this case at first, a TCB for the interrupted task is searched out, and an environment for execution of the interrupted task is stored in the TCB in step OO9.

In step OO10, a value stored in the reference cycle 511 is subtracted from the value of accumulated system clock number memo 503. A result of this processing indicates a period of time equivalent to the clock number the task continuously ran this time. The clock number is added to the column for a total clock number of the task in the task running time table 531.

Step OO11 is a processing for determining whether the task in execution is a task as an object for insurance of a rate of running or not. More particularly, determination is made as to whether the task is a task having one or more columns for a remaining running clock number in the task running state memo 512 or not. Step OO12 is a processing executed in a case where it is determined that the task is the object as described above, and in the processing a value obtained in step OO10 is subtracted from the column for remaining running clock number for the task in the task running state memo 512.

In step OO13, the value obtained in step OO10 is added to the running time alarm system clock number memo 505 for alarm of running time. In proportion to a period of time in which a task insured for its running cycle ran, a running time for tasks not insured for a running cycle is increased.

In step OO14, the prepared TCB is added to the TCB queue matrix executed by the scheduler according to the dispatching priority. It should be noted that, in this time, if the running inhibited flag for even one task is ON in the column of the task running state memo 512 (Refer to FIG. 49), TCBs for tasks for which the running inhibited flag is OFF should be set before the TCBs for tasks for which the running inhibited flag is ON in the TCB queue matrix.

In step OO15, system control jumps to the scheduler. Step OO16 is a processing after system control returns from the scheduler. This processing is not always executed right after system control has jumped to the scheduler, in some cases the processing might be executed after other ICB has been executed, but in any case system control will return to this step. From this step on the processing is an original interrupt processing specifically executed to each interrupt, and contents of the processing varies according to a cause of interrupt. Step OO17 is a step for terminating interrupt processing, and generally an command for return to an ordinary subroutine is issued, and according to this return command, system control returns to the ICB processing section by the scheduler.

Figure 66:
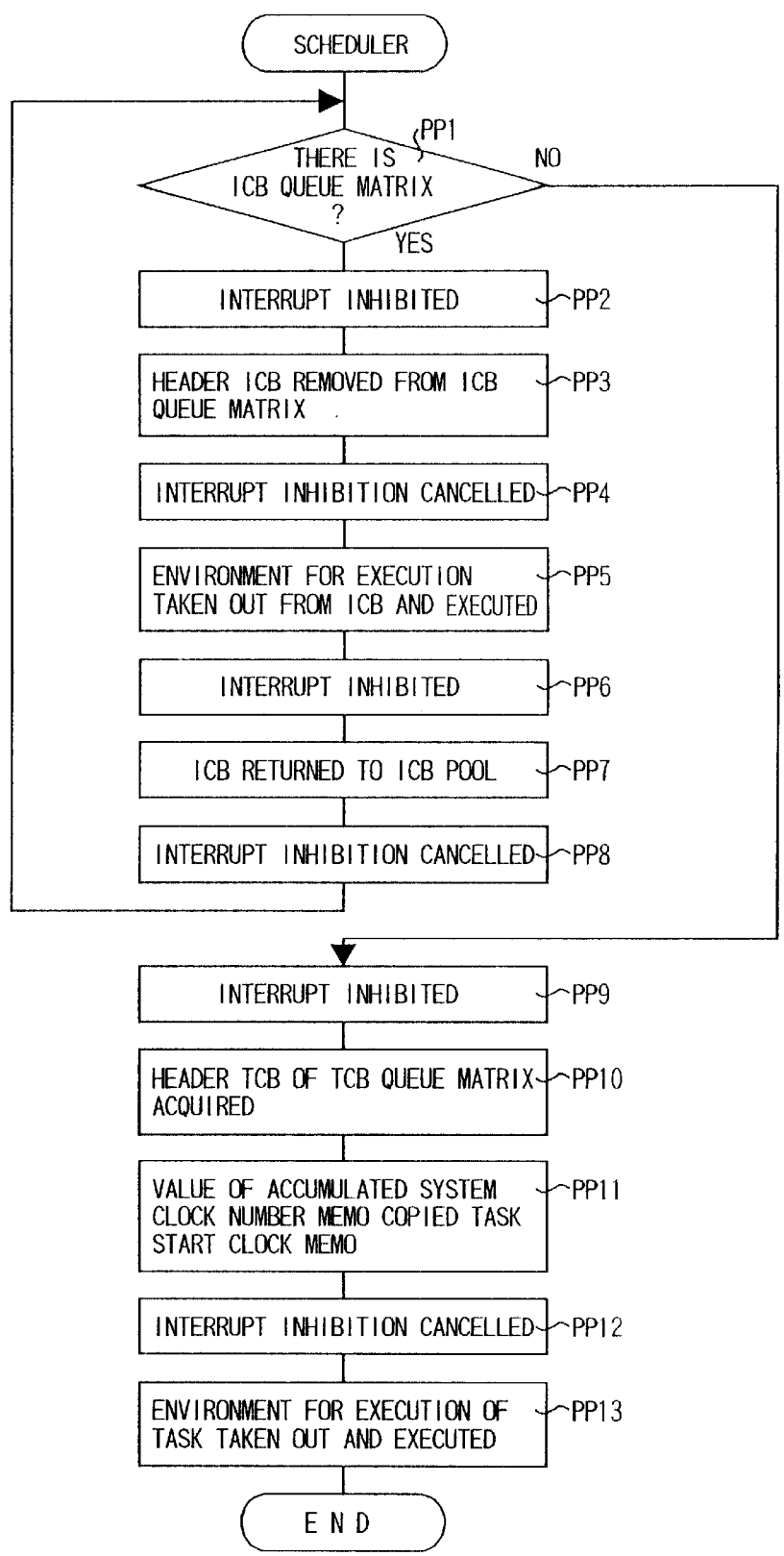
FIG. 66 is a flow chart showing a sequence for processing by a scheduler.

FIG. 66 is a flow chart showing operations of the scheduler. It is assumed that an idle task having the lowest dispatching priority and executing nothing to the external devices is always running in this embodiment.

In FIG. 66, step PP1 is a processing for checking whether there is a queue matrix for interrupt processing (ICB) or not, and step PP2 is a processing executed when there is a queue for matrix interrupt processing and in the processing at first an interrupt is inhibited to execute the queue matrix. This is because, if an interrupt is generated and it is tried to be added to the queue matrix for interrupt processing during processing the list of queue for interrupt processing, consistency of the list is lost.

Step PP3 is a processing for removing a header ICB for the list of queue matrix for interrupt processing. In step PP4, inhibition of interrupt is canceled. In step PP5, an environment for execution of interrupt processing such as execution addresses and the register stored in step OO3 (Refer to FIG. 65) is taken out from the ICB removed in step PP3 and executed.

Step PP6 is a step to which system control returns from step OO17 (Refer to FIG. 65), and in the processing an interrupt is inhibited again. Step PP7 is a processing for returning the ICB removed in step PP3 to the ICB pool. In step PP8, system control cancels inhibition of interrupt, and then returns to step PP1. Then processing from step PP1 to step PP7 is repeated as long as there is left an interrupt processing queue matrix.

In step PP9, an interrupt is inhibited to execute a queue matrix for the task processing. In step PP10, a header TCB is acquired from the list of the queue matrix for interrupt processing. In step PP11, a value of the accumulated system clock memo 503 for measuring a task running time is stored in the task start system clock memo 510.

In step PP12, interrupt inhibition is canceled. In step PP13, an environment for execution for a task stored in step OO9 (Refer to FIG. 65) is taken out from the TCB acquired from the head of the queue matrix for the task processing in step PP10 and executed. This time system control jumps to the processing, and will never return to this step.

As described above, the control software execution system A24 for an NC unit according to Embodiment 24 is based on a system in which functions capable of setting a running rate for a task as well as of knowing an actual running time for interrupt processing for a task are added, and executes control software for an NC unit based on this system.

With Embodiment 24, the control software execution system A24 for an NC unit can easily allocate a running time to each task by knowing an accurate execution time for tasks realizing functions of the NC unit and for interrupt processing, and because of this feature system construction becomes easier.

Next, a description is made for Embodiment 25 of the present invention. General configuration of the control software execution system A25 according to Embodiment 24 is substantially the same as that in Embodiment 18 (Refer to FIG. 48), and description thereof is omitted herein.

Next, a description is made for the control software execution system A25 for an NC unit. A processing sequence in an operating mode selection block in the NC unit is the same as that shown in FIG. 29. Namely, step Q1 is a processing for determining whether an operating mode of the NC unit is in the graphic check mode or not. Step Q2 is a processing executed in a case where it is determined that the operating mode of the NC unit is in the graphic checking mode, and in this case allocation of graphic display tasks is increased, and allocation of other tasks, for instance, tasks processed in the automatic mode is proportionately reduced.

Step Q3 is a processing executed when it is determined that the operating mode of the NC unit is not in the graphics check mode, and in this step determination is made as to whether the NC unit is in the automatic mode or not. Step Q4 is a processing executed when it is determined that the NC unit is in the automatic mode, and in this processing allocation of tasks processed in the automatic mode is increased, and allocation of other processing tasks is reduced. Step Q5 is a processing for checking whether the operating mode is a manual mode or not. Step Q6 is a processing executed when the operating mode is a manual mode, and in this case allocation of tasks processing in the manual mode is increased, and allocation of other tasks is reduced. The processing sequence from this step and on is executed in other operation mode, but description thereof is omitted herein.

As described above, the control software execution system A25 for an NC unit according to Embodiment 25 executes control software for an NC unit by changing a running rate of a task according to an operating mode of the NC unit.

With Embodiment 25, the control software execution system A25 for an NC unit according to Embodiment 25 can run a task for an appropriate period of time suited to each task for each operating mode by changing a running rate of a task according to an operating mode of the NC unit, so that a speed in execution of functions of the NC unit can be improved.

Next, a description is made for Embodiment 26 of the present invention. The control software execution system A26 for an NC unit according to Embodiment 26 optimizes, when running the same machining program a plurality of times, allocation of a running time for each task in machining second times and on according to a running state of each task in the first machining process.

General configuration of the control software execution system A26 for an NC unit according to Embodiment 26 is substantially the same as that in Embodiment 18 described above (Refer to FIG. 48), and description thereof is omitted herein, but for convenience of description, it is assumed in the following description that in the present invention there are provided a means for specifying a running rate of each task and a means for recording an actual running state of each task like, for instance, in Embodiment 24.

The data structure used in this embodiment includes, like in a case of Embodiment 24, a task start system clock memo 510 (Refer to FIG. 49), an area for storing therein a reference cycle 511 (Refer to FIG. 49), a task running state memo 512 (Refer to FIG. 49), and a task running time table 531 (Refer to FIG. 61). The task running state memo 512 (Refer to FIG. 49) includes columns for "remaining running clock number", "number of times of repetition", and "running inhibited flag", while the task running time table 531 (Refer to FIG. 61) includes a column for a "total clock number" for each task.

A sequence for reference time interrupt processing and that for running time alarm interrupt processing are the same as those in Embodiment 18 (Refer to FIG. 50 and FIG. 51), and also a sequence of the system clock interrupt processing is the same as that in Embodiment 24 (Refer to FIG. 66), so that description thereof is omitted herein.

A sequence for optimizing allocation of a running time for each task for shortening a time consumed for processing in a plurality of machining cycles is the same as that shown in the flow chart in FIG. 30. Namely the step R1 is a processing for checking whether the current processing cycle is the first one of the same machining process or the second or subsequent one. Step R2 is a processing executed when it is determined that the current processing is the first machining cycle, and in this step a total running time (clock number) for each task is measured and recorded. In step R3, a total of a running time of necessary tasks other than unnecessary ones such as an idle task in the task run is computed.

In step R4, a running rate of a necessary task is computed depending on the total computed in step R3. A running rate of a task not required to be run is set to zero (0). In step R5, the rate computed in step R4 is registered in the column for running rate in the task running state memo 512 (Refer to FIG. 49).

Step R6 is a processing executed when the current processing is the one in the second or subsequent machining cycle, and each task is run according to the running rate for each task registered in the task running state memo 512 (Refer to FIG. 49) in step R5.

As described above, the control software execution system A26 for an NC unit according to Embodiment 26 has a function to automatically set an optimal running rate for each task after execution of the first machining cycle and executes control software for an NC unit.

With Embodiment 26, the control software execution system A26 for an NC unit can shorten a time required for machining in a repeated machining process by automatically optimizing allocation of a running time for each task realizing a function of the NC unit.

Then, a description is made for Embodiment 27. In the control software execution system A27 for an NC unit according to Embodiment 27, if data for each task now being run under the control by the control software execution system for an NC unit is displaced from a reference running rate or a total running time for each task previously registered by a percentage larger than a prespecified one, the state is regarded as a task fault.

General configuration of the control software execution system A27 for an NC unit according to Embodiment 27 is the same as that in Embodiment 24 (Refer to FIG. 48), and description thereof is omitted herein. Also a sequence for measuring data for each task actually being run in the control software execution system for an NC unit is the same as that in other embodiments described above, so that description thereof is omitted herein.

Data structure required for determining whether each task is running normally or not is shown in FIG. 67.

The reference numeral 550 indicates "task running standard data", which has columns for "a running rate" and "a total running clock number" or the like for each task. These data may be prepared previously when the system has been generated, or may be set at any given time before the data is used by some SVC.

In the figure, the reference numeral 551 indicates "a running time determination allowance" for storing therein data for a degree of allowance according to which execution of the task is not regarded as a task error when the deviation is less than a prespecified rate even if there is deviation in the task running time, and the reference numeral 552 indicates "a running rate determination allowance" for storing therein data for a degree of allowance according to which execution of the task is not regarded as a task error when the deviation is within a prespecified range even if there is deviation in task running rate. This running rate determination allowance has a column for lower limit and a column for upper limit, and the execution of task is not regarded as a task error as long as deviation thereof is within the range.

Comparison between the task running time table 531 (Refer to FIG. 61) and task running standard data 550 (Refer to FIG. 67) to determine whether each task is running normally or not may be executed by a scheduler, for instance, when task switching is executed, or the determination may be made by preparing a task error determinating task, which periodically runs, and executing the task. It is assumed in the following description that determination as to whether a task is normally running or not is executed with a task fault determination task. In addition, the running table determination allowance 551 may be prepared for a total running time and for a running rate respectively, but herein it is assumed for convenience in description that the same value is used.

Figure 68:
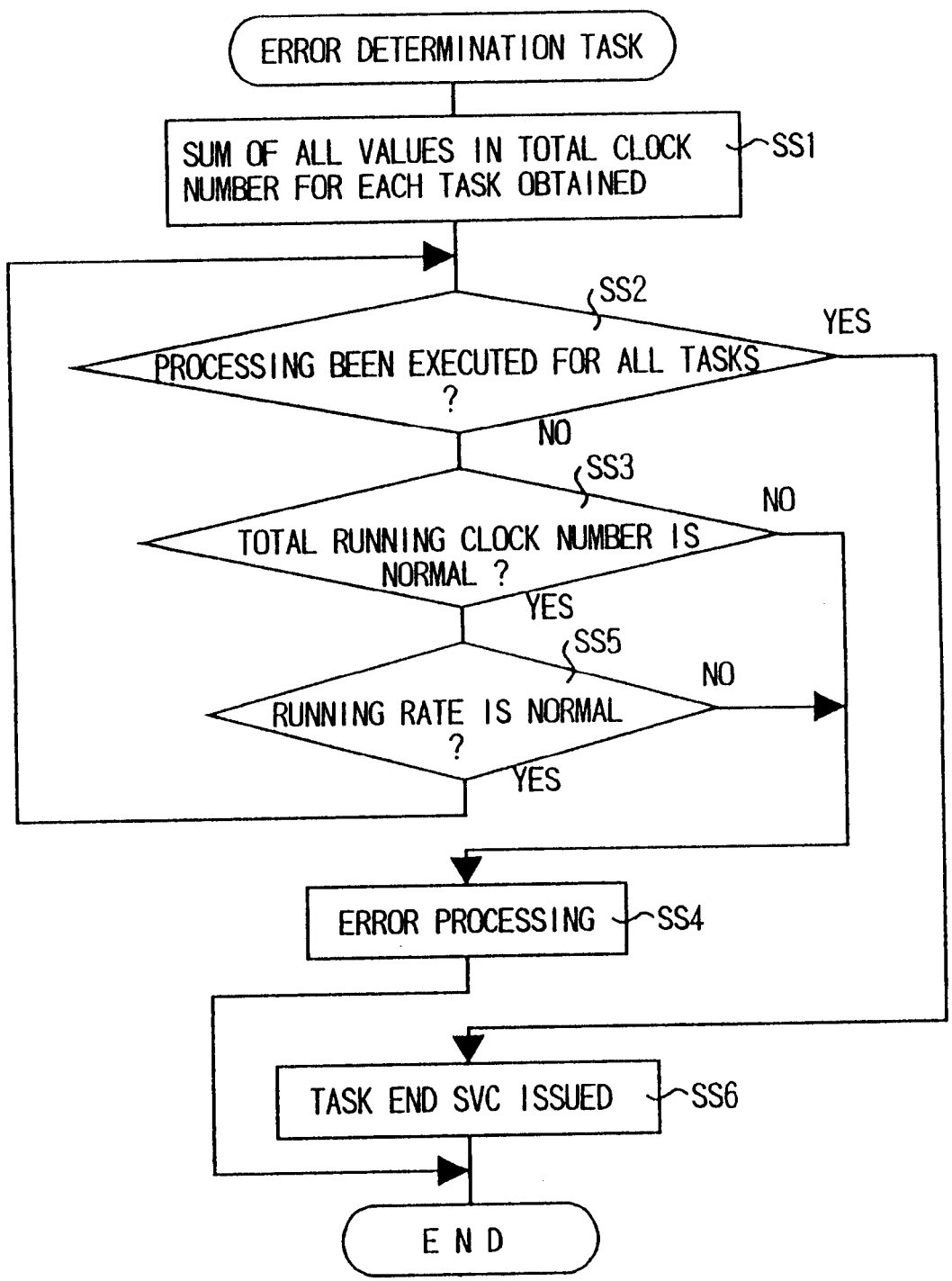
FIG. 68 is a flow chart showing a processing sequence for an error determining task.

FIG. 68 is a flow chart showing operations in the error determinating task. Step SS1 is a header step of the error determinating task, and a processing for obtaining a sum of all values in the volume for total clock number for each task. Step SS2 is a processing for determining for all tasks whether a processing from step SS3 to step SS5 has been executed or not, and when this processing has been finished for all tasks, system control shifts to step SS6.

Step SS3 is a processing for comparison between the total clock number for the task in the task running table 531 (Refer to FIG. 61) and all running clock number in the task running standard data 550. If a value of the total clock number for the task in the task running time table 531 (Refer to FIG. 61) is equal to or smaller than a value obtained by multiplying a value of the all running clock number in the task running standard data 550 by a value of the running time determination allowance 551, it is regarded that this task is being executed normally.

Step SS4 is a processing executed when it is determined in step SS3 that a task error has been generated, and in this step, such an error processing as sending a message to tell that a task error has been generated to an operator is executed.

Step SS5 is a processing for checking a running rate of a task. A running rate of the task is obtained by summing up values of total clock numbers for all tasks in the task running table 531 (Refer to FIG. 61) and dividing the total clocks for the task by this number obtained as described above. If the value is between a upper limit and a lower limit of the running rate determination allowance in the task running standard data 550, it is regarded that the task is being executed normally. If it is determined in this step that any task error has been generated, system control shifts to step SS4. Step SS6 is a processing executed when determination for all tasks has been finished and no error has been found out, and in this step an SVC for terminating the task is issued, and nothing is executed until called next time.

As described above, the control software execution system A27 for an NC unit according to Embodiment 27 has a function to detect a error generated in a task realizing a function of the NC unit.

With Embodiment 27, the control software execution system A27 for an NC unit has a function to detect a error generated in a task realizing a function of an NC unit, and when any fault has been generated in an NC unit, the control software execution system A27 can immediately detect the error.

Next, a description is made for Embodiment 28 of the present invention. General configuration of the control software execution system A28 for an NC unit according to Embodiment 28 is the same as that in Embodiment 18 (Refer to 48), and description thereof is omitted herein.

It should be noted that, in this embodiment, as data on the RAM 4, an accumulated system clock memo 503 for measurement of a task running time, a system clock number memo 501 for stopping execution of a task, a dispatch clock number 508, and a dispatch clock number memo 509 are used.

FIG. 69 shows data structure required in this embodiment, and in this figure the reference numeral 600 indicates a "task stop table". A clock number for each task from start until stop of the task is registered, when execution of this task is started, by an SVC in the column for a "stop clock number" in this task stop table 600. For a task not to be specified, this value is set to zero (0).

In this figure, the reference numeral 510 (Refer to FIG. 49) indicates a "task start system clock memo". Immediately before the RTOS starts execution of a task, a value of the accumulated system clock number memo 503 (Refer to FIG. 48) is recorded, and a task running time is obtained by obtaining a difference between a value of the accumulated system clock number memo 503 at the time when execution of the task has been finished and system control returns to the RTOS and the registered value described above. The reference numeral 611 indicates a "task stop clock memo". When this task stop processing can not be executed immediately, this memo is turned ON and then the processing is executed later.

Each time execution of a task is executed, the control software execution system A28 for an NC unit according to the present embodiment sets a value of the stop clock number in the task stop table 600 in the system clock number memo 501, if specified. The RTOS decrements a value of the system clock number memo 501 each time system clock interrupt is generated, and when the value is reduced to zero (0), a task stop processing is called, and execution of the task is forcefully stopped.

If the CPU is occupied by other task before the task stop processing is called, a running clock for the task is obtained from the accumulated system clock memo 503 (Refer to FIG. 48) as well as from the task stop clock memo 611, and the value is subtracted from the stop clock number in the task stop table 600. Thus a maximum running clock number for a specified task can be limited.

Figure 70:
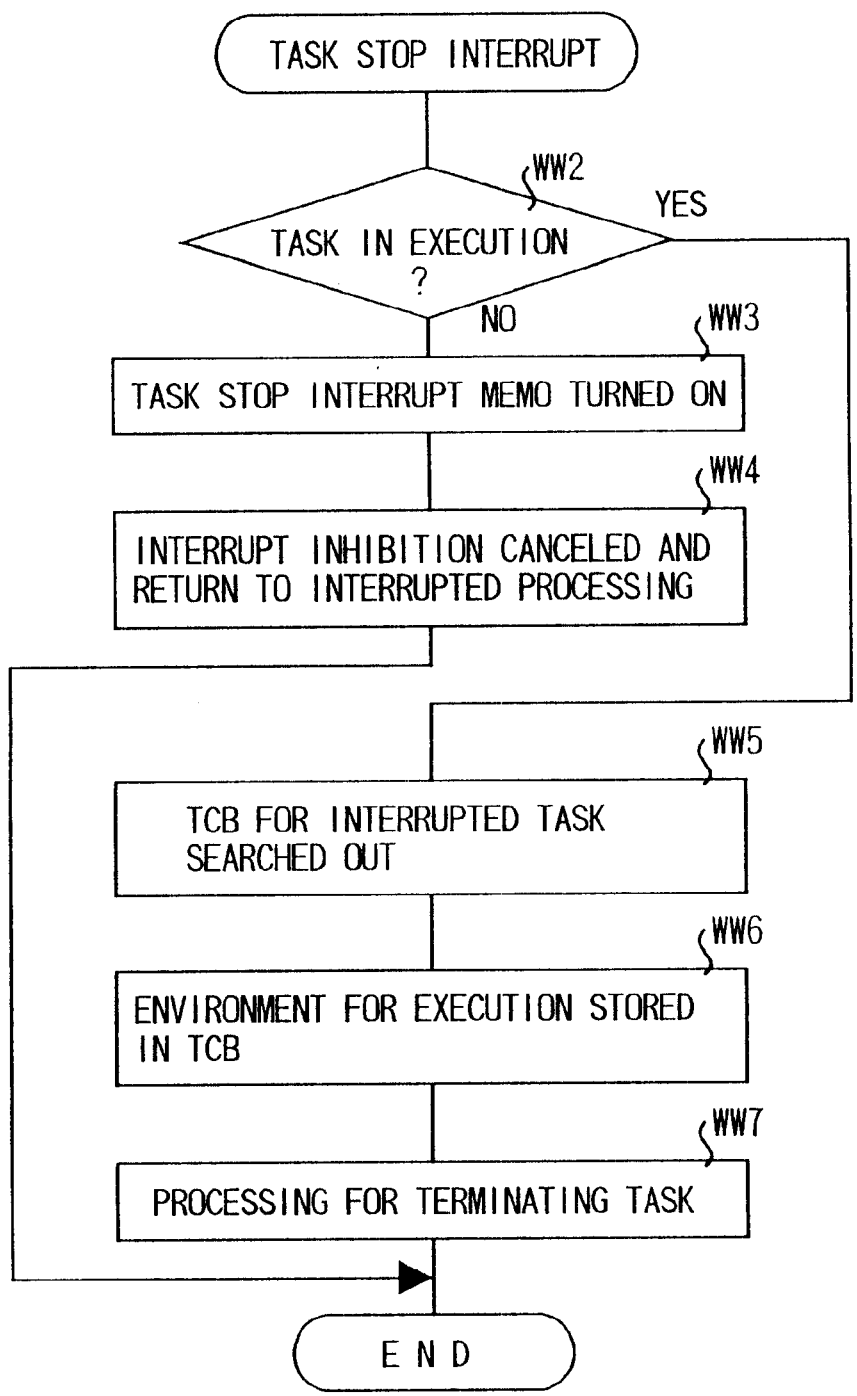
FIG. 70 is a flow chart showing a processing sequence for a task stop process.

Then description is made for operations of the control software execution system A28 for an NC unit. At first description is made for the task stop processing. FIG. 70 is a flow chart showing a sequence of the task stopping processing.

Step WW2 is a processing for determinating where the interrupted processing is a task in execution or not. Step WW3 is a processing executed when the interrupted processing is not a task in execution, and in this case the task stop clock memo 611 is turned ON. In step WW4, interrupt inhibition is canceled, and system control returns to the interrupted processing. Step WW5 is a processing executed when an interrupt is generated during execution of a task, and at first a TCB for the interrupted task is searched out.

In step WW6, an environment for execution of the interrupted task is stored in the TCB found out in step WW4. In step WW7, a processing for terminating execution of the task like that executed by the task stop SVC is executed. For instance, operation of the column for a status for the TCB is stopped, and a queue matrix for TCB is switched to a queue matrix for the stopped execution.

Figure 71:
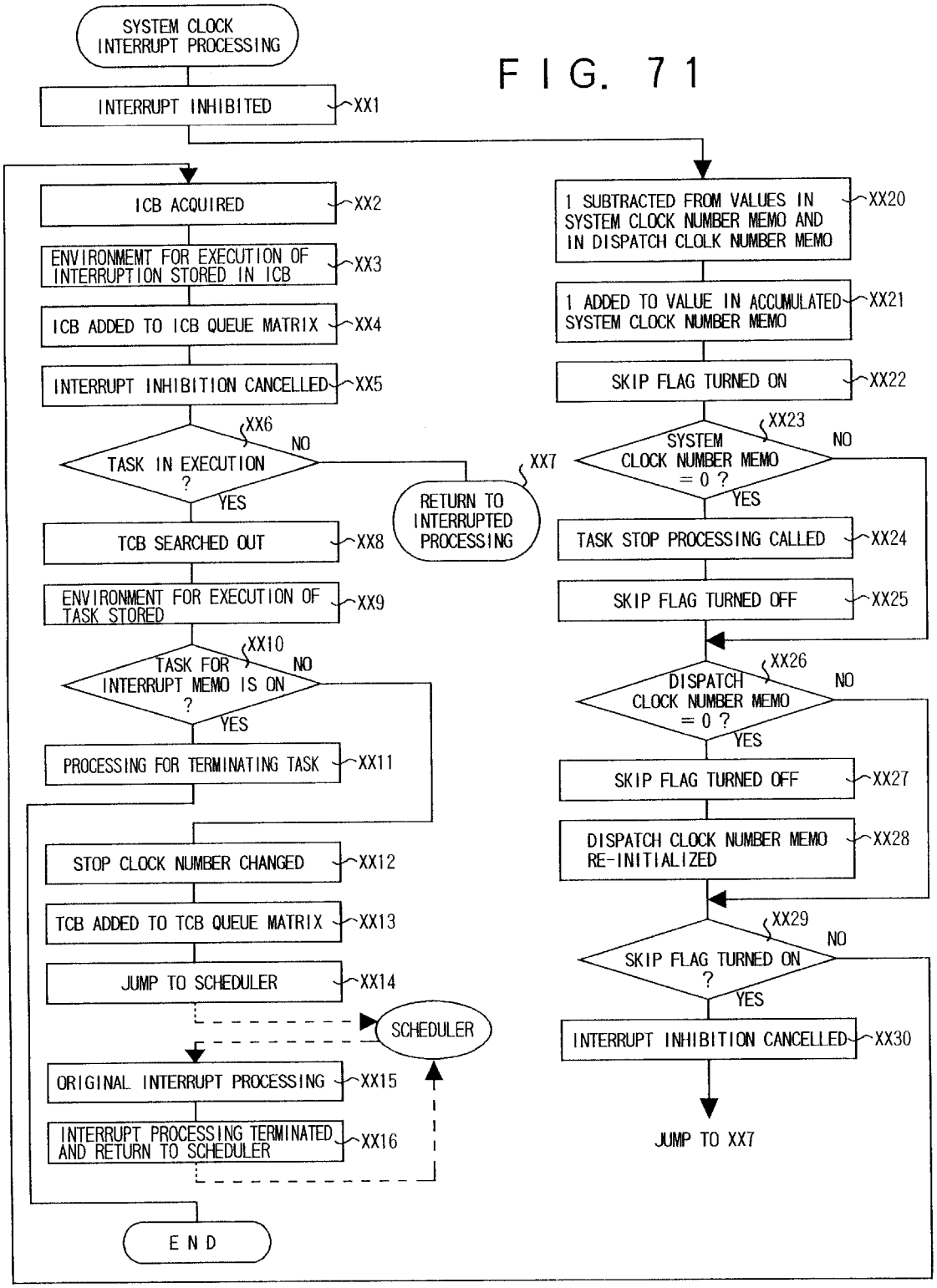
FIG. 71 is a flow chart showing a sequence for system clock interrupt processing.
Figure 72:
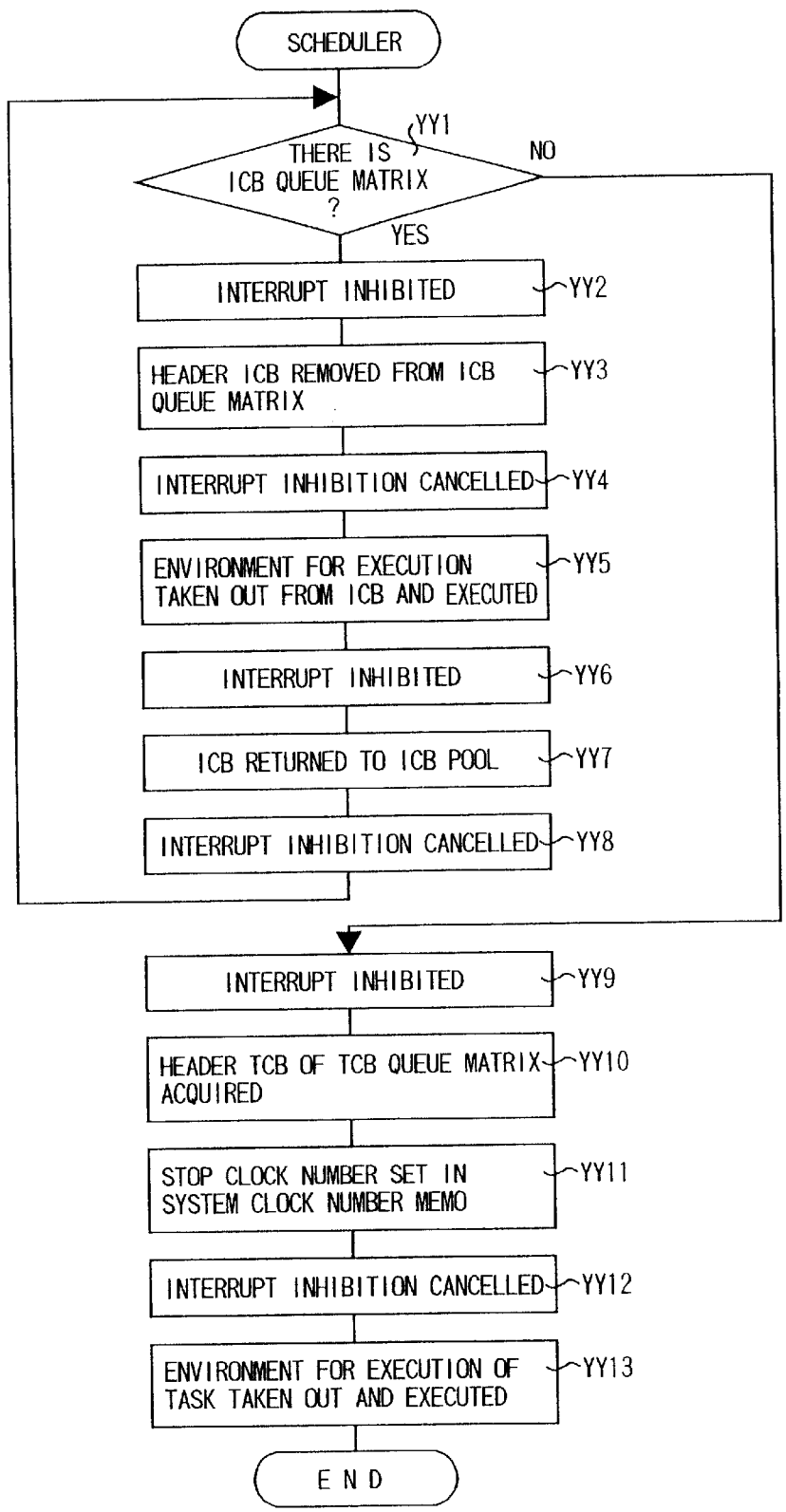
FIG. 72 is a flow chart showing a sequence for processing by a scheduler.
Figure 73:
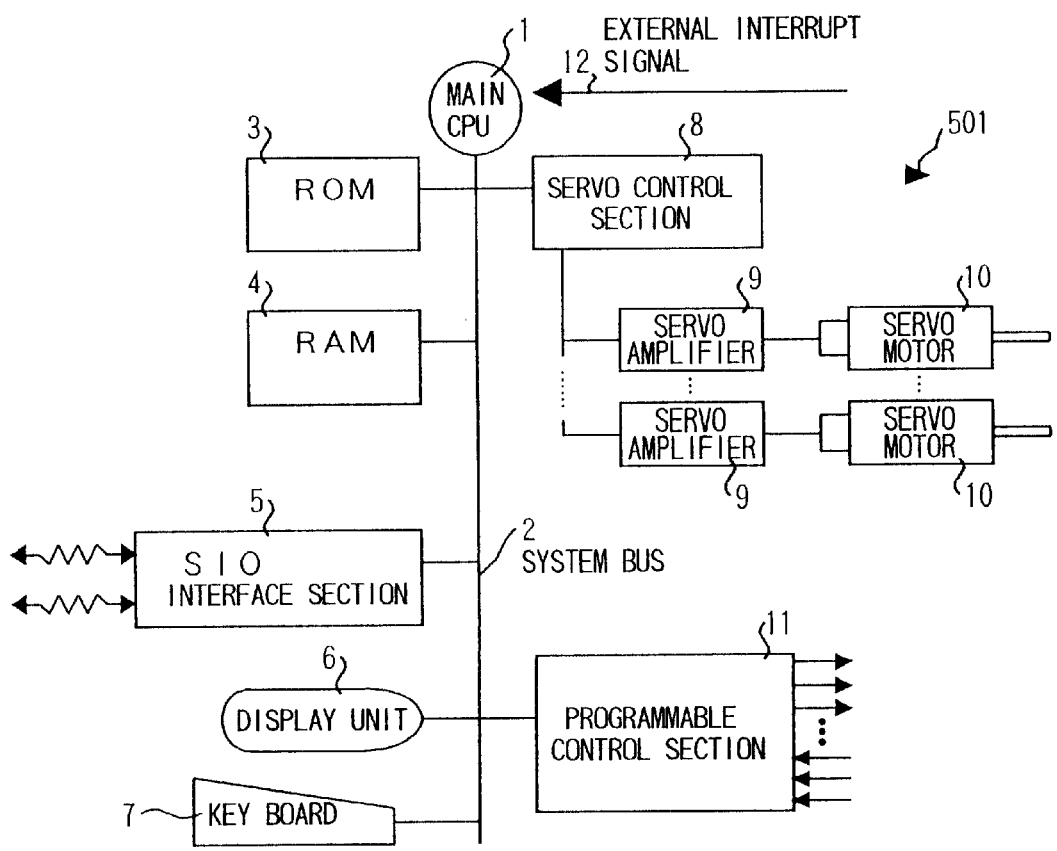
FIG. 73 is a block diagram showing general configuration of a control software execution system for an NC unit based on conventional technology.
Figure 74:
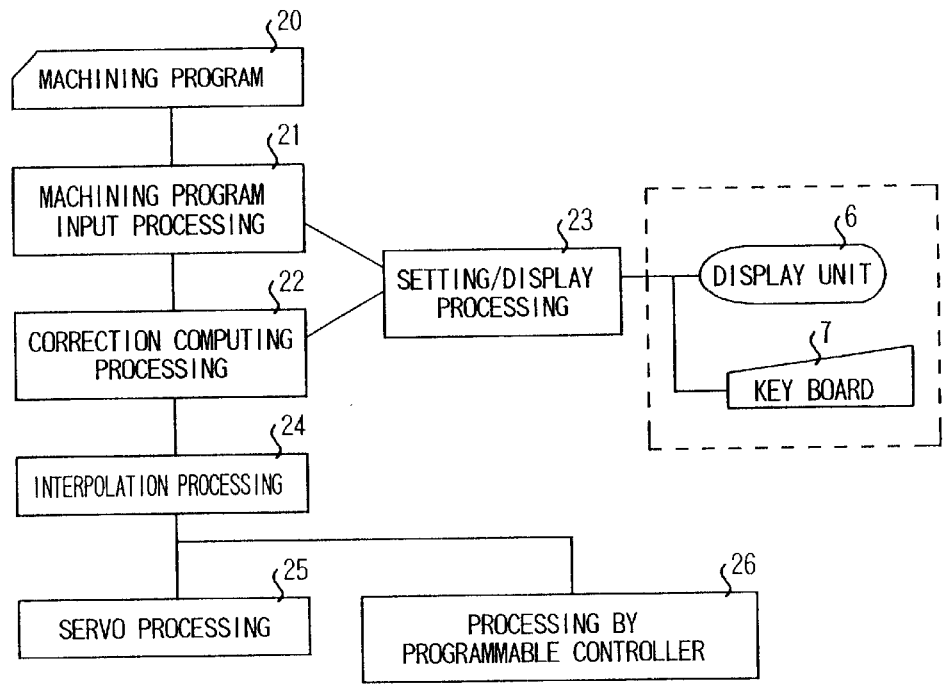
FIG. 74 is an explanatory view showing an analysis executing sequence for a machining program for the control software execution system for NC unit.
Figure 75:
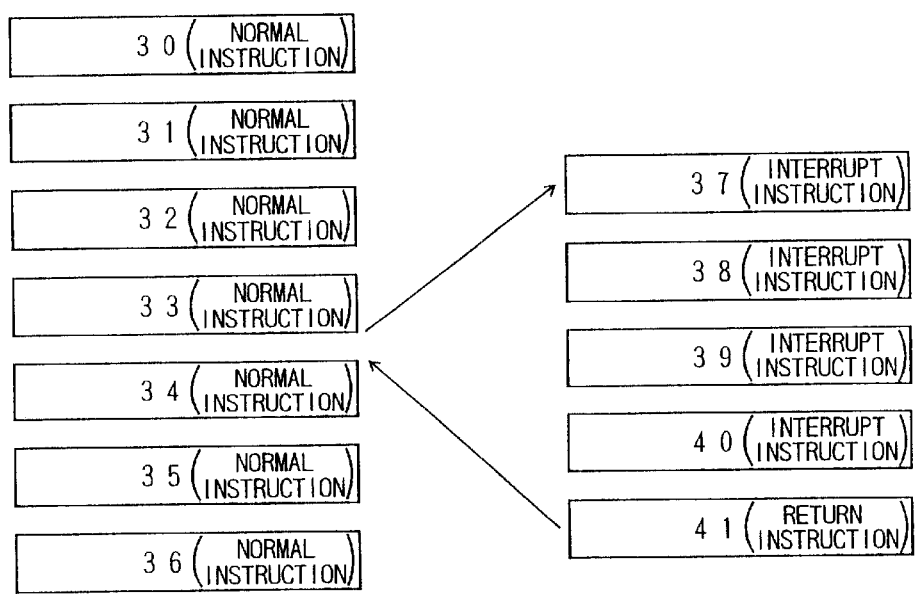
FIG. 75 is a concept diagram showing interrupt processing.
Figure 76:
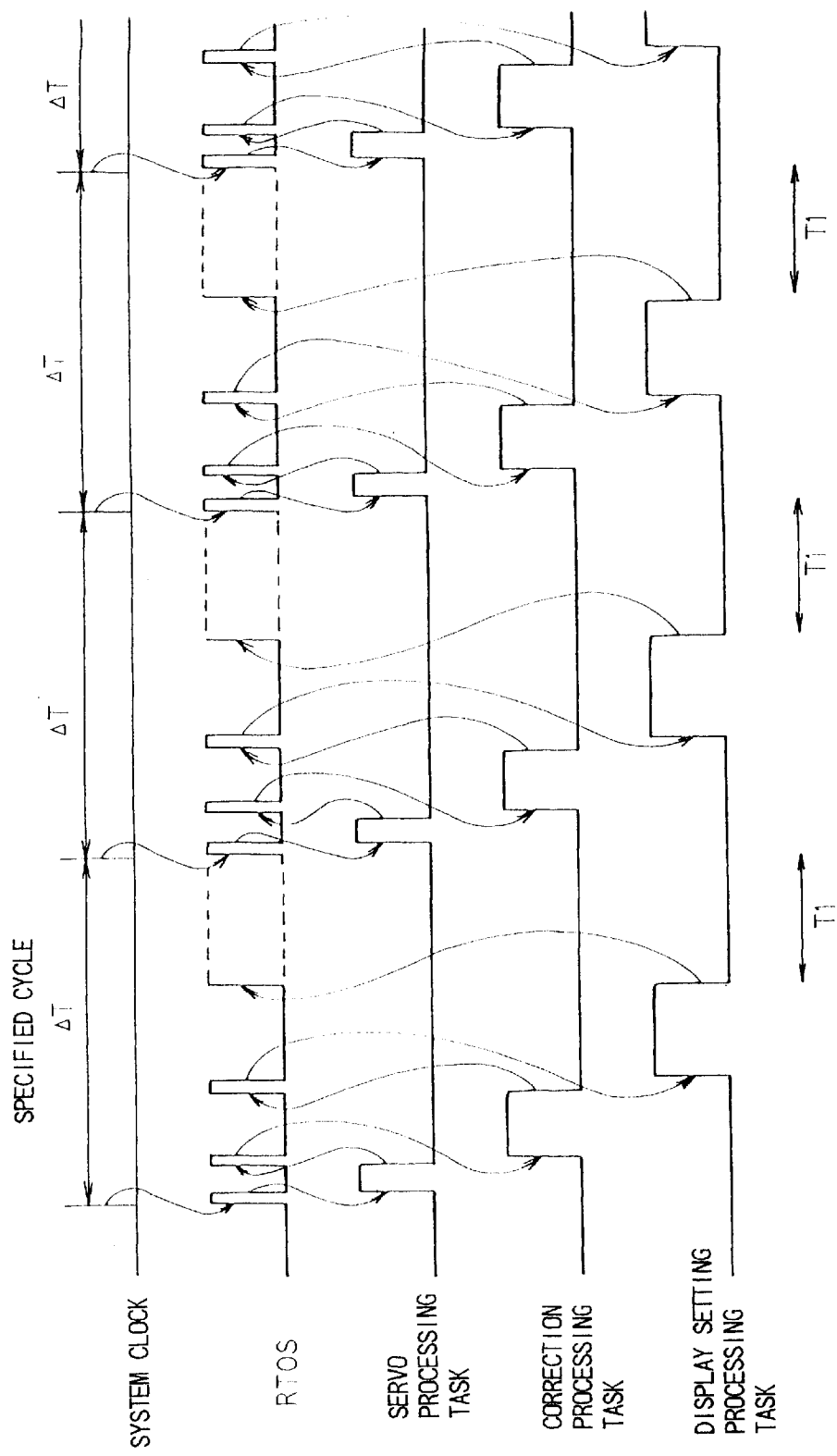
FIG. 76 is a timing chart showing a relation in terms of times between operations in each task.
Figure 77:
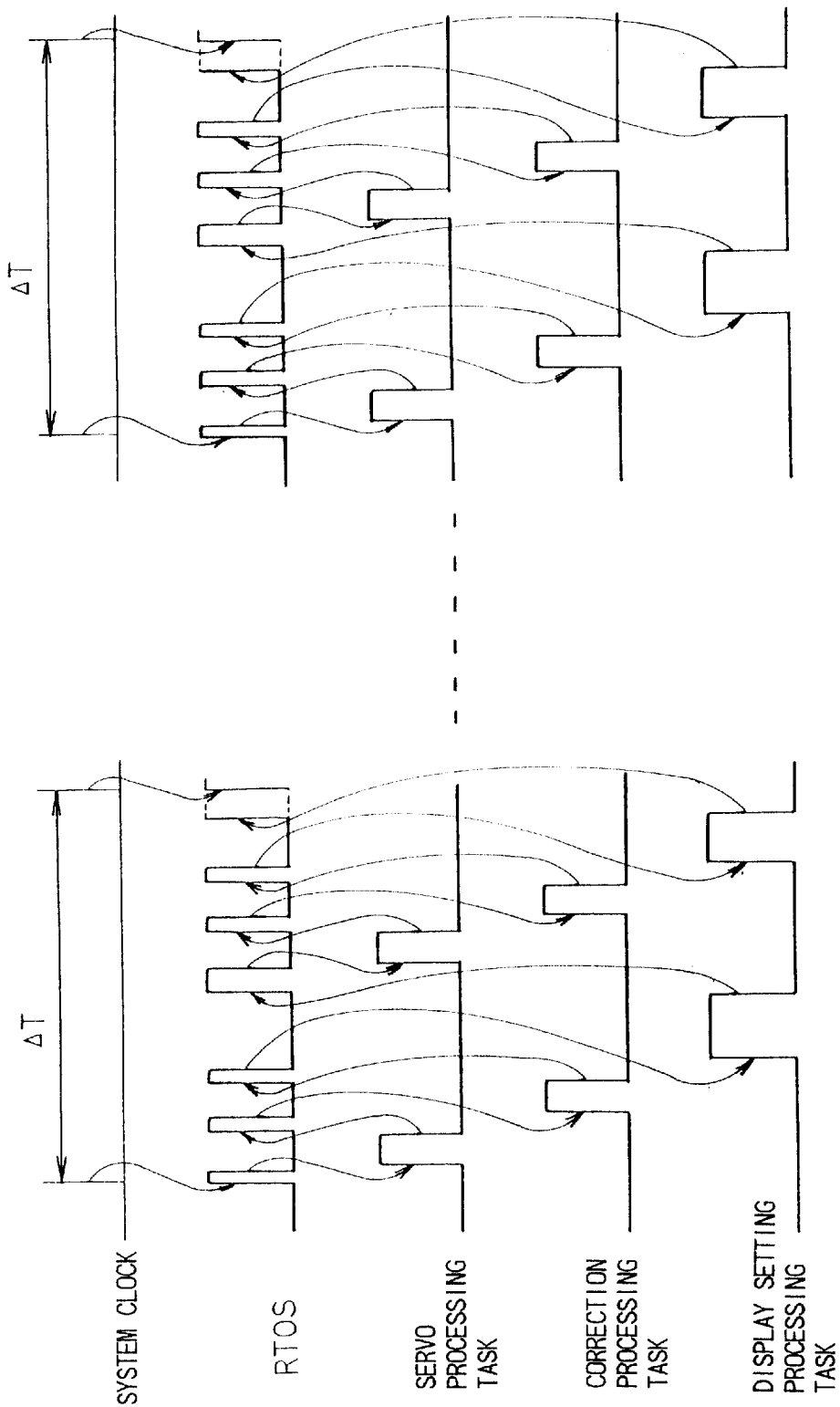
FIG. 77 is a timing chart showing a relation in terms of times between operations in each task.
Figure 79:
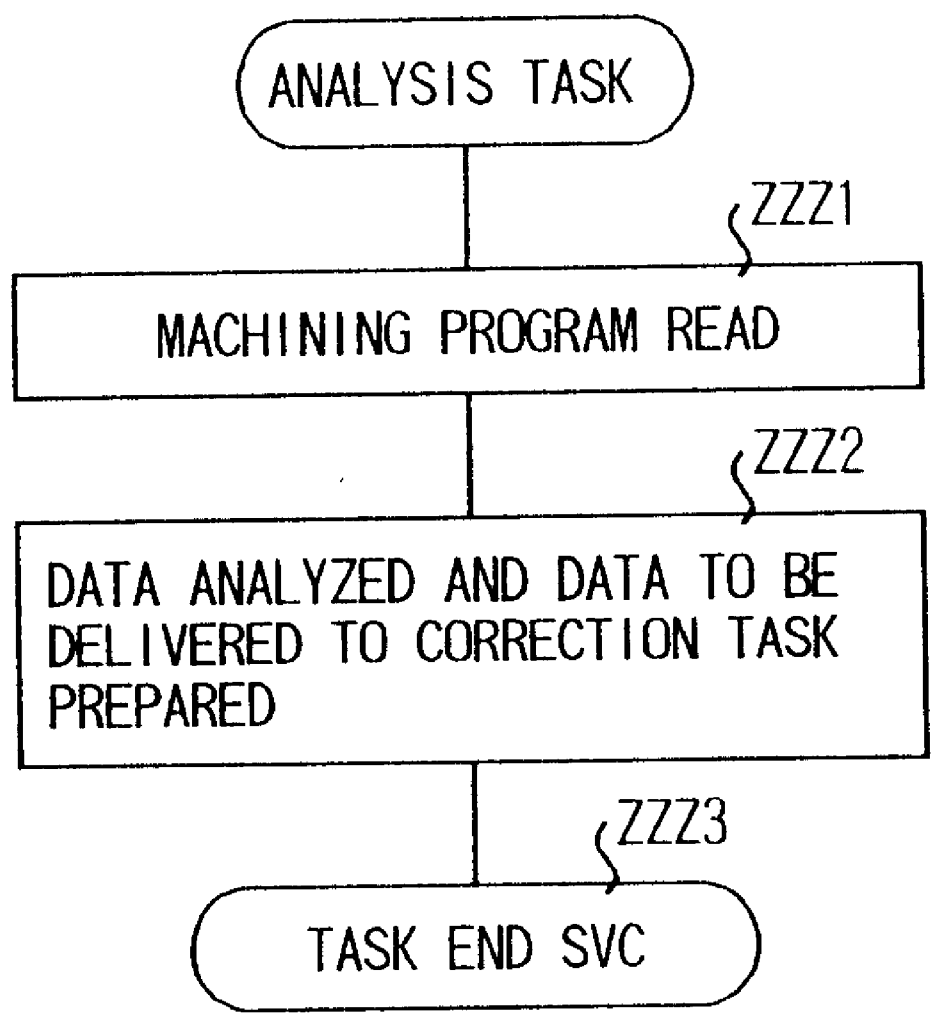
FIG. 79 is a flow chart showing a processing sequence for an analyzing task process.

FIG. 71 is a flow chart showing a processing of system clock interrupt processing. As for the system clock number memo 501, like in system clock interrupt processing in Embodiment 18 (Refer to FIG. 47), a valid flag is provided, and a processing for the system clock number memo 501 may be executed only when the valid flag is ON ("valid"), but for simplifying the following description, the processing is omitted in the flow chart described in relation to the present embodiment.

Step XX1 is a header step of interrupt processing executed when an interrupt is generated, and usually this processing is automatically executed by the CPU.

Step XX20 is a processing for subtracting 1 from a value of the dispatch clock number memo 509 as well as from a value of the system cock number memo 501 respectively, step XX21 is a processing for adding 1 to a value of the accumulated system clock number memo 503, and step XX22 is a processing for turning ON the skip flag. Herein the skip flag is provided on the RAM 4 and is used for indicating whether such a processing as scheduling is executed in association with the system clock interrupt or not.

Step XX23 is a processing for determining whether a value of the system clock number memo 501 has been reduced to zero (0) or not, and it is determined that the value has been reduced to zero (0), in step XX24, the task top processing shown in FIG. 41 is called. Then in step XX25, the skip flag is turned OFF. Herein the skip flag is provided on the RAM 4, and is used for determining whether a dispatch processing is to be called or not.

If it is determined in step XX23 that a value of the system clock number memo 501 is not zero (0), in step XX26 determination is made as to whether a value of the dispatch clock number memo 509 is zero (0) or not. As a result, if it is determined that the value is zero (0), in step XX27 the skip flag is turned OFF, and in step XX28, the dispatch clock number memo 509 is re-initialized by substituting a value of the dispatch clock number 508 into the dispatch clock number memo 509.

Step XX29 is a processing for determining whether the skip flag is ON or OFF, and in a case where the skip flag is ON, inhibition of interrupt is canceled in step XX30, then system control jumps the step XX7, and directly returns to the interrupted processing. In a case where the skip flag is OFF, system control jumps to step XX2, and an ordinary dispatch processing is executed.

In step XX2, an ICB not used yet is acquired from an ICB pool (a site for storing therein ICBs not used yet). In step XX3, an environment for execution of this interrupt processing (for the task itself) is stored in the ICB. This operation also includes storage of a header address for the processing in step XX8 as an address of an command to be executed next. In step XX4, the ICB prepared as described above is added to a queue matrix for ICB to be executed by the scheduler. In step XX5, inhibition of interrupt effected in step XX1 is canceled. From this step and On, an interrupt may be generated again. A error processing is executed to make a time of inhibition of interrupt as short as possible.

Step XX6 is a processing for determining whether the interrupted processing is interrupt processing, an operation of the RTOS, or a task in execution. step XX7 is a processing executed when the interrupted processing is interrupt processing or an operation by the RTOS, and in this case system directly control returns to the interrupted processing. Step XX8 is a processing executed in a case where the interrupted processing is a task in execution, and in this case at first a TCB for the interrupted task is searched out. In step XX9, an environment for execution of the interrupted task is stored in the TCB found in step XX8.

Step XX10 is a processing for checking whether the task stop clock memo 611 is ON or not. Step XX11 is a processing executed when the task stop clock memo 611 is ON, and a processing for terminating the task like that by the task stop SVC is executed. For instance, an operation for the task for status of the TCB is stopped, and the TCB queue matrix is switched to a queue matrix for stopped tasks.

Step XX12 is a processing executed when the task stop clock memo 611 is OFF, and a running clock number for the task is obtained from a difference between the accumulated clock number memo 503 and the task start clock memo, and the running clock number is subtracted from a stop clock number in the task stop table 600. In step XX13, the TCB prepared in step XX9 is added to the TCB queue matrix to be executed by the scheduler according to the priority. In step XX14, system control jumps to the scheduler.

Step XX15 is a processing to which system control returns from the scheduler. This processing is not always executed just after system control jumps to the scheduler, and sometimes the processing may be executed after other ICB has been executed, but anyhow system control returns to this step. The sequence from this step and on is interrupt processing originally specific to each interrupt, and contents of the processing varies according to a cause for interrupt. Step XX16 is a processing for terminating interrupt processing, and typically an command for returning to an ordinary subroutine is issued. With this command for return, system control returns to the ICB processing section in the scheduler.

Next, a description is made for operations of a scheduler in the control software execution system A28 for an NC unit according to the present embodiment. For convenience of description, it is assumed in the following description that in the present invention an idle task having the lowest priority and executing nothing to outside is always running.

Step YY1 is a processing for checking whether there is a queue matrix for interrupt processing (ICB) or not. Step YY2 is a processing executed when there is a queue matrix for interrupt processing, and to execute the queue matrix, at first an interrupt is inhibited. This operation is executed because, if an interrupt is generated and it is tried to add the interrupt to the queue matrix for interrupt processing during a processing of a list of queue matrix for interrupt processing, consistency of the list is lost.

In step YY3, a header ICB is removed from the list of queue matrix for interrupt processing. In step YY4, inhibition of an interrupt is canceled.

In step YY5, an environment for execution of interrupt processing such as an execution address or a register stored in step XX3 is taken out from the ICB removed in step YY3, and interrupt processing is executed. This is a processing executed in step XX15 (Refer to FIG. 71). Step YY6 is a step to which system control returns from step XX16, and an interrupt is inhibited again. In step YY7, the ICB removed in step YY3 is returned to the ICB pool. In step YY8, interrupt inhibition is canceled and then system control returns to step YY1. From this step and on, while there is a queue matrix for interrupt processing, a sequence from step YY1 to YY7 is repeated.

In step YY9, an interrupt is inhibited. In step YY10, a header TCB is acquired from the list of queue matrix for interrupt processing. In step YY11, in a case where a task of the TCB is the one having a stop clock number of zero or more in the task stop table 600, a value of the stop clock number for the task in the task stop table 600 is substituted into the system clock number memo 501.

When a period of time equivalent to the clock number set as described above, the system clock interrupt described in relation to FIG. 71 calls a processing for stopping execution of the task. In step YY12, inhibition of an interrupt is canceled. In step YY13, an environment for execution of a task stored in step XX9 (Refer to FIG. 71) is taken from the TCB acquired from the queue matrix (list) for task processing in step YY10, and the task is executed. Then system control jumps to the processing, and does not return to this step.

As described above, the control software execution system A28 for an NC unit according to Embodiment 28 is a system in which a function to limit a task running time is added to the RTOS having only an ordinary scheduling system according to dispatching priority, and executes control software for an NC unit according to the system.

With Embodiment 28, the control software execution system for an NC unit can limit a running time of a task realizing function of an NC unit. For this reason, a task never runs for a period of time longer than a time allocated to the task, and system construction becomes easier.

Next, a description is made for Embodiment of the present invention. The control software execution system A29 for an NC unit according to Embodiment 29 does not escape from execution of each task each time 1 block is executed in the conventional technology during execution of such a processing as a machining program analysis processing, but continues analysis so long as a machining program exists, and analysis is interrupted only due to a reason of timing.

Next description is made for a sequence of execution of a machining program analysis task by the control software execution system A29 for an NC unit according to Embodiment 29. Step Z1 is a header step in the machining program analysis task, and in this step determination is made as to whether all the blocks of a specified machining program have been analyzed or not.

Step Z2 is a processing executed in a case where it is determined that all the blocks of the machining program have been analyzed, and in this step a task end SVC is issued, and nothing is executed until the task is restarted again. Step Z3 is a processing executed when a block of a machining program not analyzed yet exists, and analysis of the block is executed. From this step and on, the processing in step Z1 is repeated until analysis of all blocks is over.

As described above, the control software execution system A29 for an NC unit according to Embodiment 29 continues a machining program analysis task so long as the program is running, and interrupts the analysis only for a time-related reason to execute the control software for an NC unit.

With Embodiment 29 described above, the control software execution system A29 for an NC unit runs or interrupts a task for analysis of a machining program according to a time-related reason, so that surplus of a processing time due to size of a block of a machining program is never generated, and improvement of the processing capability can be executed in analysis of a machining program for movement of minute linear sections. Furthermore when preparing a task, such complicated processing as terminating execution of a machining program each time a block is executed are not required.

As described above, with the control software execution system for an NC unit according to each embodiment of the present invention, control of tasks each realizing a function of the NC unit respectively by sharing can precisely be execute, so that a processing time required for each task can be optimized, and for this reason, waste of time can be reduced, which makes the entire processing time shorter. Also, the system has a means for determining by itself an error in the control software execution system for an NC unit, so that it is easy to suppress troubles caused by an error.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A control method for a control software execution system in which a scheduler for switching between different tasks is provided in a real time operating system in a memory and a plurality of tasks each for executing control software is executed according to task switch control by said scheduler, the method comprising the steps of:

changing a value stored in a counter with each cycle of a real time clock;

reading and recording a first value stored in said counter immediately before a task is started;

reading and recording a second value stored in said counter immediately after said task is finished;

computing a last running time for said task from said first and second values;

computing a total running time for said task from a previous total running time and said last running time; and recording said computed total running time.

2. A control method for a control software execution system in which a scheduler for switching between different tasks is provided in a real time operating system in a memory and a plurality of tasks each for executing control software is executed according to task switch control by said scheduler, the method comprising the steps of:

synchronizing operations of the control software execution system using a system clock having a system clock cycle not less than a time required to execute a task requiring a longest processing time;

computing a lapse of time from a current point of time to a point of time after which a task is to be run so that the task runs at a prespecified rate, said lapse of time being an integer multiple of a real time clock cycle that is a fraction of the system clock cycle;

writing said computed lapse of time in a counter;

making said task run after the lapse of time written in said counter has passed;

changing a value stored in a second counter with each cycle of the real time clock;

reading and recording a first value stored in said second counter immediately before a task is started;

reading and recording a second value stored in said second counter immediately after said task is finished computing a last running time for said task from said first and second values;

computing a total running time for said task from a previous total running time and said last running time;

recording said computed total running time;

executing interrupt processing when interrupt is generated with a task having higher dispatching priority order;

specifying an expected total running rate for each task;

specifying allowance for a difference between said specified expected total running rate and the actual running time;

computing an expected total running time from the expected running rate including the specified allowance; and determining an abnormal state of a task by comparing said expected total running time to the actual running time.

3. A control method for a control software execution system in which a scheduler for switching between different tasks is provided in a real time operating system in a memory and a plurality of tasks each for executing control software is executed according to task switch control by said scheduler, the method comprising the steps of:

synchronizing operations of the control software execution system using a system clock having a system clock cycle not less than a time required to execute a task requiring a longest processing time;

computing a lapse of time from a current point of time to a point of time after which a task is to be run so that the task runs at a prespecified rate, said lapse of time being an integer multiple of a real time clock cycle that is a fraction of the system clock cycle;

writing said computed lapse of time in a counter;

making said task run after the lapse of time written in said counter has passed;

changing a value stored in a second counter with each cycle of the real time clock;

reading and recording a first value stored in said second counter immediately before a task is started;

reading and recording a second value stored in said second counter immediately after said task is finished;

computing a last running time for said task from said first and second values;

computing a total running time for said task from a previous total running time and said last running time;

recording said computed total running time;

executing interrupt processing when interrupt is generated, with a task having higher dispatching order;

specifying an expected total running rate for each task;

specifying an allowance for a difference between said expected total running rate and the actual running time;

computing an expected total running time from the expected running rate including said specified allowance;

determining an abnormal state of a task by comparing said computed expected total running time to the actual running time;

determining whether or not said task is one affected by a tool;

selecting another tool if it has been determined that the task will be affected by the tool; and restarting execution of a machining program specified by said selected tool.

4. A control method for a control software execution system in which a scheduler for switching between different tasks is provided in a real time operating system in a memory and a plurality of tasks each for executing control software is executed according to task switch control by said scheduler, the method comprising the steps of:

synchronizing operations of the control software execution system using a system clock having a system clock cycle not less than a time required to execute a task requiring a longest processing time;

computing a lapse of time from a current point of time to a point of time after which a task is to be run so that the task runs at a prespecified rate, said lapse of time being an integer multiple of a real time clock cycle that is a fraction of the system clock cycle;

writing said computed lapse of time in a counter;

making said task run after the lapse of time written in said counter has passed;

changing a value stored in a second counter with each cycle of the real time reading and recording a first value stored in said second counter immediately before a task is started;

reading and recording a second value stored in said second counter immediately after said task is finished;

computing a last running time for said task from said first and second values;

computing a total running time for said task from a previous total running time and said last running time;

recording said computed total running time;

executing interrupt processing when interrupt is generated with a task having higher dispatching priority;

specifying an expected total running rate for each task;

specifying an allowance for a difference between said specified expected total running time and the actual running time;

computing an expected total running time from the expected running rate including said specified allowance;

determining an abnormal state of a task by comparing said computed expected total running time to the actual running time;

determining whether or not said task is one affected by a tool feed speed;

selecting another tool feed speed if it is determined that the task is affected by the tool feed speed; and restarting execution of a machining program specified by said selected tool feed speed.

5. A control method for executing control software so as to execute switching between different tasks using a scheduler which is independent of a task priority system in a real time operating system having a plurality of tasks in a memory, the method comprising:

synchronizing operations of the control software execution system using a system clock having a system clock cycle which is at least equal to a time required to execute that task requiring a longest processing time;

computing a time period from a first time to a second time after which a task is to be run so that a task runs according to a prespecified parameter from the first time, said time period being an integer multiple of a real time clock period which is a fraction of the system clock cycle;

writing the time period in a counter; and running a task after the time period written in the counter has passed.

6. A method according to claim 5 wherein said prespecified parameter is specified so that the task runs once in each cycle.

7. A method according to claim 5 wherein said prespecified parameter is specified so that the task runs at a prespecified rate.

8. A method according to claim 5 wherein said prespecified parameter is specified so that the task runs continuously.

9. A method according to claim 5 wherein said prespecified parameter is specified so that the task runs at a prespecified rate in a cycle.

10. A method according to claim 5 wherein said prespecified parameter is specified so that the task runs for a prespecified time in a cycle.

11. A control method for executing control software so as to execute switching between different tasks using a scheduler which is independent of a task priority system, in a real time operating system having a plurality of tasks in a memory, the method comprising:

synchronizing operations between an external event and a task of the control software execution system, using a system clock having a system clock cycle which is at least equal to a time required to execute that task requiring a longest processing time;

computing a time period from a first time to a second time after which a task is to be run so that a task runs according to a prespecified parameter from the current time, said time period being an integer multiple of a real time clock period which is a fraction of the system clock cycle;

writing the time period in a counter; and running a task after the time period written in the counter has passed.

* * * * *